US012372222B2

(12) United States Patent
Kopitzke et al.

(10) Patent No.: US 12,372,222 B2
(45) Date of Patent: *Jul. 29, 2025

(54) LIGHTING MODULE HAVING FIELD-REPLACEABLE OPTICS, IMPROVED COOLING, AND TOOL-LESS MOUNTING FEATURES

(71) Applicant: DMF, Inc., Carson, CA (US)

(72) Inventors: Frederick William Kopitzke, Long Beach, CA (US); Nolan Gunsolley, Aliso Viejo, CA (US); Amir Lotfi, Redondo Beach, CA (US); Benjamin Pin-Chun Chen, Lomita, CA (US)

(73) Assignee: DMF, Inc., Carson, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/171,379

(22) Filed: Feb. 20, 2023

(65) Prior Publication Data

US 2024/0035643 A1 Feb. 1, 2024

Related U.S. Application Data

(63) Continuation of application No. 17/384,564, filed on Jul. 23, 2021, now Pat. No. 11,585,517.

(Continued)

(51) Int. Cl.

*F21V 17/06* (2006.01)

*F21S 8/02* (2006.01)

(Continued)

(52) U.S. Cl.

CPC ................ *F21V 17/06* (2013.01); *F21S 8/02* (2013.01); *F21V 23/003* (2013.01);

(Continued)

(58) Field of Classification Search

CPC ........... F21V 17/06; F21V 29/508; F21S 8/02

See application file for complete search history.

(56) References Cited

U.S. PATENT DOCUMENTS

| | | | |
|---|---|---|---|
| 1,133,535 | A | 3/1915 | Cain et al. |
| 1,454,722 | A | 5/1923 | Boutin |

(Continued)

FOREIGN PATENT DOCUMENTS

| | | | |
|---|---|---|---|
| CA | 2243934 | C | 6/2002 |
| CA | 2502637 | A1 | 9/2005 |

(Continued)

OTHER PUBLICATIONS

2006 International Building Code, Section 712 Penetrations, Jan. 2006, 4 pages.

(Continued)

*Primary Examiner* — Christopher E Dunay

(74) *Attorney, Agent, or Firm* — Smith Baluch LLP

(57) ABSTRACT

A lighting module includes a heat sink with a sidewall and a partition defining two cavities, a LED light source disposed in one cavity to emit light, a driver module disposed in the other cavity with driver circuitry to provide electrical power to the light source, and an optical assembly to provide a desired emission profile. The optical assembly is field-changeable and includes a cover lens with snap-fit connectors to facilitate removal and replacement. The optical assembly further includes either a reflector coupled to the cover lens or an optical lens coupled to the heat sink via an optic holder. In some examples, the driver circuitry facilitates dimming of the light source. The heat sink also dissipates heat generated by the light source and the driver circuitry to maintain desired operating temperatures and thereby facilitate increased light output.

20 Claims, 96 Drawing Sheets

Related U.S. Application Data

(60) Provisional application No. 63/224,469, filed on Jul. 22, 2021, provisional application No. 63/188,221, filed on May 13, 2021, provisional application No. 63/175,101, filed on Apr. 15, 2021, provisional application No. 63/141,340, filed on Jan. 25, 2021, provisional application No. 63/076,323, filed on Sep. 9, 2020, provisional application No. 63/055,787, filed on Jul. 23, 2020.

(51) Int. Cl.
*F21V 23/00* (2015.01)
*F21V 29/508* (2015.01)
*H05B 45/10* (2020.01)
*F21Y 115/10* (2016.01)

(52) U.S. Cl.
CPC ........... *F21V 29/508* (2015.01); *H05B 45/10* (2020.01); *F21Y 2115/10* (2016.08)

(56) References Cited

U.S. PATENT DOCUMENTS 1,471,340 A 10/1923 Knight
1,856,356 A 5/1932 Owen
2,038,784 A 4/1936 Ghadiali
2,179,161 A 11/1939 Rambusch
2,197,737 A 4/1940 Appleton
2,352,913 A 7/1944 Morrill
2,528,989 A 11/1950 Ammells
2,597,595 A 5/1952 Ordas
2,642,246 A 6/1953 Larry
2,670,919 A 3/1954 Vincent
2,697,535 A 12/1954 Olson
2,758,810 A 8/1956 Good
D180,844 S 8/1957 Poliakoff
2,802,933 A 8/1957 Broadwin
2,998,512 A 8/1961 Duchene et al.
3,023,920 A 3/1962 Cook et al.
3,057,993 A 10/1962 Gellert
3,104,087 A 9/1963 Joseph et al.
3,214,126 A 10/1965 Roos
3,422,261 A 1/1969 McGinty
3,460,299 A 8/1969 Wilson
3,650,046 A 3/1972 Skinner
3,675,807 A 7/1972 Lund et al.
3,700,885 A 10/1972 Bobrick
3,711,053 A 1/1973 Drake
D227,989 S 7/1973 Geisel
3,773,968 A 11/1973 Copp
3,812,342 A 5/1974 Mcnamara
3,836,766 A 9/1974 Auerbach
3,874,035 A 4/1975 Schuplin
3,913,773 A 10/1975 Copp et al.
D245,905 S 9/1977 Taylor
4,088,827 A 5/1978 Kohaut
4,176,758 A 12/1979 Glick
4,280,169 A 7/1981 Allen
4,399,497 A 8/1983 Druffel
4,450,512 A 5/1984 Kristofek
4,460,948 A 7/1984 Malola
4,520,435 A 5/1985 Baldwin
4,539,629 A 9/1985 Poppenheimer
4,601,145 A 7/1986 Wilcox
4,667,840 A 5/1987 Lindsey
4,723,747 A 2/1988 Karp et al.
4,729,080 A 3/1988 Fremont et al.
4,754,377 A 6/1988 Wenman
4,770,311 A 9/1988 Wang
4,880,128 A 11/1989 Jorgensen
4,910,651 A 3/1990 Montanez
4,919,292 A 4/1990 Hsu
4,929,187 A 5/1990 Hudson et al.
4,930,054 A 5/1990 Krebs
D326,537 S 5/1992 Gattari
5,216,203 A 6/1993 Gower
5,222,800 A 6/1993 Chan et al.
5,239,132 A 8/1993 Bartow
5,250,269 A 10/1993 Langer et al.
5,266,050 A 11/1993 O'Neil et al.
5,291,381 A 3/1994 Price
5,303,894 A 4/1994 Deschamps et al.
5,382,752 A 1/1995 Reyhan et al.
5,420,376 A 5/1995 Rajecki et al.
5,465,199 A 11/1995 Bray et al.
5,505,419 A 4/1996 Gabrius
5,544,870 A 8/1996 Kelley et al.
5,560,101 A 10/1996 Sandell
5,562,343 A 10/1996 Chan et al.
5,571,993 A 11/1996 Jones et al.
5,580,158 A 12/1996 Aubrey et al.
5,588,737 A 12/1996 Kusmer
5,603,424 A 2/1997 Bordwell et al.
5,609,408 A 3/1997 Targetti
5,613,338 A 3/1997 Esposito
D381,111 S 7/1997 Lecluze
5,662,413 A 9/1997 Akiyama et al.
D386,277 S 11/1997 Lecluze
5,690,423 A 11/1997 Hentz et al.
D387,466 S 12/1997 Lecluze
5,738,436 A 4/1998 Cummings et al.
5,778,625 A 7/1998 Druffel et al.
5,836,678 A 11/1998 Wright et al.
5,942,726 A 8/1999 Reiker
5,944,412 A 8/1999 Janos et al.
5,957,573 A 9/1999 Wedekind et al.
5,975,323 A 11/1999 Turan
6,030,102 A 2/2000 Gromotka
6,082,878 A 7/2000 Doubek et al.
6,095,669 A 8/2000 Cho
6,098,945 A 8/2000 Korcz
6,105,334 A 8/2000 Monson et al.
6,161,910 A 12/2000 Reisenauer et al.
6,170,685 B1 1/2001 Currier
6,174,076 B1 1/2001 Petrakis et al.
6,176,599 B1 1/2001 Farzen
6,267,491 B1 7/2001 Parrigin
6,332,597 B1 12/2001 Korcz et al.
6,350,043 B1 2/2002 Gloisten
6,350,046 B1 2/2002 Lau
6,364,511 B1 4/2002 Cohen
6,375,338 B1 4/2002 Cummings et al.
6,402,112 B1 6/2002 Thomas et al.
6,423,899 B1 7/2002 Reiker
D461,455 S 8/2002 Forbes
6,461,016 B1 10/2002 Jamison et al.
6,474,846 B1 11/2002 Kelmelis et al.
6,491,413 B1 12/2002 Benesohn
D468,697 S 1/2003 Straub, Jr.
D470,970 S 2/2003 Huang
6,515,313 B1 2/2003 Ibbetson et al.
6,521,833 B1 2/2003 DeFreitas
D471,657 S 3/2003 Huang
6,583,573 B2 6/2003 Bierman
6,585,389 B2 7/2003 Bonazzi
6,600,175 B1 7/2003 Baretz et al.
D478,872 S 8/2003 Heggem
6,632,006 B1 10/2003 Rippel et al.
6,657,236 B1 12/2003 Thibeault et al.
6,666,419 B1 12/2003 Vrame
D488,583 S 4/2004 Benghozi
6,719,438 B2 4/2004 Sevack et al.
6,758,578 B1 7/2004 Chou
6,777,615 B1 8/2004 Gretz
6,779,908 B1 8/2004 Ng
6,827,229 B2 12/2004 Dinh et al.
6,838,618 B2 1/2005 Newbold et al.
6,906,352 B2 6/2005 Edmond et al.
D509,314 S 9/2005 Rashidi
6,948,829 B2 9/2005 Verdes et al.
6,958,497 B2 10/2005 Emerson et al.
6,964,501 B2 11/2005 Ryan
6,967,284 B1 11/2005 Gretz

(56) References Cited

U.S. PATENT DOCUMENTS

| | | | |
|---|---|---|---|
| D516,235 | S | 2/2006 | Rashidi |
| 7,025,477 | B2 | 4/2006 | Blessing |
| 7,064,269 | B2 | 6/2006 | Smith |
| D528,673 | S | 9/2006 | Maxik et al. |
| 7,102,172 | B2 | 9/2006 | Lynch |
| D531,740 | S | 11/2006 | Maxik |
| D532,532 | S | 11/2006 | Maxik |
| 7,148,420 | B1 | 12/2006 | Johnson et al. |
| 7,148,632 | B2 | 12/2006 | Berman et al. |
| 7,154,040 | B1 | 12/2006 | Tompkins |
| 7,170,015 | B1 | 1/2007 | Roesch et al. |
| D536,349 | S | 2/2007 | Humber et al. |
| D537,039 | S | 2/2007 | Pincek |
| D539,229 | S | 3/2007 | Murphey |
| 7,186,008 | B2 | 3/2007 | Patti |
| 7,190,126 | B1 | 3/2007 | Paton |
| 7,211,833 | B2 | 5/2007 | Slater, Jr. et al. |
| 7,213,940 | B1 | 5/2007 | Van De Ven et al. |
| 7,234,674 | B2 | 6/2007 | Rippel et al. |
| D547,889 | S | 7/2007 | Huang |
| D553,267 | S | 10/2007 | Yuen |
| D555,106 | S | 11/2007 | Pape et al. |
| D556,144 | S | 11/2007 | Dinh |
| 7,297,870 | B1 | 11/2007 | Sartini |
| 7,312,474 | B2 | 12/2007 | Emerson et al. |
| 7,320,536 | B2 | 1/2008 | Petrakis et al. |
| D561,372 | S | 2/2008 | Yan |
| D561,373 | S | 2/2008 | Yan |
| 7,335,920 | B2 | 2/2008 | Denbaars et al. |
| D563,896 | S | 3/2008 | Greenslate |
| 7,347,580 | B2 | 3/2008 | Blackman et al. |
| D570,012 | S | 5/2008 | Huang |
| 7,374,308 | B2 | 5/2008 | Sevack et al. |
| D570,504 | S | 6/2008 | Maxik et al. |
| D570,505 | S | 6/2008 | Maxik et al. |
| 7,399,104 | B2 | 7/2008 | Rappaport |
| 7,413,156 | B1 | 8/2008 | Cho |
| 7,429,025 | B1 | 9/2008 | Gretz |
| D578,677 | S | 10/2008 | Huang |
| 7,431,482 | B1 | 10/2008 | Morgan et al. |
| 7,432,440 | B2 | 10/2008 | Hull et al. |
| 7,442,883 | B2 | 10/2008 | Jolly et al. |
| 7,446,345 | B2 | 11/2008 | Emerson et al. |
| 7,470,048 | B2 | 12/2008 | Wu |
| 7,473,005 | B2 | 1/2009 | O'Brien |
| 7,488,097 | B2 | 2/2009 | Reisenauer et al. |
| 7,503,145 | B2 | 3/2009 | Newbold et al. |
| 7,524,089 | B2 | 4/2009 | Park |
| D591,894 | S | 5/2009 | Flank |
| 7,534,989 | B2 | 5/2009 | Suehara et al. |
| D596,154 | S | 7/2009 | Rivkin |
| 7,566,154 | B2 | 7/2009 | Gloisten et al. |
| D599,040 | S | 8/2009 | Alexander et al. |
| D600,836 | S | 9/2009 | Hanley et al. |
| 7,588,359 | B2 | 9/2009 | Coushaine et al. |
| 7,592,583 | B2 | 9/2009 | Page et al. |
| D606,696 | S | 12/2009 | Chen et al. |
| 7,625,105 | B1 | 12/2009 | Johnson |
| 7,628,513 | B2 | 12/2009 | Chiu |
| 7,651,238 | B2 | 1/2010 | O'Brien |
| 7,654,705 | B2 | 2/2010 | Czech et al. |
| D611,650 | S | 3/2010 | Broekhoff |
| 7,670,021 | B2 | 3/2010 | Chou |
| 7,673,841 | B2 | 3/2010 | Wronski |
| 7,677,766 | B2 | 3/2010 | Boyer |
| 7,692,182 | B2 | 4/2010 | Bergmann et al. |
| 7,699,283 | B2 | 4/2010 | Vrame |
| 7,704,763 | B2 | 4/2010 | Fujii et al. |
| D616,118 | S | 5/2010 | Thomas et al. |
| 7,712,922 | B2 | 5/2010 | Hacker et al. |
| 7,722,208 | B1 | 5/2010 | Dupre et al. |
| 7,722,227 | B2 | 5/2010 | Zhang et al. |
| 7,735,795 | B2 | 6/2010 | Wronski |
| 7,735,798 | B2 | 6/2010 | Kojima |
| 7,748,887 | B2 | 7/2010 | Zampini, II et al. |
| 7,766,518 | B2 | 8/2010 | Piepgras et al. |
| 7,769,192 | B2 | 8/2010 | Takagi et al. |
| 7,771,082 | B2 | 8/2010 | Peng |
| 7,771,094 | B2 | 8/2010 | Goode |
| D624,691 | S | 9/2010 | Zhang et al. |
| D624,692 | S | 9/2010 | Mackin et al. |
| D625,847 | S | 10/2010 | Maglica |
| D625,876 | S | 10/2010 | Chen et al. |
| D627,507 | S | 11/2010 | Lai et al. |
| D627,727 | S | 11/2010 | Alexander et al. |
| 7,828,465 | B2 | 11/2010 | Roberge et al. |
| D629,366 | S | 12/2010 | Ericson et al. |
| 7,845,393 | B2 | 12/2010 | Kao et al. |
| 7,857,275 | B2 | 12/2010 | de la Borbolla |
| 7,871,184 | B2 | 1/2011 | Peng |
| 7,874,539 | B2 | 1/2011 | Wright et al. |
| 7,874,703 | B2 | 1/2011 | Shastry et al. |
| 7,874,709 | B1 | 1/2011 | Beadle |
| D633,224 | S | 2/2011 | Lee |
| 7,909,487 | B1 | 3/2011 | Venetucci et al. |
| D636,117 | S | 4/2011 | Kim et al. |
| D636,118 | S | 4/2011 | Kim et al. |
| D636,903 | S | 4/2011 | Torenbeek |
| D637,339 | S | 5/2011 | Hasan et al. |
| D637,340 | S | 5/2011 | Hasan et al. |
| 7,950,832 | B2 | 5/2011 | Tanaka et al. |
| D639,499 | S | 6/2011 | Choi et al. |
| D640,819 | S | 6/2011 | Pan |
| 7,956,546 | B2 | 6/2011 | Hasnain |
| 7,959,332 | B2 | 6/2011 | Tickner et al. |
| 7,967,480 | B2 | 6/2011 | Pickard et al. |
| D642,317 | S | 7/2011 | Rashidi |
| 7,972,035 | B2 | 7/2011 | Boyer |
| 7,972,043 | B2 | 7/2011 | Schutte |
| D642,536 | S | 8/2011 | Robinson |
| D643,970 | S | 8/2011 | Kim et al. |
| 8,002,425 | B2 | 8/2011 | Russo et al. |
| D646,011 | S | 9/2011 | Rashidi |
| 8,013,243 | B2 | 9/2011 | Korcz et al. |
| 8,038,113 | B2 | 10/2011 | Fryzek et al. |
| D648,476 | S | 11/2011 | Choi et al. |
| D648,477 | S | 11/2011 | Kim et al. |
| D650,115 | S | 12/2011 | Kim et al. |
| 8,070,328 | B1 | 12/2011 | Knoble et al. |
| 8,096,670 | B2 | 1/2012 | Trott |
| D654,205 | S | 2/2012 | Rashidi |
| D656,262 | S | 3/2012 | Yoshinobu et al. |
| D656,263 | S | 3/2012 | Ogawa et al. |
| 8,142,057 | B2 | 3/2012 | Roos et al. |
| 8,152,334 | B2 | 4/2012 | Krogman |
| D658,788 | S | 5/2012 | Dudik et al. |
| D658,802 | S | 5/2012 | Chen |
| D659,862 | S | 5/2012 | Tsai |
| D659,879 | S | 5/2012 | Rashidi |
| D660,814 | S | 5/2012 | Wilson |
| 8,182,116 | B2 | 5/2012 | Zhang et al. |
| 8,201,968 | B2 | 6/2012 | Maxik et al. |
| D663,058 | S | 7/2012 | Pan |
| D663,466 | S | 7/2012 | Rashidi |
| D664,274 | S | 7/2012 | de Visser et al. |
| D664,705 | S | 7/2012 | Kong et al. |
| 8,215,805 | B2 | 7/2012 | Cogliano et al. |
| 8,220,970 | B1 | 7/2012 | Khazi et al. |
| 8,226,270 | B2 | 7/2012 | Yamamoto et al. |
| 8,235,549 | B2 | 8/2012 | Gingrich, III et al. |
| 8,240,630 | B2 | 8/2012 | Wronski |
| D667,155 | S | 9/2012 | Rashidi |
| 8,262,255 | B1 | 9/2012 | Rashidi |
| D668,372 | S | 10/2012 | Renshaw et al. |
| D668,809 | S | 10/2012 | Rashidi |
| D669,198 | S | 10/2012 | Qiu |
| D669,199 | S | 10/2012 | Chuang |
| D669,620 | S | 10/2012 | Rashidi |
| 8,277,090 | B2 | 10/2012 | Fryzek et al. |
| D671,668 | S | 11/2012 | Rowlette, Jr. et al. |
| 8,308,322 | B2 | 11/2012 | Santiago et al. |
| D672,899 | S | 12/2012 | Van de Ven et al. |
| D673,869 | S | 1/2013 | Yu |
| D676,263 | S | 2/2013 | Birke |

(56) References Cited

U.S. PATENT DOCUMENTS

D676,814 S 2/2013 Paul
8,376,593 B2 2/2013 Bazydola et al.
D677,417 S 3/2013 Rashidi
D677,634 S 3/2013 Korcz et al.
D679,044 S 3/2013 Jeswani et al.
D679,047 S 3/2013 Tickner et al.
8,403,289 B1 3/2013 Rinderer
8,403,533 B1 3/2013 Paulsel
8,403,541 B1 3/2013 Rashidi
8,405,947 B1 3/2013 Green et al.
D681,259 S 4/2013 Kong
8,408,759 B1 4/2013 Rashidi
D682,459 S 5/2013 Gordin et al.
D683,063 S 5/2013 Lopez et al.
D683,890 S 6/2013 Lopez et al.
D684,269 S 6/2013 Wang et al.
D684,287 S 6/2013 Rashidi
D684,719 S 6/2013 Rashidi
D685,118 S 6/2013 Rashidi
D685,120 S 6/2013 Rashidi
8,454,204 B1 6/2013 Chang et al.
D685,507 S 7/2013 Sun
D687,586 S 8/2013 Rashidi
D687,587 S 8/2013 Rashidi
D687,588 S 8/2013 Rashidi
D687,980 S 8/2013 Gravely et al.
D688,405 S 8/2013 Kim et al.
8,506,127 B2 8/2013 Russello et al.
8,506,134 B2 8/2013 Wilson et al.
D690,049 S 9/2013 Rashidi
D690,864 S 10/2013 Rashidi
D690,865 S 10/2013 Rashidi
D690,866 S 10/2013 Rashidi
D691,314 S 10/2013 Rashidi
D691,315 S 10/2013 Samson
D691,763 S 10/2013 Hand et al.
8,550,669 B2 10/2013 Macwan et al.
D693,043 S 11/2013 Schmalfuss et al.
D693,517 S 11/2013 Davis
D694,456 S 11/2013 Rowlette, Jr. et al.
8,573,816 B2 11/2013 Negley et al.
D695,441 S 12/2013 Lui et al.
D695,941 S 12/2013 Rashidi
D696,446 S 12/2013 Huh
D696,447 S 12/2013 Huh
D696,448 S 12/2013 Huh
8,602,601 B2 12/2013 Khazi et al.
D698,067 S 1/2014 Rashidi
D698,068 S 1/2014 Rashidi
8,622,361 B2 1/2014 Wronski
8,632,040 B2 1/2014 Mass et al.
D698,985 S 2/2014 Lopez et al.
D699,384 S 2/2014 Rashidi
D699,687 S 2/2014 Baldwin et al.
D700,387 S 2/2014 Snell
8,641,243 B1 2/2014 Rashidi
8,651,705 B2 2/2014 Wilcox
8,659,034 B2 2/2014 Baretz et al.
D700,991 S 3/2014 Johnson et al.
D701,175 S 3/2014 Baldwin et al.
D701,466 S 3/2014 Clifford et al.
8,672,518 B2 3/2014 Boomgaarden et al.
D702,867 S 4/2014 Kim et al.
D703,843 S 4/2014 Cheng
8,684,569 B2 4/2014 Pickard et al.
8,696,158 B2 4/2014 Santiago et al.
D705,472 S 5/2014 Huh
D705,481 S 5/2014 Zhang et al.
8,727,582 B2 5/2014 Brown et al.
D708,381 S 7/2014 Rashidi
8,777,449 B2 7/2014 Ven et al.
D710,529 S 8/2014 Lopez et al.
8,801,217 B2 8/2014 Oehle et al.
8,820,985 B1 9/2014 Tam et al.
8,833,013 B2 9/2014 Harman
8,845,144 B1 9/2014 Davis et al.
D714,989 S 10/2014 Rowlette, Jr. et al.
8,870,426 B2 10/2014 Biebl et al.
8,890,414 B2 11/2014 Rowlette, Jr. et al.
D721,845 S 1/2015 Lui et al.
8,926,133 B2 1/2015 Booth
8,939,418 B2 1/2015 Green et al.
D722,296 S 2/2015 Taylor
D722,977 S 2/2015 Hagarty
D722,978 S 2/2015 Hagarty
8,950,898 B2 2/2015 Catalano
D723,781 S 3/2015 Miner
D723,783 S 3/2015 Miner
D725,359 S 3/2015 Miner
D726,363 S 4/2015 Danesh
D726,949 S 4/2015 Redfern
D728,129 S 4/2015 Kreuzbichler
9,004,435 B2 4/2015 Wronski
9,039,254 B2 5/2015 Danesh
D731,689 S 6/2015 Bernard et al.
9,062,866 B1 6/2015 Christ et al.
9,065,264 B2 6/2015 Cooper et al.
9,068,719 B2 6/2015 Van De Ven et al.
9,068,722 B2 6/2015 Wronski et al.
D734,525 S 7/2015 Gordin et al.
D735,012 S 7/2015 Cowie
D735,142 S 7/2015 Hagarty
9,078,299 B2 7/2015 Ashdown
9,109,783 B1 8/2015 Davis et al.
D739,355 S 9/2015 D'Aubeterre
D739,590 S 9/2015 Redfern
9,140,441 B2 9/2015 Goelz et al.
D741,538 S 10/2015 Ghasabi
9,151,457 B2 10/2015 Pickard et al.
9,151,477 B2 10/2015 Pickard et al.
D742,325 S 11/2015 Leung
D743,079 S 11/2015 Adair
D744,723 S 12/2015 Yoo
9,217,560 B2 12/2015 Harbers et al.
9,222,661 B2 12/2015 Kim et al.
9,239,131 B1 1/2016 Wronski et al.
D750,317 S 2/2016 Lui et al.
9,285,103 B2 3/2016 Van De Ven et al.
9,291,319 B2 3/2016 Kathawate et al.
9,301,362 B2 3/2016 Dohn et al.
D754,078 S 4/2016 Baldwin et al.
D754,079 S 4/2016 Baldwin et al.
D754,605 S 4/2016 McMillan
9,303,812 B2 4/2016 Green et al.
9,310,038 B2 4/2016 Athalye
9,322,543 B2 4/2016 Hussell et al.
9,347,655 B2 5/2016 Boomgaarden et al.
9,366,418 B2 6/2016 Gifford
9,371,966 B2 6/2016 Rowlette, Jr. et al.
D762,181 S 7/2016 Lin
9,395,051 B2 7/2016 Hussell et al.
D762,906 S 8/2016 Jeswani et al.
D764,079 S 8/2016 Wu
9,417,506 B1 8/2016 Tirosh
9,423,110 B1 8/2016 Newton et al.
D766,185 S 9/2016 Hagarty
9,447,917 B1 9/2016 Wronski et al.
9,447,953 B2 9/2016 Lawlor
D768,325 S 10/2016 Xu
D768,326 S 10/2016 Guzzini
D769,501 S 10/2016 Jeswani et al.
D770,065 S 10/2016 Tittle
9,476,552 B2 10/2016 Myers et al.
D774,676 S 12/2016 Ng
D776,324 S 1/2017 Gierl et al.
D777,967 S 1/2017 Redfern
9,534,751 B2 1/2017 Maglica et al.
D778,241 S 2/2017 Holbrook et al.
D778,484 S 2/2017 Guzzini
D779,100 S 2/2017 Redfern
9,581,302 B2 2/2017 Danesh
9,599,315 B1 3/2017 Harpenau et al.
9,605,842 B1 3/2017 Davis
9,605,910 B2 3/2017 Swedberg et al.

(56) References Cited

U.S. PATENT DOCUMENTS

| | | | |
|---|---|---|---|
| D785,228 | S | 4/2017 | Guzzini |
| D786,472 | S | 5/2017 | Redfern |
| D786,473 | S | 5/2017 | Dean |
| D786,474 | S | 5/2017 | Fujisawa |
| D788,330 | S | 5/2017 | Johnson et al. |
| D790,102 | S | 6/2017 | Guzzini |
| 9,673,597 | B2 | 6/2017 | Lee |
| 9,689,541 | B2 | 6/2017 | Wronski |
| D791,709 | S | 7/2017 | Holton |
| D791,711 | S | 7/2017 | Holton |
| D791,712 | S | 7/2017 | Holton |
| 9,702,516 | B1 | 7/2017 | Vasquez et al. |
| D795,820 | S | 8/2017 | Wengreen |
| 9,732,947 | B1 | 8/2017 | Christ et al. |
| 9,739,464 | B2 | 8/2017 | Wronski |
| D799,105 | S | 10/2017 | Eder et al. |
| D800,957 | S | 10/2017 | Eder et al. |
| 9,791,111 | B1 | 10/2017 | Huang et al. |
| 9,797,562 | B2 | 10/2017 | Dabiet et al. |
| 9,803,839 | B2 | 10/2017 | Visser et al. |
| D805,660 | S | 12/2017 | Creasman et al. |
| 9,854,642 | B2 | 12/2017 | Kashani |
| D809,176 | S | 1/2018 | Partington |
| 9,860,961 | B2 | 1/2018 | Chemel et al. |
| 9,863,619 | B2 | 1/2018 | Mak |
| D809,465 | S | 2/2018 | Keirstead |
| 9,903,569 | B2 | 2/2018 | O'Brien et al. |
| 9,945,548 | B2 | 4/2018 | Williams et al. |
| 9,964,266 | B2 | 5/2018 | Danesh |
| D820,494 | S | 6/2018 | Cohen |
| D821,615 | S | 6/2018 | Trice |
| D821,627 | S | 6/2018 | Ko |
| 9,995,441 | B2 | 6/2018 | Power et al. |
| D822,505 | S | 7/2018 | Gibson et al. |
| D824,494 | S | 7/2018 | Martins et al. |
| D825,829 | S | 8/2018 | Guo |
| 10,041,638 | B2 | 8/2018 | Vasquez et al. |
| 10,054,274 | B2 | 8/2018 | Athalye et al. |
| D827,903 | S | 9/2018 | Wu |
| 10,072,805 | B2 | 9/2018 | Bailey |
| D832,218 | S | 10/2018 | Wronski et al. |
| D833,977 | S | 11/2018 | Danesh et al. |
| 10,125,959 | B2 | 11/2018 | Cohen |
| 10,139,059 | B2 | 11/2018 | Danesh |
| D836,976 | S | 1/2019 | Reese et al. |
| 10,244,607 | B1 | 3/2019 | Kashani |
| D847,414 | S | 4/2019 | Danesh et al. |
| D847,415 | S | 4/2019 | Danesh et al. |
| 10,247,390 | B1 | 4/2019 | Kopitzke, IV |
| D848,375 | S | 5/2019 | Danesh et al. |
| 10,281,131 | B2 | 5/2019 | Cohen |
| 10,295,163 | B1 | 5/2019 | Cohen |
| D850,695 | S | 6/2019 | Dabiet et al. |
| D851,046 | S | 6/2019 | Peng et al. |
| 10,408,395 | B2 | 9/2019 | Danesh |
| 10,408,396 | B2 | 9/2019 | Wronski et al. |
| 10,408,436 | B2 | 9/2019 | Wronski et al. |
| D863,661 | S | 10/2019 | Tian et al. |
| D864,877 | S | 10/2019 | Danesh |
| D867,653 | S | 11/2019 | Gorman |
| 10,488,000 | B2 | 11/2019 | Danesh et al. |
| 10,551,044 | B2 | 2/2020 | Peng et al. |
| 10,563,850 | B2 | 2/2020 | Danesh |
| D877,957 | S | 3/2020 | Kopitzke, IV |
| 10,591,120 | B2 | 3/2020 | Bailey et al. |
| 10,609,785 | B1 | 3/2020 | Fardadi et al. |
| D880,733 | S | 4/2020 | Lo et al. |
| D883,562 | S | 5/2020 | Hu |
| D885,648 | S | 5/2020 | Zeng |
| D885,649 | S | 5/2020 | Mclaughlin, III et al. |
| 10,663,127 | B2 | 5/2020 | Danesh et al. |
| 10,663,153 | B2 | 5/2020 | Nikooyan et al. |
| D888,313 | S | 6/2020 | Xie et al. |
| 10,683,994 | B2 | 6/2020 | Wronski et al. |
| 10,684,003 | B2 | 6/2020 | Wronski et al. |
| D890,410 | S | 7/2020 | Stanford et al. |
| 10,704,745 | B2 | 7/2020 | Sherry et al. |
| D892,069 | S | 8/2020 | Cohen |
| 10,753,558 | B2 | 8/2020 | Danesh |
| 10,808,917 | B2 | 10/2020 | Harris et al. |
| 10,816,148 | B2 | 10/2020 | Danesh |
| D901,398 | S | 11/2020 | Danesh et al. |
| D901,745 | S | 11/2020 | Yang |
| D902,871 | S | 11/2020 | Danesh et al. |
| D903,605 | S | 12/2020 | Danesh et al. |
| D905,327 | S | 12/2020 | Williams et al. |
| D907,284 | S | 1/2021 | Danesh et al. |
| D910,223 | S | 2/2021 | Cohen |
| D917,401 | S | 4/2021 | Mohamed |
| 10,975,570 | B2 | 4/2021 | Shen |
| 10,982,829 | B2 | 4/2021 | Danesh |
| 11,015,785 | B1 | 5/2021 | Schubert |
| D922,331 | S | 6/2021 | Cohen |
| 11,022,259 | B2 | 6/2021 | Bailey et al. |
| 11,028,982 | B2 | 6/2021 | Danesh |
| 11,047,538 | B2 | 6/2021 | Danesh et al. |
| D924,467 | S | 7/2021 | Danesh et al. |
| D925,109 | S | 7/2021 | Danesh et al. |
| 11,060,705 | B1 | 7/2021 | Danesh et al. |
| 11,067,231 | B2 | 7/2021 | Lotfi et al. |
| 11,085,597 | B2 | 8/2021 | Danesh |
| 11,118,768 | B2 | 9/2021 | Danesh |
| D939,134 | S | 12/2021 | Danesh et al. |
| 11,231,154 | B2 | 1/2022 | Kopitzke et al. |
| D944,212 | S | 2/2022 | Peng et al. |
| 11,242,983 | B2 | 2/2022 | Danesh |
| 11,255,497 | B2 | 2/2022 | Danesh |
| 11,274,821 | B2 | 3/2022 | Danesh |
| 11,306,903 | B2 | 4/2022 | Young |
| 11,391,442 | B2 | 7/2022 | Danesh |
| 11,435,064 | B1 | 9/2022 | Danesh |
| 11,435,066 | B2 | 9/2022 | Danesh |
| 11,448,384 | B2 | 9/2022 | Nikooyan et al. |
| D966,877 | S | 10/2022 | Kopitzke et al. |
| D970,081 | S | 11/2022 | Kopitzke et al. |
| 11,585,517 | B2 | 2/2023 | Kopitzke et al. |
| D990,030 | S | 6/2023 | Young et al. |
| 11,668,455 | B2 | 6/2023 | Danesh et al. |
| 11,800,617 | B2 | 10/2023 | Kumar et al. |
| 11,808,430 | B2 | 11/2023 | Danesh |
| D1,012,864 | S | 1/2024 | Danesh et al. |
| 12,000,562 | B2 | 6/2024 | Danesh |
| 12,169,053 | B2 | 12/2024 | Lotfi et al. |
| 12,203,631 | B2 | 1/2025 | Kopitzke et al. |
| 12,209,736 | B2 | 1/2025 | Yong et al. |
| 2002/0172047 | A1 | 11/2002 | Ashley |
| 2003/0006353 | A1 | 1/2003 | Dinh et al. |
| 2003/0016532 | A1 | 1/2003 | Reed |
| 2003/0021104 | A1 | 1/2003 | Tsao |
| 2003/0092323 | A1 | 5/2003 | Chou |
| 2003/0161153 | A1 | 8/2003 | Patti |
| 2004/0001337 | A1 | 1/2004 | Defouw et al. |
| 2004/0120141 | A1 | 6/2004 | Beadle |
| 2004/0156199 | A1 | 8/2004 | Rivas et al. |
| 2005/0078474 | A1 | 4/2005 | Whitfield |
| 2005/0225966 | A1 | 10/2005 | Hartmann et al. |
| 2005/0227536 | A1 | 10/2005 | Gamache et al. |
| 2005/0231962 | A1 | 10/2005 | Koba et al. |
| 2005/0237746 | A1 | 10/2005 | Yiu |
| 2006/0005988 | A1 | 1/2006 | Jorgensen |
| 2006/0108137 | A1 | 5/2006 | Smith |
| 2006/0158873 | A1 | 7/2006 | Newbold et al. |
| 2006/0198126 | A1 | 9/2006 | Jones |
| 2006/0215408 | A1 | 9/2006 | Lee |
| 2006/0221620 | A1 | 10/2006 | Thomas |
| 2006/0237601 | A1 | 10/2006 | Rinderer |
| 2006/0243877 | A1 | 11/2006 | Rippel |
| 2006/0250788 | A1 | 11/2006 | Hodge et al. |
| 2006/0262536 | A1 | 11/2006 | Nevers |
| 2006/0262545 | A1 | 11/2006 | Piepgras et al. |
| 2007/0012847 | A1 | 1/2007 | Tai |
| 2007/0035951 | A1 | 2/2007 | Tseng |
| 2007/0121328 | A1 | 5/2007 | Mondloch et al. |
| 2007/0131827 | A1 | 6/2007 | Nevers et al. |

(56) References Cited

U.S. PATENT DOCUMENTS

2007/0185675 A1 8/2007 Papamichael et al.
2007/0200039 A1 8/2007 Petak
2007/0206374 A1 9/2007 Petrakis et al.
2008/0002414 A1 1/2008 Miletich et al.
2008/0112168 A1 5/2008 Pickard et al.
2008/0112170 A1 5/2008 Trott
2008/0112171 A1 5/2008 Patti et al.
2008/0130308 A1 6/2008 Behr et al.
2008/0137347 A1 6/2008 Trott et al.
2008/0165545 A1 7/2008 O'Brien
2008/0170404 A1 7/2008 Steer et al.
2008/0224008 A1 9/2008 Dal Ponte et al.
2008/0232116 A1 9/2008 Kim
2008/0247181 A1 10/2008 Dixon
2008/0285271 A1 11/2008 Roberge et al.
2009/0003009 A1 1/2009 Tessnow et al.
2009/0034261 A1 2/2009 Grove
2009/0080189 A1 3/2009 Wegner
2009/0086484 A1 4/2009 Johnson
2009/0097262 A1 4/2009 Zhang et al.
2009/0135613 A1 5/2009 Peng
2009/0141500 A1 6/2009 Peng
2009/0141506 A1 6/2009 Lan et al.
2009/0141508 A1 6/2009 Peng
2009/0147517 A1 6/2009 Li
2009/0161356 A1 6/2009 Negley et al.
2009/0237924 A1 9/2009 Ladewig
2009/0280695 A1 11/2009 Sekela et al.
2009/0283292 A1 11/2009 Lehr
2009/0290343 A1 11/2009 Brown et al.
2009/0310371 A1 12/2009 Goode
2010/0014282 A1 1/2010 Danesh
2010/0033095 A1 2/2010 Sadwick
2010/0061108 A1 3/2010 Zhang et al.
2010/0067226 A1* 3/2010 Higuchi .................. F21V 29/75 362/235
2010/0110690 A1 5/2010 Hsu et al.
2010/0110698 A1 5/2010 Harwood et al.
2010/0110699 A1 5/2010 Chou
2010/0148673 A1 6/2010 Stewart et al.
2010/0149822 A1 6/2010 Cogliano et al.
2010/0165643 A1 7/2010 Russo et al.
2010/0244709 A1 9/2010 Steiner et al.
2010/0246172 A1 9/2010 Liu
2010/0259919 A1 10/2010 Khazi et al.
2010/0270903 A1 10/2010 Jao et al.
2010/0277905 A1 11/2010 Janik et al.
2010/0284185 A1 11/2010 Ngai
2010/0302778 A1 12/2010 Dabiet et al.
2010/0328956 A1 12/2010 Zhang
2011/0043040 A1 2/2011 Porter et al.
2011/0063831 A1 3/2011 Cook
2011/0068687 A1 3/2011 Takahasi et al.
2011/0069499 A1 3/2011 Trott et al.
2011/0080750 A1 4/2011 Jones et al.
2011/0116276 A1 5/2011 Okamura et al.
2011/0121756 A1 5/2011 Thomas et al.
2011/0134634 A1 6/2011 Gingrich, III et al.
2011/0134651 A1 6/2011 Berman
2011/0140633 A1 6/2011 Archenhold
2011/0170294 A1 7/2011 Mier-Langner et al.
2011/0194299 A1 8/2011 Crooks et al.
2011/0216534 A1 9/2011 Tickner et al.
2011/0226919 A1 9/2011 Fryzek et al.
2011/0255292 A1 10/2011 Shen
2011/0267828 A1 11/2011 Bazydola et al.
2011/0285314 A1 11/2011 Carney et al.
2012/0020104 A1 1/2012 Biebl et al.
2012/0074852 A1 3/2012 Delnoij
2012/0106176 A1 5/2012 Lopez et al.
2012/0113642 A1 5/2012 Catalano
2012/0140442 A1 6/2012 Woo et al.
2012/0140465 A1 6/2012 Rowlette, Jr. et al.
2012/0162994 A1 6/2012 Wasniewski et al.
2012/0182744 A1 7/2012 Santiago et al.
2012/0188762 A1 7/2012 Joung et al.
2012/0243237 A1 9/2012 Toda et al.
2012/0250321 A1 10/2012 Blincoe et al.
2012/0266449 A1 10/2012 Krupa
2012/0268688 A1 10/2012 Sato et al.
2012/0287625 A1 11/2012 Macwan et al.
2012/0305868 A1 12/2012 Callahan et al.
2012/0314429 A1 12/2012 Plunk
2013/0009552 A1 1/2013 Page
2013/0010476 A1 1/2013 Pickard et al.
2013/0016864 A1 1/2013 Ivey et al.
2013/0033872 A1 2/2013 Randolph et al.
2013/0050994 A1 2/2013 Pieper
2013/0051012 A1 2/2013 Oehle et al.
2013/0077307 A1 3/2013 Yamamoto
2013/0083529 A1 4/2013 Gifford
2013/0141913 A1 6/2013 Sachsenweger
2013/0155681 A1 6/2013 Nall et al.
2013/0163254 A1 6/2013 Chang et al.
2013/0170232 A1 7/2013 Park et al.
2013/0170233 A1* 7/2013 Nezu ....................... F21V 15/01 362/373
2013/0201699 A1* 8/2013 Kato ..................... F21V 23/006 362/382
2013/0227908 A1 9/2013 Gulbrandsen et al.
2013/0258677 A1 10/2013 Fryzek et al.
2013/0265750 A1 10/2013 Pickard et al.
2013/0271989 A1 10/2013 Hussell et al.
2013/0292149 A1 11/2013 Cooper
2013/0294084 A1 11/2013 Kathawate et al.
2013/0301252 A1 11/2013 Hussell et al.
2013/0322084 A1 12/2013 Ebisawa
2013/0335980 A1 12/2013 Nakasuji et al.
2014/0029262 A1 1/2014 Maxik et al.
2014/0036497 A1 2/2014 Hussell et al.
2014/0049957 A1 2/2014 Goelz et al.
2014/0063776 A1 3/2014 Clark et al.
2014/0063818 A1 3/2014 Randolph et al.
2014/0071679 A1 3/2014 Booth
2014/0071687 A1 3/2014 Tickner et al.
2014/0140490 A1 5/2014 Roberts et al.
2014/0233246 A1 8/2014 Lafreniere et al.
2014/0254177 A1 9/2014 Danesh
2014/0268836 A1 9/2014 Thompson
2014/0268869 A1 9/2014 Blessitt et al.
2014/0299730 A1 10/2014 Green et al.
2014/0301092 A1 10/2014 Wronski
2014/0313775 A1 10/2014 Myers et al.
2014/0321122 A1 10/2014 Domagala et al.
2014/0347848 A1 11/2014 Pisavadia et al.
2015/0029732 A1 1/2015 Hatch
2015/0078008 A1 3/2015 He
2015/0085495 A1 3/2015 Seki
2015/0085500 A1 3/2015 Cooper et al.
2015/0092449 A1 4/2015 Demuynck et al.
2015/0131301 A1 5/2015 Ho
2015/0138779 A1 5/2015 Livesay et al.
2015/0153635 A1 6/2015 Chen et al.
2015/0184837 A1 7/2015 Zhang et al.
2015/0198324 A1 7/2015 O'Brien et al.
2015/0219317 A1 8/2015 Gatof et al.
2015/0241039 A1 8/2015 Fryzek
2015/0263497 A1 9/2015 Korcz et al.
2015/0276185 A1 10/2015 Bailey et al.
2015/0308662 A1 10/2015 Vice et al.
2015/0345761 A1 12/2015 Lawlor
2015/0362159 A1 12/2015 Ludyjan
2016/0084488 A1 3/2016 Wu et al.
2016/0178181 A1 6/2016 LaDuca
2016/0209007 A1 7/2016 Belmonte et al.
2016/0238225 A1 8/2016 Rashidi Doust
2016/0308342 A1 10/2016 Witherbee et al.
2016/0348860 A1 12/2016 Danesh
2016/0366738 A1 12/2016 Boulanger et al.
2017/0003007 A1 1/2017 Wronski
2017/0005460 A1 1/2017 Lee
2017/0045213 A1 2/2017 Williams et al.
2017/0059135 A1 3/2017 Jones
2017/0138581 A1 5/2017 Doust

(56) References Cited

U.S. PATENT DOCUMENTS

| | | | |
|---|---|---|---|
| 2017/0167672 A1 | 6/2017 | Stauner et al. | |
| 2017/0167699 A1 | 6/2017 | Schubert et al. | |
| 2017/0198896 A1 | 7/2017 | May | |
| 2017/0284616 A1 | 10/2017 | Coakley et al. | |
| 2017/0307188 A1 | 10/2017 | Oudina et al. | |
| 2017/0307198 A1 | 10/2017 | Shah et al. | |
| 2018/0112857 A1 | 4/2018 | Wronski et al. | |
| 2018/0123351 A1 | 5/2018 | Andrews et al. | |
| 2018/0142871 A1 | 5/2018 | Morales | |
| 2018/0156431 A1 | 6/2018 | Zhuang et al. | |
| 2018/0216809 A1 | 8/2018 | Cohen | |
| 2018/0224095 A1 | 8/2018 | Cohen | |
| 2018/0283677 A1 | 10/2018 | Cohen | |
| 2019/0032874 A1 | 1/2019 | Bonnetto et al. | |
| 2019/0041050 A1 | 2/2019 | Cairns et al. | |
| 2019/0063724 A1 | 2/2019 | Vice, Jr. et al. | |
| 2019/0086043 A1 | 3/2019 | Wronski | |
| 2019/0195475 A1 | 6/2019 | Jones | |
| 2019/0195479 A1* | 6/2019 | Bonne | F21K 9/20 |
| 2019/0301710 A1 | 10/2019 | Harris | |
| 2019/0353341 A1 | 11/2019 | Spiro | |
| 2020/0049326 A1* | 2/2020 | Brown | F21V 23/06 |
| 2020/0182420 A1 | 6/2020 | Cohen et al. | |
| 2020/0323073 A1 | 10/2020 | Cartrette et al. | |
| 2020/0355334 A1 | 11/2020 | Shen et al. | |
| 2021/0010647 A1 | 1/2021 | Danesh et al. | |
| 2021/0045221 A1 | 2/2021 | Dejonge et al. | |
| 2021/0071833 A1 | 3/2021 | Hou et al. | |
| 2021/0080084 A1 | 3/2021 | Danesh et al. | |
| 2021/0085098 A1 | 3/2021 | Pacella | |
| 2021/0364139 A1 | 11/2021 | Danesh | |
| 2022/0018522 A1 | 1/2022 | Kopitzke et al. | |
| 2022/0018523 A1 | 1/2022 | Vinh et al. | |
| 2022/0034488 A1 | 2/2022 | Cohen | |
| 2022/0042664 A1 | 2/2022 | Lotfi et al. | |
| 2022/0082233 A1 | 3/2022 | Kopitzke et al. | |
| 2022/0085610 A1 | 3/2022 | Dejonge et al. | |
| 2022/0243883 A1 | 8/2022 | Cohen | |
| 2023/0040032 A1 | 2/2023 | Danesh et al. | |
| 2023/0125086 A1 | 4/2023 | Ungaro | |

FOREIGN PATENT DOCUMENTS

| | | | |
|---|---|---|---|
| CA | 2691480 | C | 4/2012 |
| CA | 2734369 | A1 | 10/2013 |
| CA | 2561459 | A1 | 11/2013 |
| CA | 2815067 | | 11/2013 |
| CA | 2848289 | A1 | 10/2014 |
| CA | 2998173 | | 7/2018 |
| CN | 2182475 | Y | 11/1994 |
| CN | 1309618 | A | 8/2001 |
| CN | 201059503 | Y | 5/2008 |
| CN | 201259125 | Y | 6/2009 |
| CN | 101608781 | A | 12/2009 |
| CN | 201636626 | U | 11/2010 |
| CN | 102062373 | A | 5/2011 |
| CN | 202014067 | U | 10/2011 |
| CN | 202392473 | U | 8/2012 |
| CN | 202733693 | U | 2/2013 |
| CN | 103307518 | A | 9/2013 |
| CN | 103322476 | A | 9/2013 |
| CN | 203202661 | U | 9/2013 |
| CN | 203215483 | U | 9/2013 |
| CN | 101498411 | B | 11/2013 |
| CN | 203273663 | U | 11/2013 |
| CN | 203297980 | U | 11/2013 |
| CN | 203628464 | U | 6/2014 |
| CN | 203641919 | U | 6/2014 |
| CN | 204300818 | U | 4/2015 |
| CN | 104654142 | A | 5/2015 |
| CN | 204513161 | U | 7/2015 |
| CN | 204611541 | U | 9/2015 |
| CN | 204786225 | U | 11/2015 |
| CN | 204829578 | U | 12/2015 |
| CN | 103712135 | B | 4/2016 |
| CN | 205606362 | U | 9/2016 |
| CN | 206130742 | U | 4/2017 |
| CN | 103154606 | B | 5/2017 |
| CN | 206222112 | U | 6/2017 |
| CN | 107013845 | A | 8/2017 |
| CN | 107084343 | A | 8/2017 |
| CN | 110671657 | A | 1/2020 |
| CN | 210536989 | U | 5/2020 |
| DE | 9109828 | U1 | 2/1992 |
| DE | 199 47 208 | | 5/2001 |
| EP | 1 589 289 | | 10/2005 |
| EP | 1 672 155 | A1 | 6/2006 |
| EP | 1688663 | A2 | 8/2006 |
| EP | 2 095 938 | A1 | 9/2009 |
| EP | 2 306 072 | A1 | 4/2011 |
| EP | 2 453 169 | A2 | 5/2012 |
| EP | 2 193 309 | B1 | 7/2012 |
| EP | 2 735 787 | A1 | 5/2014 |
| EP | 3 104 024 | A1 | 12/2016 |
| GB | 2325728 | A | 12/1998 |
| GB | 2427020 | A | 12/2006 |
| GB | 2466875 | A | 7/2010 |
| GB | 2471929 | A | 1/2014 |
| GB | 2509772 | A | 7/2014 |
| JP | H02113002 | U | 9/1990 |
| JP | 2007091052 | A | 4/2007 |
| JP | 2007265961 | A | 10/2007 |
| JP | 2011060450 | A2 | 3/2011 |
| JP | 2012064551 | A2 | 3/2012 |
| JP | 2015002027 | A2 | 1/2015 |
| JP | 2015002028 | A2 | 1/2015 |
| JP | 2016219335 | A | 12/2016 |
| JP | 2017107699 | A2 | 6/2017 |
| KR | 1020110008796 | A | 1/2011 |
| KR | 1020120061625 | A | 6/2012 |
| MX | 2011002947 | A | 9/2011 |
| TW | 474382 | U | 1/2002 |
| WO | WO 2013/128896 | A1 | 9/2013 |
| WO | WO 2015/000212 | A1 | 1/2015 |
| WO | WO 2016152166 | A2 | 9/2016 |
| WO | WO 2022/056180 | | 3/2022 |

OTHER PUBLICATIONS

Acrich COB Zhaga Module, Product Description, Seoul Semiconductor, Nov. 11, 2016, 39 pages.
<https://www.zhagastandard.org/books/book18/>, Mar. 2017, 5 pages. Accessed on May 14, 2018.
BXUV.Guideinfo, Fire Resistance Ratings—ANSI/UL 263, UL Online Certifications Directory, last updated Nov. 3, 2016, 27 pages.
CEYY. GuideInfo, Outlet Boxes and Fittings Certified for Fire Resistance, UL Online Certifications Directory, last updated May 16, 2013, 2 pages.
Canadian Office Action dated Dec. 23, 2013 from Canadian Application No. 2,778,581, 3 pages.
Canadian Office Action dated Mar. 22, 2016 from Canadian Application No. 2,879,629, 4 pages.
Canadian Office Action dated Dec. 6, 2016 from Canadian Application No. 2,879,629, 3 pages.
Canadian Office Action dated Mar. 9, 2017 from Canadian Application No. 2,931,588, 5 pages.
Canadian Office Action dated Feb. 1, 2016 from Canadian Application No. 2,879,486, 5 pages.
Canadian Office Action dated Jun. 12, 2017 from Canadian Application No. 2,927,601, 4 pages.
Canadian Office Action dated Aug. 11, 2017 from Canadian Application No. 2,941,051, 4 pages.
Cree LED Lamp Family Sales Sheet—Better light is beautiful light, Apr. 24, 2017, 2 pages.
DME Series Installation Instructions, Oct. 18, 2011, 2 pages.
DMF, Inc., "dmfLighting: LED Recessed Lighting Solutions," Info sheets, Mar. 15, 2012, 4 pages.
DMF, Inc., "dmfLighting: LED Recessed Downlighting," DRD2 Product Brochure, Oct. 23, 2014, 50 pages.
DMF, Inc., "dmfLighting: LED Recessed Downlighting," Product Catalog, Aug. 2012, 68 pages.

(56) References Cited

OTHER PUBLICATIONS

Halo, Halo LED H4 H7 Collection, SustainabLEDesign, Cooper Lighting, (emphasis on p. 18 "H7 Collection LED Modules—Halo Led H7 Module Features,") Mar. 28, 2012, 52 pages.
Halo, H7 LED Downlight Trims 49x Series, 6-inch LED Trims for Use with MI7x LED Modules, Cooper Lighting, ADV110422, rev. Aug. 12, 2011, 15 pages.
Halo, LED Module ML706x, Cooper Lighting, General Installation for All Modules/p. 1; Tether Installation/pp. 2-3; Installation into Halo H750x Series LED—only (Non-Screw Based), Recessed Fixture, p. 4, Oct. 20, 2009, 4 pages.
"Membrane Penetrations in Fire-Resistance Rated Walls," https://www.ul.com/wp-content/uploads/2014/04/ul_MembranePenetrations.pdf, Issue 1, 2009, published Feb. 26, 2010, 2 pages.
"Metallic Outlet Boxes," UL 514A, Underwriters Laboratories, Inc., Feb. 16, 2004 (Title Page Reprinted Aug. 10, 2007), 106 pages.
"Metallic and Non-metallic Outlet Boxes Used in Fire-rated Assembly," https://iaeimagazine.org/magazine/2000/09/16/metallic-and-non-metallic-outlet-boxes-used-in-fire-rated-assembly/, Sep. 16, 2000, 5 pages.
Notice of Allowance mailed Aug. 23, 2017 from Canadian Application No. 2,879,629, 1 page.
"Outlet Boxes for Use in Fire Rated Assemblies," https://www.ul.com/wp-content/uploads/2014/04/UI_outletboxes.pdf, Apr. 2007, 2 pages.
"Advanced LED Solutions," Imtra Marine Lighting. Jun. 17, 2011, 40 pages.
"Portland Bi-Color, Warm White/Red," item:ILIM30941.Imtra Marine Products. 2012. 3 pages. Accessed athttp://www.imtra.com:80/0ade25fb-3218-4cae-a926-6abe64ffd93a/lighting-light-fixtures-downlights-3-to-4-inches-detail.htm on Jan. 25, 2013.
"Cree LMH2 LED Modules," Mouser Electronics. Accesssed at www.mouser.com/new/cree/creelmh2 on Sep. 9, 2012. 2 pages.
"Cree LMH2 LED Module with TrueWhite Technology," Cree Product Family Data Sheet. Dec. 21, 2011. 3 pages.
"Cree LMH2 LED Modules Design Guide," Cree Product Design Guide. 2011. 20 pages.
"Undercabinet Pucks, Xyris Mini LED Puck Light," ELCO Lighting. Sep. 2018. 1 page.
"LED Undercabinet Pocket Guide," ELCO Lighting. Nov. 2, 2016. 12 pages.
"VERSI LED Mini Flush," Lithonia Lghting. Sep. 2013. 6 pages.
OneFrame Recessed LED Downlight. Dmflighting.com. Published Jun. 6, 2018. Retrieved at https://www.dmflighting.com/product/oneframe on Jun. 6, 2018. 11 pages.
International Search Report and Written Opinion in PCT/US2018/048357 mailed Nov. 14, 2018, 13 pages.
International Search Report and Written Opinion in International Patent Application No. PCT/US18/39048 mailed Dec. 14, 2018. 24 pages.
RACO 4 i+A882:C958n. Octagon Welded Concrete Ring, 3-½ in. Deep with ½ and ¾ in. Knockouts and ilcludes 890 cover (20-Pack). Model # 280. Accessed at https://www.homedepot.com/p/RACO-4-in-Octagon-Welded-Concrete-Ring-3-1-2-in-Deep-with-1-2-and-3-4-in-Knockouts-and-ilcludes-890-cover-20-Pack-280/203638679 on Jan. 18, 2019. 3 pages.
RACO 4 in. Octagon Welded Concrete Ring, 6 in. Deep with ½ and ¾ in. Knockouts (10-Pack). Model # 276. Accessed at https://www.homedepot.com/p/RACO-4-in-Octagon-Welded-Concrete-Ring-6-in-Deep-with-1-2-and-3-4-in-Knockouts-10-Pack-276/203638675 on Jan. 16, 2019. 4 pages.
International Search Report and Written Opinion in International Patent Application No. PCT/US18/62868 mailed Mar. 14, 2019, 13 pages.
CS&E PCT Collaborative Search and Examination Pilot Upload Peer Contribution in International Patent Application No. PCT/US18/62868 mailed Mar. 14, 2019, 61 pages.
International Search Report and Written Opinion in International Patent Application No. PCT/US18/67614 mailed Apr. 25, 2019, 20 pages.
CS&E PCT Collaborative Search and Examination Pilot Upload Peer Contribution in International Patent Application No. PCT/US18/67614 mailed Apr. 24, 2019, 53 pages.
Specification & Features 4" Octagonal Concrete Box Covers. Orbit Industries, Inc. Accessed at https://www.orbitelectric.com on May 6, 2019. 1 page.
4" Octagon Concrete Boxes and Back Plates. Appleton. Accessed at www.appletonelec.com on May 6, 2019. 1 page.
RACO Commercial, Industrial and Residential Electrical Products. Hubbell. Accessed at www.Hubbell-RTB.com on May 6, 2019. 356 pages.
Imtra Marine Lighting 2008 Catalog. 40 pages.
Imtra Marine Lighting 2009 Catalog. 32 pages.
Imtra Marine Lighting Spring 2007 Catalog. 36 pages.
Cooper Lighting Halo ML56 LED System Product Sheet. Mar. 2, 2015. Accessed at http://www.cooperindustries.com/content/dam/public/lighting/products/documents/halo/spec_sheets/halo-ml56600-80cri-141689-sss.pdf. 8 pages.
Kwikbrace® New Construction Braces for Lighting Fixtures or Ceiling Fans 1-½ in. Depth. Hubbel. Accessed at https://hubbellcdn.com/specsheet/926.pdf on Jun. 27, 2019. 1 page.
IC1JB Housing 4" IC-Rated New Construction Junction Box Housing. AcuityBrands. Accessed at https://www.acuitybrands.com/en/products/detail/845886/juno/ic1jb-housing/4-ic-rated-new-construction-junction-box-housing on Jun. 27, 2019, 4 pages.
International Search Report and Written Opinion in International Patent Application No. PCT/US19/32281 mailed Aug. 2, 2019, 18 pages.
Delhi Rehab & Nursing Facility ELM16-70884. Vertex Innovative Solutions Feb. 25, 2016. 89 pages.
SlimSurface surface mount downlighting. Philips Lightolier 2018. 8 pages.
Be seen in the best light. Lightolier by signify. Comprehensive 2019 Lighting Catalog. 114 pages.
Cree® LMR2 LED Module. Product Family Data Sheet Cree 2011. 3 pages.
International Search Report and Written Opinion in International Patent Application No. PCT/US2019/036477 mailed Oct. 17, 2019, 15 pages.
ML56 LED Lighting System 600 / 900 / 1200 Series Halo. Cooper Lighting Brochure 2015. Accessed at https://images.homedepot-static.com/catalog/pdfImages/06/06d28f93-4bf6-45be-a35a-a0239606f227.pdf. 41 pages.
Switch and Outlet Boxes and Covers Brochure. Appelton 2010. 77 pages.
Maxim Lighting Wafer Trifold Brochure LMXBRO1711 2017. Accessed at https://www.maximlighting.com/Upload/download/brochure/pdf/LMXBRO1711.pdf on Feb. 13, 2020. 2 pages.
Maxim Convert Fixture. LMXCAT 1805 Maxim Main Catalog 2018 p. 639.
Maxim Wafer. LMXCAT 1805 Maxim Main Catalog 2018 pp. 636-638.
Maxim Lighting Trim Trifold LMXBRO1905 2019. Accessed at https://www.maximlighting.com/Upload/download/brochure/pdf/LMXBRO1905.pdf on Feb. 13, 2020. 2 pages.
International Search Report and Written Opinion in International Patent Application No. PCT/US2019/054220 mailed Feb. 24, 2020, 23 pages.
LED Book Price Guide 2012. DMF Light. Issued Jun. 26, 2013. 3 pages.
DLER411 4" Recessed LED Retrofit Module. DMF Light. Issued Jun. 15, 2011. 1 page.
DLEI411 4" Recessed LED New Construction, IC. DMF Light. Issued Nov. 30, 2011. 1 page.
DLEIR411 4" Recessed LED Remodel, IC. DMF Light. Issued Jun. 15, 2011. 1 page.
3 & 4" DLE Ser ies LED Sample Case Now Available. DMF Light. Issued Jan. 6, 2012. 1 page.
DLEI3 3" Recessed LED New Construction, IC. DMF Light. Issued Nov. 30, 2011. 2 pages.
Ridgway-Barnes, SlimSurface LED Downlight: One of the thinnest LED surface mount downlights in the market. Philips Lighting Blog. Oct. 28, 2014. Accessed at http://applications.nam.lighting.

(56) References Cited

OTHER PUBLICATIONS philips.com/blog/index.php/2014/10/28/slimsurface-led-downlight-one-of-the-thinnest-led-surface-mount-downlights-in-the-market/. 3 pages.
SlimSurface LED S5R, S7R & S10R Round 5", 7" and 10" Apertures. Lightolier by Signify. Nov. 2018. 9 pages.
Maxim Lighting International, "Wafer LED 7" Rd 3000K Wall/Flush Mount", undated. 1 page.
Maxim Lighting International, "Convert LED Flush Mount", undated. 1 page.
Maxim Lighting International, "Views of the Wafer Flush Mount", undated. 1 page.
Maxim Lighting International, "Product/Drawing Specification Sheet" undated. 1 page.
International Search Report and Written Opinion in PCT/US2020/017331 mailed Jun. 22, 2020, 16 pages.
Taiwan Office Action and translation thereof dated Jun. 12, 2020 from Taiwan Application No. 108116564, 8 pages.
Access Lighting Installation Instructions. No. 20870LEDD/20871LEDD/20872LEDD. Dec. 16, 2019. 2 pages.
Model No. 20870LEDD-WH/ACR Infinite Specification Sheet. Access Lighting. Apr. 9, 2020. 1 page.
Dmf DRD2 Recessed LED Downlight General Retrofit Junction Box Dated: Dec. 18, 2015 Downloaded Jul. 28, 2018, from https://www.a lconlighting.com/specsheets/DMF/DRD2-Junction-Box-Retrofit-Spec-Sheet.pdf, 6 pages.
Dmf DRD2 Recessed LED Downlight General New Construction 4", 5", 6" Aperture Dated Aug. 31, 2016 Downloaded Jul. 28, 2018, from https://www. cansandfans.com/sites/default/files/DRD2-General-New-Construction-Spec-Sheet_7_0 .pdf , 9 pages.
Mar. 5, 2016—The DMF Lighting DRD2 Recessed LED Downlight General Retrofit Junction Box—Wet Location Rated is the ideal solution for Commercial LED recessed lighting retrofit applications. web cache https://ww w.alconlighting.com/dmf-drd2m.html (downloaded Jul. 28, 2018), 6 pages.
LED modules advance in performance, standardization questions persist (Magazine). LEDs Magazine. Oct. 29, 2013. Accessed at https://www.ledsmagazine.com/leds-ssl-design/modular-light-engines/article/16695073/led-modules-advance-in-performance-standardization-questions-persist-magazine. 9 pages.
Octagon Concrete Box Cover with (3) ½ in. & (2) ¾ in. Conduit Knockouts. Garvin. Accessed at https://www.garvinindustries.com/covers-and-device-rings/concrete-slab-box-covers-adaptor-rings/flat-covers-all-styles/cbp?gclid=Cj0KCQjw9b_4BRCMARIsADMUlyp Jc0K80UHdDTI9C5m4BDzR3U87PRYV1NdQIBFxEWQ21_3otTCTqEkaAi_DEALw_wcB on Jul. 20, 2020. 1 page.
Canadian Office Action in Application No. 2931588 dated Aug. 13, 2020, 5 pages.
International Search Report and Written Opinion in PCT/US2020/050767 mailed Dec. 9, 2020, 25 pages.
Canadian Office Action in Application No. 2941051 dated Dec. 8, 2020, 5 pages.
"Electrical Boxes" accessed at http://electrical-inspector.blogspot.com/2013/06/electrical-boxes.html Jun. 22, 2013 retrieved from Wayback Machine Archive.org on Jan. 25, 2021. 12 pages.
"Electrical Boxes Volume and Fill Calculations" accessed at http://electrical-inspector.blogspot.com/2013/06/electrical-boxes-Volume-and-Fill-Calculations.html Jun. 22, 2013 retrieved from Wayback Machine Archive.org on Jan. 25, 2021. 8 pages.
U.S. Appl. No. 61/881,162, filed Sep. 23, 2013. Priority application to US Publication No. 2015/0085500 to Cooper et al. 31 pages.
Canadian Notice of Allowance dated Nov. 23, 2022 from Canadian Application No. 3,102,022, 1 Page.
Canadian Office Action dated Dec. 19, 2022 from Canadian Application No. 3,135,470, 5 pages.
Canadian Office Action dated Dec. 16, 2022 from Canadian Application No. 3,130,524, 6 pages.
Chinese Office Action and English Translation in Chinese Application No. CN 202210354716.6, dated Jul. 29, 2023, 13 pages.
Canadian Office Action in Canadian Application No. CA 3,135,470, dated Jul. 27, 2023, 4 pages.
Whaling Museum Chooses Imtra LED Lighting for Popular Exhibit, LEDs Magazine Sep. 17, 2010; https://www.ledsmagazine.com/company-newsfeed/article/16690837/whaling-museum-chooses-imtra-led-lighting-for-popular-exhibit, 3 pages.
Imtra supplied its LED lighting to USA. Whaling Museum; LEDinside, Sep. 20, 2010, https://www.ledinside.com/news/2010/9/news_Imtra_LED_20100920, 1 page.
Final Office Action mailed Apr. 27, 2016 from U.S. Appl. No. 14/184,601, 19 pages.
Final Office Action mailed Jul. 26, 2017 from U.S. Appl. No. 14/184,601, 18 pages.
Final Office Action mailed Jan. 29, 2016 from U.S. Appl. No. 14/183,424, 21 pages.
Final Office Action mailed Jun. 23, 2016 from U.S. Appl. No. 13/484,901, 18 pages.
Final Office Action mailed Apr. 2, 2015 from U.S. Appl. No. 13/484,901, 13 pages.
Notice of Allowance mailed Mar. 26, 2018 for U.S. Appl. No. 14/184,601, 10 pages.
Non-Final Office Action mailed Mar. 15, 2010 from U.S. Appl. No. 12/100,148, 8 pages.
Non-Final Office Action mailed Apr. 30, 2010 from U.S. Appl. No. 12/173,232, 13 pages.
Non-Final Office Action mailed Sep. 5, 2014 from U.S. Appl. No. 13/791,087, 8 pages.
Non-Final Office Action mailed Jul. 20, 2015 from U.S. Appl. No. 14/184,601, 16 pages.
Non-Final Office Action mailed Dec. 15, 2016 from U.S. Appl. No. 14/184,601, 18 pages.
Non-Final Office Action mailed Feb. 6, 2018 from U.S. Appl. No. 15/167,682, 9 pages.
Non-Final Office Action mailed Sep. 15, 2015 from U.S. Appl. No. 13/484,901, 16 pages.
Non-Final Office Action mailed Oct. 16, 2014 from U.S. Appl. No. 13/484,901, 11 pages.
Non-Final Office Action mailed Sep. 6, 2017 from U.S. Appl. No. 14/726,064, 8 pages.
Non-Final Office Action mailed May 17, 2017 from U.S. Appl. No. 14/183,424, 20 pages.
Non-Final Office Action mailed Jun. 2, 2015 from U.S. Appl. No. 14/183,424, 20 pages.
Non-Final Office Action mailed Apr. 12, 2018 for U.S. Appl. No. 29/638,259, 5 pages.
Non-Final Office Action mailed May 16, 2018 for U.S. Appl. No. 15/132,875, 18 pages.
Notice of Allowance mailed Jan. 30, 2015 from U.S. Appl. No. 13/791,087, 9 pages.
Notice of Allowance mailed Jan. 16, 2015 from U.S. Appl. No. 29/467,026, 9 pages.
Notice of Allowance mailed Oct. 21, 2016 from U.S. Appl. No. 13/484,901, 7 pages.
Notice of Allowance mailed Mar. 24, 2016 from U.S. Appl. No. 14/247,149, 8 pages.
Notice of Allowance mailed May 22, 2018 from U.S. Appl. No. 14/183,424, 9 pages.
Notice of Allowance mailed May 10, 2018 from U.S. Appl. No. 14/726,064, 7 pages.
Notice of Allowance mailed Sep. 21, 2018 from U.S. Appl. No. 29/645,941, 5 pages.
Notice of Allowance mailed Oct. 4, 2018 from U.S. Appl. No. 15/947,065 , 9 pages.
Notice of Allowance mailed Sep. 19, 2018 from U.S. Appl. No. 15/167,682 , 7 pages.
Non-Final Office Action mailed Jun. 25, 2018 for U.S. Appl. No. 29/541,565, 10 pages.
Non-Final Office Action mailed Oct. 24, 2018 for U.S. Appl. No. 15/688,266, 14 pages.
Notice of Allowance mailed Oct. 9, 2018 from U.S. Appl. No. 29/653,142, 7 pages.
Notice of Allowance mailed Nov. 27, 2018 from U.S. Appl. No. 15/167,682, 11 pages.

(56) References Cited

OTHER PUBLICATIONS

Non-Final Office Action mailed Dec. 5, 2018 from U.S. Appl. No. 14/942,937, 13 pages.
Notice of Allowance mailed Jan. 2, 2019 from U.S. Appl. No. 29/541,565, 6 pages.
Notice of Allowance mailed Feb. 8, 2019 from U.S. Appl. No. 29/541,565, 5 pages.
Non-Final Office Action mailed Febraury 7, 2019 from U.S. Appl. No. 16/200,393, 32 pages.
Notice of Allowance mailed Jan. 28, 2019 from U.S. Appl. No. 29/664,471, 8 pages.
Non-Final Office Action mailed Jul. 24, 2018 from U.S. Appl. No. 29/638,259, 5 pages.
Final Office Action mailed Mar. 15, 2019 from U.S. Appl. No. 15/132,875, 15 pages.
Notice of Allowance mailed Apr. 1, 2019 from U.S. Appl. No. 15/167,682, 7 pages.
Non-Final Office Action mailed Apr. 4, 2019 from U.S. Appl. No. 29/678,482, 8 pages.
Notice of Allowance mailed Apr. 8, 2019 from U.S. Appl. No. 29/653,142, 8 pages.
Notice of Allowance mailed Apr. 17, 2019 from U.S. Appl. No. 29/678,478, 7 pages.
Final Office Action mailed Jun. 6, 2019 from U.S. Appl. No. 15/688,266, 7 pages.
Non-Final Office Action mailed Jun. 11, 2019 from U.S. Appl. No. 15/901,738, 6 pages.
Notice of Allowance mailed Jun. 12, 2019 from U.S. Appl. No. 16/016,040, 8 pages.
Ex-Parte Quayle Action mailed Jun. 27, 2019 from U.S. Appl. No. 29/683,730, 5 pages.
Notice of Allowance mailed Jul. 31, 2019 from U.S. Appl. No. 15/167,682 , 7 pages.
Supplemental Notice of Allowance mailed Aug. 5, 2019 from U.S. Appl. No. 15/947,065, 2 pages.
Notice of Allowance mailed Sep. 11, 2019 from U.S. Appl. No. 29/653,142, 6 pages.
Notice of Allowance mailed Sep. 19, 2019 from U.S. Appl. No. 16/016,040, 7 pages.
Corrected Notice of Allowance mailed Sep. 27, 2019 from U.S. Appl. No. 15/167,682 , 2 pages.
Final Office Action mailed Sep. 27, 2019 from U.S. Appl. No. 16/200,393, 34 pages.
Notice of Allowance mailed Feb. 15, 2019 from U.S. Appl. No. 15/947,065, 9 pages.
Notice of Allowance mailed Oct. 1, 2019 from U.S. Appl. No. 14/942,937, 7 pages.
Final Office Action mailed Oct. 3, 2019 from U.S. Appl. No. 29/678,482, 6 pages.
Corrected Notice of Allowance mailed Oct. 10, 2019 from U.S. Appl. No. 16/016,040, 2 pages.
Notice of Allowance mailed Oct. 16, 2019 from U.S. Appl. No. 15/132,875, 12 pages.
Non-Final Office Action mailed Dec. 30, 2019 from U.S. Appl. No. 16/653,497, 8 pages.
Notice of Allowance mailed Feb. 5, 2020 from U.S. Appl. No. 15/901,738, 8 pages.
Notice of Allowance mailed Feb. 5, 2020 from U.S. Appl. No. 29/678,482, 13 pages.
Final Office Action mailed Mar. 17, 2020 for U.S. Appl. 29/653,142, 13 pages.
Non-Final Office Action mailed Apr. 2, 2020 for U.S. Appl. No. 16/522,275, 21 pages.
Notice of Allowance mailed May 18, 2020 from U.S. Appl. No. 15/901,738, 7 pages.
Non-Final Office Action mailed May 20, 2020 for U.S. Appl. No. 15/688,266, 6 pages.
Non-Final Office Action mailed May 26, 2020 for U.S. Appl. No. 16/719,361, 10 pages.
Notice of Allowance mailed Apr. 9, 2020 from U.S. Appl. No. 16/653,497, 7 pages.
Notice of Allowance mailed Jul. 10, 2020 from U.S. Appl. No. 29/694,475, 6 pages.
Corrected Notice of Allowability mailed Oct. 25, 2018 from U.S. Appl. No. 14/183,424, 3 pages.
Ex Parte Quayle Office Action mailed Oct. 16, 2018 for U.S. Appl. No. 29/663,037, 7 pages.
Notice of Allowance mailed Nov. 19, 2018 from U.S. Appl. No. 29/663,037, 5 pages.
Notice of Allowance mailed Nov. 15, 2018 from U.S. Appl. No. 29/663,040, 5 pages.
Notice of Allowance mailed Jul. 20, 2020 from U.S. Appl. No. 29/648,046, 5 pages.
Notice of Allowance mailed Jul. 28, 2020 from U.S. Appl. No. 16/719,361, 8 pages.
Notice of Allowance mailed Jul. 29, 2020 from U.S. Appl. No. 16/522,275, 8 pages.
Non-Final Office Action mailed Aug. 19, 2020 for U.S. Appl. No. 16/886,365, 16 pages.
Notice of Allowance mailed Sep. 8, 2020 from U.S. Appl. No. 29/678,482, 5 pages.
Corrected Notice of Allowance mailed Sep. 11, 2020 from U.S. Appl. No. 16/719,361, 2 pages.
Corrected Notice of Allowance mailed Sep. 14, 2020 from U.S. Appl. No. 16/522,275, 2 pages.
Notice of Allowance mailed Sep. 22, 2020 from U.S. Appl. No. 29/683,730, 6 pages.
Notice of Allowance mailed Sep. 22, 2020 from U.S. Appl. No. 29/653,142, 6 pages.
Notice of Allowance mailed Oct. 27, 2020 from U.S. Appl. No. 29/648,046, 5 pages.
Notice of Allowance mailed Oct. 27, 2020 from U.S. Appl. No. 29/694,475, 5 pages.
Notice of Allowance mailed Nov. 10, 2020 from U.S. Appl. No. 29/688,143, 6 pages.
Notice of Allowance mailed Nov. 10, 2020 from U.S. Appl. No. 29/688,172, 6 pages.
Non-Final Office Action mailed Nov. 30, 2020 from U.S. Appl. No. 17/000,702, 7 pages.
Notice of Allowance mailed Dec. 2, 2020 from U.S. Appl. No. 29/746,262, 6 pages.
Non-Final Office Action mailed Dec. 16, 2020 from U.S. Appl. No. 17/080,080, 28 pages.
Final Office Action mailed Jan. 11, 2021 from U.S. Appl. No. 15/688,266, 7 pages.
Non-Final Office Action mailed Jan. 11, 2021 from U.S. Appl. No. 16/725,606, 7 pages.
Non-Final Office Action mailed Jan. 13, 2021 from U.S. Appl. No. 17/085,636, 14 pages.
Notice of Allowance mailed Jan. 15, 2021 from U.S. Appl. No. 17/000,702, 7 pages.
Notice of Allowance mailed Jan. 22, 2021 from U.S. Appl. No. 17/080,080, 14 pages.
Notice of Allowance mailed Jan. 22, 2021 from U.S. Appl. No. 16/886,365, 7 pages.
Final Office Action mailed Feb. 5, 2021 from U.S. Appl. No. 16/200,393, 7 pages.
Non-Final Office Action mailed Jan. 19, 2021 from U.S. Appl. No. 17/099,650, 15 pages.
Supplemental Notice of Allowance mailed Mar. 10, 2021 from U.S. Appl. No. 16/886,365, 2 pages.
Notice of Allowance mailed Apr. 6, 2021 from U.S. Appl. No. 16/200,393, 11 pages.
Non-Final Office Action mailed Apr. 12, 2021 from U.S. Appl. No. 29/694,475, 11 pages.
Notice of Allowance mailed Apr. 13, 2021 from U.S. Appl. No. 16/725,606, 7 pages.
Notice of Allowance mailed Apr. 26, 2021 from U.S. Appl. No. 17/080,080, 11 pages.
Corrected Notice of Allowance mailed Apr. 28, 2021 from U.S. Appl. No. 16/725,606, 2 pages.

(56) References Cited

OTHER PUBLICATIONS

Notice of Allowance mailed May 5, 2021 from U.S. Appl. No. 17/085,636, 8 pages.
Notice of Allowance mailed May 14, 2021 from U.S. Appl. No. 16/881,686, 8 pages.
Notice of Allowance mailed May 17, 2021 from U.S. Appl. No. 15/688,266, 9 pages.
Notice of Allowance mailed May 24, 2021 from U.S. Appl. No. 29/688,143, 6 pages.
Notice of Allowance mailed May 24, 2021 from U.S. Appl. No. 29/688,172, 6 pages.
Notice of Allowance mailed May 27, 2021 from U.S. Appl. No. 16/779,865, 9 pages.
Notice of Allowance mailed May 28, 2021 from U.S. Appl. No. 16/779,824, 11 pages.
Notice of Allowance mailed Jun. 1, 2021 from U.S. Appl. No. 16/719,361,7 pages.
Corrected Notice of Allowance mailed Jun. 21, 2021 from U.S. Appl. No. 16/779,865, 3 pages.
Non-Final Office Action mailed Jul. 14, 2021 from U.S. Appl. No. 17/118,742, 11 pages.
Notice of Allowance mailed Jul. 21, 2021 from U.S. Appl. No. 17/318,13 pages.
Supplemental Notice of Allowance mailed Aug. 13, 2021 1 from U.S. Appl. No. 16/779,824, 3 pages.
Supplemental Notice of Allowance mailed Aug. 19, 2021 1 from U.S. Appl. No. 17/318,193, 4 pages.
Notice of Allowance mailed Aug. 20, 2021 1 from U.S. Appl. No. 29/764,875, 5 pages.
Notice of Allowance mailed Sep. 16, 2021 from U.S. Appl. No. 16/779,865, 9 pages.
Non-Final Office Action mailed Oct. 18, 2021 from U.S. Appl. No. 29/696,830, 8 pages.
Notice of Allowance mailed Nov. 3, 2021 from U.S. Appl. No. 17/220,779, 7 pages.
Notice of Allowance mailed Nov. 5, 2021 1 from U.S. Appl. No. 17/318,193, 11 pages.
Non-Final Office Action mailed Nov. 5, 2021 from U.S. Appl. No. 17/379,748, 8 pages.
Notice of Allowance mailed Nov. 8, 2021 1 from U.S. Appl. No. 29/764,875, 5 pages.
Non-Final Office Action mailed Nov. 15, 2021 from U.S. Appl. No. 17/374,674, 7 pages.
Final Office Action mailed Nov. 16, 2021 from U.S. Appl. No. 17/099,650, 14 pages.
Notice of Allowance mailed Nov. 22, 2021 from U.S. Appl. No. 29/694,475, 7 pages.
Notice of Allowance mailed Nov. 24, 2021 from U.S. Appl. No. 17/234,421, 9 pages.
Non-Final Office Action mailed Nov. 30, 2021 from U.S. Appl. No. 17/395,522, 28 pages.
Non-Final Office Action mailed Dec. 1, 2021 from U.S. Appl. No. 16/883,144, 23 pages.
Corrected Notice of Allowance mailed Dec. 10, 2021 from U.S. Appl. No. 17/234,421, 2 pages.
Non-Final Office Action mailed Dec. 13, 2021 from U.S. Appl. No. 29/711,198, 8 pages.
Corrected Notice of Allowance mailed Jan. 11, 2022 from U.S. Appl. No. 29/694,475, 2 pages.
Corrected Notice of Allowance mailed Jan. 12, 2022 from U.S. Appl. No. 16/779,865, 9 pages.
Non-Final Office Action mailed Jan. 21, 2022 from U.S. Appl. No. 17/229,668, 5 pages.
Notice of Allowance from U.S. Appl. No. 17/379,748 mailed Feb. 16, 2022, 5 pages.
Notice of Allowance mailed Feb. 14, 2022 from U.S. Appl. No. 17/473,934, 9 pages.
Non-Final Office Action mailed Feb. 25, 2022 from U.S. Appl. No. 17/384,564 28 pages.
Notice of Allowance mailed Mar. 11, 2022 from U.S. Appl. No. 17/118,742 13 pages.
Notice of Allowance Mailed Apr. 27, 2022 from U.S. Appl. No. 16/883,144.
Notice of Allowance Mailed Apr. 27, 2022 from U.S. Appl. No. 17/374,674.
Notice of Allowance Mailed Apr. 27, 2022 from U.S. Appl. No. 17/473,934, 9 pages.
Notice of Allowance Mailed Jun. 7, 2022 from U.S. Appl. No. 29/683,638, 7 pages.
Non-Final Office Action mailed Jun. 20, 2022 from U.S. Appl. No. 17/381,147, 4 Pages.
Non-Final Office Action mailed Jun. 22, 2022 from U.S. Appl. No. 29/759,492, 6 Pages.
Notice of Allowance mailed Jul. 11, 2022 from U.S. Appl. No. 29/696,830, 5 Pages.
Final Office Action received Jul. 11, 2022 from U.S. Appl. No. 29/711,198 , 7 Pages.
Non-Final Office Action dated Oct. 25, 2022 from U.S. Appl. No. 17/099,650, 10 Pages.
Final Office Action dated Dec. 15, 2022 from U.S. Appl. No. 29/743,066, 16 pages.
Supplemental Notice of Allowance mailed Jan. 17, 2023 from U.S. Appl. No. 17/384,564 2 pages.
Office Action dated Jan. 24, 2023 from U.S. Appl. No. 17/677,300, 5 pages.
Notice of Allowance mailed Mar. 1, 2023 from U.S. Appl. No. 29/711,198, 7 pages.
Non-Final Office Action mailed Mar. 17, 2023 from U.S. Appl. No. 17/723,370, 5 pages.
Non-Final Office Action mailed Mar. 23, 2023 from U.S. Appl. No. 17/694,489, 9 pages.
Notice of Allowance mailed Mar. 29, 2023 from U.S. Appl. No. 17/666,441, 9 pages.
Notice of Allowance mailed Apr. 10, 2023 from U.S. Appl. No. 29/743,066, 7 pages.
Final Office Action mailed Apr. 12, 2023 from U.S. Appl. No. 29/759,492, 8 Pages.
Non-Final Office Action dated May 8, 2023 from U.S. Appl. No. 17/677,300 , 7 Pages.
Non-Final Office Action dated Jul. 7, 2023 from U.S. Appl. No. 17/826,847, 8 Pages.
Non-Final Office Action dated Aug. 31, 2023 from U.S. Appl. No. 17/379,489, 11 Pages.
Non-Final Office Action dated Oct. 5, 2023 from U.S. Appl. No. 17/328,214, 12 Pages.
Final Office Action dated Oct. 12, 2023 from U.S. Appl. No. 17/723,370, 25 Pages.
Non-Final Office Action dated Oct. 16, 2023 from U.S. Appl. No. 17/694,489, 17 Pages.
Non-Final Office Action dated Oct. 23, 2023 from U.S. Appl. No. 17/381,147, 4 Pages.
Petition for Inter Partes Review of U.S. Pat. No. 9,964,266 Pursuant to 37 C.F.R. § 42.100 et seq. *AMP Plus Inc. dbd ELCO Lighting* v. *DMF, Inc*, IPR2019-01094 filed May 17, 2019. 108 pages.
IPR2019-01094 Exhibit 1001. U.S. Pat. No. 9,964,266 ("the '266 Patent"). 14 pages.
IPR2019-01094 Exhibit 1002. Declaration of Eric Bretschneider, Ph.D. ("Bretschneider"). 107 pages.
IPR2019-01094 Exhibit 1003. Curriculum Vitae of Dr. Bretschneider. 11 pages.
IPR2019-01094 Exhibit 1004. Excerpts from the File History of U.S. Pat. No. 9,964,266. 105 pages.
IPR2019-01094 Exhibit 1005. Imtra 2011 Marine Lighting Catalog—Advanced LED Solutions ("Imtra 2011"). 40 pages.
IPR2019-01094 Exhibit 1006. Imtra 2007 Marine Lighting Catalog ("Imtra 2007"). 36 pages.
IPR2019-01094 Exhibit 1007. U.S. Pat. No. 9,366,418 ("Gifford"). 9 pages.
IPR2019-01094 Exhibit 1008. Declaration of Colby Chevalier ("Chevalier"). 89 pages.
IPR2019-01094 Exhibit 1009. U.S. Pat. No. 7,102,172 ("Lynch"). 41 pages.

(56) References Cited

OTHER PUBLICATIONS

IPR2019-01094 Exhibit 1010. Illuminating Engineering Society, ANSI RP-16-10, Nomenclature and Definitions for Illuminating Engineering (approved as an American National Standard Jul. 15, 2005, approved by the IES Board of Directors Oct. 15, 2005). 4 pages.
IPR2019-01094 Exhibit 1011. Underwriters Laboratories Inc. Standard for Safety, Standard UL- 8750, entitled Light Emitting Diode (LED) Equipment for Use in Lighting (1st ed. 2009). 5 pages.
IPR2019-01094 Exhibit 1012. Celanese CoolPoly® D5502 Thermally Conductive Liquid Crystalline Polymer Specification ("CoolPoly"). 1 page.
IPR2019-01094 Exhibit 1013. Illuminating Engineering Society of North America, IES Lighting Handbook (John E. Kaufman and Howard Haynes eds., Application vol. 1981) ("Lighting Handbook"). 5 pages.
IPR2019-01094 Exhibit 1014. California Energy Commission, PIER Lighting Research Program: Project 2.3 Low-profile LED Luminaires Final Report (Prepared by Lighting Research Center, Jan. 2005) ("Pier LRP"). 70 pages.
IPR2019-01094 Exhibit 1015. Jim Sinopoli, Using DC Power to Save Energy and End the War on Currents, GreenBiz (Nov. 15, 2012), https://www.greenbiz.com/news/2012/11/15/using-dc-power-save-energy-end-war-currents ("Sinopoli"). 6 pages.
IPR2019-01094 Exhibit 1016. Robert W. Johnson, "Thought Leadership White Paper: AC Versus DC Power Distribution" (Nov. 2012) ("Johnson"). 10 pages.
IPR2019-01094 Exhibit 1017. Lumileds, Luxeon Rebel General Purpose Product Datasheet, Specification DS64 (2016) ("Luxeon Rebel"). 26 pages.
IPR2019-01094 Exhibit 1018. U.S. Pat. No. 8,454,204 ("Chang"). 11 pages.
IPR2019-01094 Exhibit 1019. U.S. Department of Energy, CALiPER Benchmark Report: Performance of Incandescent A-Type and Decorative Lamps and LED Replacements (prepared by Pacific National Laboratory, Nov. 2008) ("CALiPER 2008"). 25 pages.
IPR2019-01094 Exhibit 1020. U.S. Pat. No. 3,836,766 ("Auerbach"). 13 pages.
IPR2019-01094 Exhibit 1021. U.S. Department of Energy, CALiPER Application Summary Report 16: LED BR30 and R30 Lamps (prepared by Pacific Northwest National Laboratory, Jul. 2012) ("CALiPER 2012"). 26 pages.
IPR2019-01094 Exhibit 1022. Sandia National Laboratories, Sandia Report: "The Case for a National Research Program on Semiconductor Lighting" (Jul. 2000) ("Haitz"). 24 pages.
IPR2019-01094 Exhibit 1023. Sylvania, Post Top Street Light LED Retrofit Kit Specification, LED40Post (2009) ("Sylvania"). 4 pages.
IPR2019-01094 Exhibit 1024. Webster's New Collegiate Dictionary (1973) ("Webster's"). 2 pages.
IPR2019-01094 Exhibit 1025. 3M Wire Connectors and Tools Catalog 2013 ("3M Catalog"). 22 pages.
IPR2019-01094 Exhibit 1026. Wakefield Semiconductor Heat Sinks and Thermal Products 1974 Catalog ("Wakefield"). 3 pages.
IPR2019-01094 Exhibit 1027. U.S. Department of Energy, Solid-State Lighting Research and Development Portfolio: Multi-Year Program Plan FY'07-FY'12 (prepared by Navigant Consulting, Inc., Mar. 2006) ("DOE 2006"). 129 pages.
IPR2019-01094 Exhibit 1028. U.S. Department of Energy, Solid-State Lighting ResearA1023:C1043elopment: Multi-Year Program Plan (Apr. 2013) ("DOE 2013"). 89 pages.
Declaration of Colby Chevalier from Central District of California Civil Docket for Case #: 2:18-cv-07090-CAS-GJS filed Jun. 3, 2019, signed Jun. 3, 2019. 2 pages.
Docket Listing in Inter Partes Review of U.S. Pat. No. 9,964,266. Docket Navegator *AMP Plus, Inc. d/b/a Elco Lighting et al* v. *DMF, Inc.* PTAB-IPR2019-01094. Downloaded Mar. 25, 2020. 4 pages.
Petition for Inter Partes Review of U.S. Pat. No. 9,964,266 Pursuant to 37 C.F.R. § 42.100 et seq. *AMP Plus Inc. dbd ELCO Lighting* v. *DMF, Inc*, PTAB-IPR2019-01500 filed Aug. 14, 2019. 99 pages.
Docket Listing in Inter Partes Review of U.S. Pat. No. 9,964,266 . *AMP Plus, Inc. d/b/a ELCO Lighting et al* v. *DMF, Inc.* PTAB-IPR2019-01500. Downloaded Mar. 25, 2020. 3 pages.
Civil Action No. 2:18-cv-07090. Complaint for Infringement and Unfair Competition. *DMF, Inc.* v. *AMP Plus, Inc. d/b/a ELCO Lighting*. 52 pages. Dated Aug. 15, 2018.
Docket Listing in Civil Action No. 2:18-cv-07090. *DMF, Inc.* v. *AMP Plus, Inc. d/b/a ELCO Lighting et al* CDCA-2-18-cv-07090. Downloaded on Mar. 25, 2020. 39 pages.
Civil Action No. 2:19-cv-4519.Complaint for Patent Infringement. *DMF, Inc.* v. *AMP Plus, Inc. d/b/a ELCO Lighting*. 23 pages dated May 22, 2019.
Docket Listing in Civil Action No. 2:19-cv-4519. *DMF Inc v. AMP Plus, Inc. d/b/a ELCO Lighting et al*CDCA-2-19-cv-04519. Downloaded on Mar. 25, 2020. 3 pages.
Decision Denying Institution of Inter Partes Review of U.S. Pat. No. 9,964,266 in IPR2019-01500 dated Mar. 17, 2020. 21 pages.
Defendants' Notice of Prior Art Pursuant to 35 U.S.C. § 282 in Civil Action No. 2:18-cv-07090-CAS-GJS dated Feb. 28, 2020. 7 pages.
Defendant AMP Plus, Inc.'s Opposition to DMF's Motion for Summary Judgement in Civil Action No. 2:18-cv-07090-CAS-GJS filed Feb. 10, 2020. 32 pages.
Declaration of Eric Bretschneider, Ph.D in Support of Amp Plus, Inc.'s Opposition to DMF, Inc.'s Motion for Partial Summary Judgment in Civil Action No. 2:18-cv-07090-CAS-GJS filed Feb. 10, 2020. 210 pages.
Plaintiff DMF's Reply in Support of Motion for Partial Summary Judgment in Civil Action No. 2:18-cv-07090-CAS-GJS filed Feb. 18, 2020. 33 pages.
Declaration of James R. Benya In Support of Plaintiff DMF's Motion for Summary Judgment in Civil Action No. 2:18-cv-07090-CAS-GJS filed Feb. 3, 2020. 193 pages.
Underwriters Laboratories Inc. Standard for Safely. UL 1598. Luminaires Feb. 11, 2020. 12 pages.
Exceptional LED Lighting Technology Product Portfolio. LightingScience 2012. 11 pages.
"Cree LMH2 Led Modules," Mouser Electronics. Sep. 9, 2012. 4 pages.
Slim Line Disc. EYE LEDs Specification Sheet 2012. 2 pages.
HiBay LED Heat Sink. Wakefield-vette. Dec. 11, 2017. 1 pages.
Thermal Management of Cree® XLamp® LEDs. Cree Application Note. 2004. 19 pages.
Imtra Marine Lighting Fall 2007 Catalog. 32 pages.
Cree LMH2 LED Modules Product Family Data Sheet. Cree 2011-2014, 18 pages.
Cree LMH2 LED Modules Design Guide. Cree 2011-2015, 23 pages.
Brochure of Elco EL49A, EL49ICA, EL49RA modules. ELCO Lighting Nov. 25, 2009. 1 page.
Image of Elco E347/247 module identified by Elco in response to DMF's Request for Production in Civil Action No. 2:18-cv-07090-CAS-GJS on Aug. 28, 2019. 1 page.
Screenshots from the Deposition of Brandon Cohen in Civil Action No. 2:18-cv-07090-CAS-GJS. Conducted Sep. 2, 2020. 8 pages.
Defendant AMP Plus, Inc.'s Initial Disclosure and Designation of Expert Witnesses in Civil Action No. 2:19-CV-4519-CAS dated Sep. 15, 2020, 37 pages.
Defendant AMP Plus, Inc. D/B/A Elco Lighting's Supplemental Responses to Plaintiff DMF, Inc.'s First Set of Interrogatories (Nos. 1-16) in C.A. No. 2:19-CV-4519-CAS, Redacted, dated Jul. 29, 2020. 13 pages.
Final Written Decision in IPR2019-01094 dated Nov. 19, 2020, 58 pages.
Opinion from the Fed. Ct. of App. in *AMP Plus, Inc.* v. *DMF, Inc.* in case Nos. 2021-1595, 2021-1636 (Appeals from the PTAB in IPR2019-01094) decided on Nov. 10, 2022, 15 pages.
International Search Report and Written Opinion in PCT/US 23/65292 dated Nov. 6, 2023, 31 pages.
Canadian Office Action in Canadian App. No. 3,125,954 dated Mar. 27, 2024, 13 pages.
Canadian Office Action in Canadian App. No. 3,130,524 dated Apr. 10, 2024, 7 pages.

(56) References Cited

OTHER PUBLICATIONS

Notice of Allowance dated Feb. 5, 2024 from U.S. Appl. No. 17/826,848, 8 Pages.
Notice of Allowance dated Jun. 12, 2024 in U.S. Appl. No. 17/694,489, 11 Pages.
Final Office Action dated Jun. 13, 2024 in U.S. Appl. No. 17/379,489, 12 Pages.
Canadian Office Action in Canadian App. No. 3,073,988 dated Jan. 20, 2025, 7 pages.
Non-Final Office Action dated Jul. 25, 2024 in U.S. Appl. No. 18/501,219, 5 Pages.
Notice of Allowance dated Jul. 25, 2024 in U.S. Appl. No. 17/378,214, 16 Pages.
Non-Final Office Action dated Aug. 8, 2024 in U.S. Appl. No. 29/752,046, 9 pages.
Notice of Allowance dated Aug. 12, 2024 in U.S. Appl. No. 17/381,147, 8 pages.
Notice of Allowance dated Sep. 17, 2024 in U.S. Appl. No. 17/723,370, 9 pages.
Ex Parte Quayle Office Action mailed Dec. 5, 2024 for U.S. Appl. No. 17/694,489, 8 pages.
Non-Final Office Action dated Jan. 10, 2025 in U.S. Appl. No. 18/678,652, 6 pages.
Notice of Allowance dated Jan. 15, 2025 in U.S. Appl. No. 18/501,219, 7 pages.
Notice of Allowance dated Jan. 13, 2025 in U.S. Appl. No. 17/379,489, 12 pages.
Redacted Findings of Fact and Conclusion in U.S. Dist. Ct. of California, CV 2:18-CV-07090-CA5CJS, Jul. 29, 2024, 67 pages.

* cited by examiner 1210A-1

LIGHTING MODULE HAVING FIELD-REPLACEABLE OPTICS, IMPROVED COOLING, AND TOOL-LESS MOUNTING FEATURES

CROSS-REFERENCE TO RELATED APPLICATION(S)

The present application is a continuation of, and claims priority to, U.S. Non-Provisional application Ser. No. 17/384,564, filed Jul. 23, 2021, entitled "LIGHTING MODULE HAVING FIELD-REPLACEABLE OPTICS, IMPROVED COOLING, AND TOOL-LESS MOUNTING FEATURES," which claims priority to U.S. Provisional Application No. 63/055,787, filed Jul. 23, 2020, entitled "LIGHTING MODULE HAVING FIELD-REPLACEABLE OPTICS, IMPROVED COOLING, AND TOOL-LESS MOUNTING FEATURES," U.S. Provisional Application No. 63/224,469, filed Jul. 22, 2021, entitled "METHODS AND APPARATUS FOR ENCODING ONE OR MORE HALF-CYCLES OF AN AC WAVEFORM TO CONTROL A LIGHTING FIXTURE," U.S. Provisional Application No. 63/188,221, filed May 13, 2021, entitled "METHODS AND APPARATUS FOR ENCODING ONE OR MORE HALF-CYCLES OF AN AC WAVEFORM TO CONTROL A LIGHTING FIXTURE," U.S. Provisional Application No. 63/175,101, filed Apr. 15, 2021, entitled "METHODS AND APPARATUS FOR ENCODING ONE OR MORE HALF-CYCLES OF AN AC WAVEFORM TO CONTROL A LIGHTING FIXTURE," U.S. Provisional Application No. 63/141,340, filed Jan. 25, 2021, entitled "METHODS AND APPARATUS FOR ENCODING ONE OR MORE HALF-CYCLES OF AN AC WAVEFORM TO CONTROL A LIGHTING FIXTURE," and U.S. Provisional Application No. 63/076,323, filed Sep. 9, 2020, entitled "METHODS AND APPARATUS FOR ENCODING ONE OR MORE HALF-CYCLES OF AN AC WAVEFORM TO CONTROL A LIGHTING FIXTURE." Each of the aforementioned applications is incorporated by reference herein in its entirety.

BACKGROUND

A lighting fixture is a ubiquitous device that provides artificial lighting in various indoor and outdoor settings. Conventional lighting fixtures reliant on incandescent or compact fluorescent lamp (CFL) lighting have typically used replaceable bulbs where the bulb contains components to receive an electrical input and to emit light. More recently, light emitting diode (LED)-based lighting fixtures have utilized lighting modules that contain LEDs and corresponding driver electronics to manage and control electrical inputs received by the lighting fixture. In some instances, the lighting module is in the form of a bulb.

SUMMARY

The Inventors, via previous innovative designs for lighting modules, have recognized and appreciated lighting modules that integrate a LED light source, a driver, and a standardized connector into a single package provide users a convenient, easy-to-handle device to facilitate installation, maintenance, and/or replacement. However, the Inventors have also recognized conventional lighting modules are often limited in terms of customizability, performance, and ease of assembly.

First, conventional lighting modules typically output light with a fixed emission profile. In other words, the spatial and/or angular distribution of light provided by the lighting module is not adjustable. If a change to the emission profile is desired, the entire lighting modules is typically replaced with another lighting module that provides the desired emission profile. For example, a conventional lighting system may include a first lighting module that provides ambient lighting (e.g., general illumination of a room). If a user wishes to reconfigure the lighting system to provide task lighting (e.g., illumination of a particular portion of the room), the user should remove the first lighting module and then install a second lighting module that provides task lighting, which is often purchased separately.

Second, it is also often desirable for a lighting system to include a dimmer to provide the user the ability to adjust the brightness of the light output. Various dimmer protocols are often deployed in lighting systems, such as phase dimming (e.g., triode for alternating current (TRIAC) dimmers) or 4-wire dimmers (i.e., 0-10V dimmers). For lighting systems that include a LED light source, the driver typically includes circuitry tailored for a particular dimmer protocol. However, conventional drivers that are compatible with dimmers are typically standalone devices that are installed separately from the lighting module. For example, in a conventional recessed lighting system, the driver is often placed in a junction box, which is inaccessible after installation of the lighting system. As a result, the lighting system may be constrained to a particular dimmer protocol. If a user wishes to change the driver to accommodate a different dimmer protocol, portions of the environment (e.g., the ceiling) may need to be removed and the lighting system may need to be uninstalled to provide the user access to the driver contained within the junction box.

Third, the light output provided by conventional lighting modules is typically limited by a combination of the heat generation from the LED light source and/or the circuitry in the driver module and inadequate cooling of the lighting module. In other words, conventional lighting modules are unable to provide higher light outputs without various components in the LED light source and/or the circuitry of the driver module overheating (e.g., an operating temperature greater than 125° C.), which reduces the operational lifetime of the lighting module or, in some instances, creates a potential fire hazard in the environment.

Fourth, conventional lighting modules also often include a ground connection to protect the electronic circuitry in the driver and/or the light source from a surge in electricity. However, the ground connection, which is typically a wire, is often attached to an exterior surface of the module housing (e.g., the heat sink). Although the housing may be electrically conductive, the driver circuitry may not have a direct electrical connection to the housing, thus the ground connection may only provide limited protection against an electrical surge.

Fifth, conventional lighting modules are also cumbersome to assemble and prone to assembly errors, which may affect the operation and/or performance of the lighting module. For example, previous lighting modules often include a chip on board (COB) light emitting diode (LED) as the light source, which is mounted manually to a flat, thermally dissipating surface of a heat sink via thermal paste. The position and alignment of the light source in the lighting module may thus vary depending on the precision in which the light source is attached to the heat sink. For lighting modules that include a collimating optic (e.g., lighting modules configured for task lighting), small variations in the position and alignment of the light source may have a substantial effect on the direction and divergence of the output light.

In another example, the light source in previous lighting modules is typically soldered by hand to electrical wiring in order to receive electrical power from a driver. The quality of the hand soldered joint depends, in part, on the skill of the assembler and, hence, may also vary between lighting modules. A low-quality solder joint may detrimentally affect the operation of the light source (e.g., higher noise, excess heating, lower electric current inputs) and lead to premature failure of the lighting module once deployed in the field.

In yet another example, the various components of previous lighting modules are often assembled using numerous fasteners. For instance, the optical components (e.g., a reflector, a lens) and the housing for the driver are often mounted to a heat sink using multiple screw fasteners. Furthermore, the size and type of fasteners (e.g., a Phillips screw, a hex screw, a flathead screw) often vary depending on the component. The inclusion of multiple, different fasteners increases the manufacturing costs of the lighting module as well as the time and difficulty for assembly due to the assembler having to fasten each screw one at a time and the different tools the assembler should use for the different fasteners.

In view of the foregoing, the present disclosure is directed to various inventive implementations of a lighting module for a lighting system (e.g., a recessed light, a cylinder light, a downlight, a landscape light, a flood light, an in-ground light) that provides field-changeable optics, an integrated driver with circuitry to accommodate one or more dimmer protocols, improved thermal dissipation enabling higher light outputs, an internal ground connection for the driver and/or the LED light source, and numerous tool-less mounting features for greater ease of assembly.

In some implementations, the lighting module includes a heat sink with a sidewall and a partition that defines two separate cavities to contain a light source and a driver module, respectively. The driver module may include a driver housing to support electronic circuitry (also referred to herein as "driver circuitry"). The driver circuitry typically receives AC power and outputs DC power to the LED light source. In some implementations, the driver circuitry may also receive a DC control signal to dim the light output provided by the LED light source. In some implementations, the driver module may also include a driver insulator, which may work in tandem with the driver housing to provide a barrier to physically separate the electronic circuitry from the heat sink. The lighting module may also include an optical assembly that includes one or more optical elements to redirect the light emitted by the light source in order to provide a desired emission profile (i.e., a desired spatial and/or angular light distribution).

In one aspect, the optical assembly may be readily field changeable. This may be accomplished, in part, by the optical assembly including optical elements (e.g., a reflector, an optical lens) that are readily removable from the lighting module, in part, by using tool-less mounting mechanisms. For example, the optical assembly may include a cover lens that is coupled to the heat sink via one or more snap-fit connections. Specifically, the cover lens may include two snap-fit connectors that are shaped such that a user may readily actuate the snap-fit connectors by hand in order to remove and replace the optical assembly. In some implementations, each snap-fit connector may be sufficiently actuated to allow removal of the cover lens from the heat sink when a force having a magnitude of about 25 pounds is applied to the snap-fit connector.

The cover lens may refract the emitted light to produce a desired spatial and/or angular light distribution. In some implementations, the cover lens may be patterned and/or textured to diffusely scatter at least a portion of the emitted light. In some implementations, the optical assembly may further include a substantially flat optical element (e.g., a diffuser, a filter) that is coupled to the cover lens via, for example, a snap-fit connection and/or held in place by another optical component. In this manner, the flat optical element and the cover lens may be installed and/or removed together from the lighting module as a single assembly.

In some implementations, the optical assembly may further include a reflector that is snap-fit connected to the cover lens such that the optical assembly is removably coupled to the heat sink as a single assembly. The reflector, which may be disposed within the same cavity as the LED light source, may redirect light emitted at larger emission angles towards the opening defined by the top end of the sidewall. It should be appreciated that, in some implementations, the optical assembly may include an optical lens coupled directly to the cover lens instead of a reflector.

In some implementations, the optical assembly may include an optical lens (e.g., a folded optical element) that is mounted to the heat sink separately from the cover lens. For example, the optical assembly may include an optic holder to support the optical lens and to provide mounting features (e.g., a twist-and-lock connection mechanism) to couple the optical lens to the heat sink. In this manner, the optical lens may be more precisely aligned and positioned to the heat sink in order to provide a desired spatial and/or angular light distribution. The optic holder may also be reflective in order to redirect and/or recycle stray light from the optical lens to maintain or increase the light coupling efficiency of the optical assembly (i.e., the ratio of the amount of light exiting the lighting module and the amount of light emitted by the LED light source). The inclusion of the optic holder to mount the optical lens to the heat sink separately from the cover lens may allow the user may replace only the cover lens and/or the flat optical element to change, for example, the clarity or haze of the output light by changing the diffuser or the color of the output light by changing the filter. It should be appreciated that, in some implementations, the optical assembly may include reflector coupled to the heat sink separately from the cover lens instead of an optical lens.

In example implementations, the driver circuitry of the lighting module (e.g., conversion of an AC voltage from a building mains electrical supply to a DC voltage suitable for providing power to an LED light source) may be implemented to facilitate appreciable dimming of light output, without perceivable flicker, via the output of a conventional TRIAC dimmer coupled to driver circuitry of the lighting module. Examples of driver circuitry configured for TRIAC-based dimming described further below include, or are derived from, various circuit architectures disclosed in U.S. application Ser. No. 16/561,898, filed Sep. 5, 2019, entitled "METHODS AND APPARATUS FOR TRIAC-BASED DIMMING OF LEDS," now U.S. Pat. No. 10,616,968, issued Apr. 7, 2020, is incorporated by reference herein in its entirety. Pursuant to such driver circuitry, existing triac-based dimmers from a variety of manufacturers (and different models from a given manufacturer) may be used to effectively control (increase or decrease) the light output of a lighting module in a relatively smooth fashion and over an appreciable range of light output (e.g., between full power light output and relatively small percentages of full power light output, such as less than 5%, less than 2%, or less than 1%) without shimmer or flickering effects.

In some example implementations, driver circuitry of the lighting module may be implemented to facilitate dimming of light output via 0-10V dimming. As would be readily appreciated in the art, 0-10V dimming is a lighting control method that produces varying light level outputs based on a direct current (DC) control voltage between 0 and 10 volts.

In yet other examples, driver circuitry of the lighting module is configured to adjust the light output (e.g., intensity) of the lighting module as well as correlated color temperature (CCT) of the light output. For driver circuitry configured for CCT control, in inventive aspects one or both of the AC half cycles of input AC voltage are employed to enable a phase dimmer to convey desired CCT in one half cycle and desired intensity in the other half cycle. The information is conveyed by varying the time that the phase cut dimmer conducts during the positive and negative half cycles. A controller of the driver circuitry decodes the incoming AC phase-cut waveform and converts it to two distinct signals representing intensity and CCT. Detailed examples of driver circuitry for CCT control are provided in U.S. Provisional Application No. 63/224,469, filed Jul. 22, 2021, entitled "METHODS AND APPARATUS FOR ENCODING ONE OR MORE HALF-CYCLES OF AN AC WAVEFORM TO CONTROL A LIGHTING FIXTURE," which is hereby incorporated herein by reference.

In implementations where the lighting module includes a ground connection, the lighting module may include a first ground cable that electrically couples the electronic circuitry of the driver module to the heat sink. A second ground cable may then connect the heat sink to an external ground (e.g., the housing of a lighting system). Thus, the lighting module may provide a direct ground path for the electronic circuitry to discharge in the event of an unwanted electrical surge in the lighting system. In some implementations, the first and second ground cables may be connected to the heat sink at the same location using a single screw fastener. In some implementations, potting material may also be included to electrically insulate and seal the electronic circuitry within the driver housing.

In another aspect, the lighting module may provide multiple thermal pathways to dissipate heat generated by the light source and/or electronic circuitry contained in the driver module to the surrounding environment and, in particular, the environment being illuminated (e.g., the space within which the lighting system is installed). For example, the partition of the heat sink may provide a thermal pathway to transfer heat generated by the LED light source to the sidewall and thereafter towards a top end of the sidewall defining an opening through which light from the light source exits the lighting module and into the environment being illuminated. Thus, the heat from the light source may be directed towards the portion of the lighting module proximate to the illuminated environment and subsequently dissipated into the environment via, for example, convection.

The partition may include a recessed section that surrounds and partially encloses the light source and the light source holder to position the light source at a desired distance from the various optical components of the optical assembly. In some implementations, the partition may further include a tapered section that joins the recessed section to the top end of the sidewall of the heat sink. The combination of the recessed section and the tapered section may provide a thermal pathway to transport the heat generated by the LED light source to the sidewall via heat conduction. It should be appreciated that, in some implementations, the partition may not be tapered, but instead may extend horizontally to the sidewall. Thus, the heat generated by the light source may conduct to a portion of the sidewall between the top end and a bottom end and then conduct towards the top end of the sidewall.

In some implementations, the heat sink may include a flange to provide a mechanical interface to mount the lighting module to a housing of a lighting system (e.g., a can housing, a junction box) and/or to couple a trim to the lighting module. The flange may be formed on the top end of the sidewall and may thus provide an additional surface to dissipate heat from the lighting module. For example, a trim may be coupled to the flange of the heat sink. In this manner, the heat generated by the LED light source may be transported to the top end of the heat sink via the partition and/or the sidewall and thereafter to the trim via heat conduction. The trim, in turn, may dissipate heat to the illuminated environment via, for example, convection.

The driver circuitry of the driver module may also generate heat during operation. In particular, specific circuit elements of the driver circuitry, such as a transformer, may generate more heat than other circuit elements, which may lead to hot spots in the driver circuitry (e.g., localized portions of the driver circuitry where the temperature is higher than other portions of the driver circuitry). In some implementations, the potting material disposed around the electronic circuitry in the driver housing may reduce or, in some instances, mitigate the creation of hot spots in the driver circuitry by providing a medium to locally dissipate heat from various circuit elements. Said in another way, the potting material may be sufficiently thermally conducting to maintain the temperature of the circuit elements, such as the transformer, below 125° C. during operation.

In some implementations, a portion of the heat generated by the driver circuitry may dissipate convectively to the surrounding space within the housing containing the lighting module. In some implementations, another portion of the heat generated by the driver circuitry may dissipate directly to the heat sink due to physical contact between some of the circuit elements and portions of the heat sink where the risk of short circuiting is low. For example, the transformer may directly contact the partition of the heat sink. In some implementations, yet another portion of the heat generated by the driver circuitry may be transported to the sidewall of the heat sink through a sidewall of the driver housing. In some implementations, most of the heat generated by the driver circuitry may dissipate through the sidewall of the driver housing and the sidewall of the heat sink. In other words, the thermal pathway passing through the sidewall of the driver housing and the sidewall of the heat sink may have an appreciably lower thermal resistance than other thermal pathways.

Depending on the desired output, the driver housing may be formed of a polymer or a metal. A polymeric driver housing may be used for lighting modules that provide relatively lower light outputs while a metallic driver housing may be used for lighting modules that provide relatively higher light outputs. For example, the polymeric driver housing may be used for lighting modules that provide a light output less than or equal to 1250 lumens while a metallic driver housing may be used for lighting modules that provide a light output greater than or equal to 1250 lumens. It should be appreciated the 1250 lumen threshold is exemplary and may change over time due to improvements in the efficiency of the LED light source and the driver electronics. More generally, the choice between a polymeric or a metallic driver housing may depend on which driver housing is able to maintain the driver circuitry at a desired operating temperature (e.g., less than or equal to 125° C.).

In implementations where a metallic driver housing is used, the driver module may further include a thin electrically insulating film (e.g., a mylar film) that lines the interior surfaces of the driver housing and/or the surfaces of the driver circuitry including the printed circuit board to electrically insulate the driver circuitry without appreciably increasing the thermal resistance between the driver circuitry and the sidewall of the heat sink. In some implementations, the insulating film may be perforated with openings to allow potting material to fill any gaps between the driver circuitry and the driver housing. In some implementations, the driver module may only include the potting material to electrically insulate driver circuitry from the metallic driver housing.

The lighting module may also support one or more airways for air to flow through the interior of the lighting module in order to convectively cool the various components of the lighting module. For example, the airway may provide a path for cool air to enter the lighting module where the air is then heated by the light source and/or the driver. The hot air may then exit the lighting module to dissipate the heat into the surroundings. In this manner, the lighting module may provide cooling using both internal heat conduction and convection.

In another aspect, the lighting module may include several tool-less mounting features to improve the ease of assembly by reducing the number of parts (e.g., fasteners) and the number of tools for assembly. For example, the cover lens in the optical assembly, as described above, may include snap-fit connectors that are configured to be actuated by hand. A reflector and/or an optical element may also be separately mounted to the heat sink (or a light source holder) via one or more twist and lock connectors and aligned via one or more registration features. In another example, the driver housing may be coupled to the heat sink via one or more snap-fit connectors. In some implementations, the driver insulator may not be held in place, but instead may float within the driver module. In some implementations, the driver module may also be readily replaced in the lighting module without changing the optical assembly.

In another example, the lighting module may include a light source holder to align and position the light source in the heat sink. The light source holder may include poke-in connectors to electrically couple the respective contacts of the light source to corresponding wires (e.g., positive and negative leads) from the driver module. The poke-in connector may include an integrated wire restraint that prevents the removal of a wire after the wire is inserted into the poke-in connector. In this manner, the wires may be connected to the light source without soldering. It should be appreciated that, in some implementations, the light source holder may be tailored to provide terminal pads to solder wires directly to the terminals of the LED light source. In some implementations, the light source holder may also be field-changeable in order to support the installation of different light sources (e.g., different LED COB chips) in the lighting module.

Based on the above mounting features, the various components of the lighting module may be assembled using few, if any, fasteners. For example, the lighting module may include a fastener to electrically and physically couple the electrical ground wires in the lighting module to the heat sink. One or more fasteners may couple the light source holder to the heat sink instead of the snap-fit connectors. In some applications, such as retrofit lighting systems, lighting fixtures with remote-mounted power supplies, or lighting fixtures with low voltage inputs such as through a power over Ethernet (PoE) connection, a ground connection to the lighting module may not be included. Furthermore, the light source holder may be coupled to the heat sink via another mechanism, such as one or more snap-fit connections. Therefore, in some implementations, the light module may be assembled without the use of any fasteners and/or tools, thus greatly simplifying assembly.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1A:
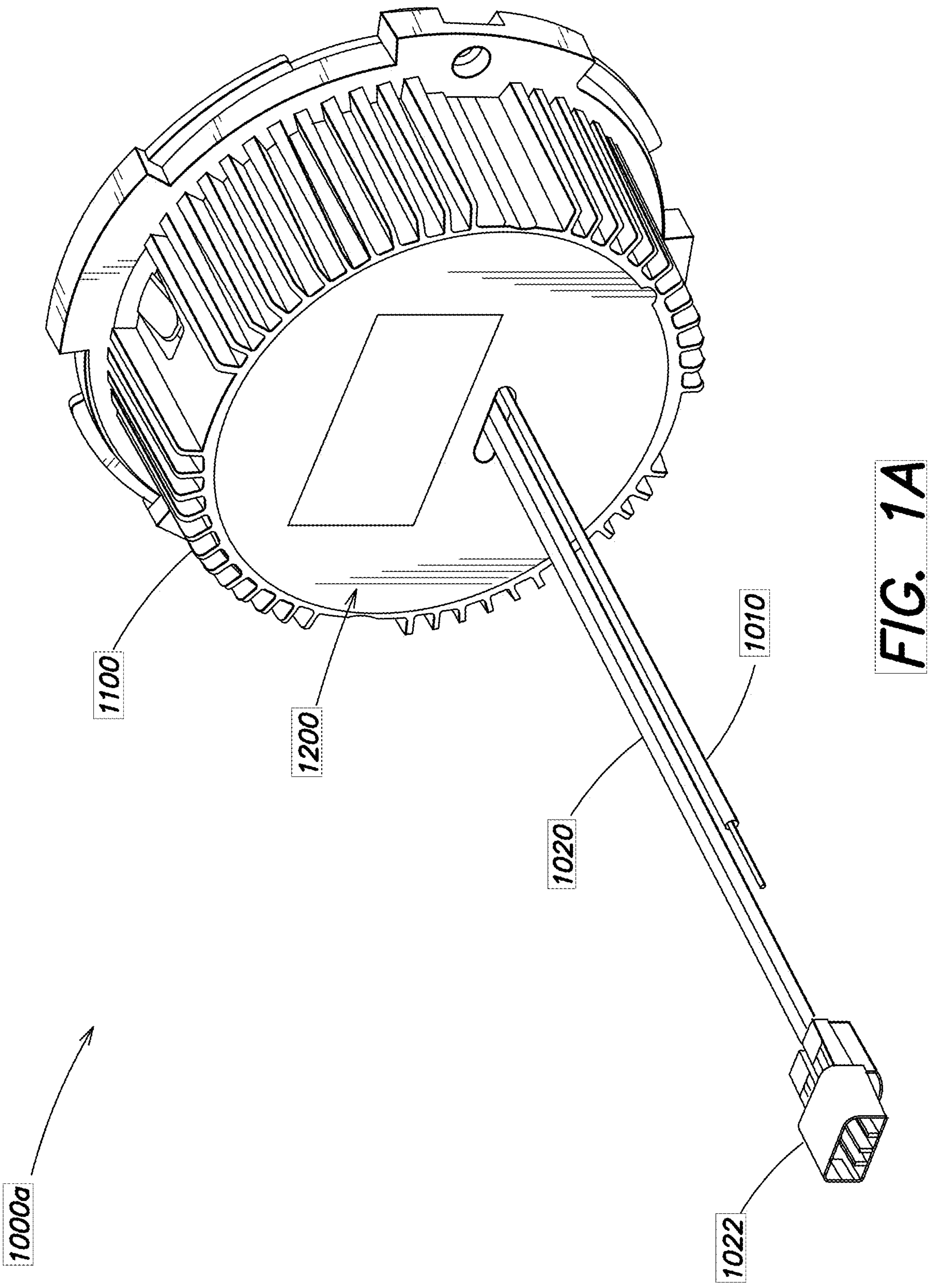
FIG. 1A shows a bottom perspective view of an exemplary lighting module with an electrical cable.
Figure 1B:
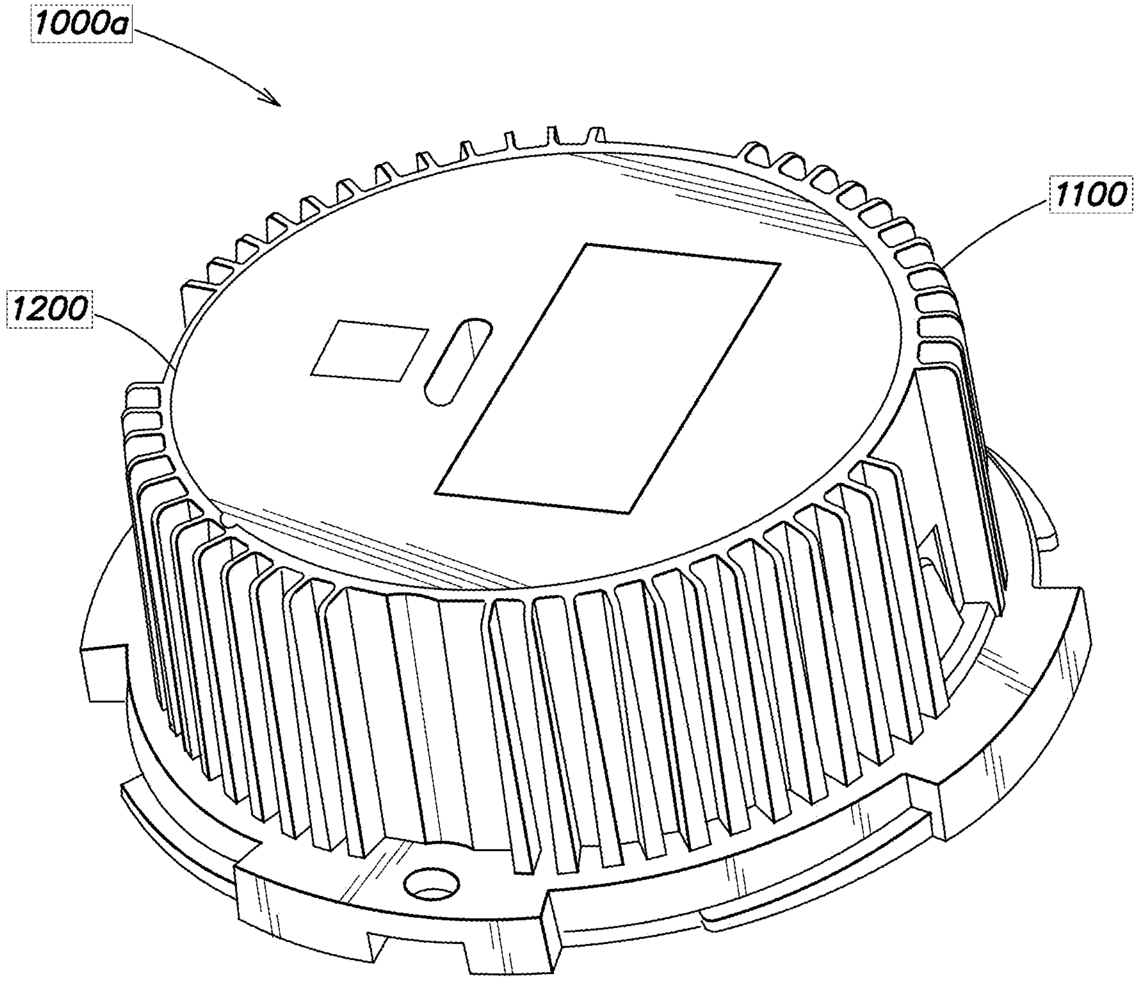
FIG. 1B shows a bottom perspective view of the lighting module of FIG. 1A without the electrical cable.
Figure 1C:
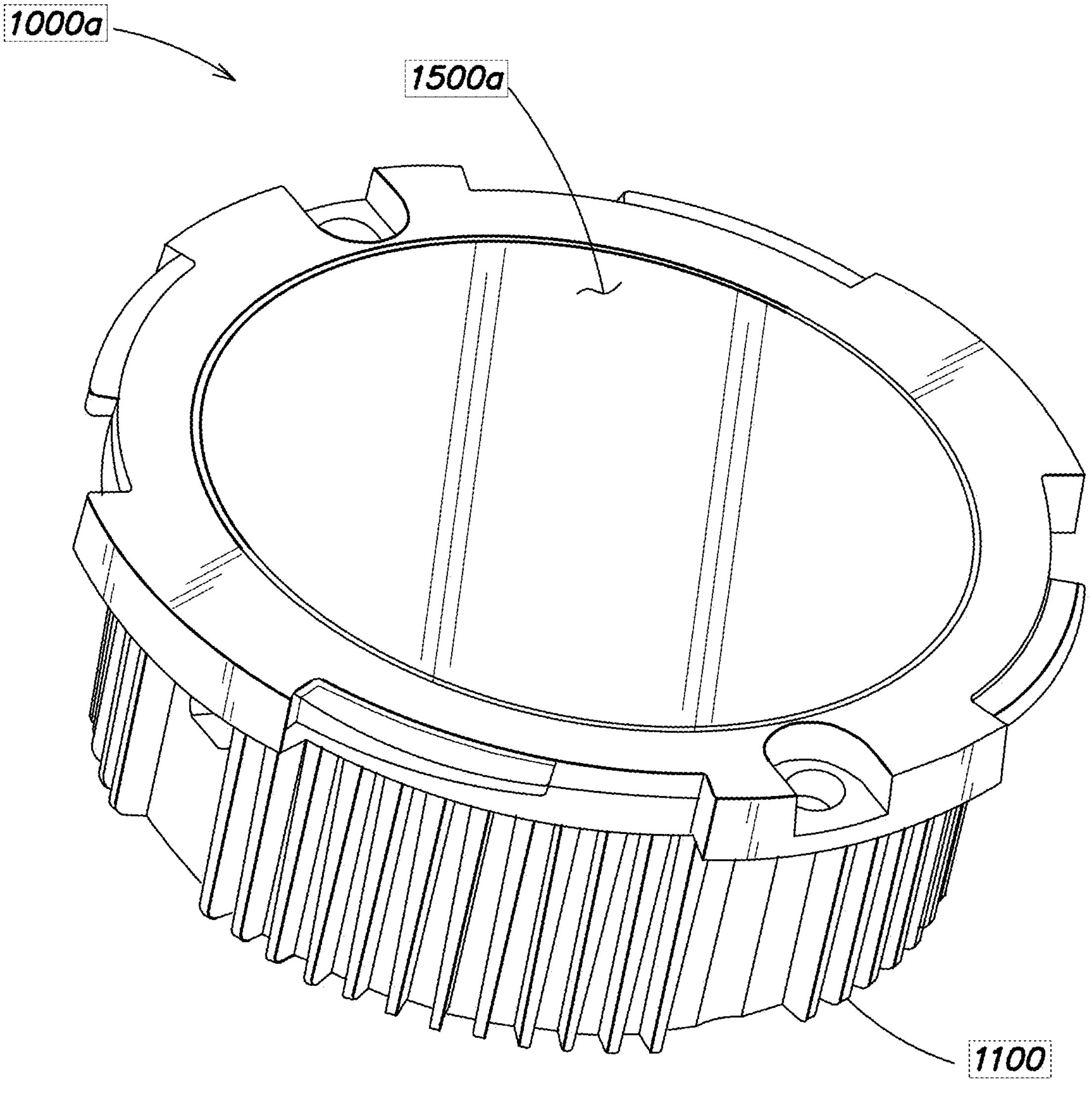
FIG. 1C shows a top perspective view of the lighting module of FIG. 1B.
Figure 1D:
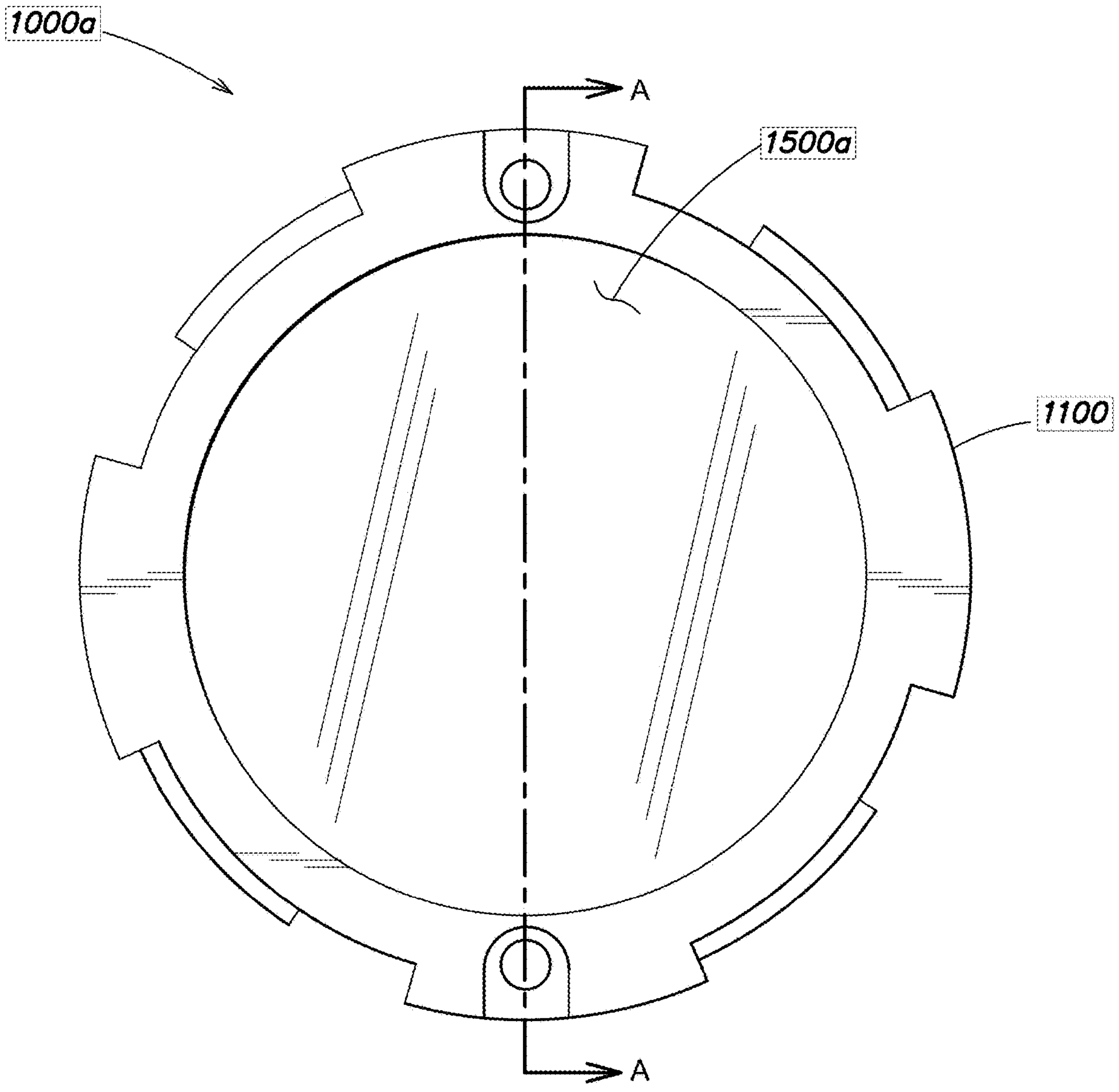
FIG. 1D shows a top view of the lighting module of FIG. 1B.
Figure 1E:
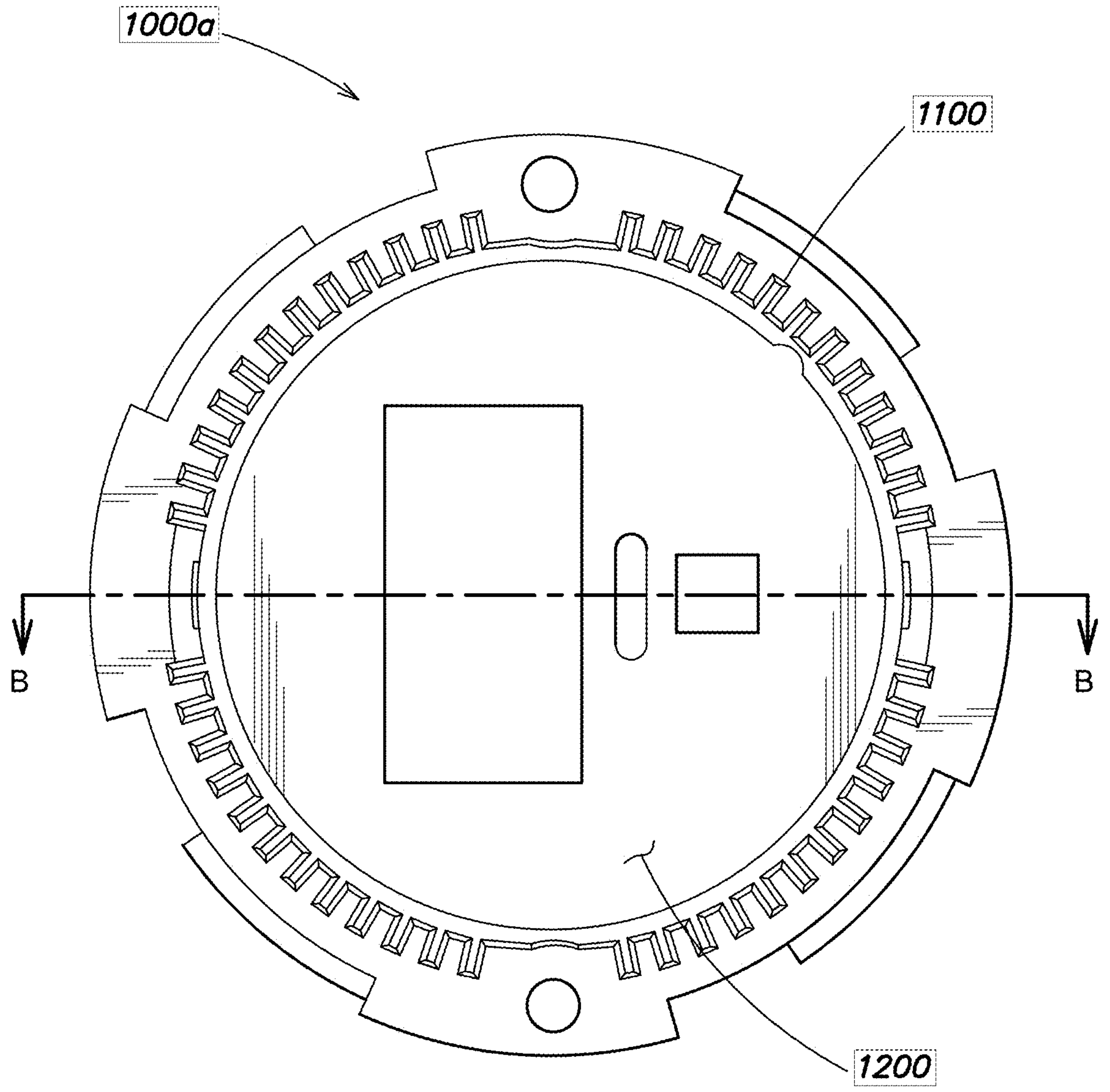
FIG. 1E shows a bottom view of the lighting module of FIG. 1B.

Following below are more detailed descriptions of various concepts related to, and implementations of, lighting modules with field-changeable optical assemblies, integrated drivers supporting different dimmer protocols, improved heat dissipation, tool-less mounting features, and structural features/components for alignment and assembly of the various components therein. It should be appreciated that various concepts introduced above and discussed in greater detail below may be implemented in multiple ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of inventive lighting modules are provided, wherein a given example or set of examples showcases one or more particular features of a heat sink, a driver module, driver circuitry, a light source, a light source holder, and an optical assembly. It should be appreciated that one or more features discussed in connection with a given example of a lighting module may be employed in other examples of lighting modules according to the present disclosure, such that the various features disclosed herein may be readily combined in a given lighting module according to the present disclosure (provided that respective features are not mutually inconsistent).

Certain dimensions and features of the lighting module are described herein using the terms "approximately," "about," "substantially," and/or "similar." As used herein, the terms "approximately," "about," "substantially," and/or "similar" indicates that each of the described dimensions or features is not a strict boundary or parameter and does not exclude functionally similar variations therefrom. Unless context or the description indicates otherwise, the use of the terms "approximately," "about," "substantially," and/or "similar" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

The lighting modules described herein may generally be used in a variety of lighting systems installed into a ceiling, wall, or floor space of an environment or installed onto a surface of a drywall panel, a wood panel, and/or flooring forming the ceiling, wall, and floor, respectively. Although the lighting modules may be described herein in the context of a particular lighting system installation, it should be appreciated the lighting module may be used in a different lighting system installation in the same or similar manner. For example, the lighting module may be installed into a housing or an enclosure of different lighting systems using the same mechanisms disclosed herein.

A Lighting Module with a Reflector

FIGS. 1A-1M show an exemplary lighting module 1000*a* for a lighting system with an optical assembly 1500*a* that includes a reflector 1540. As shown, the lighting module 1000*a* may include a heat sink 1100 with a sidewall 1110 and a partition 1120 that together define cavities 1102 and 1104.

The cavity 1102 may contain an LED light source 1300 to emit light, a light source holder 1400*a* to align and couple the light source 1300 to the heat sink 1100, and the optical assembly 1500*a* to redirect the light emitted by the light source 1300 to produce a desired emission profile. For example, the reflector 1540 may be used, in part, to redirect the light emitted by the light source 1300 to provide general ambient lighting of an environment where the output light has a beam angle greater than or equal to about 90 degrees. The optical assembly 1500*a* may also be field-changeable as will be discussed in more detail below.

The cavity 1104 may contain a driver module 1200 with driver circuitry 1210 (also referred to herein as "circuitry 1210") to receive electrical power from an external power source (e.g., a building electrical supply system, another lighting system in a daisy-chain configuration) and to supply electrical power to the light source 1300. The driver module 1200 may include various electrical wires to supply and/or transfer electrical power (e.g., an electrical cable 1020, electrical cables 1030*a* and 1030*b*) and to provide a ground connection (e.g., ground cables 1010 and 1014). The electrical cables 1020, 1030*a*, and 1030*b* are also referred to herein as power cables 1020, 1030*a*, and 1030*b*.

The lighting module 1000*a* may generally be shaped and/or dimensioned to facilitate installation into a variety of different lighting systems with different-sized housings (also referred to herein as "enclosures"). For example, the lighting module 1000*a* may be installed into various standard-sized housings including, but not limited to, a 3" junction box, a 4" junction box, a 3"/4" combo junction box, a 3/0 junction box, a 4/0 junction box, and a can housing for a 4-10 inch recessed lighting fixture. The lighting module 1000*a* may also be installed into housings for a surface mounted lighting fixture or a lighting fixture that includes a housing that extends from a wall (e.g., a wall sconce).

In some implementations, the lighting module 1000*a* may be directly mounted to the housing of a lighting system. For example, standard housings typically include one or more tabs and/or posts disposed within a cavity of the housing or at an open end of the housing with fastener openings. The lighting module 1000*a* and, in particular, the heat sink 1100 may include corresponding opening(s) (e.g., holes 1144 on a flange 1140 of the heat sink 1100*a*) that align with the opening(s) of the housing. Corresponding fasteners may thus be inserted through the respective openings of the lighting module 1000*a* and the housing to securely couple the lighting module 1000*a* to the housing.

In some implementations, the lighting module 1000*a* may be indirectly mounted to the housing of a lighting system. For example, the lighting module 1000*a* may include mounting features to support a trim (e.g., a twist-and-lock connector 1142 on the flange 1140 of the heat sink 1100). During installation, the lighting module 1000*a* may be first coupled to a trim. The lighting module 1000*a* and the trim may then be inserted into the housing together. The trim may include a separate coupling mechanism, such as one or more friction clips or spring clips, to securely couple the trim and, by extension, the lighting module 1000*a* to the housing.

Figure 1F:
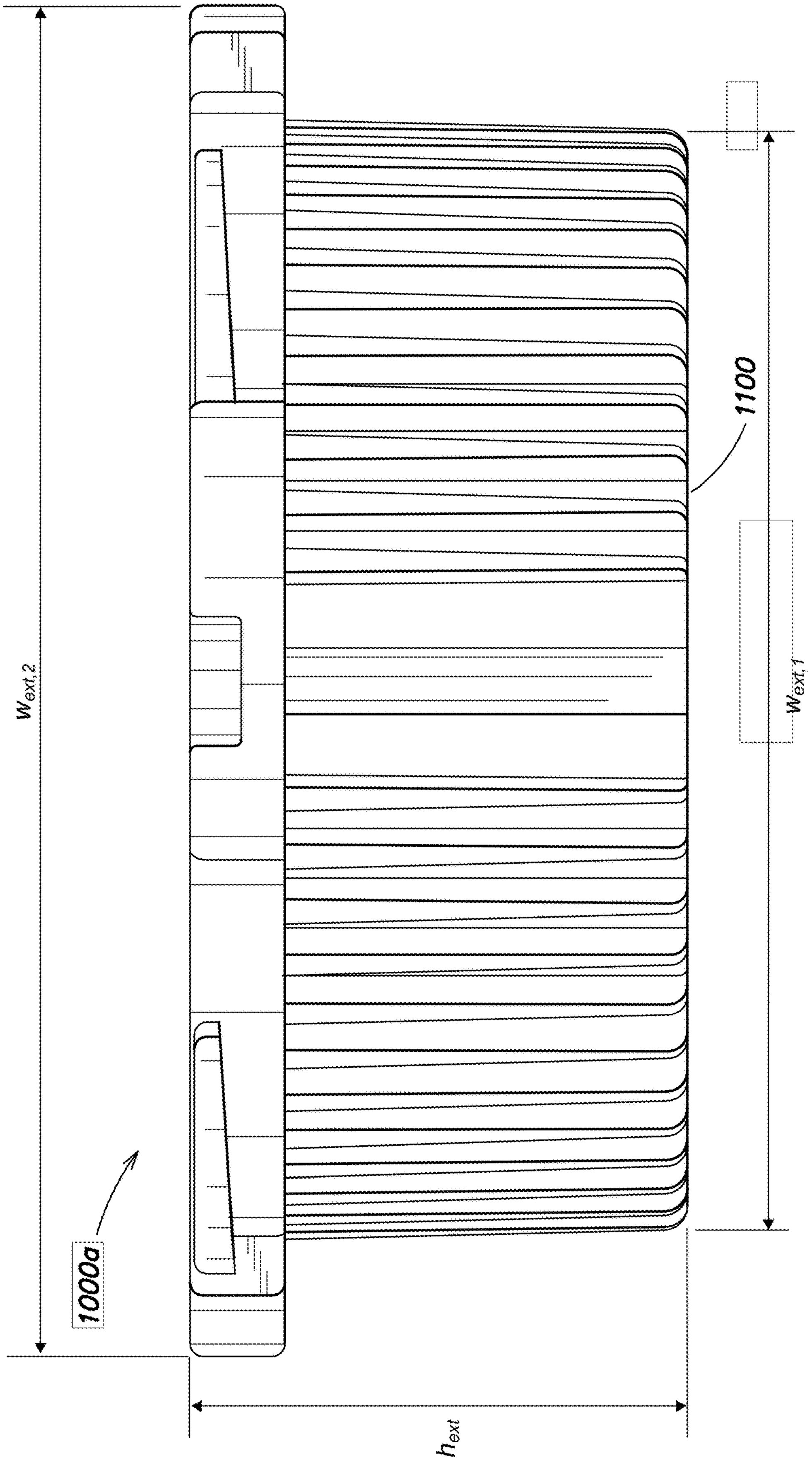
FIG. 1F shows a left-side view of the lighting module of FIG. 1B.
Figure 1G:
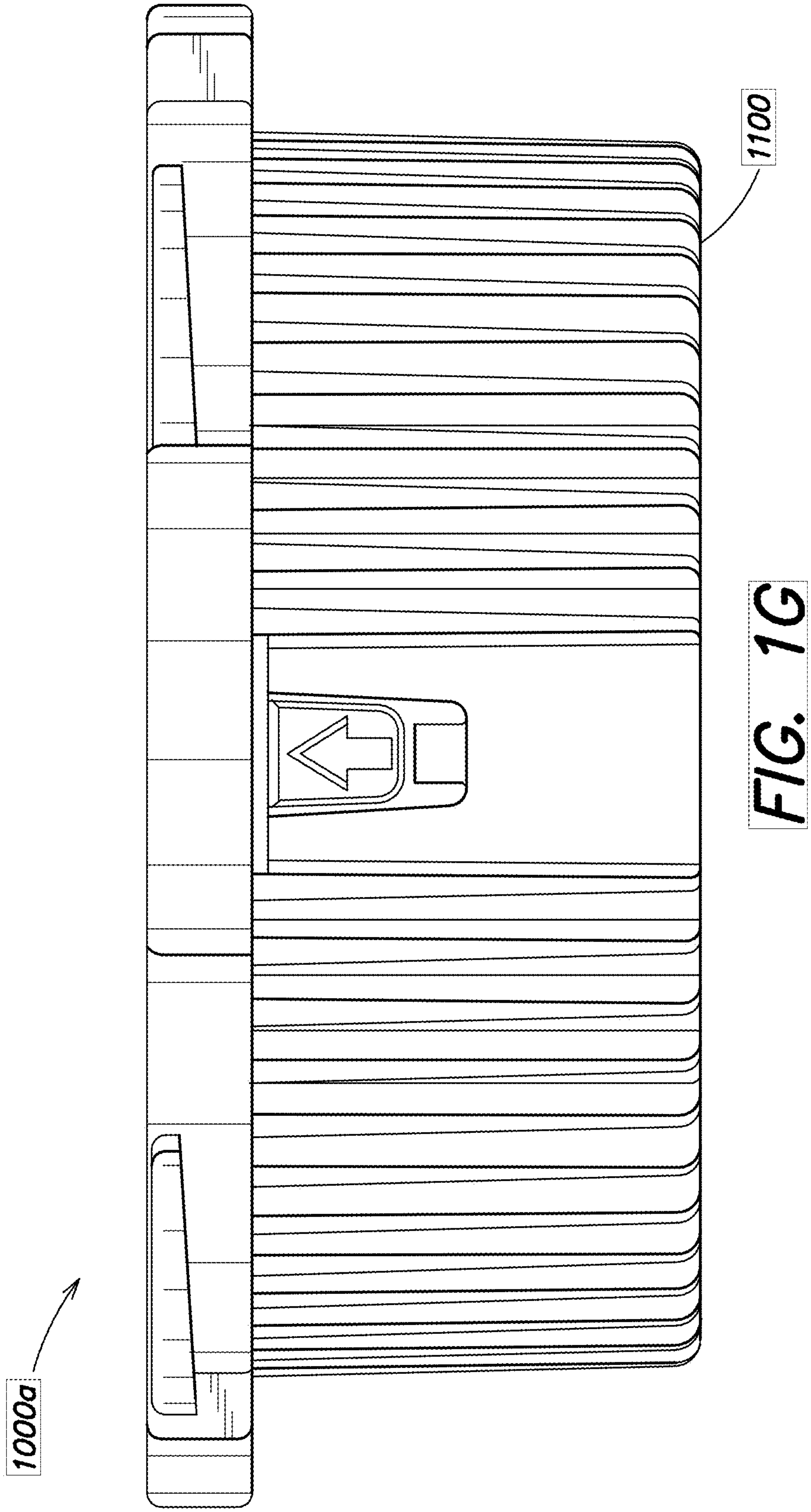
FIG. 1G shows a front view of the lighting module of FIG. 1B.

The lighting module 1000*a* may be dimensioned to be sufficiently compact to accommodate smaller-sized housings while providing a mounting interface that conforms with standard mounting features for the housing (e.g., the tabs of a junction box). For example, the lighting module 1000*a* may have a characteristic width, defined as the largest lateral extent of the lighting module 1000*a* (e.g., the exterior width ($w_{ext,2}$) of the flange 1140 as shown in FIG. 1F), of about 3⅞ inches. The exterior width of the sidewall 1110 ($w_{ext,1}$) may be about 3 inches. Thus, the exterior width of the lighting module 1000*a* may range between about 3 inches and about 3⅞ inches. More generally, the exterior width of the lighting modules described herein may range between about 3 inches and about 4 inches. The lighting module 1000*a* may also have an exterior height ($h_{ext}$), corresponding to the largest distance between the top and bottom sides of the lighting module 1000*a* (e.g., the distance between a base 1234 of the driver housing 1230 and the top-most portion of the cover lens 1510 in the optical assembly 1500*a*) of about 1 7/16 inches. More generally, the exterior height $h_{ext}$ of the lighting module 1000*a* may range between about 1 inch and about 2½ inches.

The term "about," when used to describe the various dimensions of the lighting module 1000*a*, is intended to cover manufacturing tolerances. For example, "about 3 inches" may correspond to the following dimensional ranges: 2.97 to 3.03 inches (+/−1% tolerance), 2.976 to 3.024 inches (+/−0.8% tolerance), 2.982 to 3.018 inches (+/−0.6% tolerance), 2.988 to 3.012 inches (+/−0.4% tolerance), 2.994 to 3.006 inches (+/−0.2% tolerance).

Figure 2A:
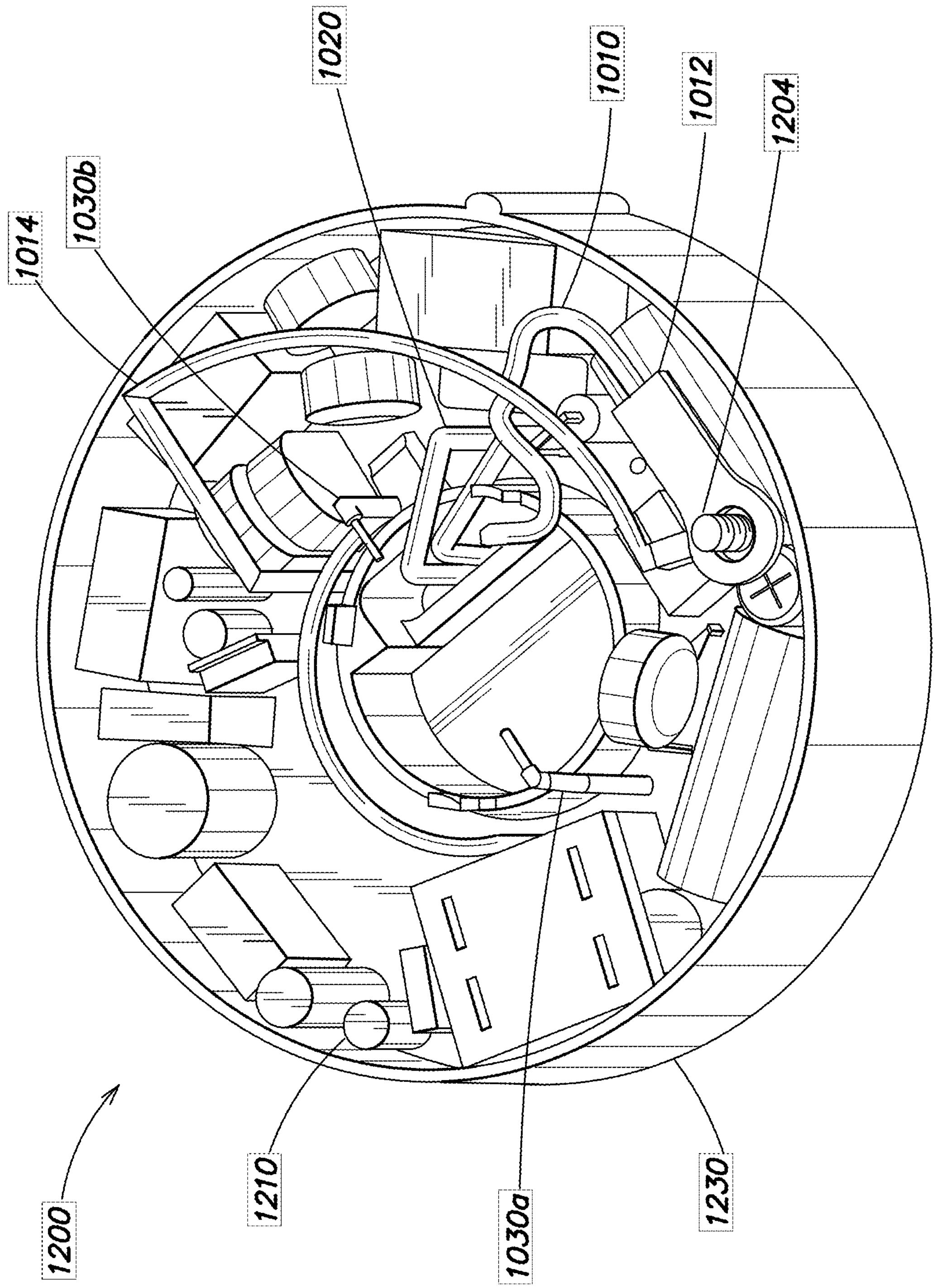
FIG. 2A shows a top perspective view of a driver module in the lighting module of FIG. 1A without a driver insulator and potting material.
Figure 2B:
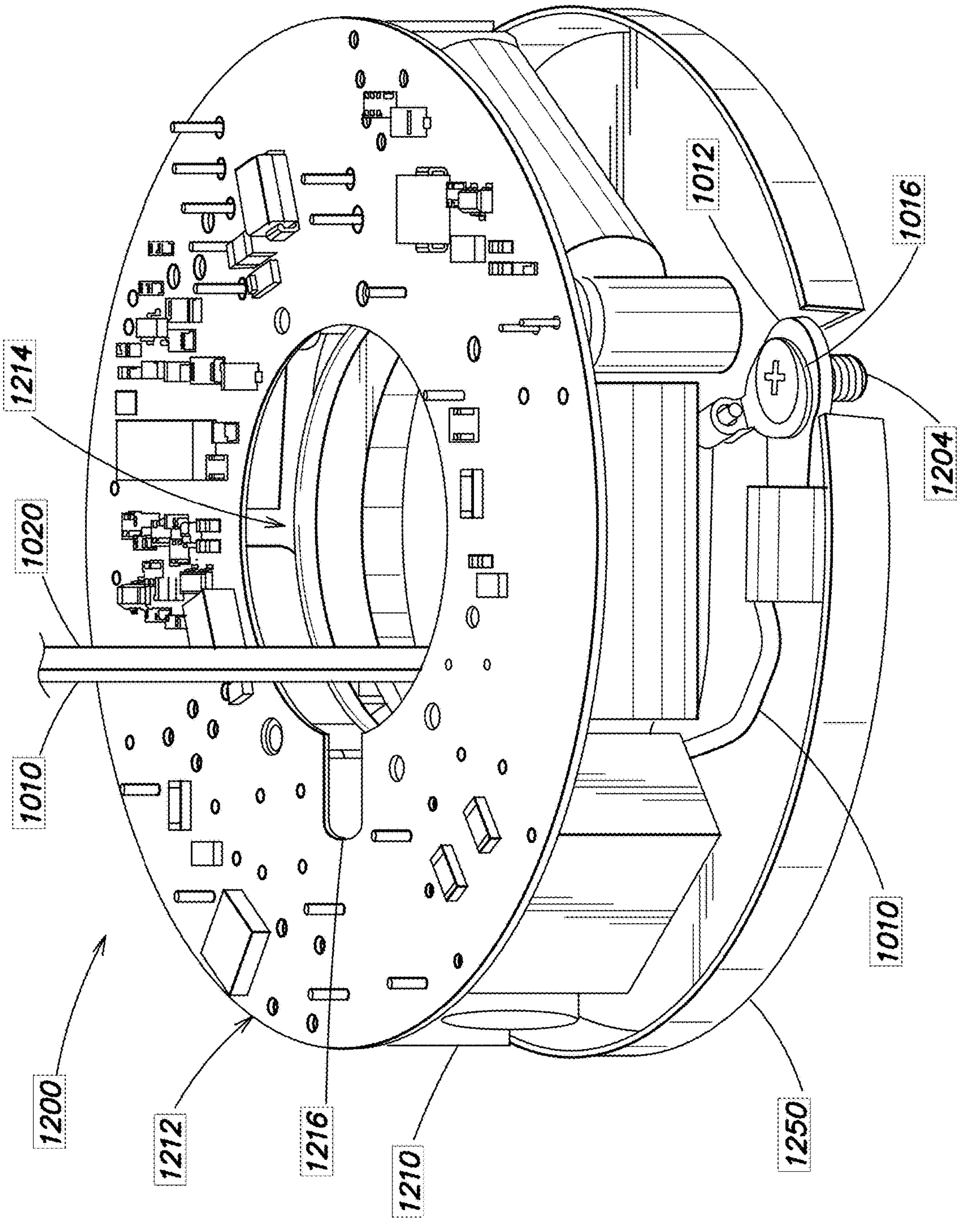
FIG. 2B shows a bottom perspective view of the driver module of FIG. 1A without a driver housing and the potting material.

FIGS. 2A and 2B show additional views of the driver module 1200 and, in particular, the circuitry 1210. As noted above, the circuitry 1210 receives electrical power from an external power source (e.g., the power supply system of a building, another lighting system) via the electrical cable 1020 and supplies electrical power to the light source 1300 via electrical cables 1030*a* and 1030*b*. The circuitry 1210 may generally receive alternating current (AC) and/or direct current (DC) at various operating voltages and/or currents.

For example, the lighting module 1000*a* may be installed in an indoor lighting system (e.g., a recessed light, a cylinder light, a downlight), which typically receives AC current as the input (e.g., a "mains" voltage from the electrical system of a building). In another example, the lighting module 1000*a* may also be installed in an outdoor lighting system (e.g., a landscape light, a flood light, an in-ground light), which typically receives DC current as the input. Furthermore, the circuitry 1210 may be compatible with a range of operating voltages including, but not limited to, low operating voltages (e.g., voltages less than 50V) and high operating voltages (e.g., voltages greater than 50V). In some implementations, the voltage input may also vary based on the application and the type of lighting system. For example, the lighting module 1000*a* may be deployed in a low voltage lighting system (e.g., household lighting, landscape lighting, office lighting, and/or hospitality lighting using a 12V input) or a high voltage lighting system (e.g., security lighting, public lighting using a 120V line voltage input or a 277V line voltage input).

The driver circuitry 1210 may then convert and/or process the electrical input into a form suitable to power the LED light source 1300. For example, the circuitry 1210 may supply DC current to the light source 1300 at a voltage corresponding to the operating voltage of the light source 1300. In some implementations, the circuitry 1210 may output DC current at voltages ranging between about 0 V and about 10 V. More generally, the circuitry 1210 may output DC current at voltages ranging between about 0 V and about 60 V.

In some implementations, the circuitry 1210 may also facilitate dimming of the LED light source 1300. The driver circuitry 1210 may provide support for various dimming protocols including, but not limited to, phase dimming (e.g., triode for alternating current (TRIAC) dimming, electronic low voltage (ELV) dimming), 4-wire dimming (e.g., 0-10V dimming), and pulse width modulated (PWM) dimming. In some examples, both the light output (e.g., intensity of light) as well as the correlated color temperature (CCT) of the light output may be controlled via the circuitry 1210.

For example, in one implementation the circuitry 1210 converts an AC voltage (e.g., from a building mains electrical supply) to a DC voltage suitable for providing power to an LED light source) and facilitates appreciable dimming of light output, without perceivable flicker, based on the output of a conventional TRIAC dimmer coupled to the circuitry 1210. Examples of circuitry 1210 configured for TRIAC-based dimming include, or are derived from, various circuit architectures disclosed in U.S. application Ser. No. 16/561,898, filed Sep. 5, 2019, entitled "METHODS AND APPARATUS FOR TRIAC-BASED DIMMING OF LEDS," now U.S. Pat. No. 10,616,968, issued Apr. 7, 2020 (incorporated by reference herein in its entirety). Pursuant to such driver circuitry, existing triac-based dimmers from a variety of manufacturers (and different models from a given manufacturer) may be used to effectively control (increase or decrease) the light output of a lighting module in a relatively smooth fashion and over an appreciable range of light output (e.g., between full power light output and relatively small percentages of full power light output, such as less than 5%, less than 2%, or less than 1%) without shimmer or flickering effects.

Figure 17A:
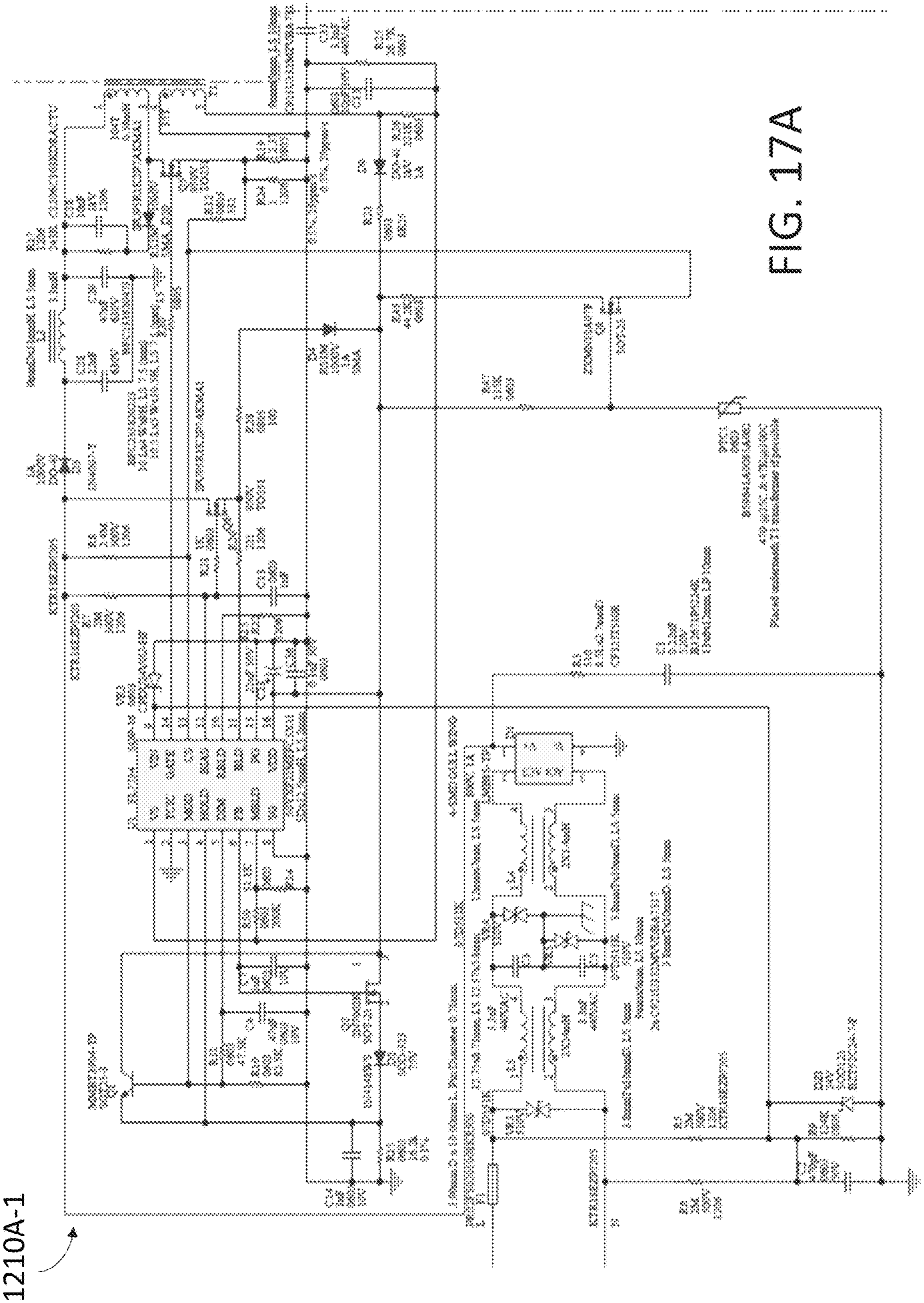
FIG. 17A shows a circuit diagram of a first portion of an exemplary driver circuit to facilitate dimming.
Figure 17B:
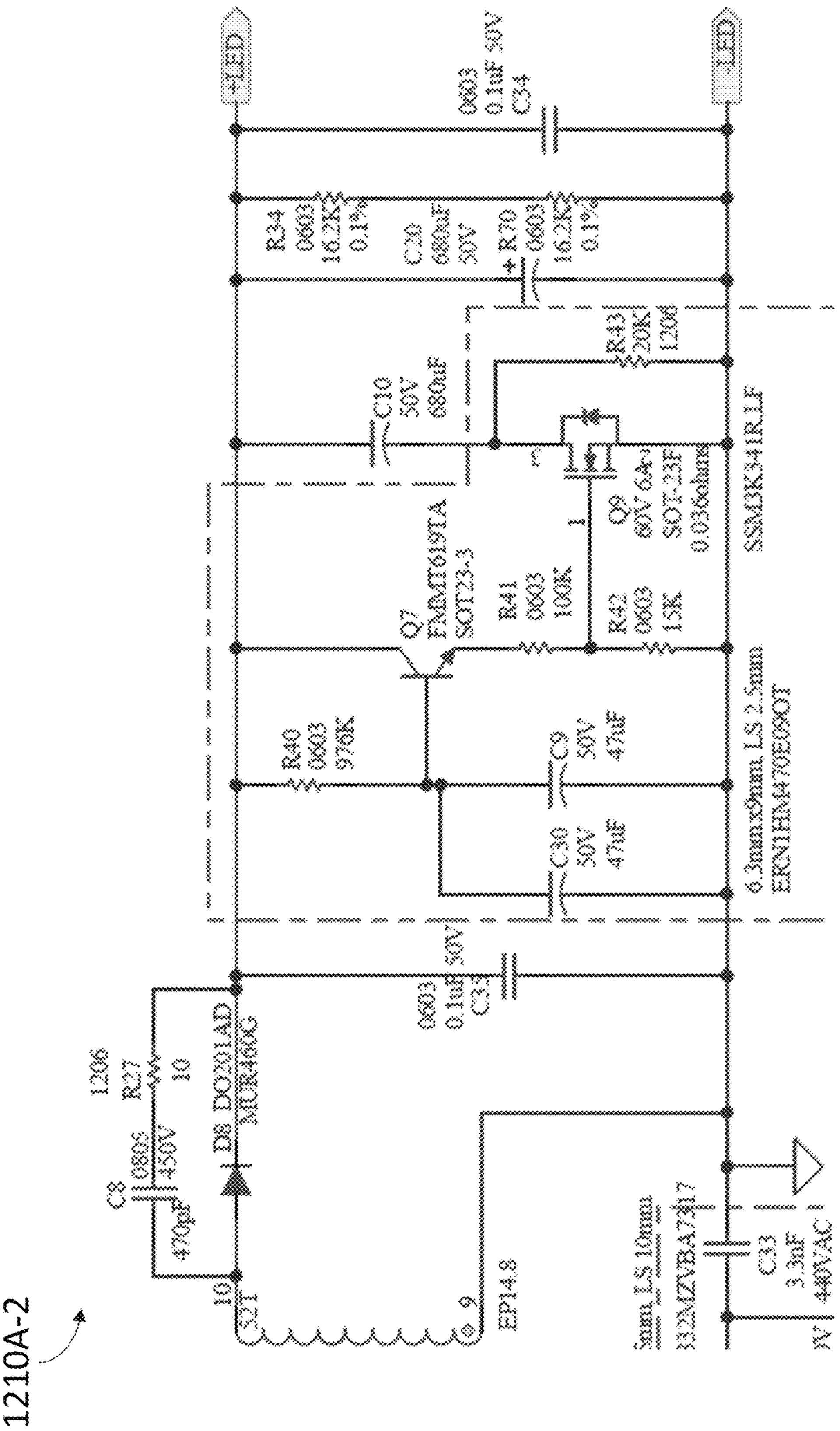
FIG. 17B shows a circuit diagram of a second portion of an exemplary driver circuit to facilitate dimming in conjunction with the first portion shown in FIG. 17A.

FIGS. 17A and 17B show respective portions of example circuitry 1210A derived in part from the circuit architectures disclosed in U.S. Pat. No. 10,616,968 referenced immediately above. In particular, FIG. 17A illustrates a primary side 1210A-1 of the circuitry 1210A and FIG. 17B illustrates a secondary side 1210A-2 of the circuitry. The overall functionality and circuit topology of the primary side 1210A-1 shown in FIG. 17A is described in detail in U.S. Pat. No. 10,616,968. Regarding the secondary side 1210A-2 of the circuitry shown in FIG. 17B, perceivable flicker is substantially mitigated in the light output via a timed addition of capacitance across the DC voltage that provides power to the LED light source. In particular, when a DC voltage is present between the terminals +LED and −LED to provide power to the LED light source, the capacitor C20 is connected between these terminals and charges relatively quickly to provide moderate flicker suppression. After approximately 60 seconds, capacitors C30 and C9 charge up through resistor R40 (with a relatively large RC time constant). Transistor Q7 is a voltage buffer generating a voltage 0.6V less than that across capacitors C30 and C9. Resistors R41 and R42 divide the voltage generated by transistor Q7 and apply the divided voltage to a MOSFET Q9. When the divided voltage reaches the turn-on threshold voltage of Q9 (e.g., approximately 3V) then Q9 turns on and connects additional capacitor C10 to further aid with flicker suppression. To prevent a premature switching-in of capacitor C10 (which may create a dip in the output voltage between the terminals +LED and −LED), resistor R43 provides a relatively slow pre-charging path for capacitor C10 to ensure that it is already fully charged before MOSFET Q9 turns on.

Another example implementation of the circuitry 1210 converts an AC voltage (e.g., from a building mains electrical supply) to a DC voltage suitable for providing power to an LED light source) and facilitates appreciable dimming of light output via 0-10V dimming. As would be readily appreciated in the art, 0-10V dimming is a lighting control method that produces varying light level outputs based on a direct current (DC) control voltage between 0 and 10 Volts. Accordingly, in these example implementations, both an AC voltage (to provide power to an LED light source) and a DC voltage (to provide dimming control of the LED light source) are provided as inputs to the circuitry 1210.

Figure 18A:
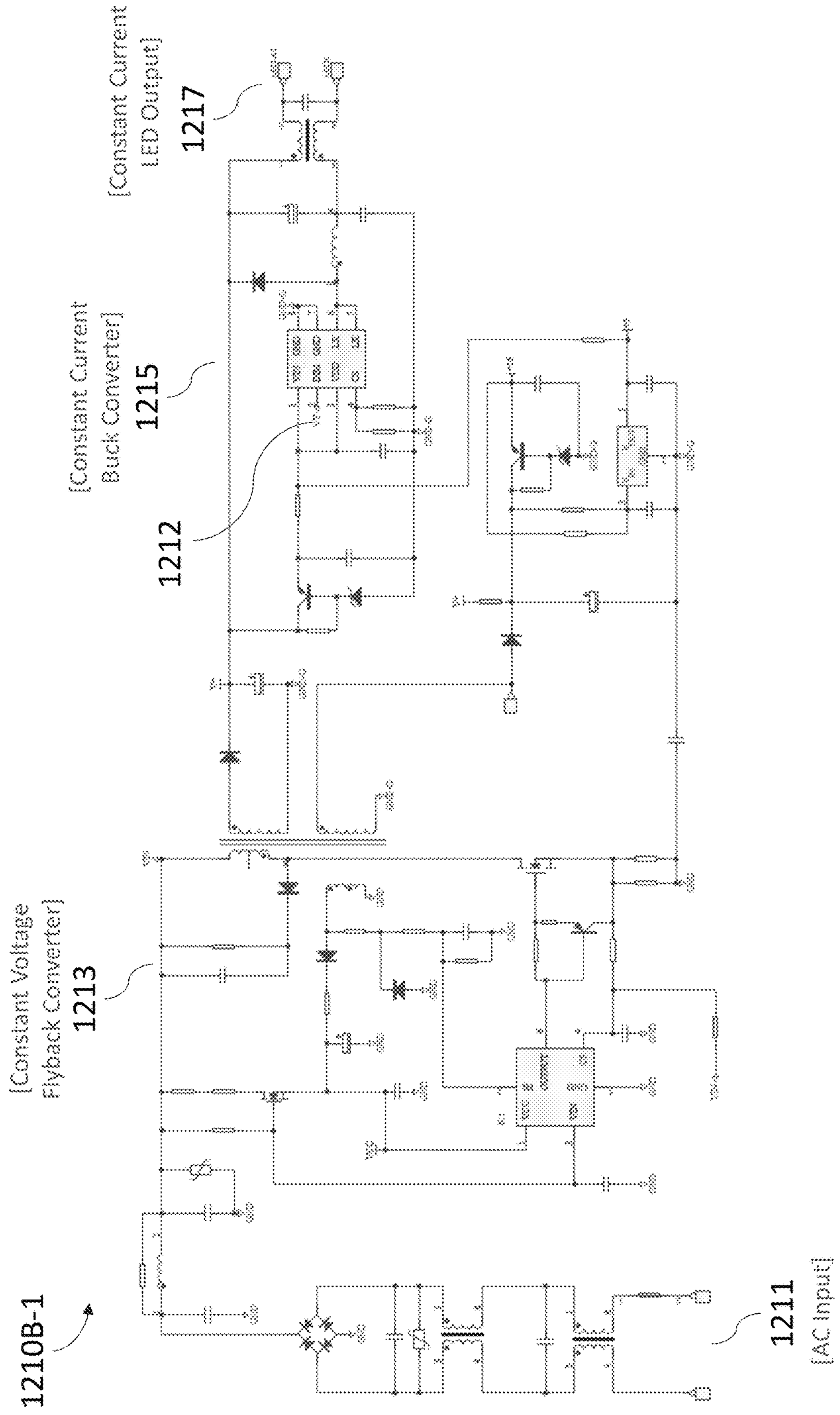
FIG. 18A shows a circuit diagram of a power portion of an exemplary driver circuit to facilitate 0-10V dimming.
Figure 18B:
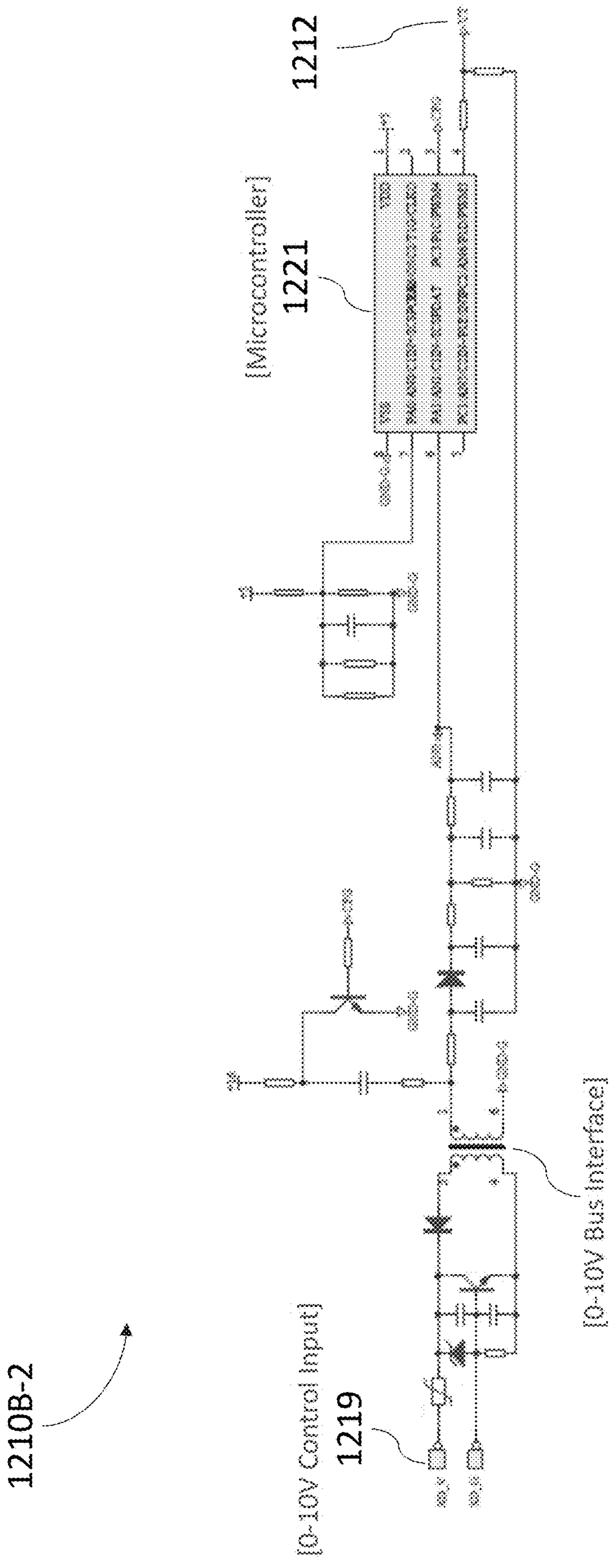
FIG. 18B shows a circuit diagram of a control portion of an exemplary driver circuit to facilitate 0-10V dimming in conjunction with the power portion shown in FIG. 18A.

FIGS. 18A and 18B show respective portions of example circuitry 1210B that provides dimming. In particular, FIG. 18A illustrates a power portion 1210B-1 of the circuitry 1210B and FIG. 18B illustrates a control portion 1210B-2 of the circuitry. As shown in FIG. 18A, the power portion 1210B-1 receives an AC voltage input 1211 and employs a constant voltage flyback converter 1213 on a primary side and a constant current buck converter 1215 on the secondary side to convert the AC voltage to a DC voltage and provide a constant current LED output 1217. An integrated circuit in the constant current buck converter in the secondary side receives a control signal VT 1212 (also referred to herein as the "DC control signal 1212") to controllably vary a value of the constant current LED output 1217, thereby varying the light output of the LED light source. As shown in FIG. 18B, the control portion 1210B-2 of the circuitry 1210B receives a 0-10V DC control input 1219 and employs a microcontroller 1221 to provide the control signal VT 1212 (which is in turn applied to the integrated circuit in the constant current buck converter of FIG. 18A) based on the 0-10V DC control input 1219. Thus, the circuitry 1210B according to this example is coupled to four input wires, e.g., two wires to provide the AC voltage input 1211 and two wires to provide the 0-10V DC control input 1219.

In yet other examples, the circuitry 1210 may be configured to adjust the light output (e.g., intensity) as well as correlated color temperature (CCT) of the light output. For circuitry configured for CCT control, in inventive aspects one or both of the AC half cycles of input AC voltage are employed to enable a phase dimmer to convey desired CCT in one half cycle and desired intensity in the other half cycle. In one example, the information is conveyed by varying the time that the phase cut dimmer conducts during the positive and negative half cycles. A controller of the driver circuitry decodes the incoming AC phase-cut waveform and converts it to two distinct signals representing intensity and CCT. Detailed examples of circuitry 1210 for CCT control are provided in U.S. Provisional Application No. 63/224,469, filed Jul. 22, 2021, entitled "METHODS AND APPARATUS FOR ENCODING ONE OR MORE HALF-CYCLES OF AN AC WAVEFORM TO CONTROL A LIGHTING FIXTURE," which is hereby incorporated herein by reference.

The circuitry 1210 may generally include a printed circuit board (PCB) supporting the various circuit elements described above. As shown in FIGS. 2A and 2B, the PCB may be shaped as a donut (i.e., a circular PCB with an opening 1214 at its center). The opening 1214 may be shaped and/or dimensioned to receive an island section 1240 of the driver housing 1230 as will be discussed in more detail below. The opening 1214 may also allow passage of other components, such as an integrated power connector for the driver circuitry 1210, the electrical cables 1020, 1030*a*, 1030*b*, and/or the ground cables 1010 and 1014. It should be appreciated, however, the PCB of the circuitry 1210 is not limited to a donut-shape, but may have other shapes including, but not limited to, a solid circle (e.g., a circular shape with no center opening) and a semi-circle (e.g., a crescent).

The circuitry 1210 may be disposed within a cavity 1231 defined by the driver housing 1230 such that a sidewall 1232 and a base 1234 of the driver housing 1230 at least partially surrounds and encloses the circuitry 1210. When the driver module 1200 is mounted to the heat sink 1100, the driver circuitry 1210 may also be disposed entirely within the cavity 1104. In some implementations, the PCB may further include a keyed feature 1216 to align the circuitry 1210 to a corresponding keyed feature 1248 of the driver housing 1230 for assembly. The keyed features 1216 and 1248 may also constrain the movement of the circuitry 1210 within the driver housing 1230 to reduce or, in some instances, prevent unwanted physical contact between the electrical components of the circuitry 1210 and/or portions of the lighting module 1000*a* where the risk of short circuiting may be high, such as portions of the heat sink 1100 where bare metal may be exposed or portions of the circuit elements in the circuitry 1210 where the metal leads are exposed.

In some implementations, the taller circuit elements of the circuitry 1210 may also be disposed near the outer edge of the PCB where the cavity 1104 of the heat sink 1100 is larger. In this manner, the driver circuitry 1210 may be positioned closer to the partition 1120 of the heat sink 1100, thus reducing the exterior height $h_{ext}$ of the lighting module 1000*a*. It should appreciated that, in some implementations, the various circuit elements of the circuitry 1210 may be placed at any location on the PCB, particularly if the exterior height $h_{ext}$ of the lighting module 1000*a* is larger such that the taller circuit elements do not contact or interfere with the partition 1120. The light module 1000*a* may also generally support different driver circuitry so long as the circuitry fits within the size constraints (e.g., the diameter, the height) imposed by the driver housing 1230 and/or the heat sink 1100. For example, the lighting module 1000*a* may include a driver module 1200 with circuitry based on the TRIAC dimmer of FIGS. 17A and 17B or the 0-10V dimmer of FIGS. 18A and 18B.

In some implementations, a potting material 1202 may be added into the driver housing 1230 to encapsulate and/or seal at least a portion of the circuitry 1210. The potting material 1202 may also seal portions of the electrical wires coupled to the circuitry (e.g., the electrical cables 1020, 1030*a*, 1030, the ground cable 1014). The potting material 1202 may provide an electrically insulating medium to electrically insulate the circuitry 1210 from other components in the lighting module 1000*a*, such as the driver housing 1230 and the heat sink 1100. The potting material 1202 may conformally coat the circuitry 1210. For example, the potting material 1202 may be applied as a liquid, which forms a solid when cured. The potting material 1202 may be formed from various materials including, but not limited to a thermosetting polymer, a silicone rubber, and epoxy resins.

In some implementations, the driver module 1200 may further include a driver insulator 1250 disposed on the surface of the partition 1120 adjoining the cavity 1104 to provide an electrically insulating barrier between the exposed portions of the circuitry 1210 and the partition 1120 of the heat sink 1100. Said in another way, the driver insulator 1250 may cover the opening into the driver cavity 1231 so that the driver housing 1230 and the driver insulator 1250 together encapsulate the circuitry 1210 within the cavity 1104 of the heat sink 1100. It should be appreciated, however, that in implementations where the gap between the circuitry 1210 and the partition 1120 is sufficiently large such that the risk of electrical contact between the circuitry 1210 and the heat sink 1100 is low, the lighting module 1000*a* may not include the driver insulator 1250.

Figure 1H:
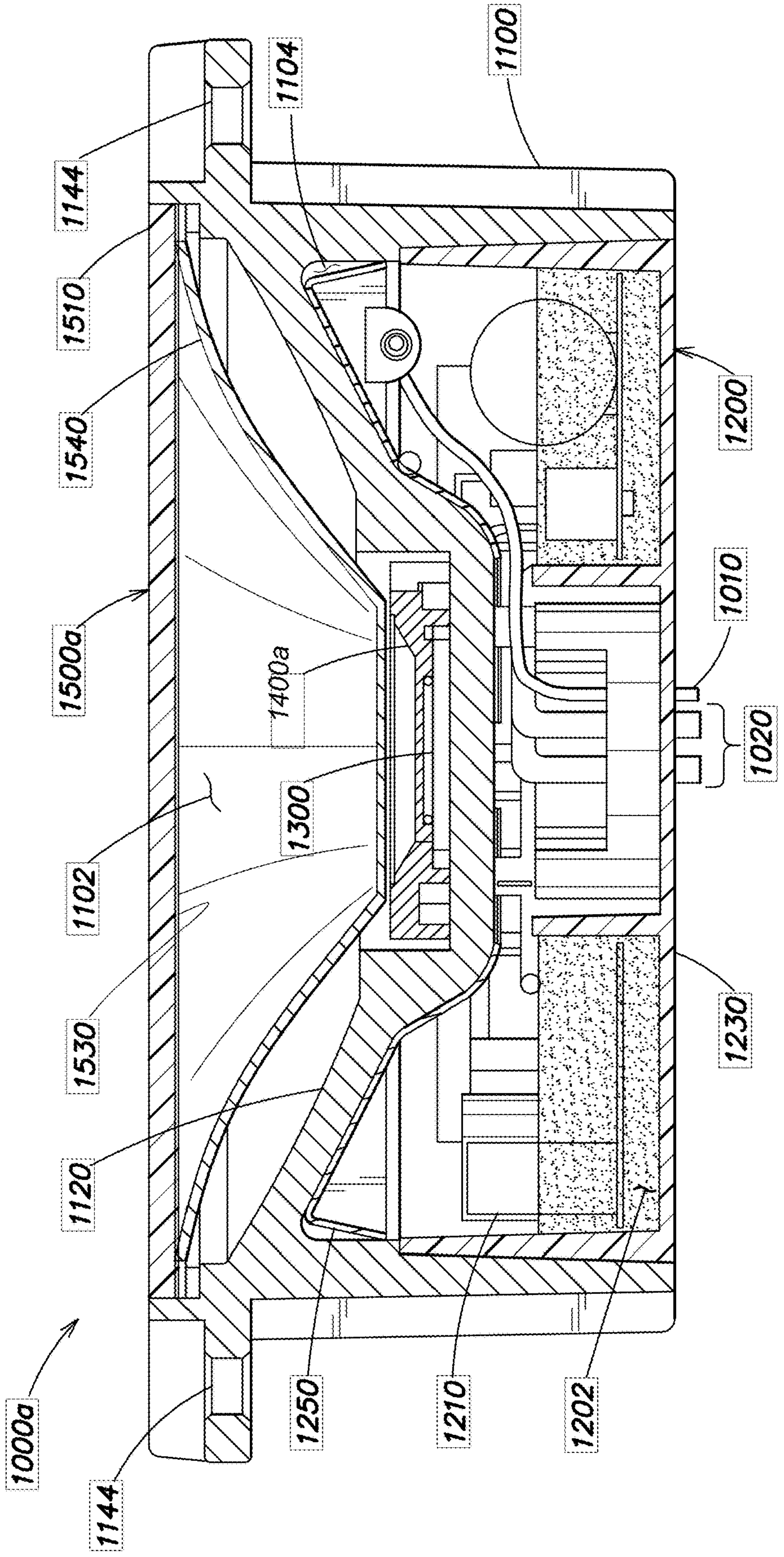
FIG. 1H shows a cross-sectional view of the lighting module corresponding to the plane A-A of FIG. 1D.

In some implementations, the driver housing 1230 and the driver insulator 1250 may not be directly coupled together. For example, FIGS. 1H, 1K, and 1L show the driver insulator 1250 may be inserted into the cavity 1104 of the heat sink 1100 first followed by the driver housing 1230 with the circuitry 1210 disposed within the cavity 1231. As shown, the driver housing 1230 may include snap-fit connectors 1236 that couple to the snap-fit receivers 1126 of the heat sink 1100. In some implementations, the driver insulator 1250 may not be held in place, but instead may float within the driver module 1200 so long as the driver insulator 1250 provides an insulating barrier between the circuitry 1210 and the heat sink 1100. In some implementations, the driver circuitry 1210 may not physically contact the driver insulator 1250. It should be appreciated, however, that in other implementations, the driver housing 1230 and the driver insulator 1250 may be coupled via various connecting mechanisms including, but not limited to, snap-fit connectors, a fastener, and an adhesive.

In some implementations, the lighting module 1000*a* may also include a ground connection. Unlike previous lighting modules, a ground connection may be provided directly between the circuitry 1210 and an external ground (e.g., the housing of a lighting system). This may be accomplished, for example, by utilizing a ground cable 1014 to electrically couple the circuitry 1210 to the heat sink 1100 and a ground cable 1010 to electrically couple the heat sink 1100 to the external ground.

As shown in FIGS. 1K, 1L, 2A, and 2B, one end of the ground cable 1014 may be electrically coupled to the PCB of the circuitry 1210. The ground cable 1014 may include a connector 1016 (e.g., a ring connector) at the other end to receive a fastener 1204 that couples the ground cable 1014 to the partition 1120 of the heat sink 1100 via an opening 1122. The ground cable 1010 may also include a connector 1012 (e.g., a ring connector) that overlaps the connector 1016 so that the fastener 1204 may also couple the ground cable 1010 to the heat sink 1100. It should be appreciated, however, that in other implementations, the ground cable 1010 and the connector 1012 may be coupled to another portion of the heat sink 1100 separate from the ground cable 1014. Once connected, the ground cable 1010 may then be routed through an opening 1246 on the driver housing 1230, together with the electrical cable 1020, for connection to the external ground. It should be appreciated, however, that in other implementations, the ground cable 1010 may be routed through a separate opening on the driver housing 1230.

The lighting module 1000*a* may also provide electrical cables 1020 to supply electrical power and/or a control signal to the driver module 1200 from an external power source and/or dimmer and the electrical cables 1030*a* and 1030*b* to supply electrical power to the light source 1300 from the driver module 1200. During assembly, the electrical cables 1030*a* and 1030*b*, which are connected directly to the circuitry 1210, may be routed through respective openings 1134 in the partition 1120 of the heat sink 1100 for connection to the light source holder 1400*a*. In some implementations, the light source holder 1400*a* may include poke-in connectors (not shown), which are configured to electrically contact the respective terminals of the light source 1300 when the light source 1300 is coupled to the light source holder 1400*a*. The electrical cables 1030*a* and 1030*b* may each be inserted into a respective poke-in connector and subsequently restrained. In other words, the electrical cables 1030*a* and 1030*b* may be electrically coupled to the light source 1300 via the light source holder 1400*a* without any soldering.

Figure 1I:
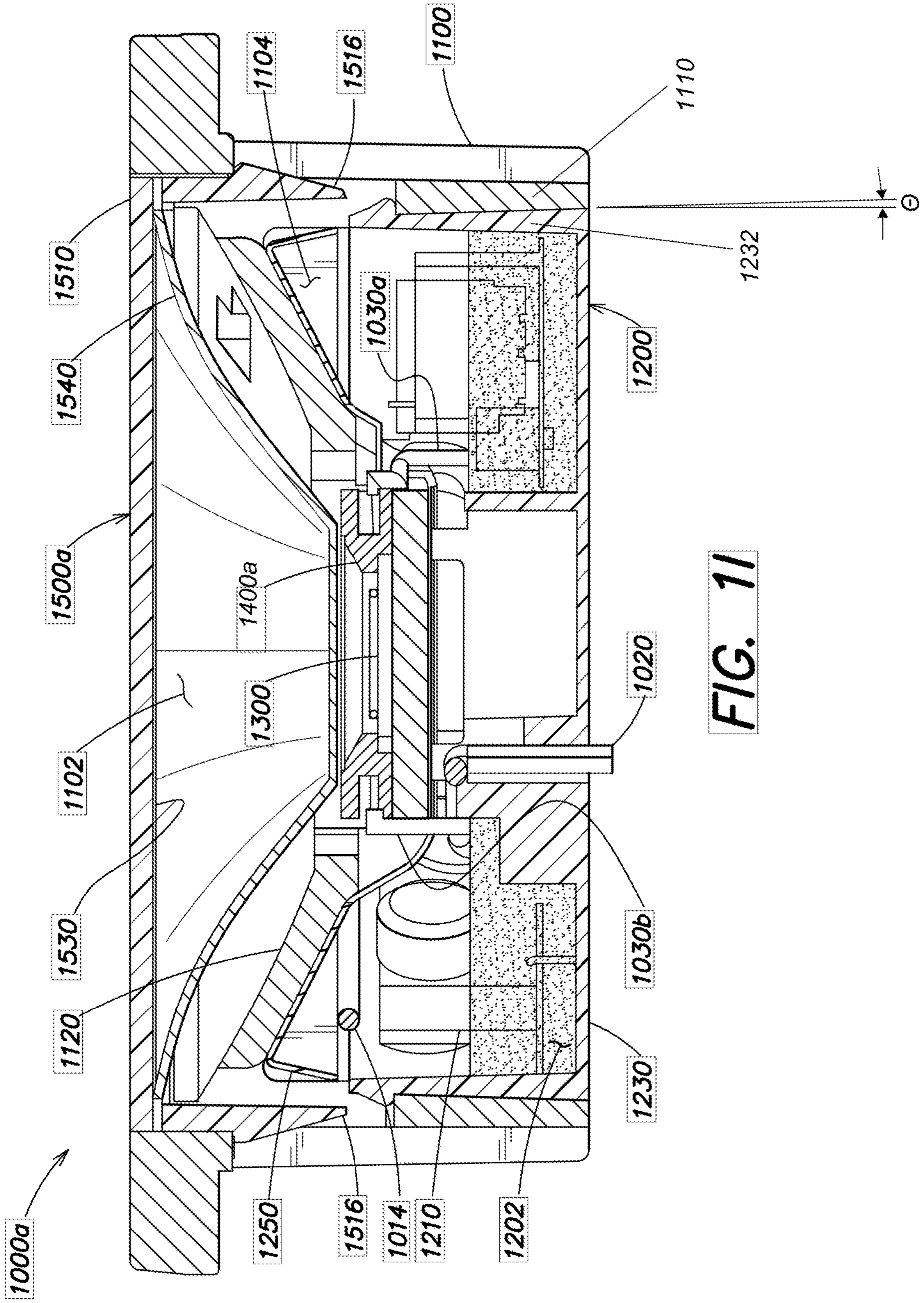
FIG. 1I shows a cross-sectional view of the lighting module corresponding to the plane B-B of FIG. 1E.
Figure 1J:
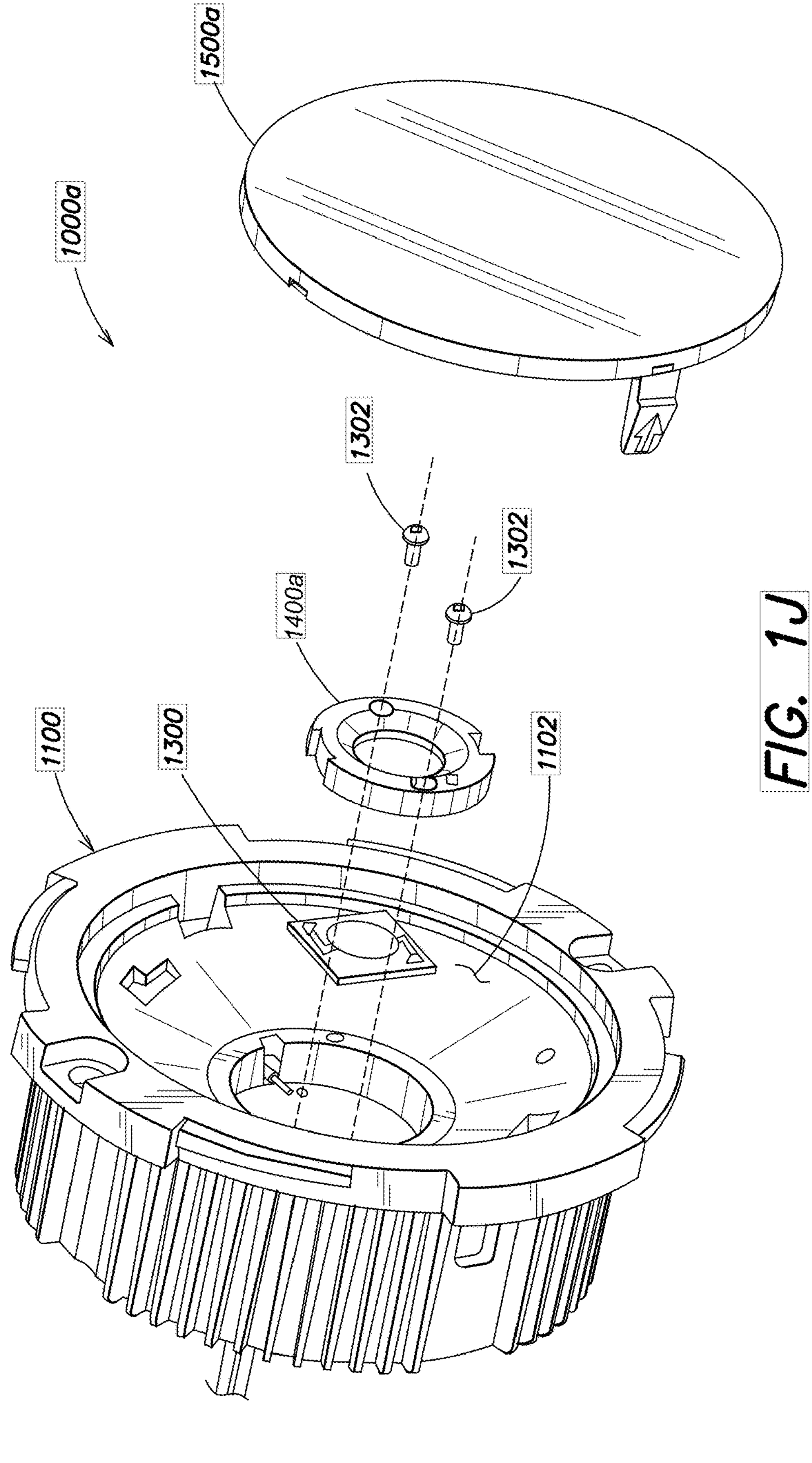
FIG. 1J shows an exploded top perspective view of the lighting module of FIG. 1B where an optical assembly, a light source holder, a light source, and fasteners are separated from a heat sink.
Figure 1K:
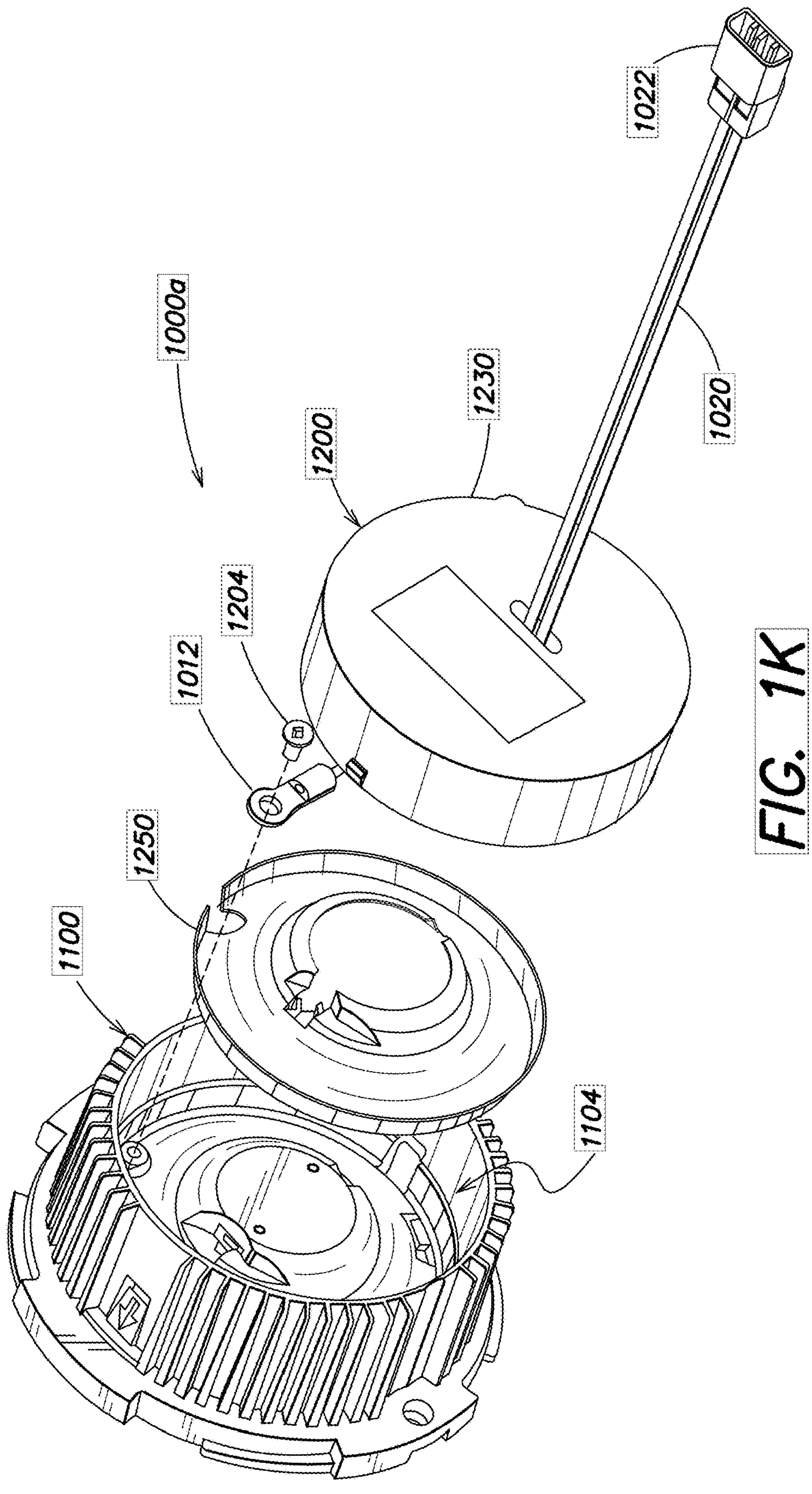
FIG. 1K shows an exploded bottom perspective view of the lighting module of FIG. 1B where a driver module is separated from the heat sink.
Figure 1L:
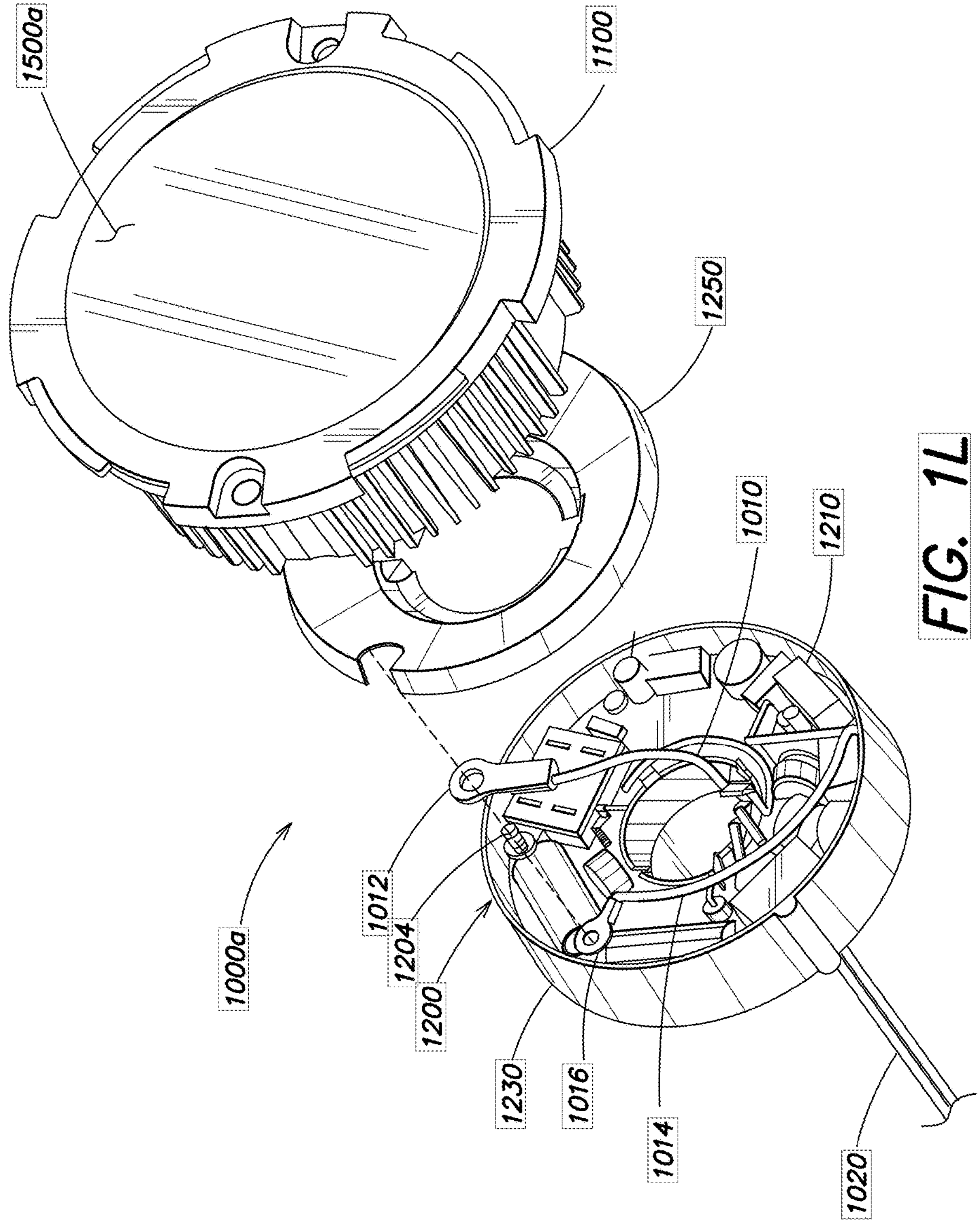
FIG. 1L shows an exploded top perspective view of the lighting module of FIG. 1K.
Figure 2C:
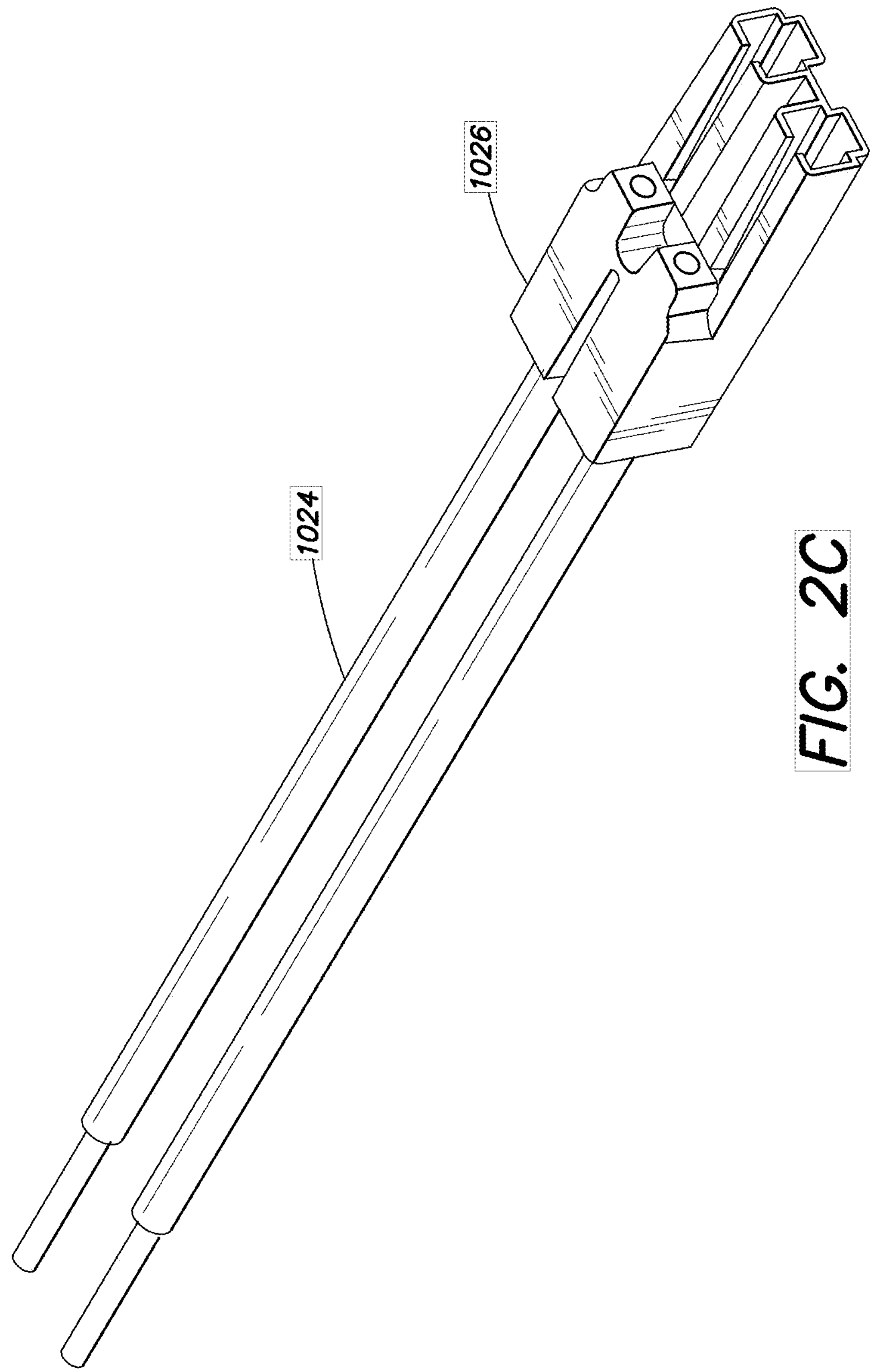
FIG. 2C shows a top perspective view of an electrical cable supplying at least electrical power to the lighting module of FIG. 1A.
Figure 2D:
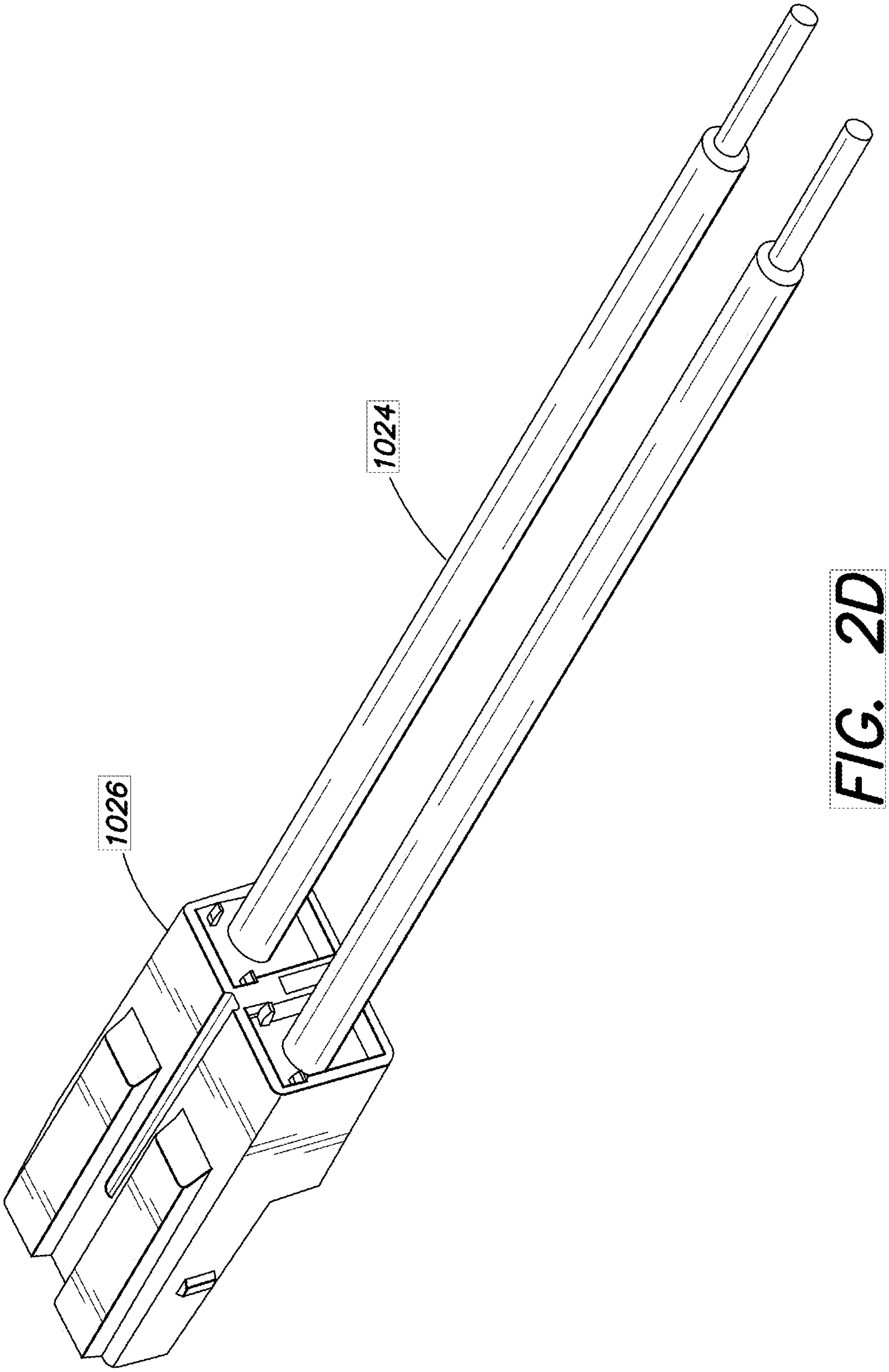
FIG. 2D shows a bottom perspective view of the electrical cable of FIG. 2C.

FIGS. 1H, 1L, and 2A show the electrical cable 1020 may be electrically coupled to the circuitry 1210 at one end and routed through the opening 1246 together with the ground cable 1010. At the other end, the electrical cable 1020 may include an electrical connector 1022 as shown in FIG. 1A. The electrical connector 1022 may be coupled to an electrical cable 1024 supplying the electrical power via a corresponding connector 1026 as shown in FIGS. 2C and 2D. In some implementations, the electrical connectors 1022 and 1026 may be interlocking and/or keyed connectors. In some implementations, the electrical connector 1022 may be integrated into the driver housing 1230 such that the electrical cable 1024 is coupled directly to the driver module 1200.

FIGS. 3A-3F show several additional views of the driver housing 1230. As shown, the driver housing 1230 may include the sidewall 1232 and the base 1234 (also referred to herein as the "driver base 1234") that together define the cavity 1231 to contain the circuitry 1210 and, optionally, the potting material 1202. In some implementations, the sidewall 1232 and/or the base 1234 may have various cross-sectional shapes including, but not limited to a circle, an ellipse, a polygon, and any combinations of the foregoing.

In some implementations, the shape and/or dimensions of the base 1234 may be tailored to substantially enclose the cavity 1104 as shown in FIGS. 1A, 1B, 1H, and 1I. The sidewall 1232 may be shaped to conform with the sidewall 1110 of the heat sink 1100. For example, FIGS. 1H and 1I show the sidewall 1110 of the heat sink 1100 and the sidewall 1232 of the driver housing 1230 may be tapered. The draft angle of the sidewalls 1110 and 1232 may be tailored such that the driver housing 1230 is positioned in close contact with the heat sink 1100 to increase thermal dissipation from the circuitry 1210 and/or to secure/position the driver housing 1230 inside the cavity 1104. In some implementations, the sidewall 1232 may contact a ledge 1118, which functions as a mechanical stop limiting the extent the driver housing 1230 is inserted into the cavity 1104. In some implementations, the base 1234 may be substantially flush or flush with the opening of the cavity 1104 (i.e., the exterior surface of the base 1234 and the bottom end of the sidewall 1110 of the heat sink 1100 defining the opening into the cavity 1104 may lie on the same horizontal plane).

Figure 3A:
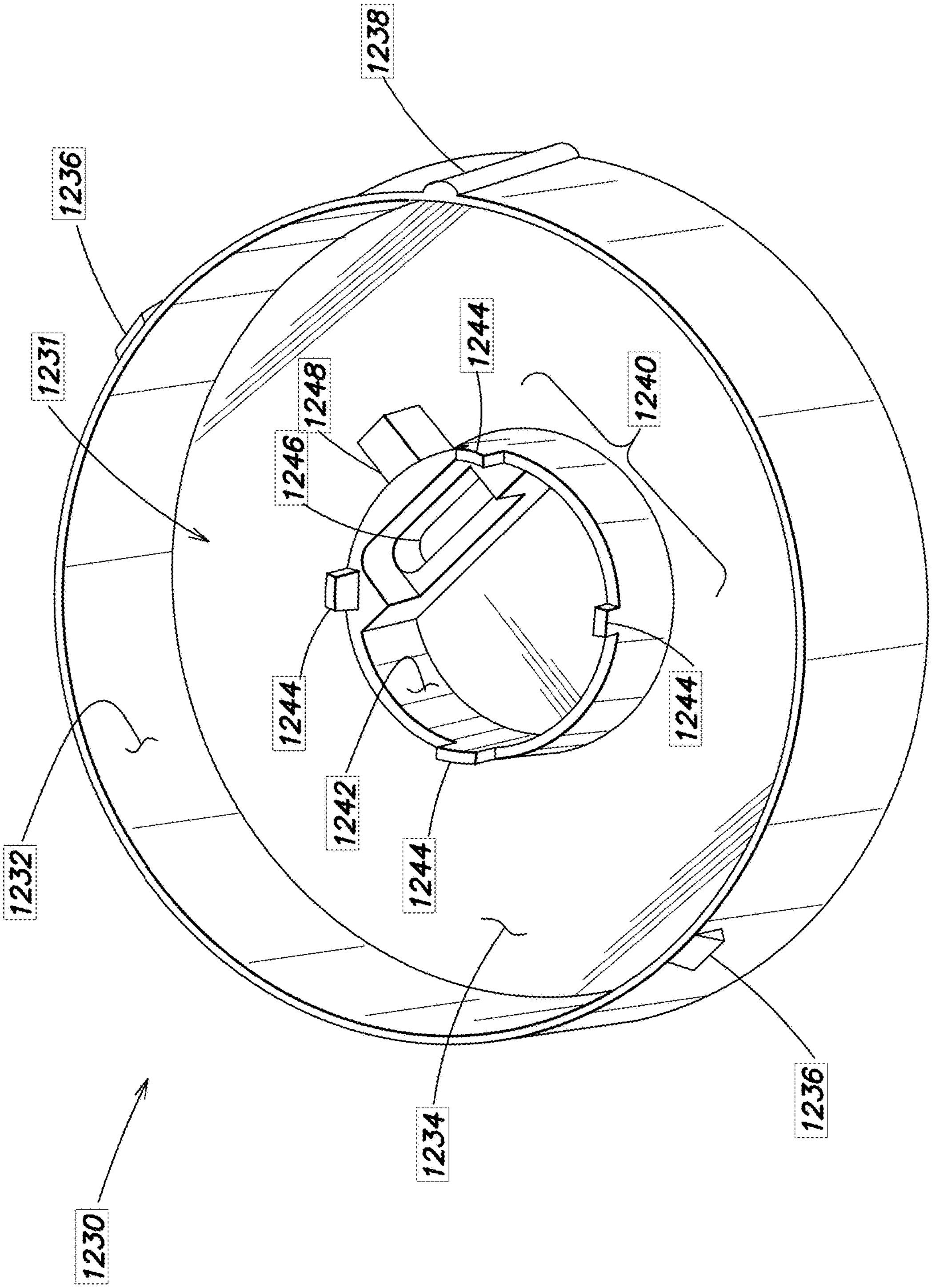
FIG. 3A shows a top perspective view of the driver housing in the driver module of FIG. 1A.
Figure 3B:
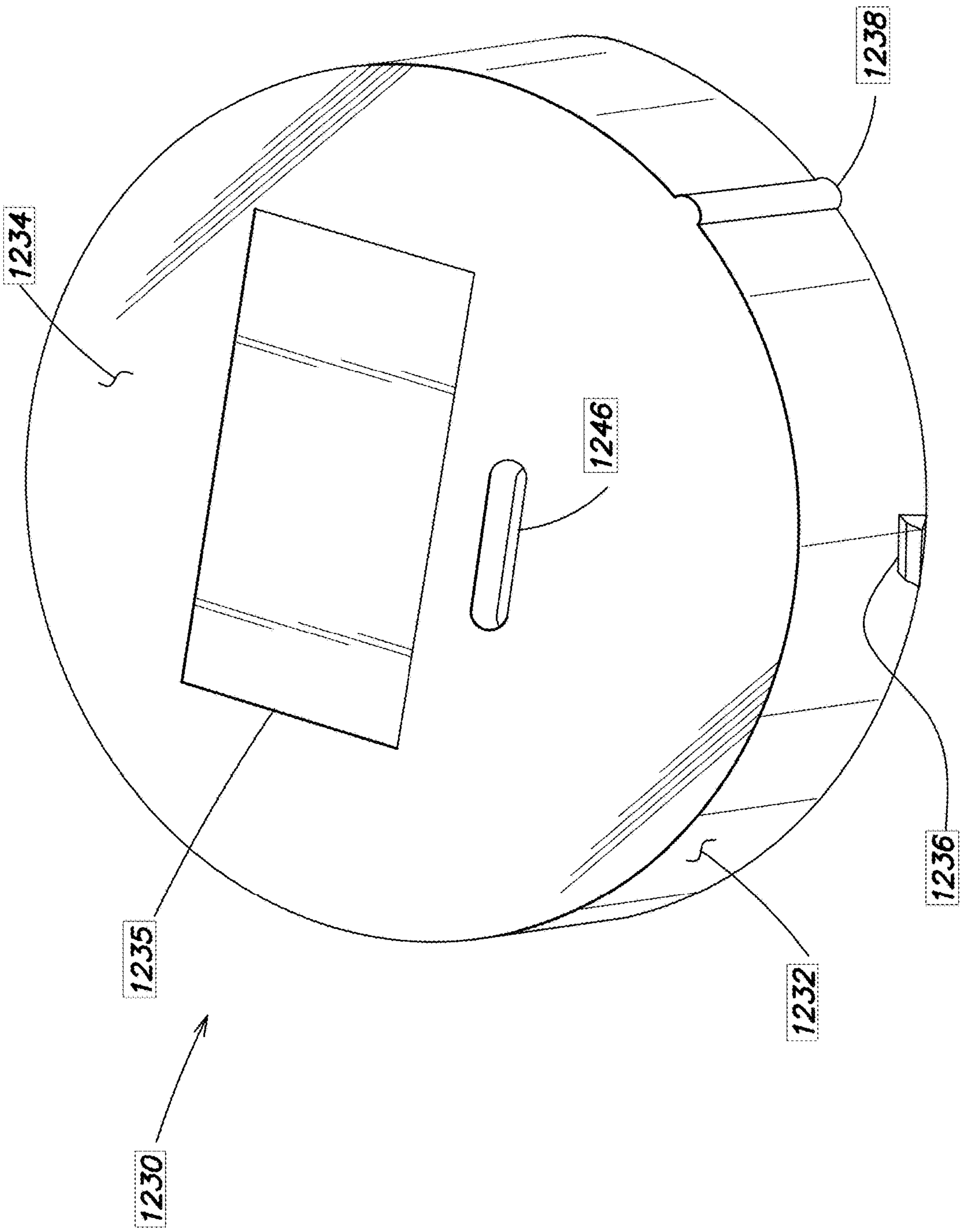
FIG. 3B shows a bottom perspective view of the driver housing of FIG. 3A.
Figure 3C:
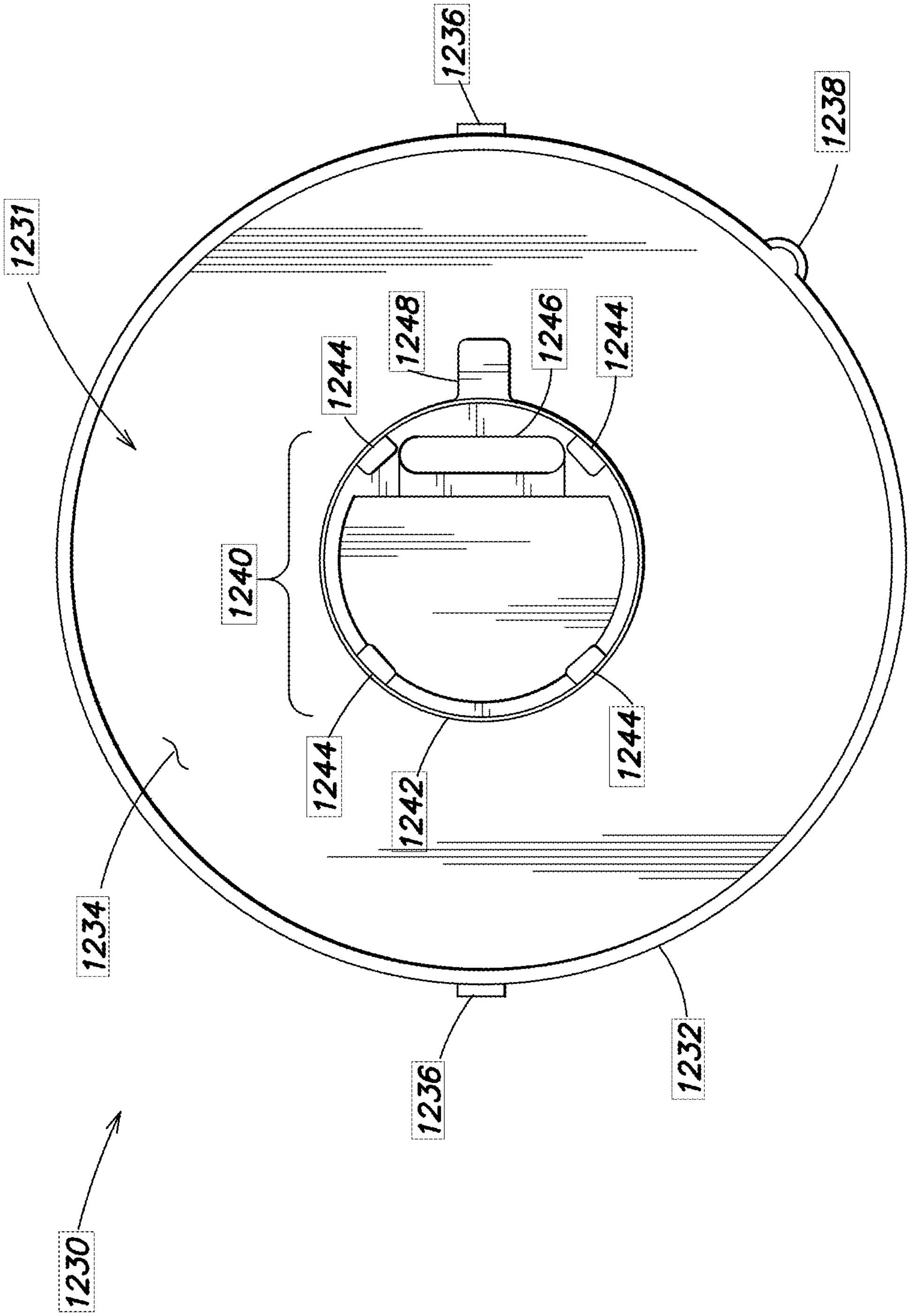
FIG. 3C shows a top view of the driver housing of FIG. 3A.
Figure 3D:
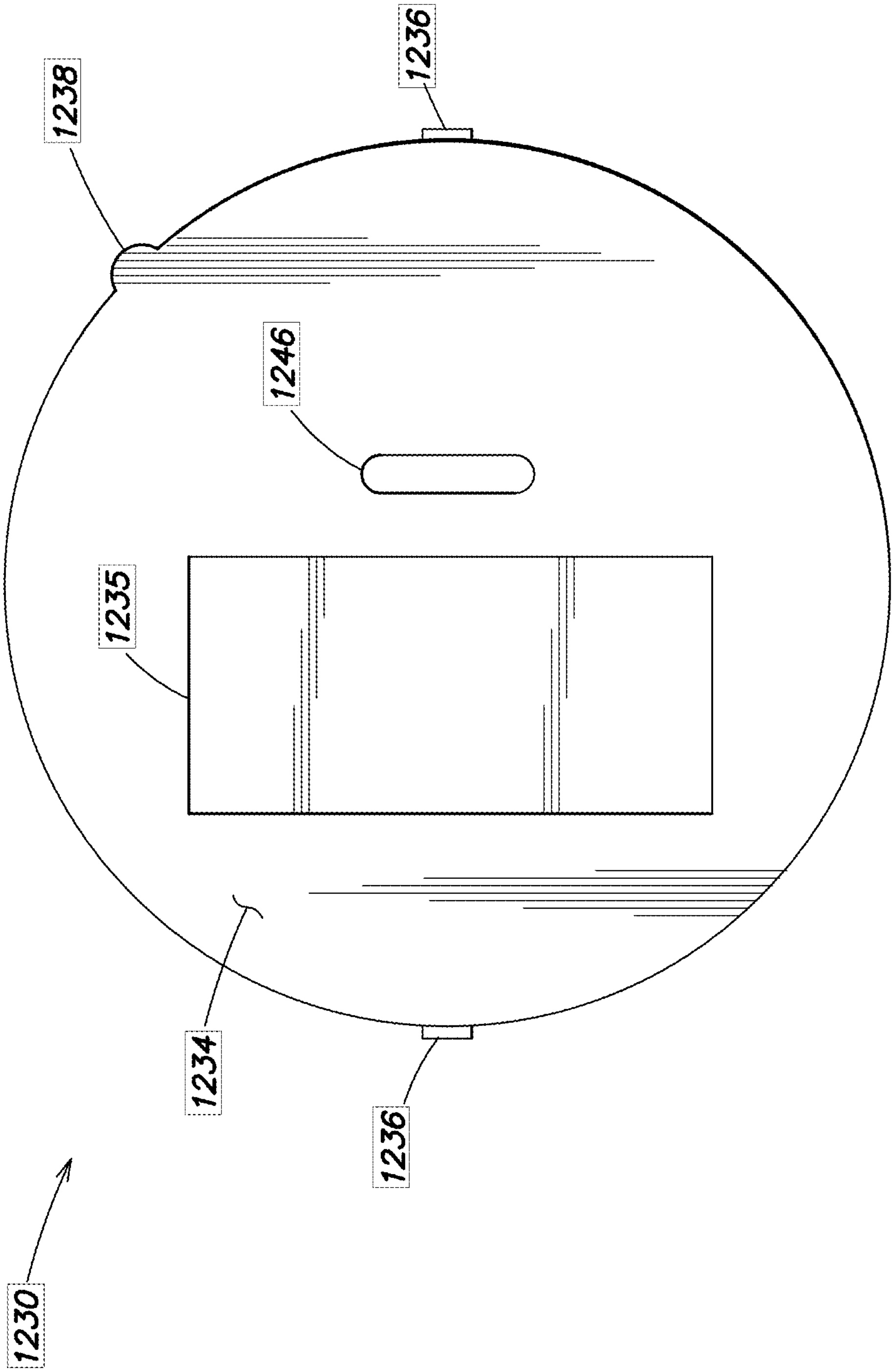
FIG. 3D shows a bottom view of the driver housing of FIG. 3A.
Figure 3E:
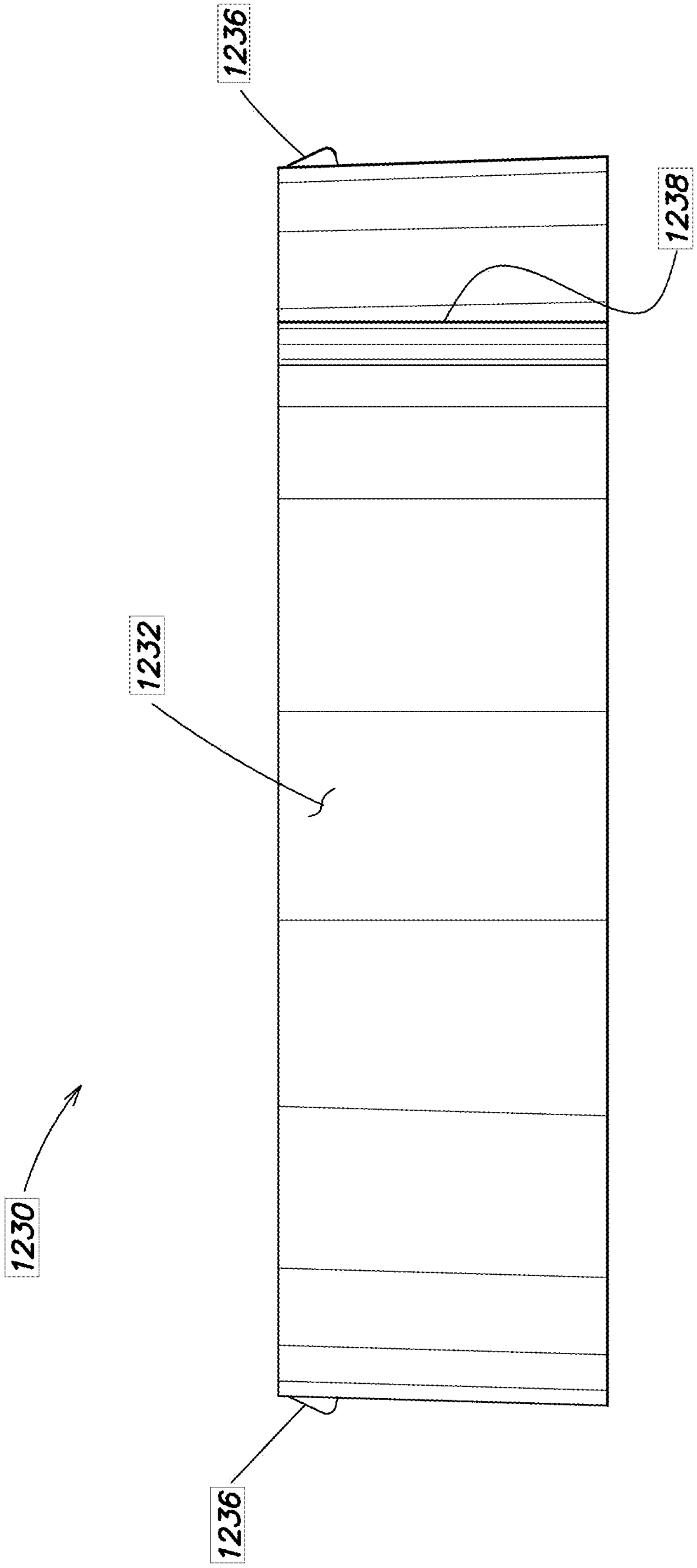
FIG. 3E shows a front view of the driver housing of FIG. 3A.
Figure 3F:
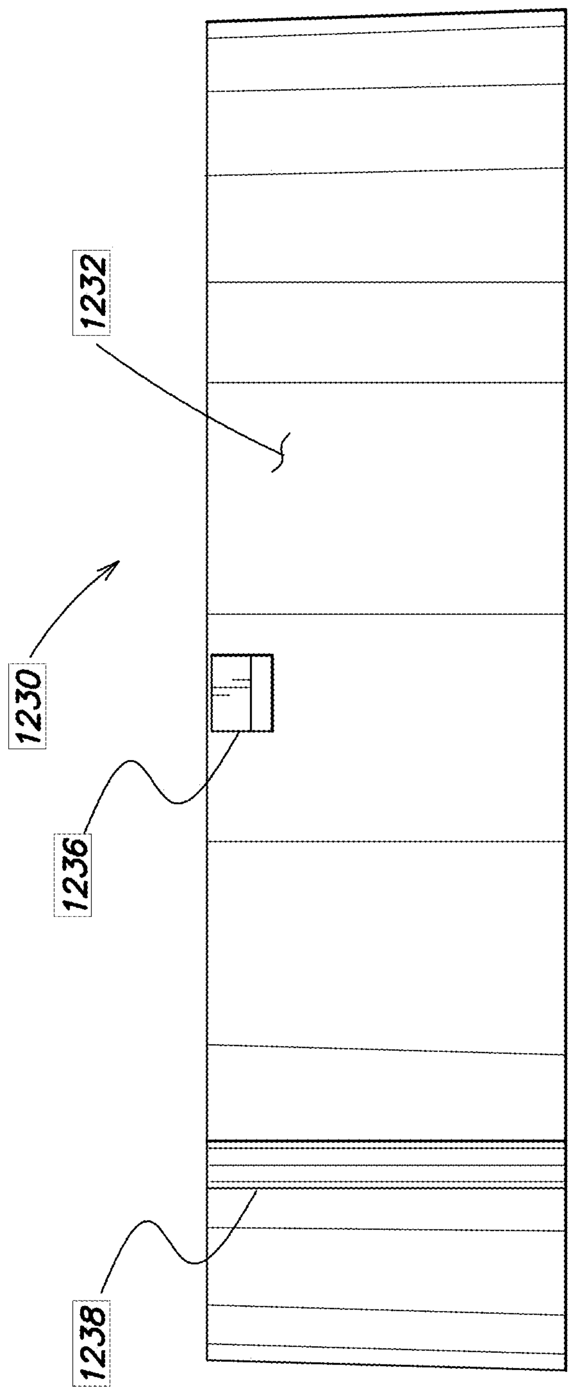
FIG. 3F shows a right-side view of the driver housing of FIG. 3A.

As shown in FIG. 3A, the driver housing 1230 may include one or more snap-fit connectors 1236 disposed along the exterior surface of the sidewall 1232 to engage the snap-fit receivers 1126 of the heat sink 1100, thus coupling the driver housing 1230 to the heat sink 1100. The snap-fit connectors 1236 may be disposed proximate to an opening defined by the sidewall 1232. In some implementations, the driver housing 1230 may include one or more pairs of snap-fit connectors 1236 disposed diametrically opposite to one another along the sidewall 1232. The driver housing 1230 may also include a keyed feature 1238 spanning the height of the sidewall 1232 that aligns with the keyed feature 1116 of the heat sink 1100. The keyed features 1238 and 1118 ensure the driver housing 1230 and, in particular, the circuitry 1210 are properly aligned to the heat sink 1100.

FIG. 3A further shows the base 1234 may include an island section 1240 disposed within the cavity 1231. As shown, the island section 1240 may include a sidewall 1242 that extends from the base 1234 towards the opening of the driver housing 1230. Thus, the sidewall 1242 may form a structure that is inserted through the opening 1214 of the circuitry 1210. In some implementations, the sidewall 1242 may mechanically constrain the lateral movement of the circuitry 1210 once inserted into the cavity 1231. In some implementations, the sidewall 1242 may be concentrically aligned with the sidewall 1232. The sidewall 1242 may also have various cross-sectional shapes including, but not limited to, a circle, an ellipse, a polygon, and any combinations of the foregoing.

The island section 1240 may also include a keyed feature 1248 extending from the sidewall 1242 along the base 1234, which aligns with the keyed feature 1216 of the circuitry 1210. The sidewall 1242 may further include one or more posts 1244 that extend from the exposed end of the sidewall 1242. The posts 1244 may abut the recessed section 1130 of the partition 1120, as shown in FIGS. 1H and 1I, to mechanically support the center portion of the driver module 1200. In other words, the posts 1244 may reduce or, in some instances, prevent the center portion of the module 1200 from being pushed into the cavity 1104 due to compliance in the driver housing 1230.

The posts 1244 may also provide openings to route the electrical wires (e.g., the electrical cable 1020, the ground cable 1010) from the circuitry 1210 and/or the heat sink 1100 into the island section 1240. The island section 1240, in turn, may include an opening 1246 disposed within the sidewall 1242 to provide a feedthrough for the electrical cable 1020 and/or the ground cable 1010 to be routed into/out of the driver housing 1230. The posts 1244 may additionally be shaped and/or dimensioned to have a contact area with the partition 1120 that is smaller than the sidewall 1242 in order to reduce unwanted heat conduction from the recessed section 1130 to the driver housing 1230. For example, the portion of the posts 1244 that contact the partition 1120 may be rounded and/or chamfered. The base 1234 may further include a label recess 1235 to receive label for the lighting module 1000*a* (e.g., a label identifying the various electrical and lighting specifications of the lighting module 1000*a*).

In some implementations, the driver housing 1230 may be formed from various electrically insulating materials including, but not limited to, polyvinyl chloride (PVC), acrylonitrile butadiene styrene (ABS), polycarbonate (PC), polyurethane (PU), polyethylene, polyethylene terephthalate, polypropylene, and polystyrene. Thus, the driver housing 1230 may form an electrically insulating barrier separating the circuitry 1210 and other components of the lighting module 1000*a*, such as the heat sink 1100. It may be preferable to form the driver housing 1230 from an electrically insulating material in implementations where the lighting module 1000*a* is tailored to provide relatively low light outputs such that the heat generated by the circuitry 1210 doesn't result in an appreciable rise in the temperature of the circuitry 1210 (e.g., the temperature of the circuitry 1210 remains below 125° C. during operation) despite the relatively lower thermal conductivity of a polymer compared to a metal. It should be appreciated that, in some implementations, the sidewall 1232 and/or the base 1234 may also be dimensioned to be sufficiently thin at least along portions of the driver housing 1230 located proximate to the heat generating circuit elements of the circuitry 1210 in order to provide a pathway to dissipate heat generated by the circuitry 1210 as will be discussed in more detail below.

Figure 1M:
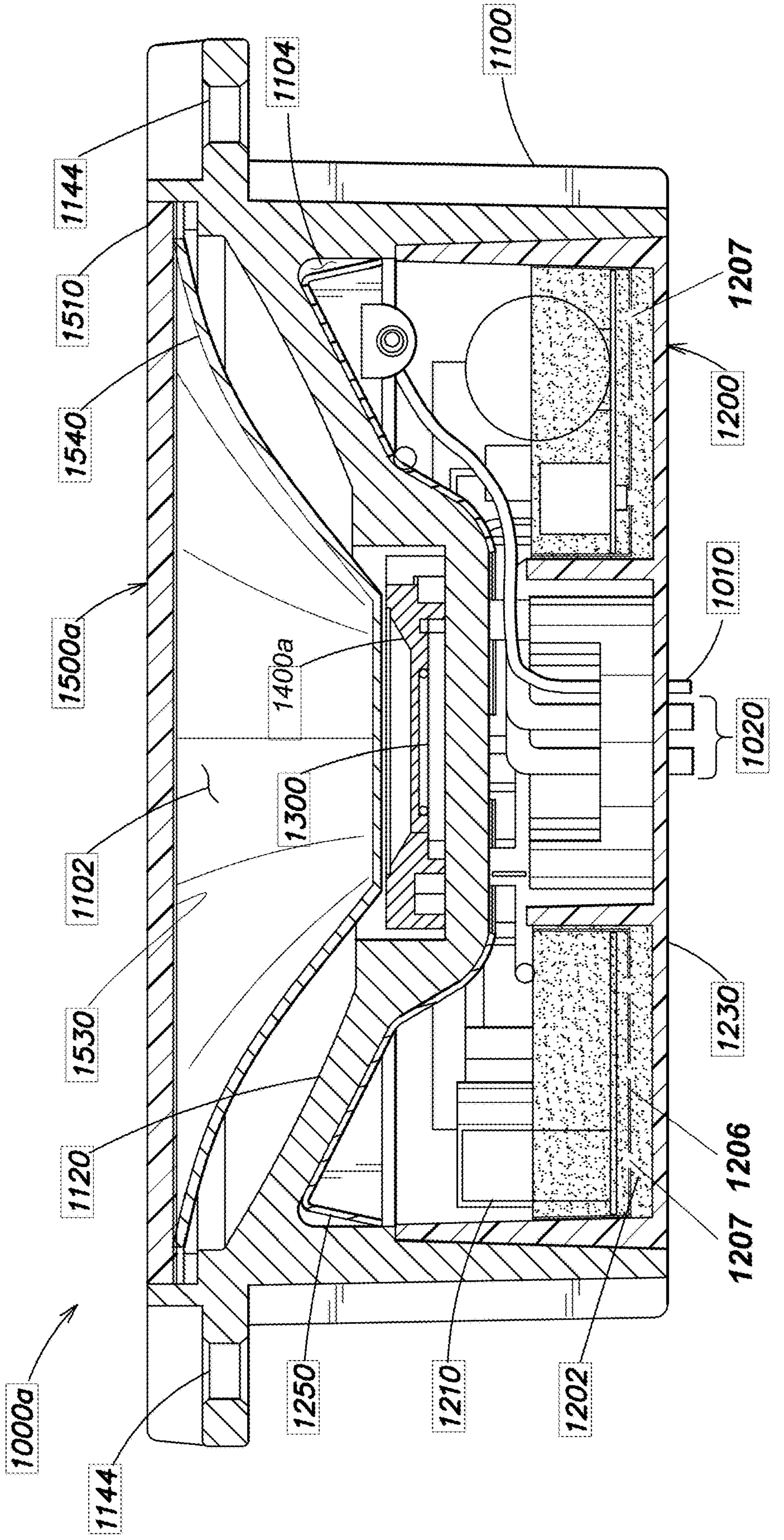
FIG. 1M shows another cross-sectional view of the lighting module corresponding to the plane A-A of FIG. 1D where the driver module includes an electrically insulating film between driver circuitry and a driver housing.

In some implementations, the driver housing 1230 may be formed from a metal including, but not limited to, aluminum and steel. In implementations where the driver housing 1230 is formed from a metal, the driver module 1200 may rely upon the potting material 1202 to electrically insulate the circuitry 1210 from the driver housing 1230. The driver module 1200 may also include an electrically insulating film 1206 disposed between the circuitry 1210 and the driver housing 1230 to prevent unwanted electrical arcing as shown in FIG. 1M. The insulating film 1206 may be formed from various materials including, but not limited to, mylar.

In some implementations, the insulating film 1206 may line the interior surfaces of the driver housing 1230. In some implementations, the insulating film 1206 may line the outer surfaces of the circuitry 1210. The insulating film 1206 may further include one or more openings 1207 to allowing the potting material 1202 to fill any gaps formed between the circuitry 1210 and the driver housing 1230. It should be appreciated, however, that in some implementations, the driver module 1200 may not include the potting material 1201, instead using the insulator film 1202 to electrically insulate the circuitry 1210. The insulating film 1206 may also be sufficiently thin (e.g., less than 100 microns thick) such that the thermal resistance between the circuitry 1210 and the sidewall 1232 does not appreciably increase as will be discussed in more detail below.

In some implementations, the insulating film 1206 may only cover high voltage circuit elements in the driver circuitry 1210. Thus, portions of the driver circuitry 1210 may directly contact the driver housing 1230 and/or the heat sink 1100, which may be beneficial for heat dissipation. It should be appreciated the portions of the driver circuitry 1210 and the portions of the driver housing 1230 and/or the heat sink 1100 where contact occurs may be chosen such that the risk of short circuiting is low. For example, some of the circuit elements, such as the transformers, may include an electrically insulating casing, which may allow direct physical contact with the heat sink 1100.

Various manufacturing techniques may be used to fabricate the driver housing 1230 depending, in part, on the material used to form the driver housing 1230 including, but not limited to, injection molding, blow molding, 3D printing, casting, and machining.

FIGS. 4A-4F show several additional views of the driver insulator 1250. As shown, the driver insulator 1250 may include a sidewall 1252. The sidewall 1252 may conform with the shape of the partition 1120 in order to provide an electrically insulating barrier between the circuitry 1210 and the heat sink 1100 without appreciably reducing the space in the cavity 1104 for the various electronic circuit elements of the circuitry 1210. The shape and/or dimensions of the driver insulator 1250 may thus depend, in part, on the geometry of the heat sink 1100. Generally, the driver insulator 1250 may have various shapes including, but not limited to, a circle, an ellipse, a polygon, and any combinations of the foregoing.

As shown, the driver insulator 1250 may include a lip 1254 spanning the periphery of the sidewall 1252. As shown in FIGS. 1H and 1I, the lip 1254 may extend towards the sidewall 1232 of the driver housing 1230. In some implementations, the lip 1254 may physically contact the driver housing 1230 to fully enclose the cavity 1231. In some implementations, the lip 1254 may form a gap with the driver housing 1230 that is sufficiently small such that the likelihood of the electronic circuit elements contacting the heat sink 1100 is substantially reduced.

The sidewall 1252 may further define an opening 1253 through which the posts 1244 of the driver housing 1230 pass through and contact the recessed section 1130 of the partition 1120 as shown in FIGS. 1H and 1I. The opening 1253 may be dimensioned such that the edges of the sidewall 1252 are proximate to the sidewall 1242 of the island section 1240, thus substantially enclosing the portion of the driver housing 1230 located between the sidewall 1232 and the sidewall 1242. It should be appreciated that in some implementations, the driver insulator 1250 may include a sidewall 1252 with no opening 1253 (i.e., the sidewall 1252 extends across the partition 1120 such that the posts 1244 contact the sidewall 1252 and not the partition 1120).

Figure 4A:
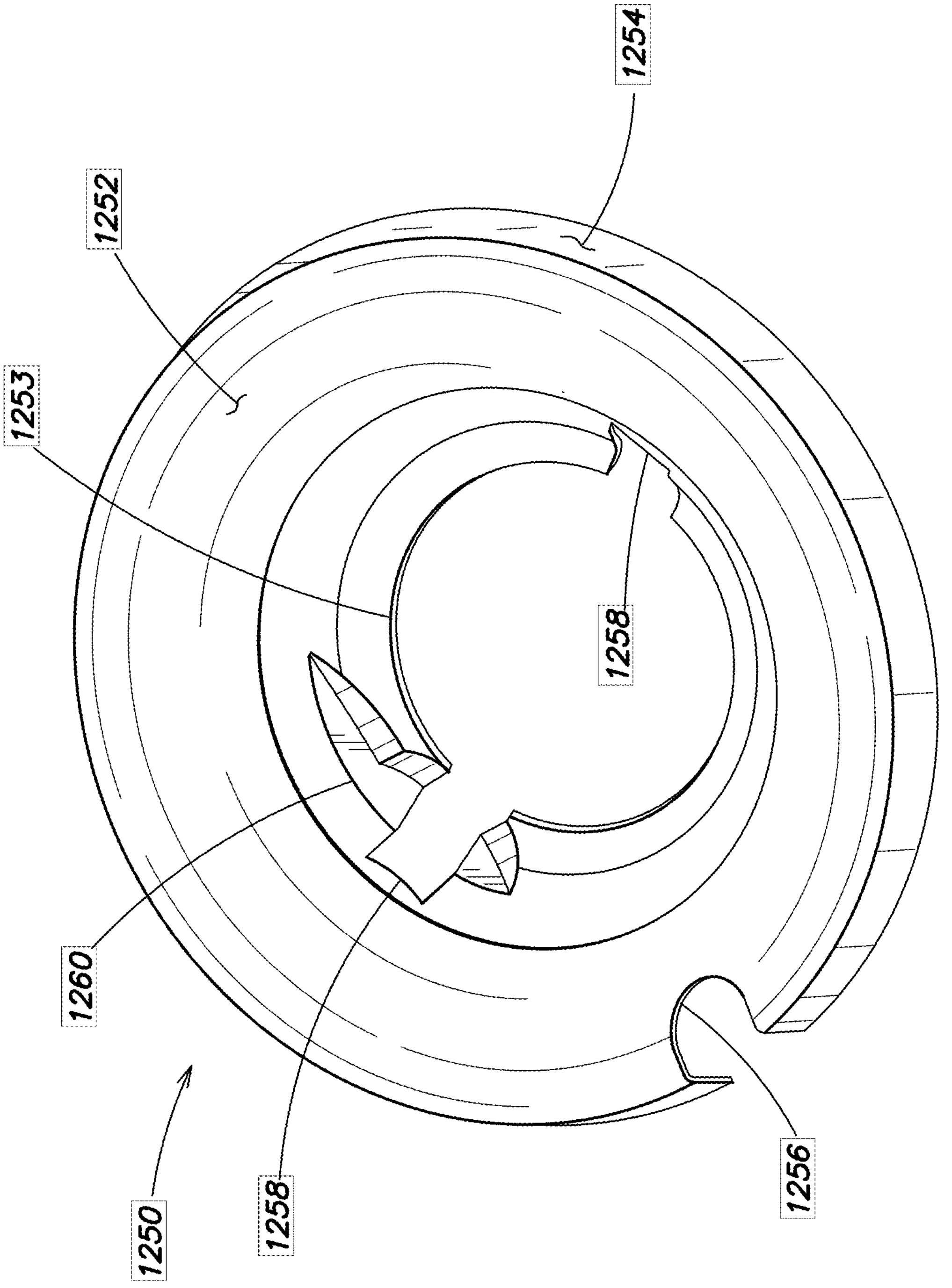
FIG. 4A shows a top perspective view of the driver insulator in the driver module of FIG. 1A.
Figure 4B:
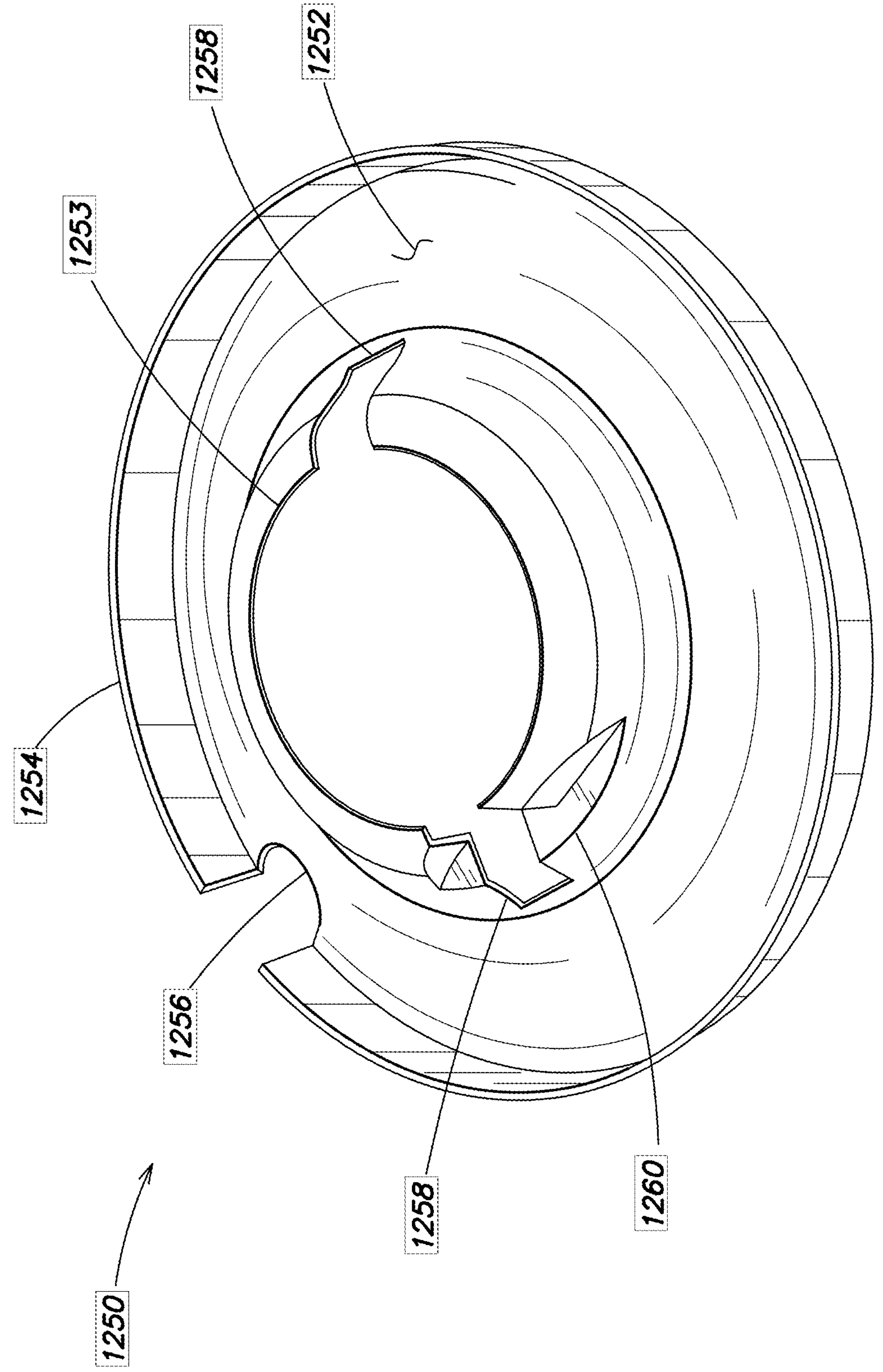
FIG. 4B shows a bottom perspective view of the driver insulator of FIG. 4A.
Figure 4C:
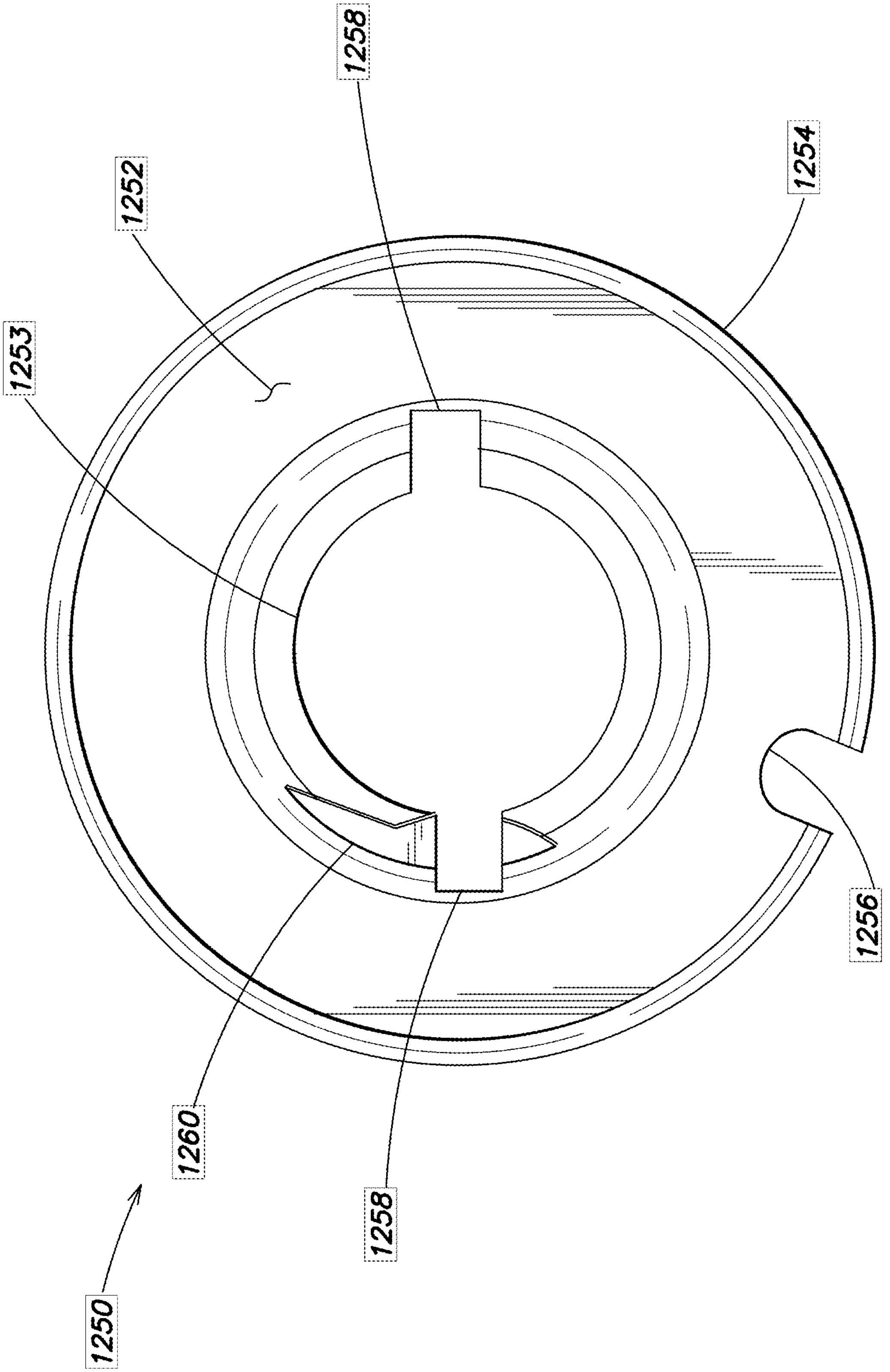
FIG. 4C shows a top view of the driver insulator of FIG. 4A.
Figure 4D:
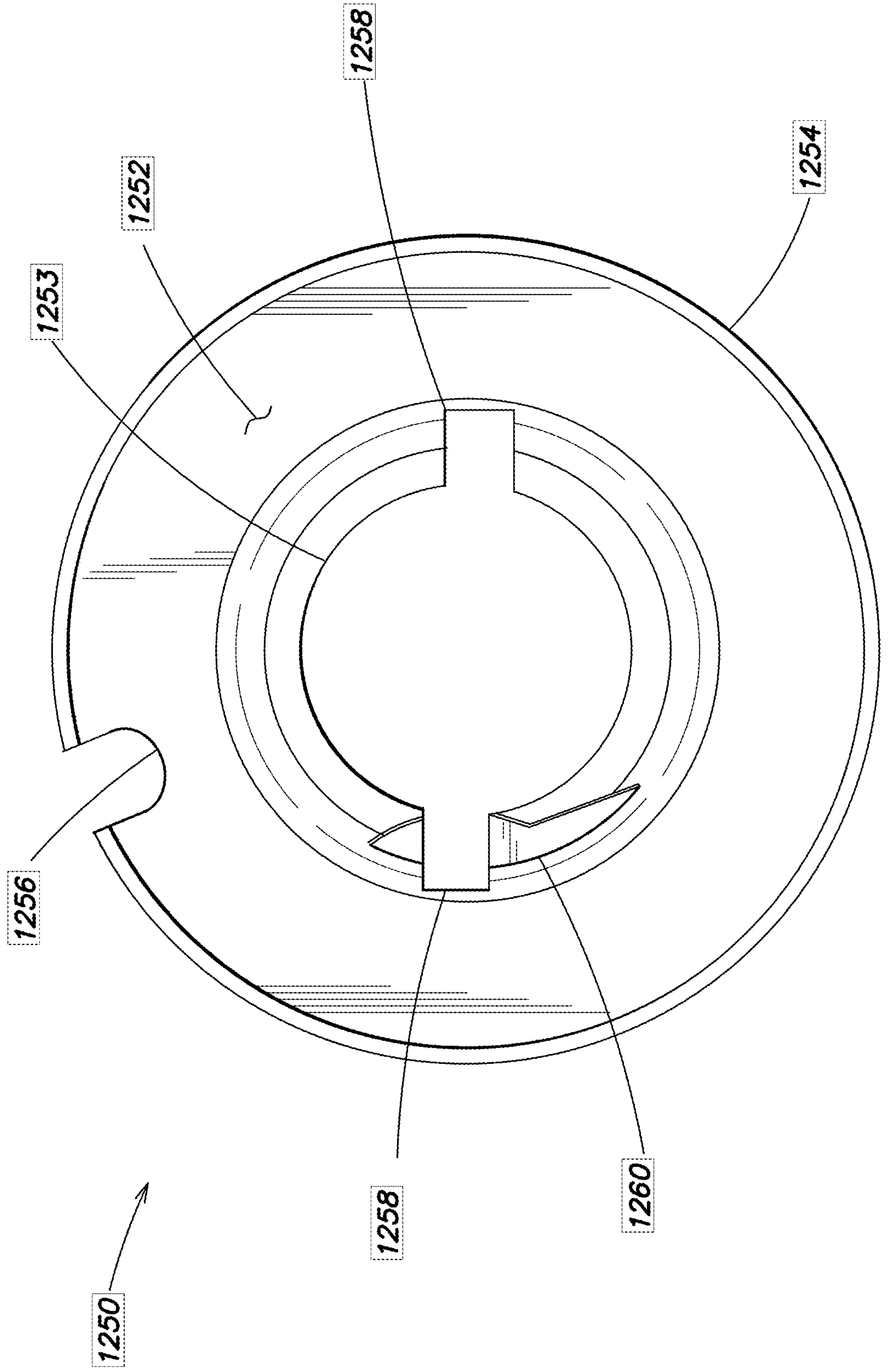
FIG. 4D shows a bottom view of the driver insulator of FIG. 4A.
Figure 4E:
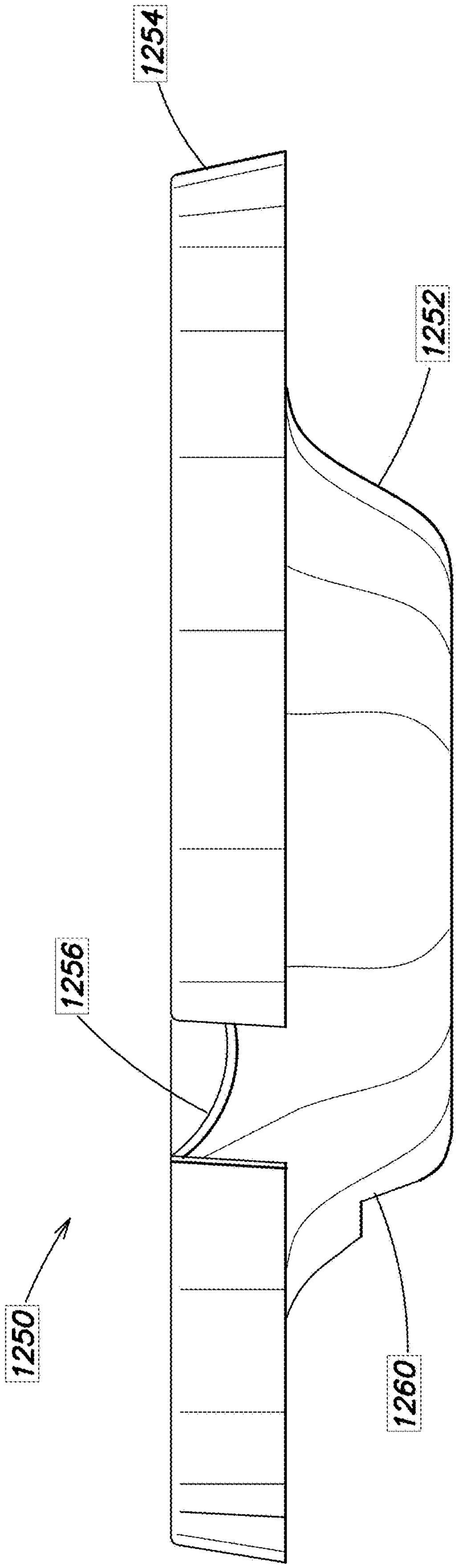
FIG. 4E shows a front view of the driver insulator of FIG. 4A.
Figure 4F:
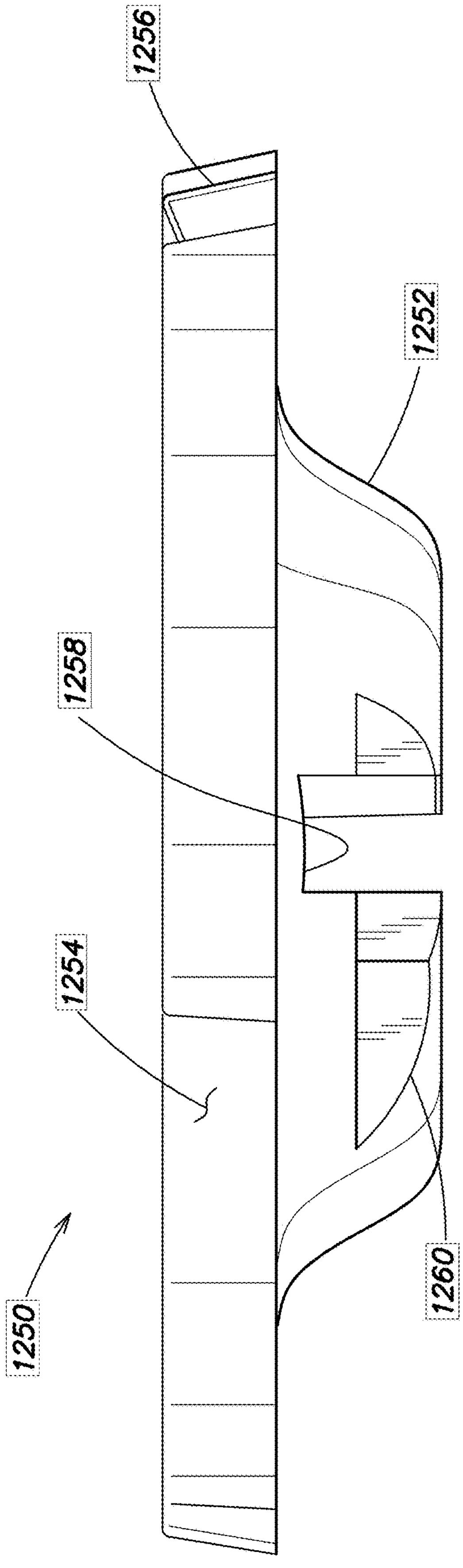
FIG. 4F shows a left-side view of the driver insulator of FIG. 4A.

FIG. 4A shows the driver insulator 1250 may further include a notch 1256 formed along the periphery of the sidewall 1252 and the lip 1254. The notch 1256 may align with the opening 1122 of the heat sink 1100, thus providing an opening to couple the ground cables 1010 and 1014 to the heat sink 1100 via the fastener 1204. The driver insulator 1250 may further include one or more notches 1258 disposed along the interior edge of the sidewall 1252 defining the opening 1253. The notches 1258 may provide openings for the electrical cables 1030*a* and 1030*b* to be inserted through the openings 1134 of the heat sink 1100 for connection with the light source holder 1400*a*. It should be appreciated that, in some implementations, holes may be cut into the driver insulator 1250 to accommodate the electrical cables 1030*a* and/or 1030*b* instead of the notches 1258. In some implementations, the driver insulator 1250 may also be shaped to accommodate a particular layout of electronic circuit elements in the circuitry 1210, which may vary in shape and size. For example, FIG. 4B shows the driver insulator 1250 may include a recessed section 1260 disposed along a notch 1258 and a portion of the opening 1253 to provide sufficient clearance for one or more transformers in the circuitry 1210.

The driver insulator 1250 may be formed from various electrically insulating materials including, but not limited to, polyvinyl chloride (PVC), acrylonitrile butadiene styrene (ABS), polycarbonate (PC), polyurethane (PU), polyethylene, polyethylene terephthalate, polypropylene, and polystyrene. In some implementations, the driver insulator 1250 may be a mylar film. Various manufacturing techniques may be used to fabricate the driver insulator 1250 depending, in part, on the material used to form the driver insulator 1250 including, but not limited to injection molding, blow molding, and 3D printing.

FIGS. 5A-5H show several views of the heat sink 1100. As shown, the heat sink 1100 may include the sidewall 1110 and the partition 1120 that together define the cavities 1102 and 1104. The heat sink 1100 may further include a flange 1140 disposed along the sidewall 1110 proximate to the cavity 1102 to provide a mechanical interface to couple the lighting module 1000*a* to a housing of a lighting system (not shown) and/or to couple a trim (not shown) to the lighting module 1000*a*.

The partition 1120 may form a barrier that physically separates the light source 1300 and the driver module 1200, which may reduce the risk of electrical shock, for example, when the cavity 1102 is exposed when a user is removing and/or replacing the optical assembly 1500*a*. In some implementations, the driver module 1200 may be a class II driver where the electrical output is isolated, in which case the partition 1120 may mitigate the risks of electrical shock. In some implementations, the driver module 1200 may be a class I driver, which means the light source 1300 may receive a high voltage input, for example, in the event of a power surge from the driver module 1200. Although an electrical shock hazard may be present when a power surge occurs, the partition 1120 may nevertheless reduce the risks of electrical shock by preventing direct physical contact with the driver module 1200.

Figure 5A:
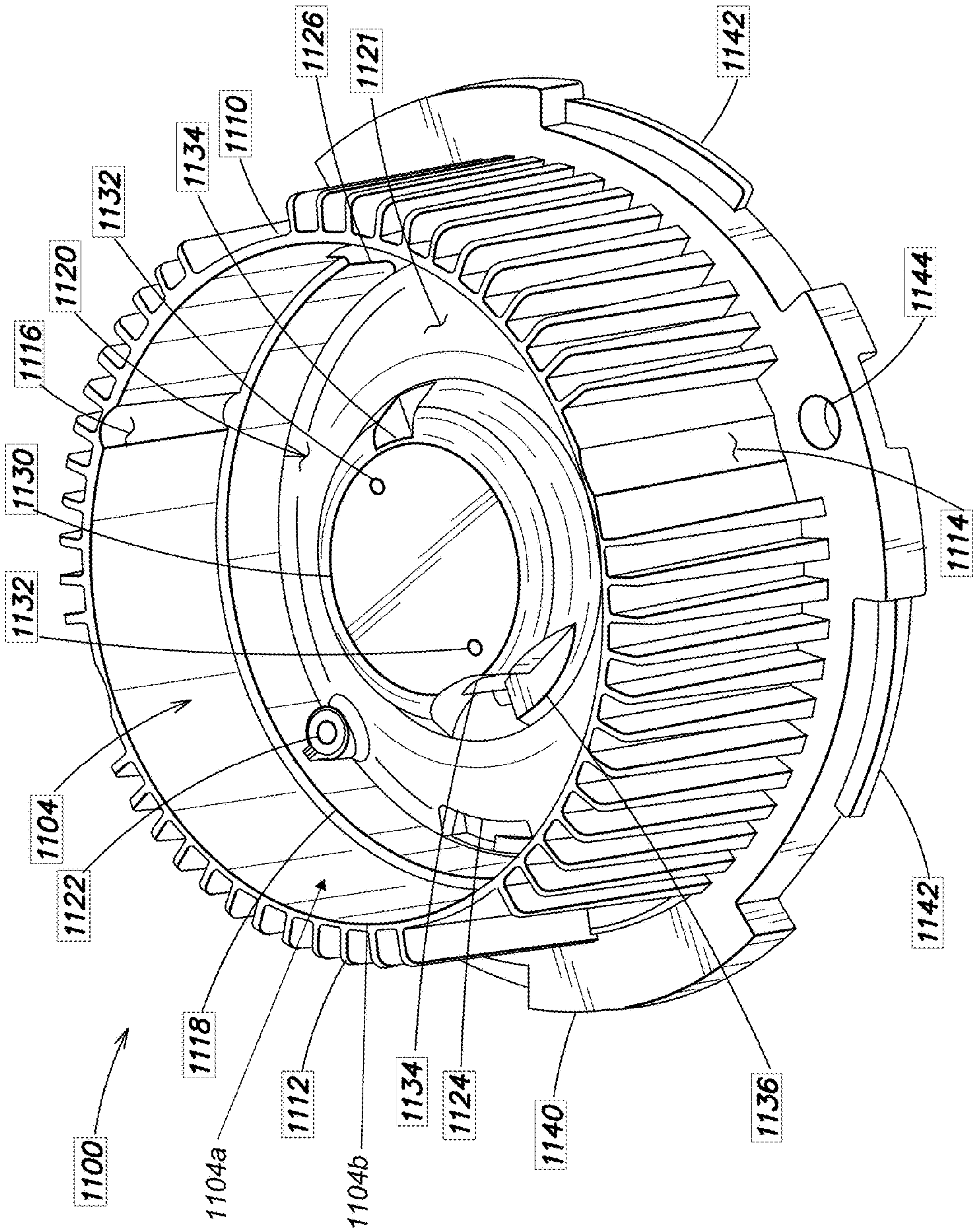
FIG. 5A shows a top perspective view of the heat sink in the lighting module of FIG. 1A.

The overall shape of the lighting module 1000*a* may be determined, in part, by the heat sink 1100 and, in particular, the sidewall 1110. For example, FIG. 5A shows the heat sink 1100 may have a circular cross-sectional shape. More generally, the sidewall 1110 may have various cross-sectional shapes including, but not limited to, a circle, an ellipse, a polygon, and any combination of the foregoing. The shape and/or dimensions of the partition 1120 and/or the flange 1140 may depend, in part, on the shape of the sidewall 1110. For example, the partition 1110 may be shaped to substantially separate the cavities 1102 and 1104. In another example, the flange 1140 may be shaped to conform with the shape of the sidewall 1110 in order to reduce the overall size of the lighting module 1000*a*. In some implementations, the sidewall 1110, the partition 1120, and the flange 1140 may be formed as a single part.

Figure 5B:
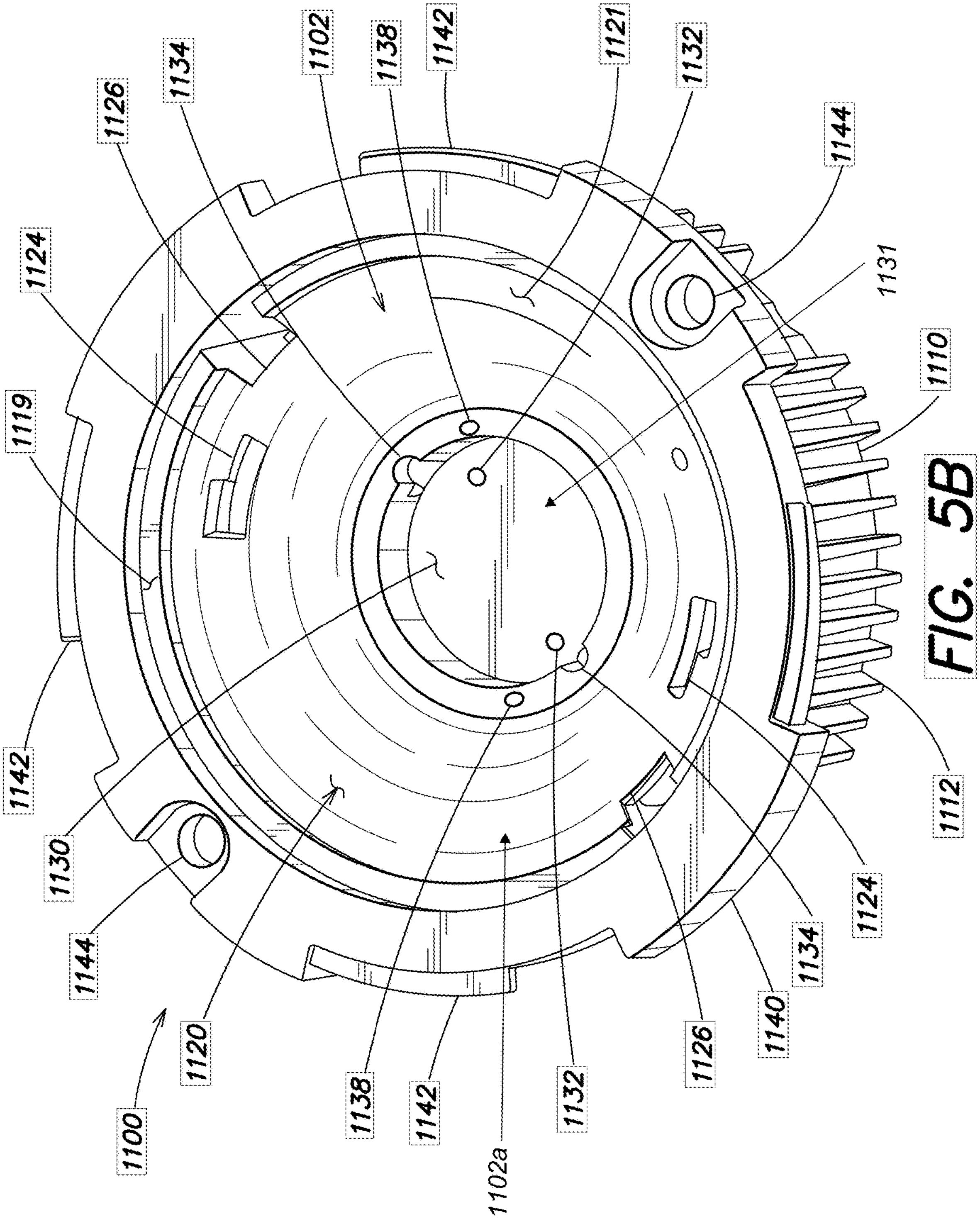
FIG. 5B shows a bottom perspective view of the heat sink of FIG. 5A.
Figure 5C:
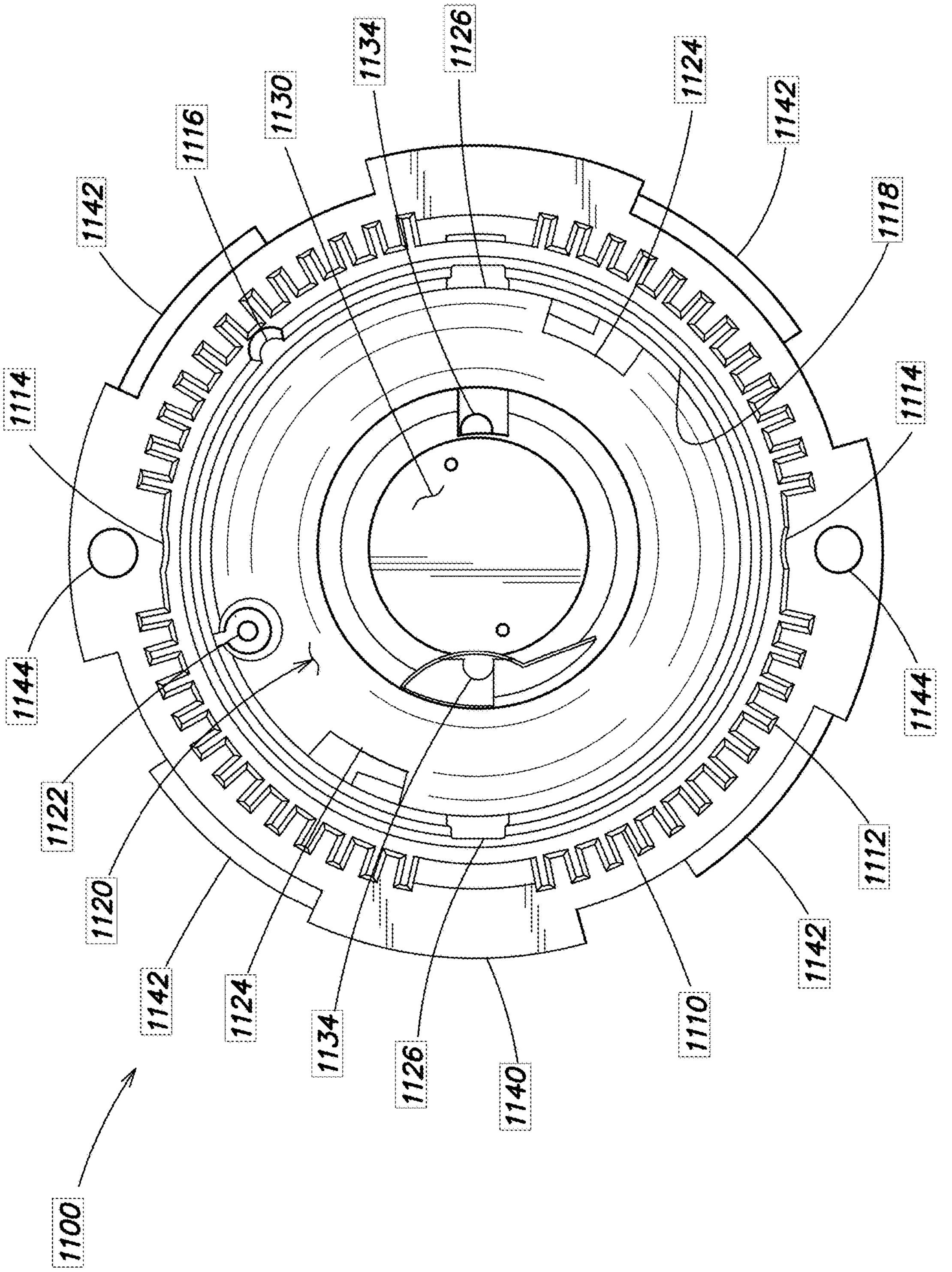
FIG. 5C shows a top view of the heat sink of FIG. 5A.
Figure 5D:
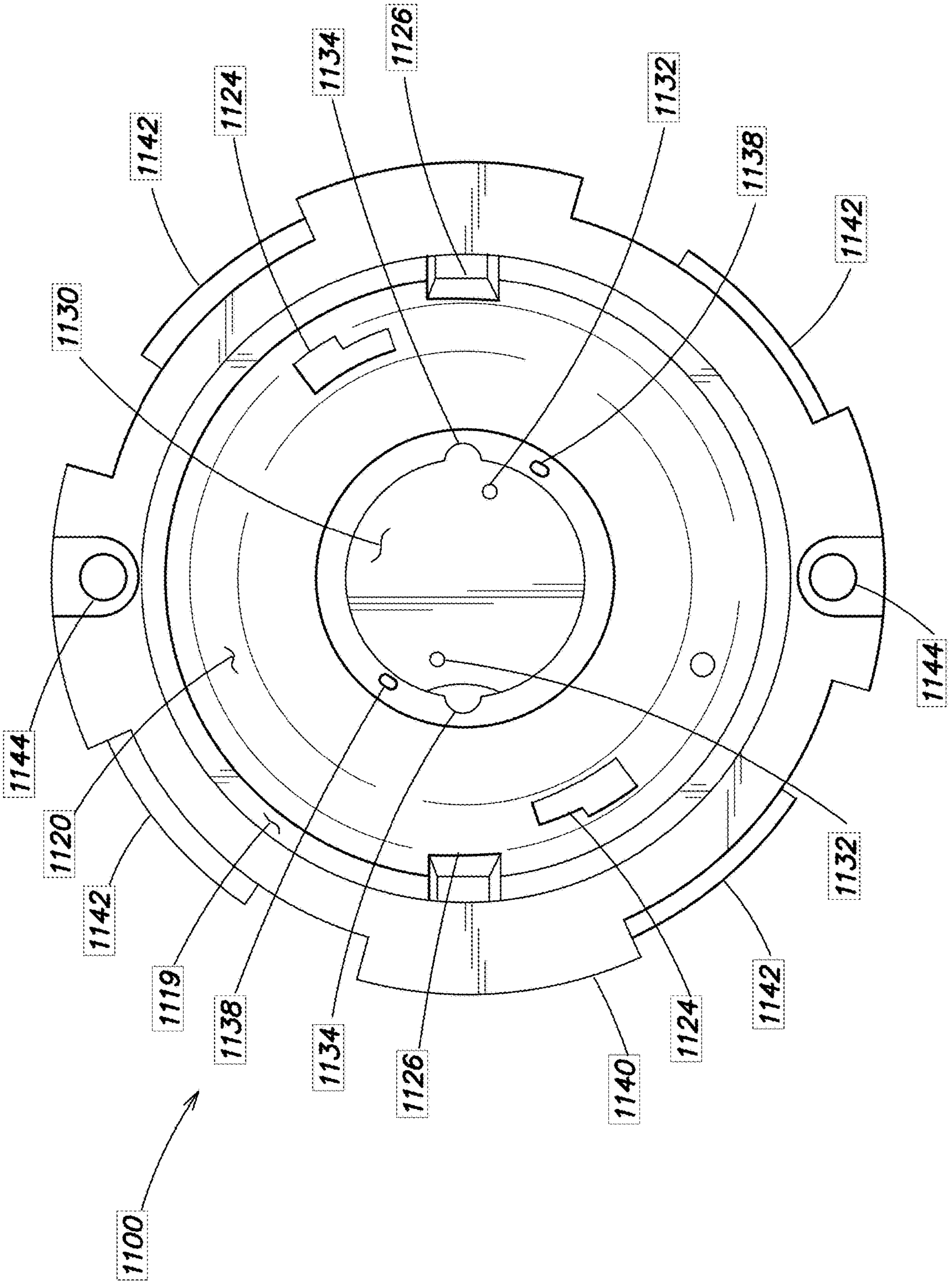
FIG. 5D shows a bottom view of the heat sink of FIG. 5A.
Figure 5E:
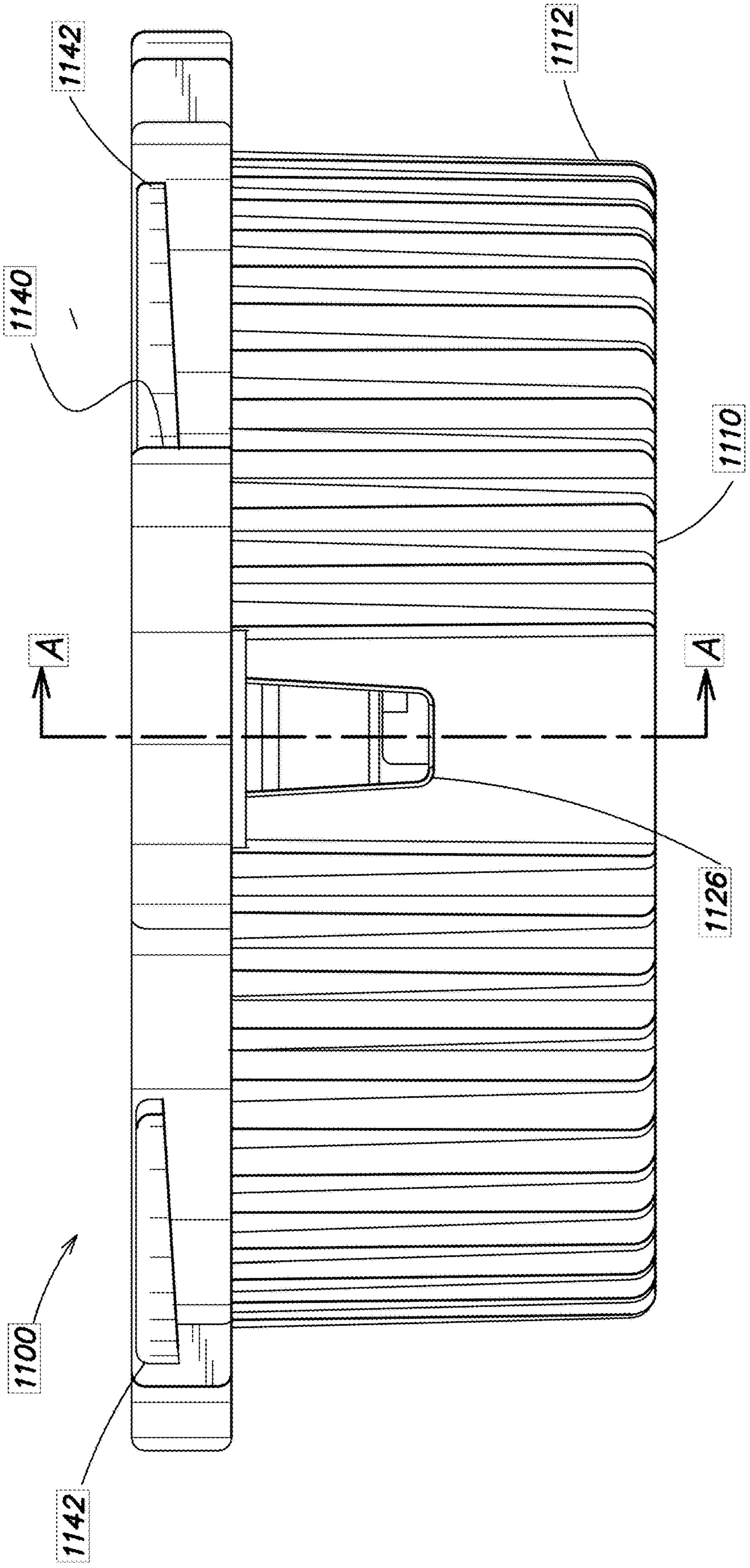
FIG. 5E shows a front view of the heat sink of FIG. 5A.
Figure 5F:
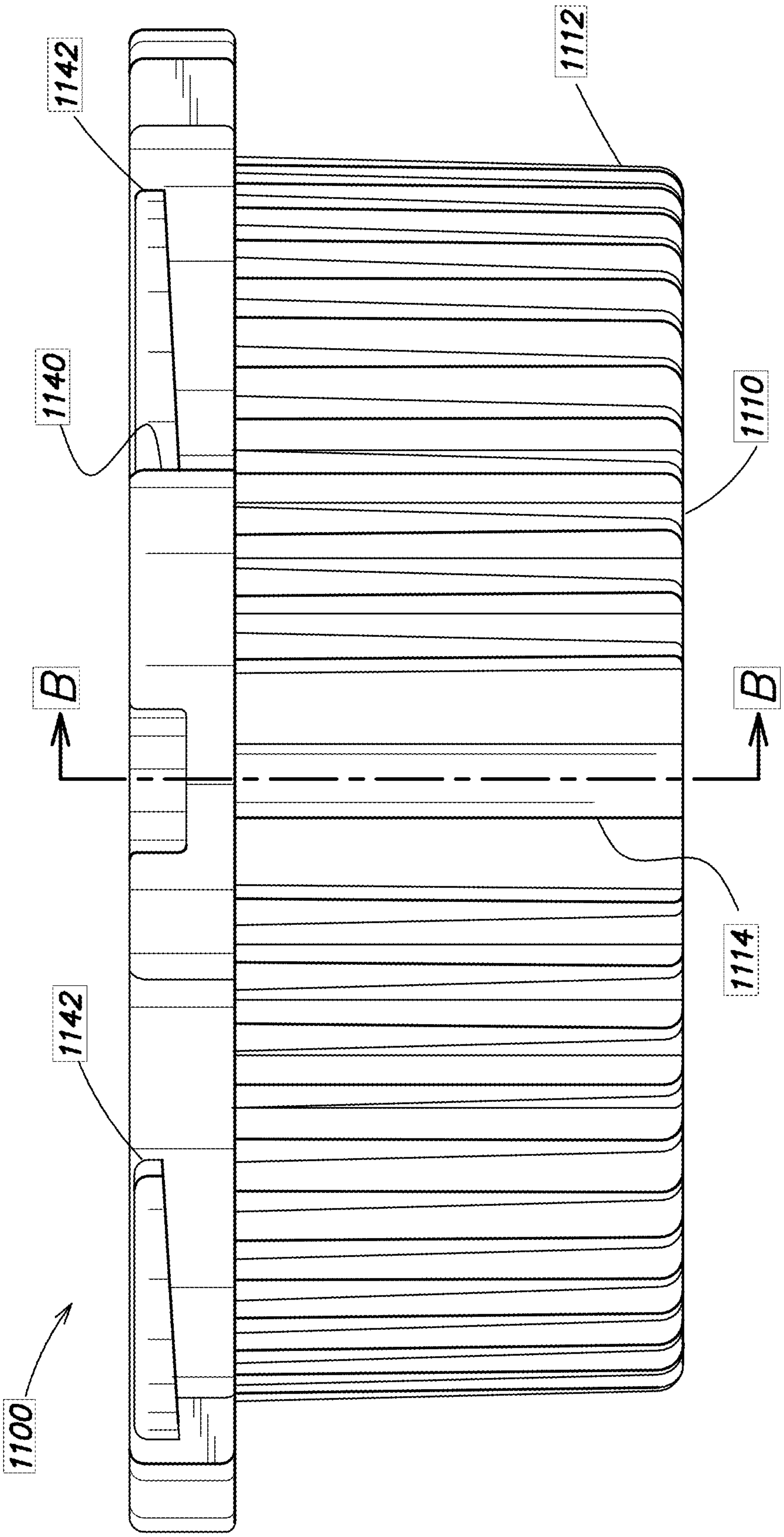
FIG. 5F shows a right-side view of the heat sink of FIG. 5A.
Figure 5G:
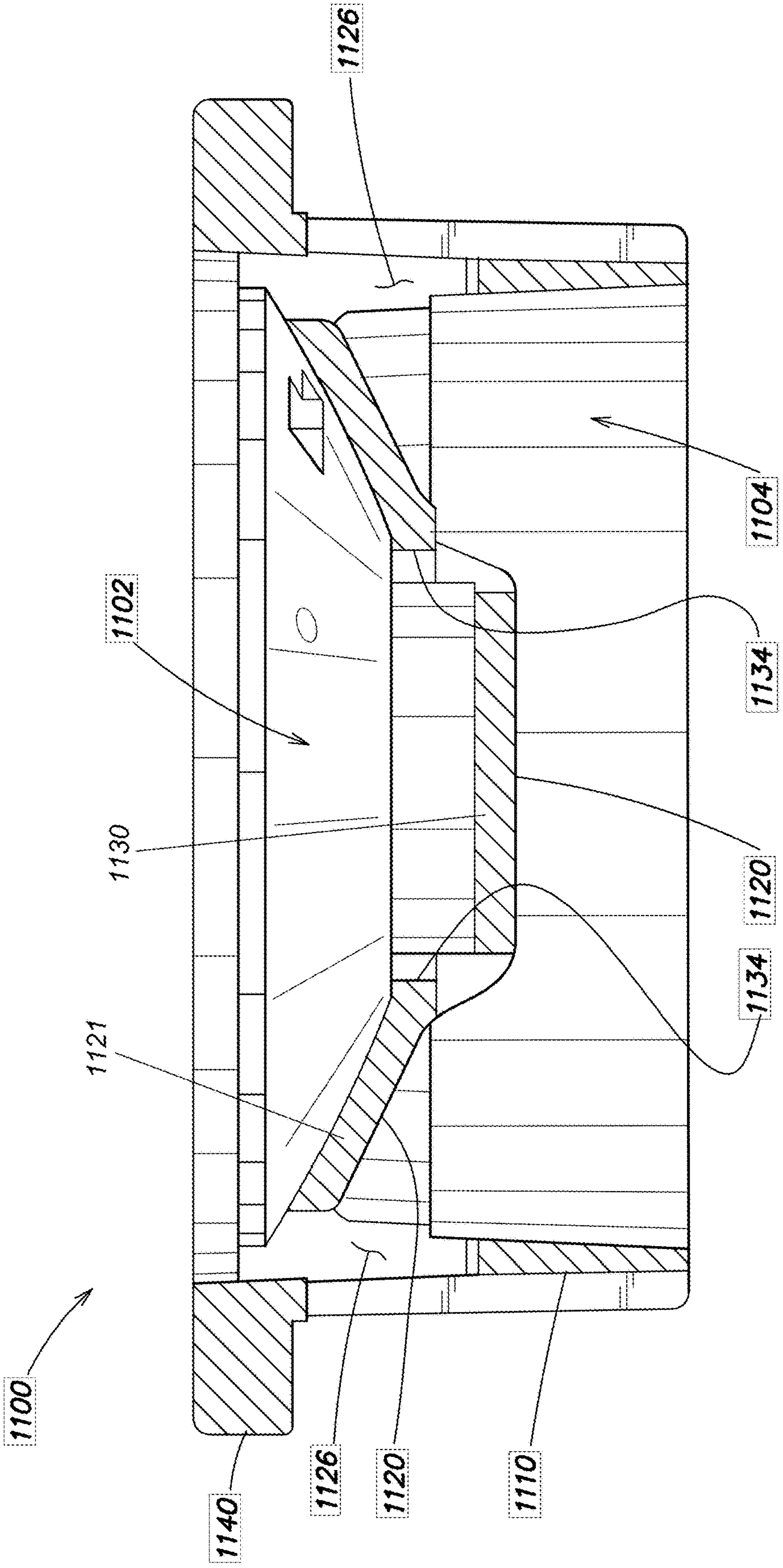
FIG. 5G shows a cross-sectional view of the heat sink corresponding to the plane A-A of FIG. 5E.
Figure 5H:
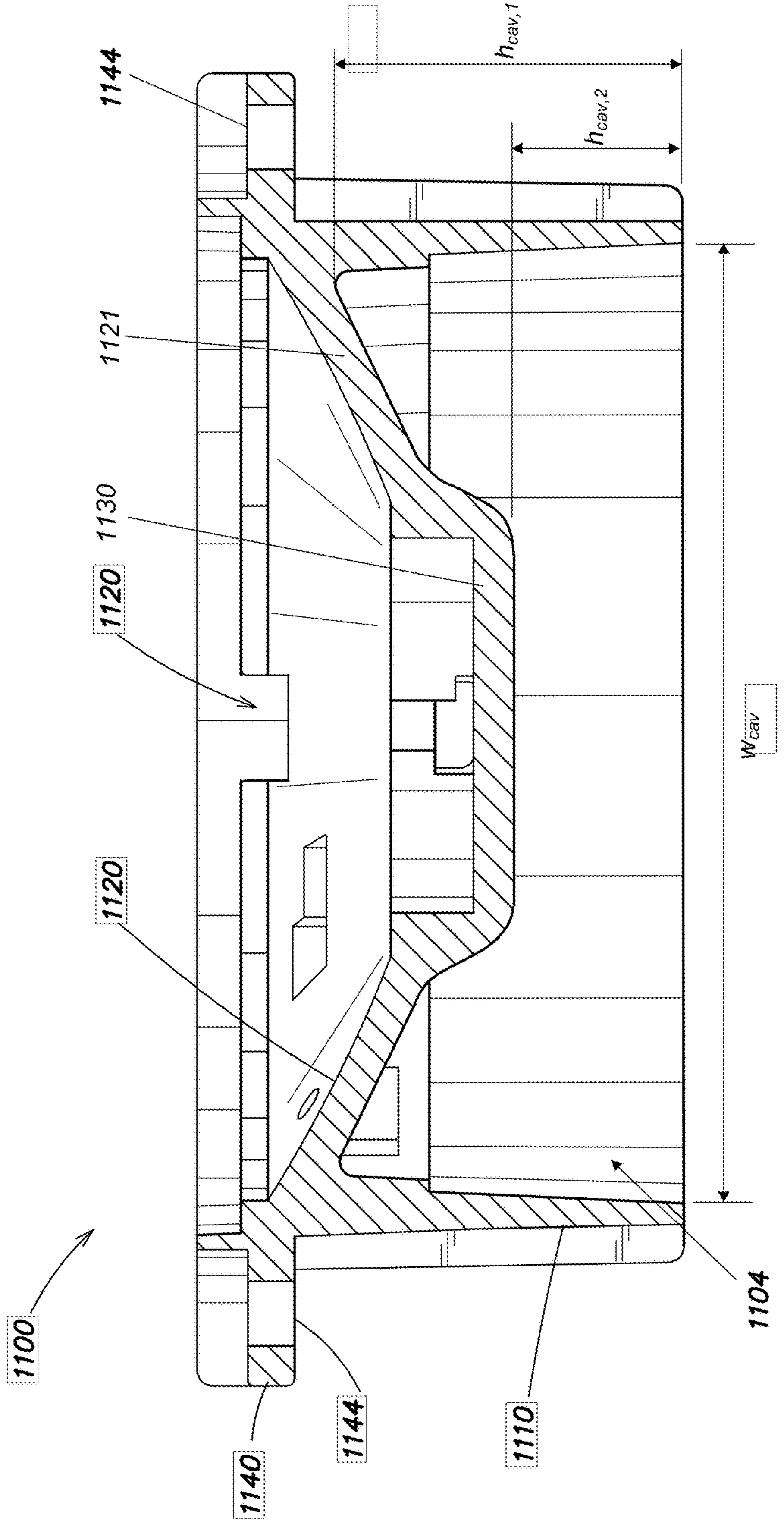
FIG. 5H shows a cross-sectional view of the heat sink corresponding to the plane B-B of FIG. 5F.

In general, the partition 1120 may be shaped and positioned along the sidewall 1110 such that the cavity 1104 provides sufficient space for the driver module 1200 and, in particular, the various circuit elements in the driver circuitry 1210 while ensuring the cavity 1102 has sufficient space to contain the light source 1300, the light source holder 1400*a*, and the optical assembly 1500*a*. In some implementations, the partition 1120 may be shaped to accommodate the aforementioned components while also maintaining an overall compact shape for the lighting module 1000*a* (e.g., maintain the exterior height $h_{ext}$ less than or equal to 2 inches). This may be accomplished, in part, by the partition 1120 having a recessed section 1130 that defines a recess 1131 to contain and support the light source 1300 and the light source holder 1400*a* as shown in FIGS. 5B, 5G, and 5H and a tapered section 1121 surrounding the recessed section 1130 that is joins the recessed section 1130 to the sidewall 1110.

For example, the tapered section 1121 may be tapered towards the top end of the sidewall 1110. This provides a thermal pathway to dissipate heat from the light source 1300 to the top end of the sidewall 1110 where the flange 1140 is located as discussed in more detail below. Additionally, the geometry of the tapered section 1121 may form a cavity 1104 that is taller near the sidewall 1110. This may provide sufficient space to accommodate the larger circuit elements in the driver circuitry 1210, which may be disposed near the outer edge of the PCB. The combination of the tapered section 1121 and the recessed 1130 may further provide sufficient space to accommodate the geometry of the optical assembly 1500*a* and to place the light source 1300 at a desired position relative to the optical assembly 1500*a*. Specifically, the optical assembly 1500*a* and/or the light source 1300 may impose certain geometric constraints in order to provide output light with a desired spatial and/or angular distribution (i.e., the desired emission profile).

For example, the optical assembly 1500*a* and, in particular, the cover lens 1510 may be positioned such that a top surface of the cover lens 1510 (e.g., the top surface of the cover 1512) is substantially flush or flush with the top end of the sidewall 1110 of the heat sink 1100 (i.e., the top surface of the cover 1512 and the top end of the sidewall 1110 defining the opening into the cavity 1102 lie on the same horizontal plane). Thus, the various components of the optical assembly 1500*a*, such as the reflector 1540, the optical element 1530, and/or portions of the cover lens 1510 may extend into the cavity 1102. The tapered section 1121 may be shaped, in part, based on the tapered geometry of the reflector 1540 or another optical element, such as the optical lens 1550 (see, for example, the lighting module 1000*b*).

The position and placement of the recessed section 1130 may also depend, in part, on the dimensions of the optical assembly 1500*a* since the light source 1300 should be preferably positioned so that the light emitted from the light source 1300 may couple into the optical assembly 1500*a*. In some implementations, the light source 1300 may emit light with a particular spatial and/or angular distribution (e.g., the emitted light may diverge and/or may be spatially non-uniform). The optical assembly 1500*a* and, in particular, the reflector 1540 may be shaped and/or dimensioned to compensate for the emission profile of the light source 1300 provided the light source 1300 is positioned at a specific offset distance from the optical assembly 1500*a*. Thus, the recessed section 1130 may be positioned such that the light source 1300 is offset from the optical assembly 1500*a* at the desired offset distance to provide the desired emission profile.

In some implementations, the recessed section 1130 may be shaped and/or dimensioned to ensure the light emitted from the light source 1300 illuminates a substantial portion of the opening into the cavity 1102. In some implementations, the recessed section 1130 may be tailored to be reflective to reflect any light emitted by the light source 1300 that is incident on the interior surfaces of the recessed section 1130. This may be accomplished in several ways. For example, the heat sink 1100 may be formed of metal and the recessed section 1130 may expose the metal to provide a reflective surface. In some implementations, the exposed metal may be polished to increase the reflectivity of the recessed section 1130. In another example, the recessed section 1130 may be coated with a metal film (e.g., an aluminum coating) or a paint (e.g., a white paint) to provide a reflective surface.

The tapered section 1121 may form an axisymmetric surface surrounding the recessed section 1130. The cross-section of the tapered section 1121 may be oriented at an angle relative to the sidewall 1110 such that the tapered section 1121 forms a convex or a concave surface with respect to the cavities 1102 and 1104. For example, FIGS. 5G and 5H show the tapered section 1121 forms a convex cavity 1102 and a concave cavity 1104. Furthermore, if the cross-section of the sidewall 1110 is circular in shape, the tapered section 1121 may thus be conical in shape. In some implementations, the angle at which the tapered section 1130 is oriented with respect to the sidewall 1110 may be chosen, in part, to conform with the geometry of the optical components in the optical assembly 1500*a* (e.g., the reflector 1540) as described above.

It should be appreciated that, in some implementations, the partition 1120 may be a substantially flat or flat wall that extends horizontally to the sidewall 1110. In other words, the partition 1120 does not have a tapered section or a recessed section. This may be used, for example, when the exterior height of the lighting module 1000*a* is sufficiently large such that the cavity 1104 has a height larger than the tallest circuit elements of the driver circuitry 1210 and/or the cavity 1102 has a height larger than the combined height of the light source 1300, the light source holder 1400*a*, and the optical assembly 1500*a*. In some implementations, the partition 1120 may include the recessed section 1130 as described above, but the recessed section 1130 may be joined to the sidewall 1110 by a substantially flat wall instead of the tapered section 1121. In other words, the partition 1120 may include the recessed section 1130, but not the tapered section 1121. IN some implementations, the cavity 1102 may have a first cylindrical portion corresponding to the recess 1131 and a second cylindrical portion formed by the sidewall 1110 and the flat portion of the partition 1121 around the recessed section 1130.

The heat sink 1100 may include various features to facilitate the assembly of the lighting module 1000*a*. The partition 1120 may include the opening 1122 to couple the ground cables 1010 and 1014 to heat sink 1100 via the fastener 1204. The partition 1120 may further include one or more openings 1134 to route the electrical cables 1030*a* and 1030*b* through the partition 1120 for connection to the light source 1300. The partition 1120 may also include one or more openings 1132 to receive fasteners 1302 to couple the light source holder 1400*a* to the heat sink 1100.

The sidewall 1110 may further include snap-fit receivers 1126 (also referred to herein as "snap-fit openings 1126") formed along the sidewall 1110 to engage the snap-fit connectors 1236 of the driver module 1200 when the driver housing 1230 is inserted into the cavity 1104. In some implementations, the snap-fit receivers 1126 may also engage the snap-fit connectors 1516 of the optical assembly 1500*a* as shown in FIG. 1I. In some implementations, the partition 1120 may include one or more twist and lock receivers 1124 to engage one or more optical components of the optical assembly. For the optical assembly 1500*a*, the twist and lock receivers 1124 are not used; however, in other implementations, the optical assembly may include components that are coupled to the heat sink 1100 separately from the cover lens 1510 as discussed below.

The heat sink 1100 may also provide several alignment features to ensure proper alignment of the various components of the lighting module 1000*a* during assembly. The sidewall 1110 may include a keyed feature 1116 in the cavity 1104 that aligns with the keyed feature 1238 of the driver housing 1230. Similar to the driver insulator 1250, the partition 1120 may also include a recess 1136 to provide sufficient clearance for the electronic circuit elements of the circuitry 1210. The recess 1136 may also ensure the driver insulator 1250 is properly aligned with the heat sink 1100. In some implementations, the recessed section 1130 may also include one or more indents 1138 to align an optical component in the optical assembly to the heat sink 1100.

The sidewall 1110 may also include a ledge 1118 disposed within the cavity 1104 to abut the driver housing 1230. Additionally, the recessed section 1130 may also be positioned with respect to the sidewall 1110 such that the posts 1244 of the driver housing 1230 abut the partition 1110. Thus, the combination of the ledge 1118 and the position of the recessed section 1130 may provide a mechanical stop to limit how far the driver housing 1230 is inserted into the cavity 1104. The sidewall 1110 may also include a ledge 1119 disposed within the cavity 1102 to abut a ridge 1514 of the cover lens 1510. Similar to the ledge 1118, the ledge 1119 may also provide a mechanical stop to limit the extent the cover lens 1510 is inserted into the cavity 1102.

The flange 1140 may include one or more openings 1144. The openings 1144 may be used, for example, to receive a fastener (not shown) to couple the lighting module 1000*a* to a housing of a lighting system. In some implementations, the openings 1144 may be arranged to align with corresponding tabs of a housing (e.g., the tabs of an electrical junction box). As described above, the overall size of the lighting module 1000*a* may be kept sufficiently small to ensure compatibility for smaller-sized housings of a lighting system. As shown in FIGS. 1H and 1I, the flange 1140 may determine the lateral extent of the lighting module 1000*a*. Thus, in some implementations, the flange 1140 may be dimensioned to reduce the overall size of the lighting module 1000*a*. In some implementations, the openings 1144 may be offset from the outer edge of the flange 1140 to ensure the regions of the flange 1140 surrounding the openings 1144 are sufficiently thick to mechanically support a fastener. This, in turn, may result in the openings 1144 being positioned proximate to the sidewall 1110.

The mounting features of the lighting system housing (e.g., the tabs of a junction box) may abut the bottom portion of the flange 1140 after installation. In other words, the flange 1140 may protrude outwards from the housing while the remainder of the heat sink 1100 may be disposed within the housing. In order to ensure the heat sink 1100 provides sufficient clearance for the mounting features of the lighting system, the sidewall 1110 may include a corresponding groove 1114 for each opening 1144. The groove 1114 may provide space for the mounting features to slide along the sidewall 1110 until contact is made with the flange 1140. In some implementations, the grooves 1114 may also guide the insertion of the lighting module 1000*a* into the cavity of a housing.

The flange 1140 may further include one or more twist and lock connectors 1142 disposed along the periphery of the flange 1140. The twist and lock connectors 1142 may provide an interface to couple a trim (not shown) to the lighting module 1000*a*. The trim may be used, in part, to cover the housing of the lighting system and/or the exposed opening formed in a ceiling, wall, or floor into which the lighting system is installed. More generally, the flange 1140 may support other coupling mechanisms to facilitate attachment of a trim to the lighting module 1000*a*. For example, the flange 1140 may be shaped to accommodate one or more snap-fit connectors on the trim. In some implementations, the snap-fit connectors of the trim may be coupled to the outer edge of the flange 1140.

The heat sink 1100 may be formed from various thermally conductive materials including, but not limited to, aluminum, copper, and steel. Various manufacturing techniques may be used to fabricate the heat sink 1100 including, but not limited to, casting and machining.

During operation of the lighting module 1000*a*, the LED light source 1300 and the driver 1200 may each generate heat. However, the heat sink 1100 may provide several thermal pathways to dissipate the heat generated by the light source 1300 and/or the driver circuitry 1210 to ensure (1) the light source 1300 and/or the driver circuitry 1210 do not overheat (e.g., exceed a temperature greater than or equal to 125° C.) and/or (2) the space within the housing of the lighting system where the lighting module 1000*a* is located is not excessively heated.

For example, the light source 1300 typically generates the most heat during operation. By placing the light source 1300 in thermal contact with the partition 1120, the partition 1120 and the sidewall 1110 may together provide a thermal pathway to transfer the heat to the flange 1140 via heat conduction. The heat may then be dissipated convectively into the illuminated environment and/or transferred to a trim (not shown) attached to the lighting module 1000*a* via heat conduction and thereafter dissipated convectively into the illuminated environment. The thickness of the flange 1120 may also be tailored to have a thermal resistance substantially lower than the thermal resistance associated with other heat dissipation pathways (e.g., heat conduction or convection into the stagnant air contained in the cavity 1104). In some implementations, thermal paste may be included between the light source 1300 and the partition 1120 to further improve thermal contact and, hence, heat dissipation from the light source 1300 to the heat sink 1100.

In some implementations, the partition 1120 may include the tapered section 1121 to provide a more direct pathway for heat to transfer to the top end of the sidewall 1110 and the flange 1140. However, it should be appreciated, that in some implementations, the partition 1120 may extend horizontally to the sidewall 1110. Although the thermal resistance may be larger due to the longer path between the light source 1300 and the flange 1140, the heat generated by the light source 1300 may still be dissipated primarily through the flange 1140 instead of through, for example the air in the cavities 1102 and 1104.

In another example, the driver circuitry 1210 may also generate heat during operation. As described above, the driver circuitry 1210 may include specific circuit elements that generate more heat than other circuit elements, resulting in localized hot spots. In some implementations, the driver module 1200 may include the potting material 1202, which provides a medium to locally dissipate heat from various circuit elements to reduce or, in some instances, mitigate the creation of hot spots in the driver circuitry 1210. In other words, the potting material 1202 may spread the heat generated by the various circuit elements of the driver circuitry over a larger volume, thus reducing the temperature variation across the driver circuitry 1210 so that the temperature of the circuit elements, such as the transformer, remain below 125° C. during operation.

The heat sink 1100 may also provide the driver module 1200 a thermal pathway to dissipate the heat generated by the driver circuitry 1210. Specifically, the heat may be dissipated through the sidewall 1232 of the driver housing 1230 and into the sidewall 1110 of the heat sink 1100 via heat conduction. Thereafter, the heat may conduct along the sidewall 1110 towards the flange 1140 where it is dissipated into the illuminated environment similar to the heat generated by the light source 1300. It should also be appreciated that a portion of the heat may also be dissipated into the space surrounding the lighting module 1000*a* within the housing of the lighting system due to convective cooling along the exterior surface of the sidewall 1110, which may include multiple fins 1112.

In some implementations, the driver circuitry 1210 may dissipate heat through the driver sidewall 1232 without the presence of the potting material 1202. For example, the circuit elements that generate the most heat may be disposed near the driver sidewall 1232 and may thus transfer heat to the driver sidewall 1232 via contact between the driver sidewall 1232 and the PCB supporting the circuit elements or directly to the sidewall 1232 through small air gaps separating the circuit elements and the sidewall 1232. It should be appreciated, however, the inclusion of the potting material 1202 may enhance heat transfer from the circuit elements to the driver sidewall 1232.

In some implementations, the driver housing 1230 may be formed of a polymer, which typically has a lower thermal conductivity than a metal. For lighting modules 1000*a* tailored for relatively lower light outputs, the polymer driver housing 1230 may still be sufficient to dissipate the heat generated by the driver circuitry 1210. For lighting modules 1000*a* tailored to provide relatively higher light outputs, however, it may be preferable to use the metallic driver housing 1230 described above to provide a thermal pathway towards the flange 1140 with less thermal resistance to accommodate the larger heat loads due to the higher light outputs. As described above, the metallic driver housing 1230 may include, in some instances, the insulator film 1206 to electrically insulate the driver circuitry 1210. The insulator film 1206, however, may be sufficiently thin so as not appreciably increase the thermal resistance between the driver circuitry 1210 and the drive sidewall 1232. In other words, the combination of the metal driver housing 1230 and the insulator film 1206 may provide a thermal pathway sufficient to keep the driver circuitry 1210 at the desired operating temperatures.

For example, the polymeric driver housing 1230 may be used for lighting modules 1000*a* that provide a light output less than or equal to 1250 lumens while a metallic driver housing 1230 may be used for lighting modules 1000*a* that provide a light output greater than or equal to 1250 lumens. It should be appreciated the 1250 lumen threshold is exemplary and may change over time due to improvements in the efficiency of the LED light source 1300 and the driver electronics 1210. More generally, the choice between a polymeric or a metallic driver housing may depend on which driver housing is able to maintain the driver circuitry at a desired operating temperature (e.g., less than or equal to 125° C.).

In some implementations, a portion of the heat generated by the driver circuitry 1210 may also dissipate convectively to the surrounding space within the housing containing the lighting module through the base 1234 of the driver housing 1230. In some implementations, another portion of the heat generated by the driver circuitry 1210 may dissipate directly to the heat sink 1100 due to physical contact between the circuit elements and the heat sink 1100 as describe above. For example, the transformer in the driver circuitry 1210 may directly contact the partition 1120 of the heat sink 1100 without short circuiting the driver circuitry 1210.

In some implementations, the lighting module 1000*a* may be tailored to intentionally provide separate thermal pathways to dissipate the heat generated by the light source 1300 and the driver circuitry 1210. For example, the driver circuitry 1210 may be separated from the recessed section 1130 of the partition 1120 by an air gap. The air gap may provide a thermally insulating barrier to reduce or, in some instances, mitigate unwanted heating of the driver circuitry 1210 by the light source 1300, which may be at an appreciably higher temperature than the driver circuitry 1210 due to higher heat generation. Instead, the heat generated by the driver circuitry 1210 and the light source 1300 may follow different thermal pathways to the sidewall 1110 of the heat sink 1100. In some implementations, the driver module 1200 may be arranged such that the heat generated by the driver circuitry 1210 may dissipate to the portions of the partition 1120 located near the sidewall 1110 where the temperature is relatively lower than at the recessed section 1130.

As described above, the light source holder 1400*a* may align and couple the light source 1300 to the heat sink 1100. For example, the light source 1300 and the light source holder 1400*a* may be mounted to the heat sink 1100 using, for example, fasteners 1302 or one or more snap-fit connections for tool-less assembly. Thus, the light source holder 1400*a* may align the light source 1300 to the heat sink 1100 based, in part, on the location of the openings 1132 on the heat sink 1100 and/or snap-fit receivers (not shown) on the heat sink 1100. In this manner, the light source 1300 may be more precisely mounted to the heat sink 1100 compared to previous lighting modules where the light source is aligned and positioned manually. Once the light source holder 1400*a* is coupled to the heat sink 1100, the light source 1300 is physically and thermally coupled to the recessed section 1130 of the partition 1120.

FIGS. 6A-6G show several additional views of the light source holder 1400*a*. As shown, the light source holder 1400*a* may include a sidewall 1410 defining an opening 1402 for light emitted by the light source 1300 to pass through. The sidewall 1410 may be shaped, in part, based on the shape of the recessed section 1130 of the heat sink 1100. For example, the sidewall 1410 may be cylindrical in shape to correspond with the cylindrical recessed section 1130 as shown in FIG. 1J. More generally, the cross-section of the sidewall 1410 may have various shapes including, but not limited to, a circle, an ellipse, a polygon, and any combination of the foregoing. The opening 1402 may be shaped based, in part, on the shape of the light emitting portion of the light source 1300. For example, the light source 1300 may emit light from a circular-shaped portion (see, for example, the light source 1300 in FIG. 7), thus the opening 1402 may also be circular in shape. More generally, the opening 1402 may have various shapes including, but not limited to, a circle, an ellipse, a polygon, and any combination of the foregoing.

Figure 6A:
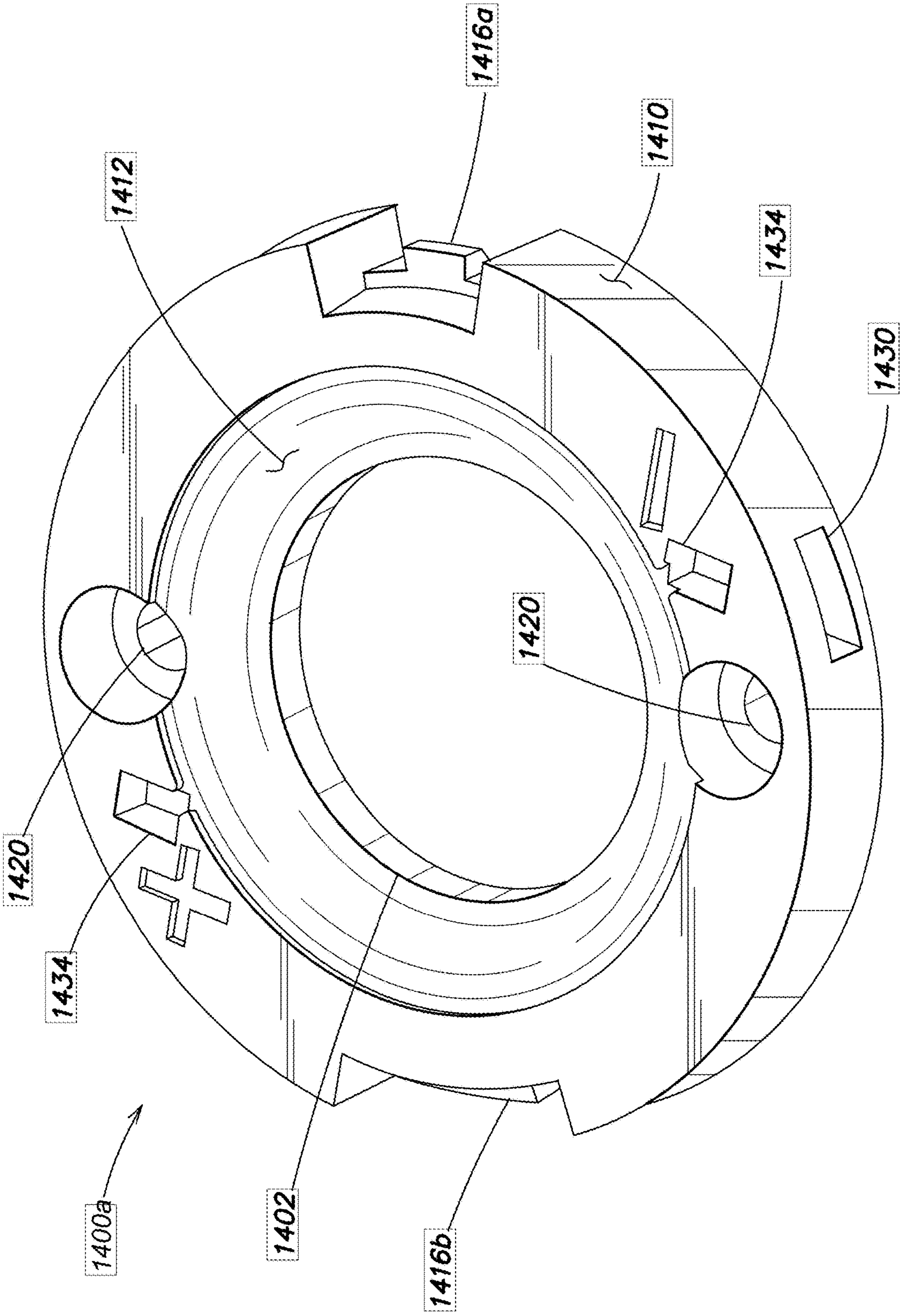
FIG. 6A shows a top perspective view of a light source holder in the lighting module of FIG. 1A.
Figure 6B:
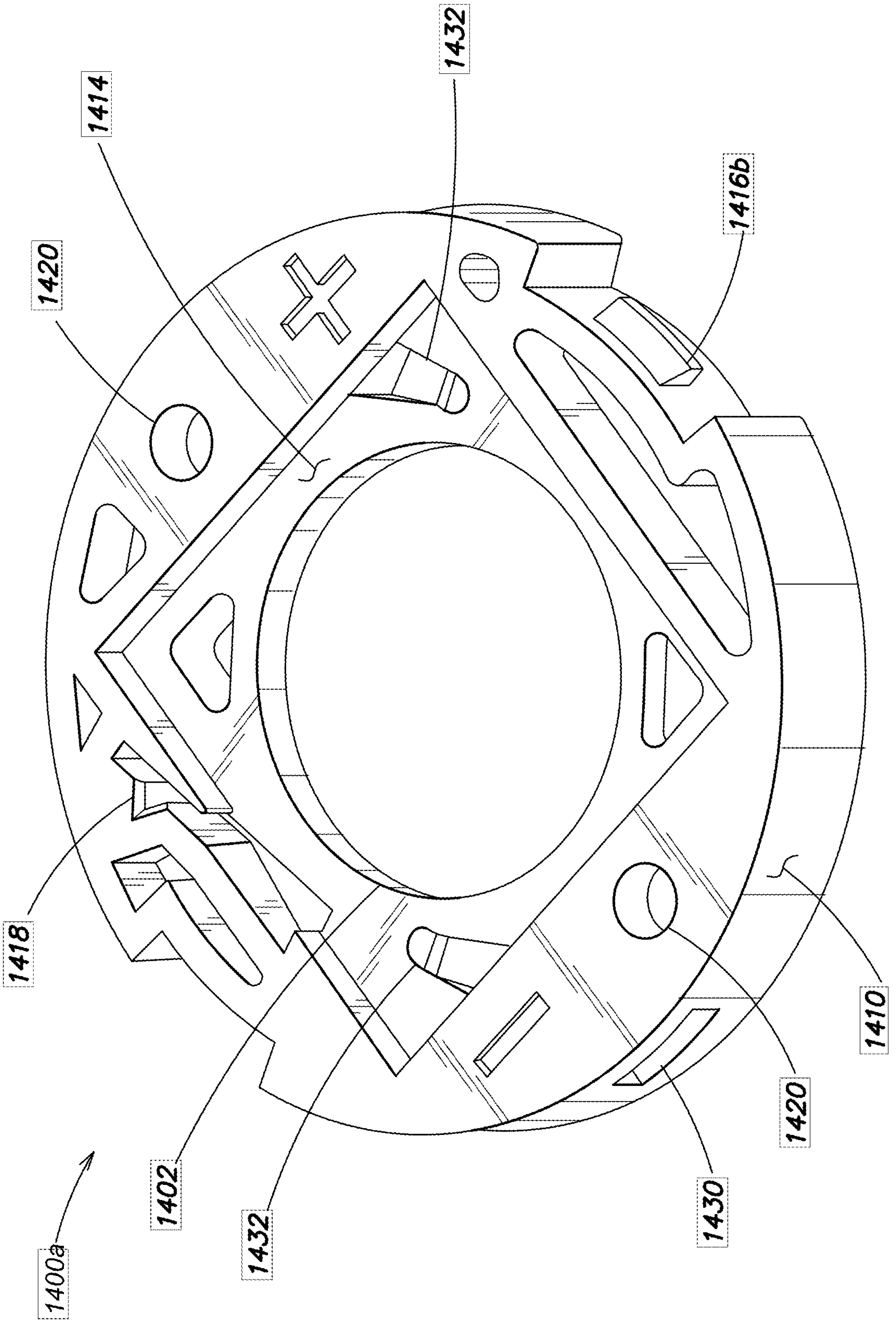
FIG. 6B shows a bottom perspective view of the light source holder of FIG. 6A.
Figure 6C:
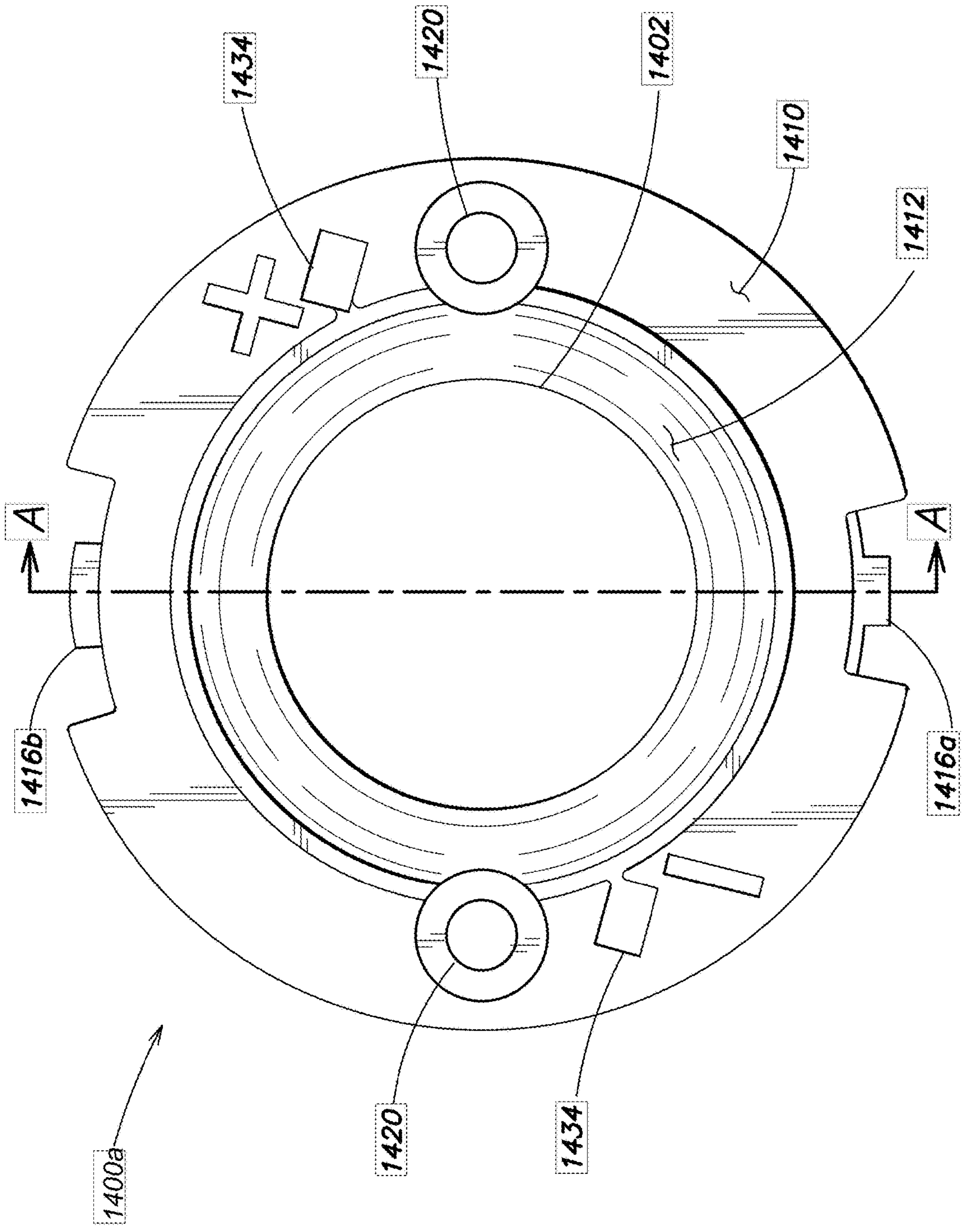
FIG. 6C shows a top view of the light source holder of FIG. 6A.
Figure 6D:
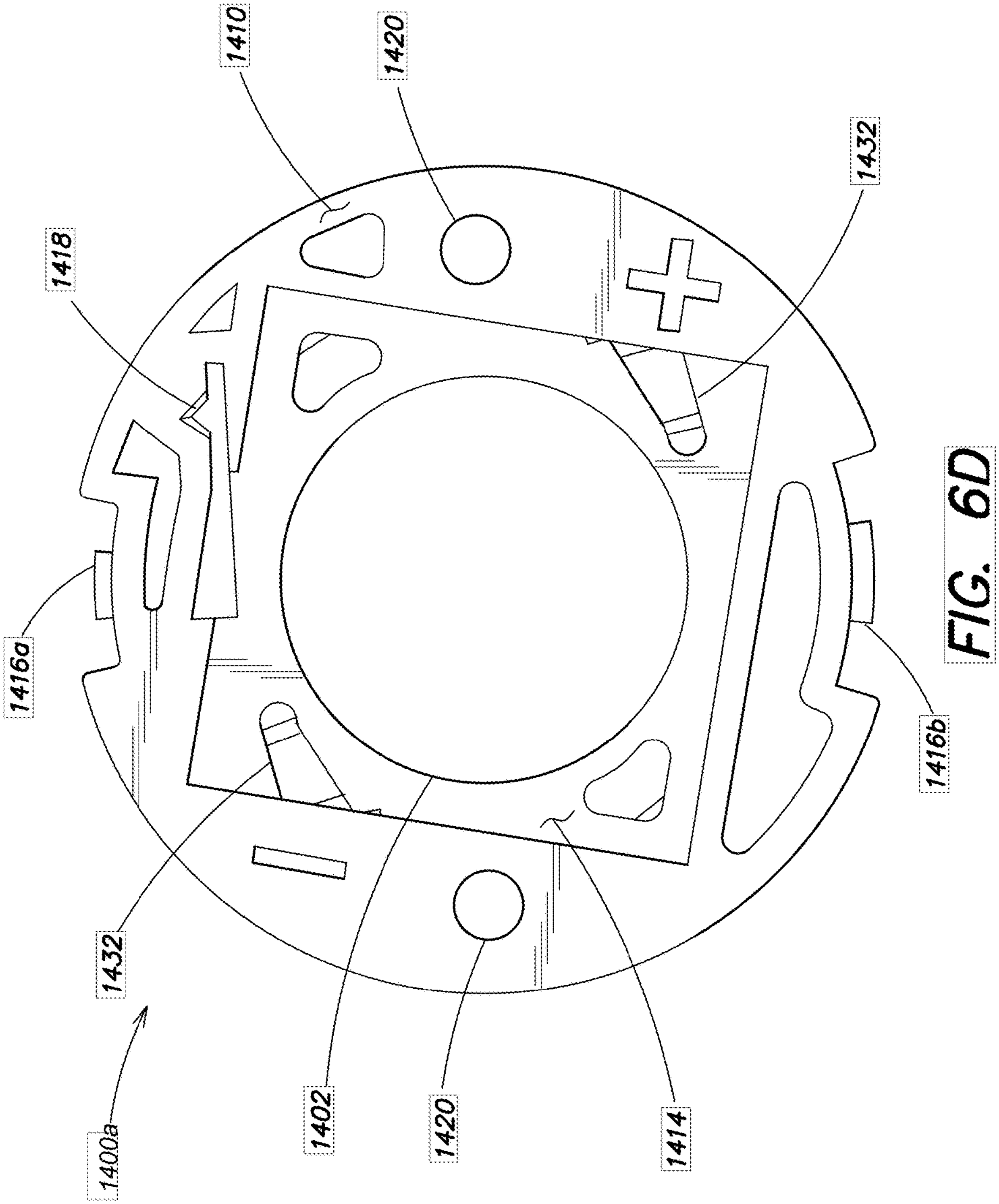
FIG. 6D shows a bottom view of the light source holder of FIG. 6A.
Figure 6E:
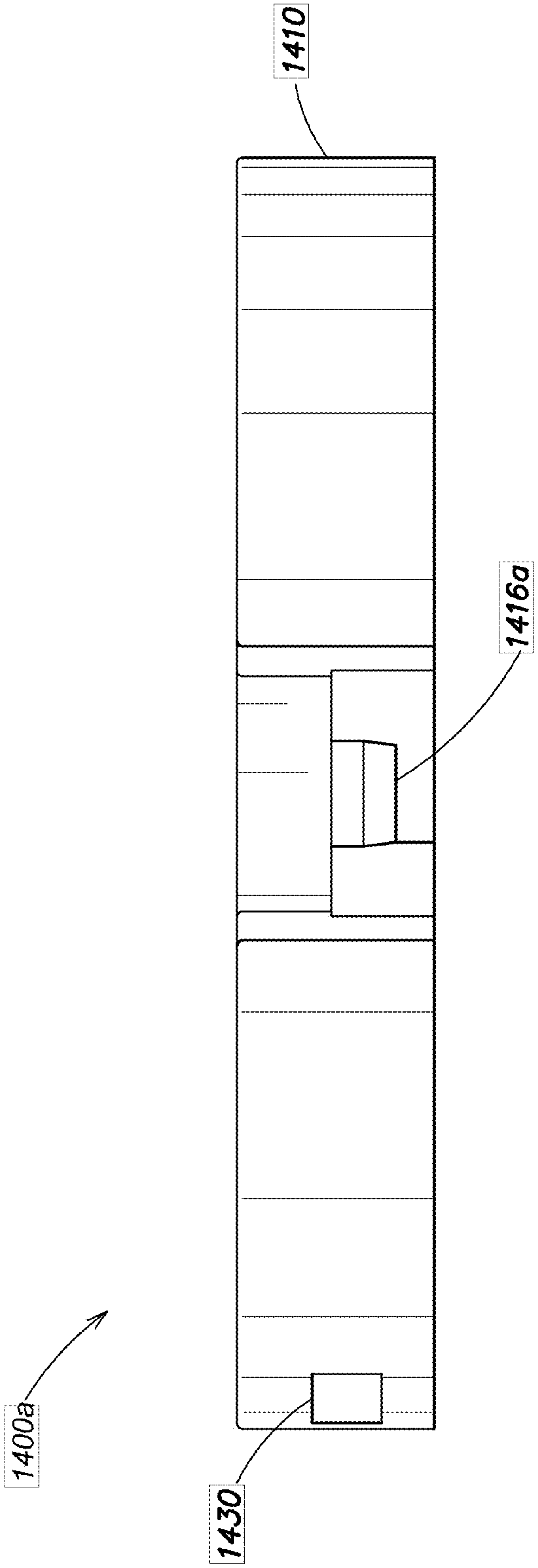
FIG. 6E shows a front view of the light source holder of FIG. 6A.
Figure 6F:
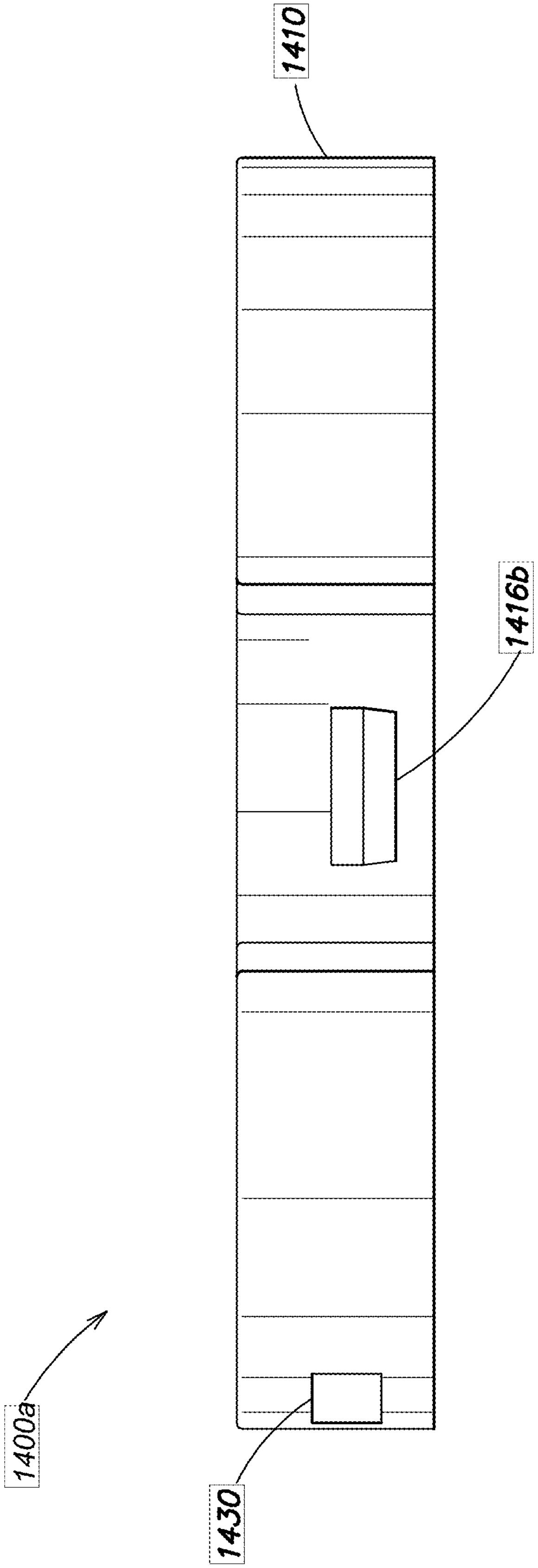
FIG. 6F shows a rear view of the light source holder of FIG. 6A.
Figure 6G:
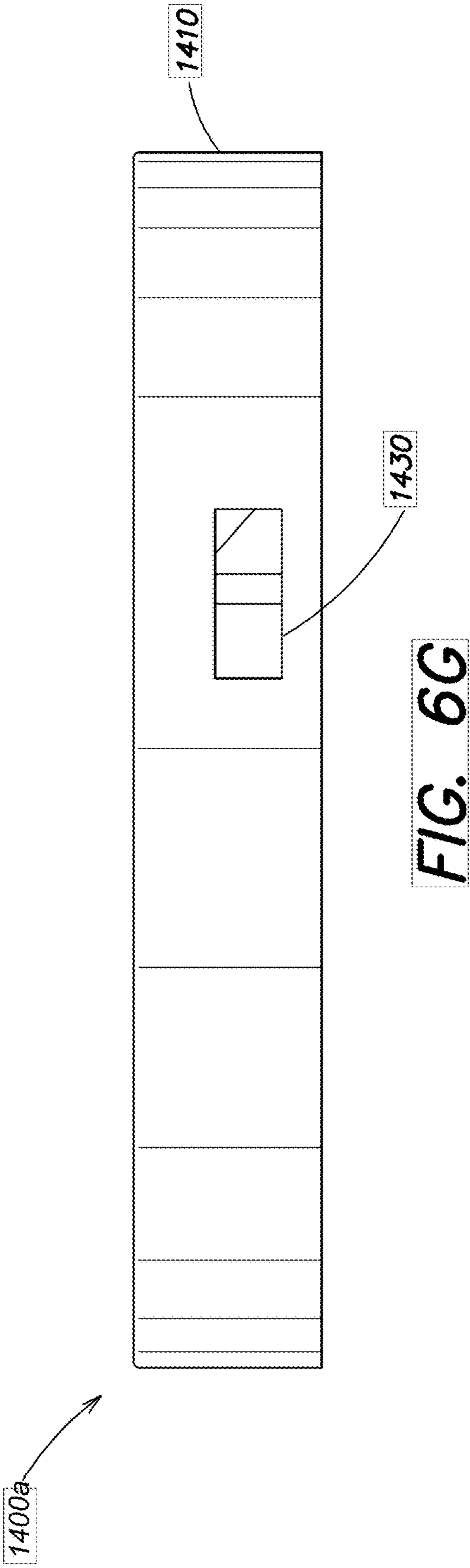
FIG. 6G shows a right-side view of the light source holder of FIG. 6A.
Figure 6H:
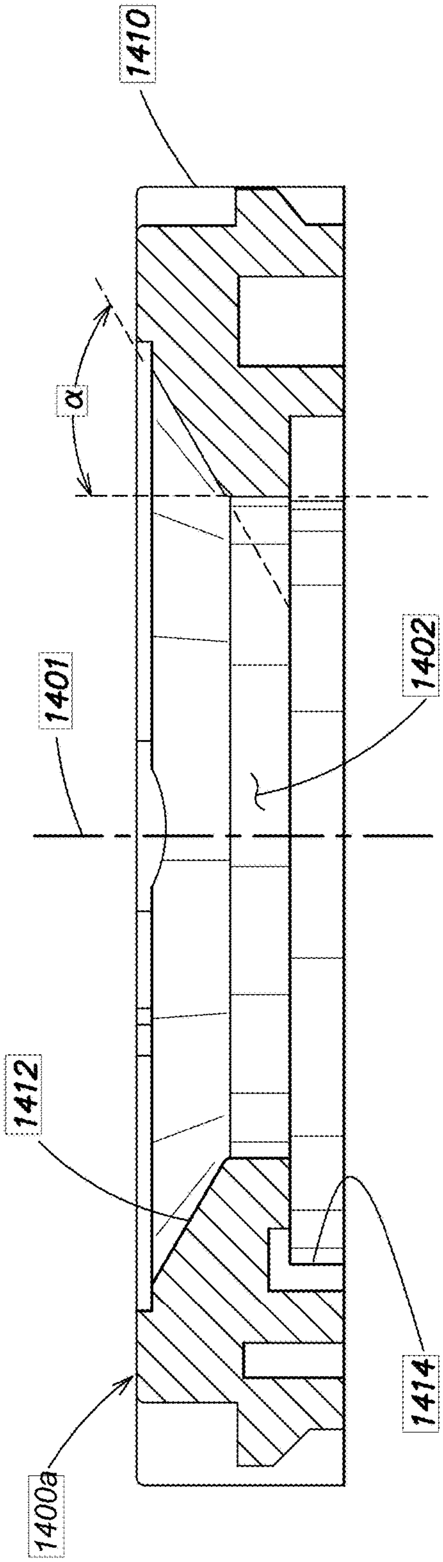
FIG. 6H shows a cross-sectional view of the light source holder corresponding to the cross-section A-A of FIG. 6C.

The sidewall 1410 may further include a tapered section 1412 adjoining the opening 1402. In some implementations, the tapered section 1412 may have a linear profile. If the opening 1402 is circular in shape, the tapered section 1412 may thus form a conical surface. The linear profile of the tapered section 1412 may be oriented at angle, a, with respect to an axis parallel to a centerline axis 1401 of the light source holder 1400*a* as shown in FIG. 6H. In some implementations, the angle (a) may be chosen to abut and support a portion of the optical assembly 1500*a* (e.g., a portion of a folded optical element may be substantially flush with the tapered section 1412).

In some implementations, the light source holder 1400*a* and, in particular, the tapered section 1412 may be tailored to reflect at least a portion of the light emitted by the light source 1300 towards either the reflector 1540 or the cover lens 1510 and the optical element 1530. In this manner, the light source holder 1400*a* may increase the light coupling efficiency of the lighting module 1000*a* (i.e., the ratio of the amount of light exiting the lighting module 1000*a* and the amount of light emitted by the LED light source 1300) by ensuring light emitted at larger emission angles are coupled out of the lighting module 1000*a* instead of being trapped and absorbed within the lighting module 1000*a*. The light source holder 1400*a* may also be shaped to reflect light along a desired set of directions. For example, the light source holder 1400*a* may be shaped to reflect light such that light is more uniformly distributed spatially and/or angularly. In some implementations, the light source holder 1400*a* may be tailored to have a reflectivity of at least about 50%. In some implementations, the light source holder 1400*a* may be tailored to have a reflectivity of at least about 75%.

The light source holder 1400*a* may also include a light source recess 1414 to receive the light source 1300 for assembly. In general, the shape and/or dimensions of the light source recess 1414 may depend on the shape of the light source 1300. For example, FIG. 6B shows the light source recess 1414 may be square in shape corresponding to the light source 1300 shown in FIG. 7. In some implementations, the depth of the light source recess 1414 may be tailored such that the light source 1300 is at least flush with the bottom side of the light source holder 1400*a*. In some implementations, the light source holder 1400*a* may be configured to allow the light source 1300 to slightly protrude out of the light source recess 1414 to ensure the light source 1300 is in sufficient thermal contact with the heat sink 1100. The light source holder 1400*a* may further include a spring clip recess 1418 to receive a spring clip (not shown). The spring clip may press against a portion of the light source 1300 thus securing the light source 1300 to the light source holder 1400*a*.

The sidewall 1410 may further include various mounting mechanisms to couple the light source holder 1400*a* to the heat sink 1100. For example, the sidewall 1410 may include one or more snap-fit connectors (e.g., snap-fit connectors 1416*a* and 1416*b*) to engage corresponding snap-fit receivers (not shown) in the recessed section 1130 of the heat sink 1100. In some implementations, the snap-fit connectors 1416*a* and 1416*b* may also be coupled to respective snap-fit receivers in the optical assembly 1500*a*. For instance, a reflector or an optic and the cover lens 1510 may be separately coupled to the heat sink 1100 via a snap-fit connection to the light source holder 1400*a*. In another example, the sidewall 1410 may include openings 1420 to receive the fasteners 1302 to couple to the heat sink 1100 via the openings 1132.

The light source holder 1400*a* may also provide features to connect the electrical cables 1030*a* and 1030*b* to the light source 1300. For example, the light source holder 1400*a* may include a slot formed along the sidewall 1410 to receive a poke-in connector (not shown), which may be electrically coupled to a terminal of the light source 1300 via a metal tab (not shown). The metal tab may be integrally formed with the poke-in connector or may be a separate component coupled to the poke-in connector during assembly. As shown, the slot may include an opening 1430 on the sidewall 1410 to receive the electrical cable, an opening 1432 adjoining the light source recess 1414 for the metal tab to contact a respective terminal of the light source 1300, and an opening 1434 to access the poke-in connector (e.g., to bend a tab once the electrical cable is inserted thereby restraining the electrical cable). As shown, the light source holder 1400*a* may include a pair of slots to support the electrical cables 1030*a* and 1030*b*. Furthermore, the light source holder 1400*a* may be marked to indicate the polarity of the terminal (e.g., a positive or negative terminal).

Figure 19A:
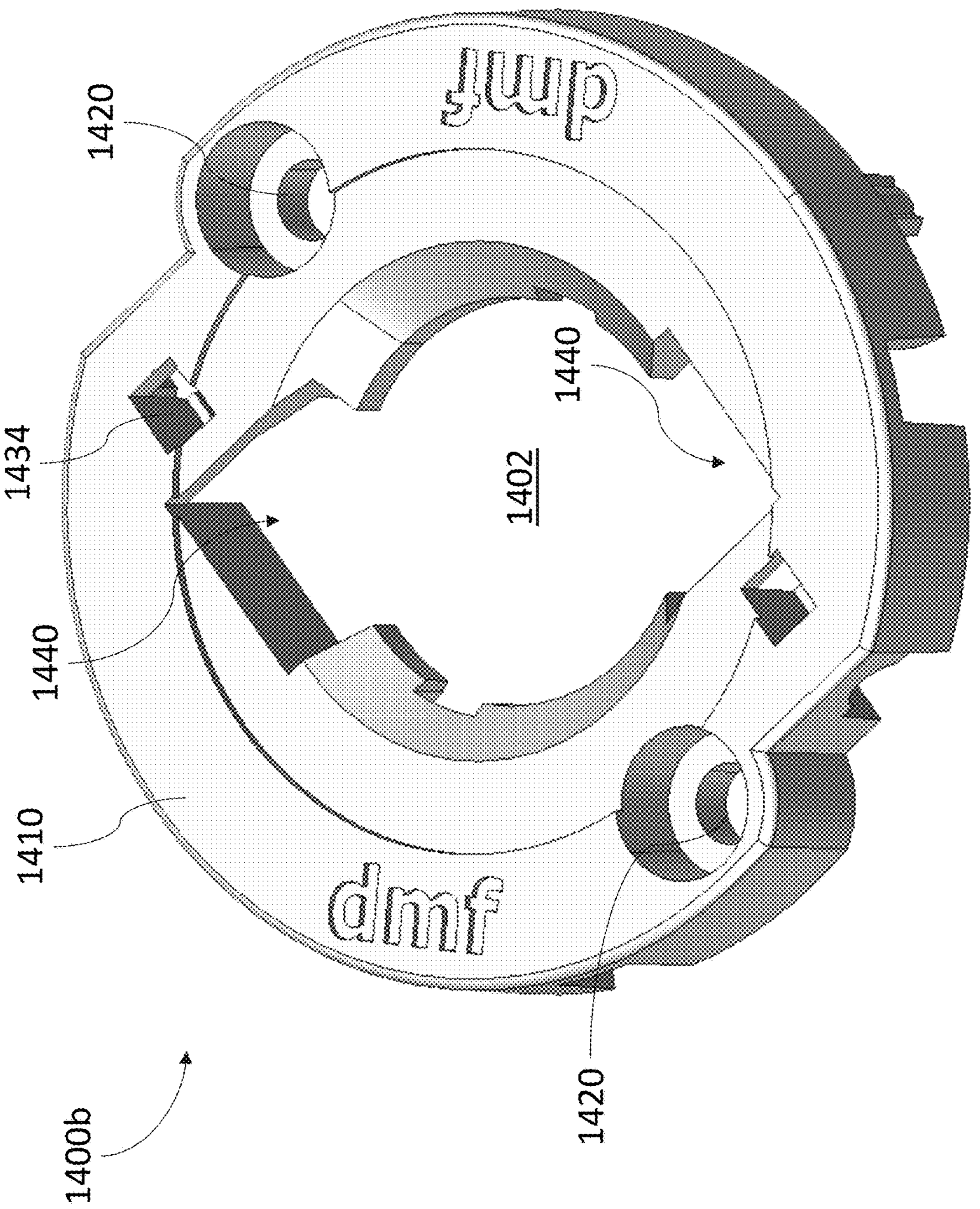
FIG. 19A shows a top perspective view of another exemplary light source holder.
Figure 19B:
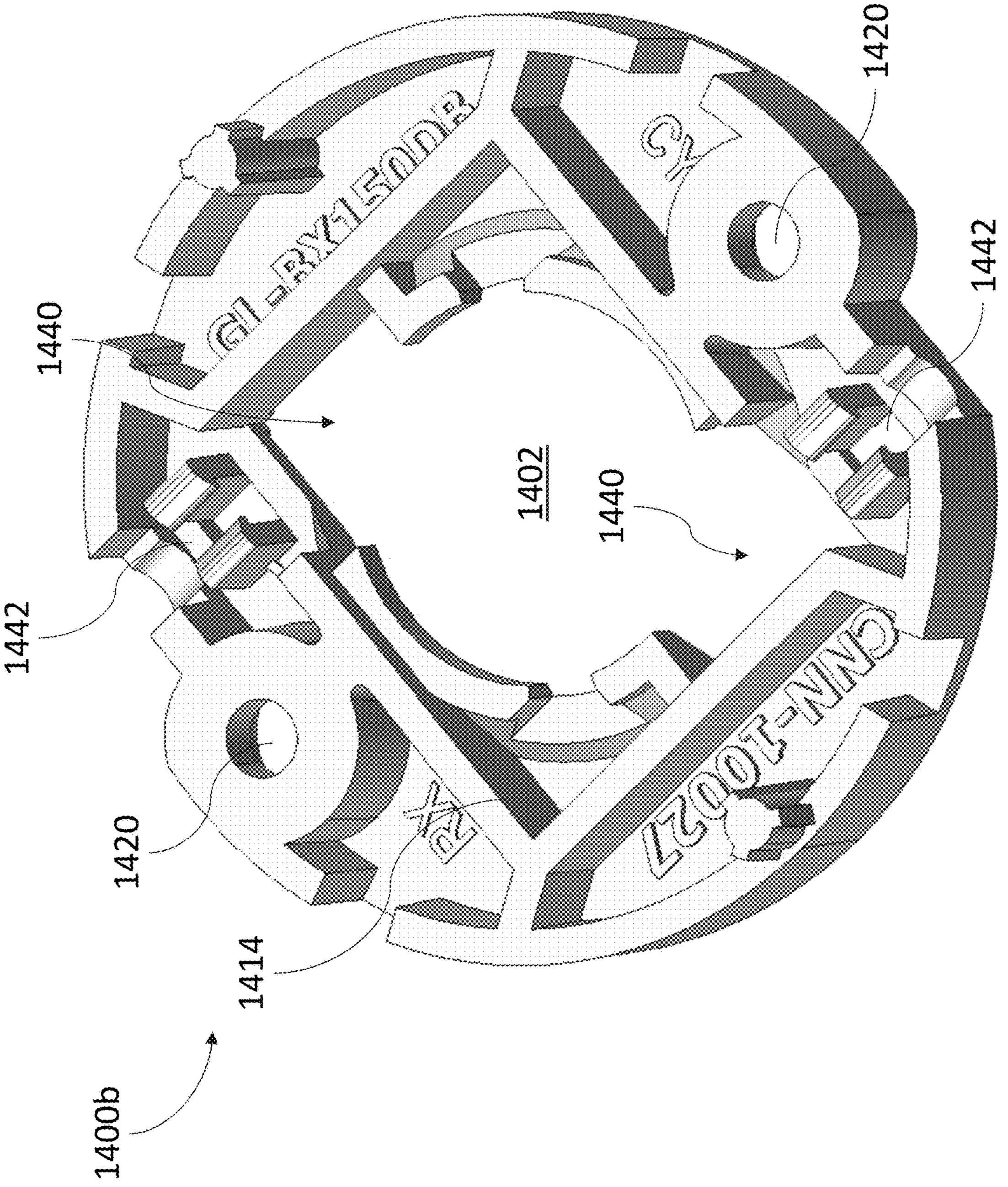
FIG. 19B shows a bottom perspective view of the light source holder of FIG. 19A.
Figure 19C:
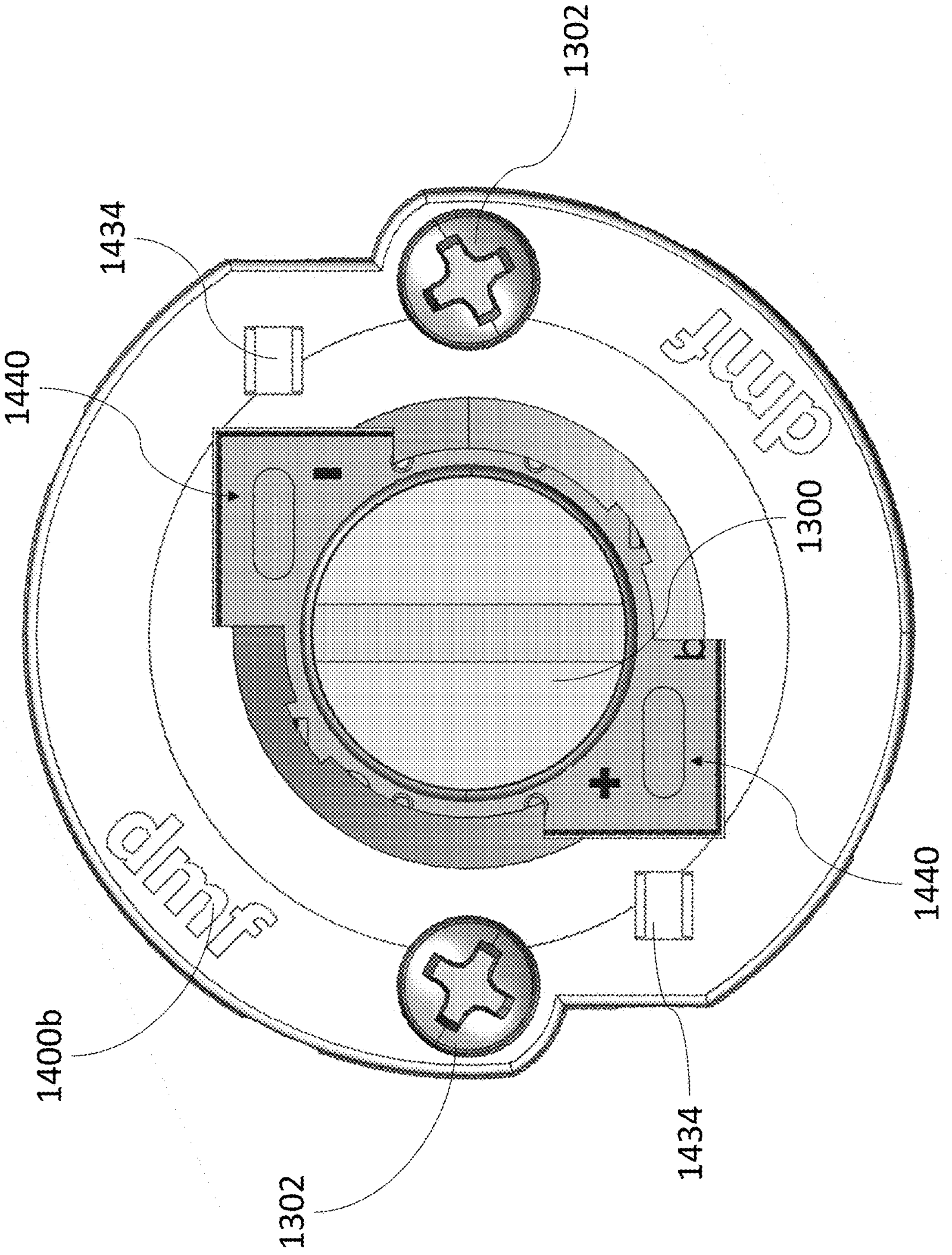
FIG. 19C shows a top view of the light source holder of FIG. 19A supporting a light source and fasteners.

It should be appreciated that, in some implementations, it may be desirable to solder the electrical cables 1030*a* and 1030*b* to the terminals of the light source 1300. FIGS. 19A-19C show another exemplary light source holder 1400*b*, which once again includes the sidewall 1410 defining the opening 1402 for light emitted by the light source 1300 to pass through and a light source recess 1414 to receive the light source 1300. As shown, the light source holder 1400*b* may further include openings 1420 to receive the fasteners 1302 to couple to the heat sink 1100 via the openings 1132. In this implementation, the light source holder 1400*b* may include snap-fit connectors 1442 disposed on the bottom side of the sidewall 1410 to couple to the insulating cladding of the electrical cables 1030*a* and 1030*b*. The light source holder 1400*b* may further include notches 1440 adjoining the opening 1402, which are positioned to expose the terminals of the light source 1300 when mounted to the light source holder 1400*b*. During assembly, the electrical cables 1030*a* and 1030*b* may be coupled to respective snap-fit connectors 1442 to position and align the exposed ends of the cables 1030*a* and 1030*b* onto corresponding terminals of the light source 1300 so that the cables 1030*a* and 1030*b* may be readily soldered to the light source 1300.

The light source holder 1400*a* may be formed from various electrically insulating materials including, but not limited to, polyvinyl chloride (PVC), acrylonitrile butadiene styrene (ABS), polycarbonate (PC), polyurethane (PU), polyethylene, polyethylene terephthalate, polypropylene, and polystyrene. Various manufacturing techniques may be used to fabricate the light source holder 1400*a* depending, in part, on the material used to form the light source holder 1400*a* including, but not limited to, injection molding, blow molding, and 3D printing.

The lighting module 1000*a* may generally support various types of light sources 1300. The light source 1300 may generally be various types of electro-optical devices including, but not limited to, a light emitting diode (LED), an organic light emitting diode (OLED), and a polymer light emitting diode (PLED). In some implementations, the light source 1300 may include one or more light emitting elements, e.g. multiple LEDs, OLEDs, or PLEDs, to increase light output and/or to alter the spectral characteristics of light emitted into the surrounding environment. For example, the light source 1300 may include LEDs with different wavelengths spanning the visible spectrum. The color of the light outputted by the lighting module 1000*a* may be tuned to have different color temperatures (e.g., white, yellow, orange, red).

Figure 7:
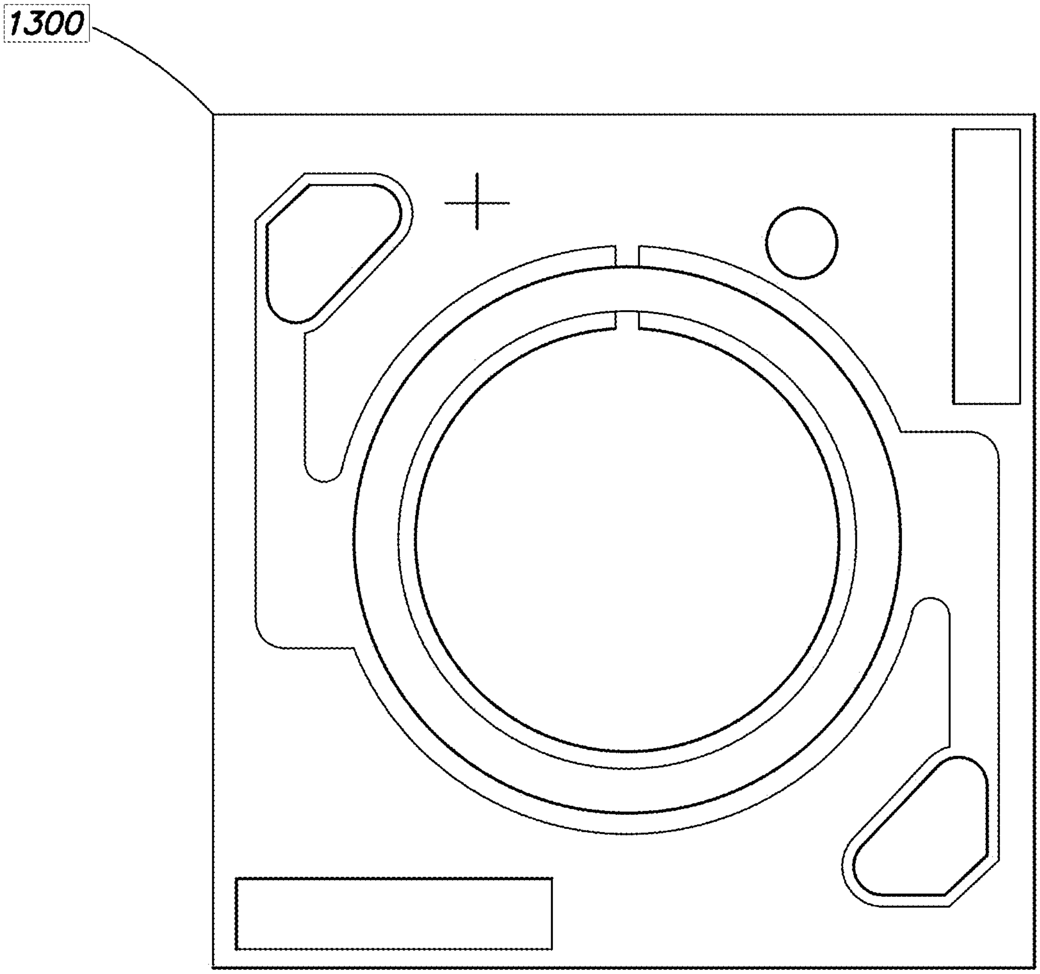
FIG. 7 shows an exemplary LED light source.
Figure 8A:
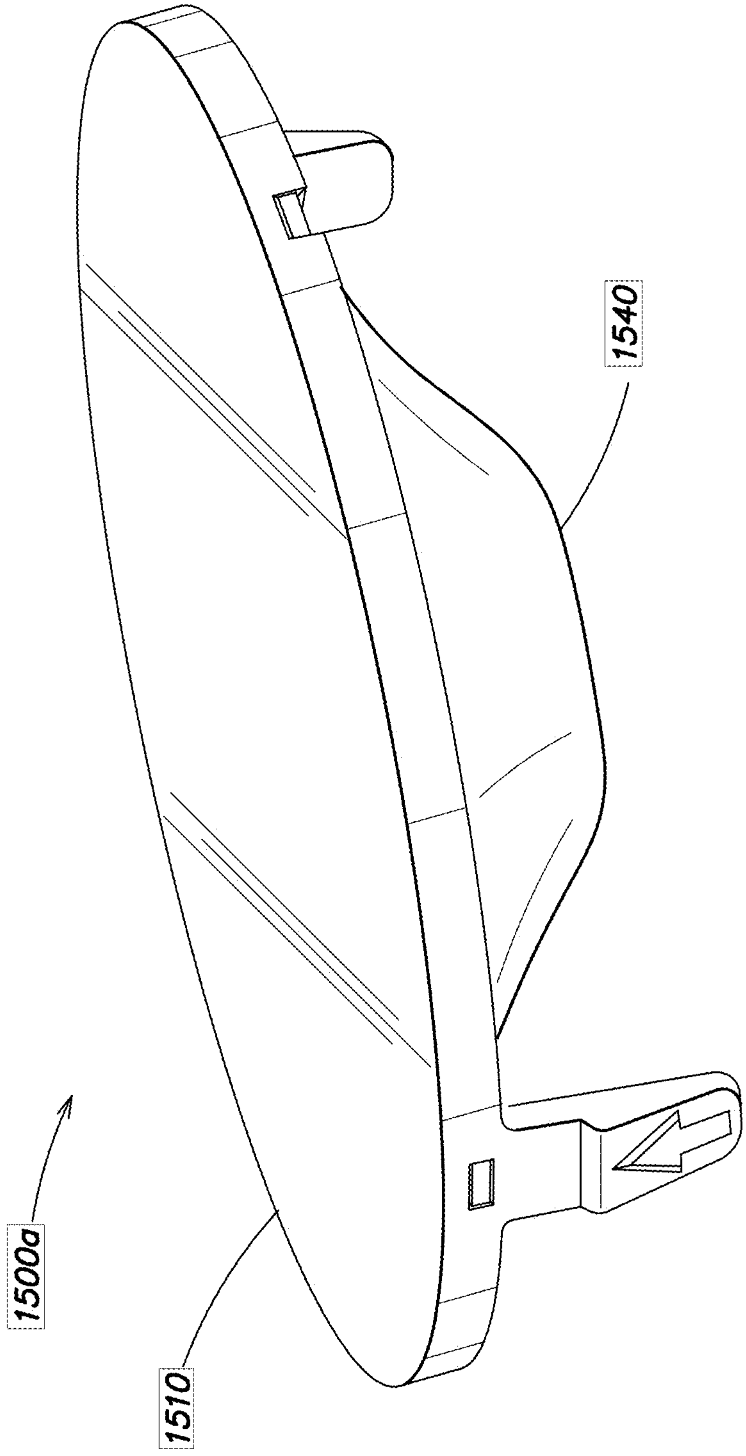
FIG. 8A shows a top perspective view of an optical assembly in the lighting module of FIG. 1A with a reflector.
Figure 8B:
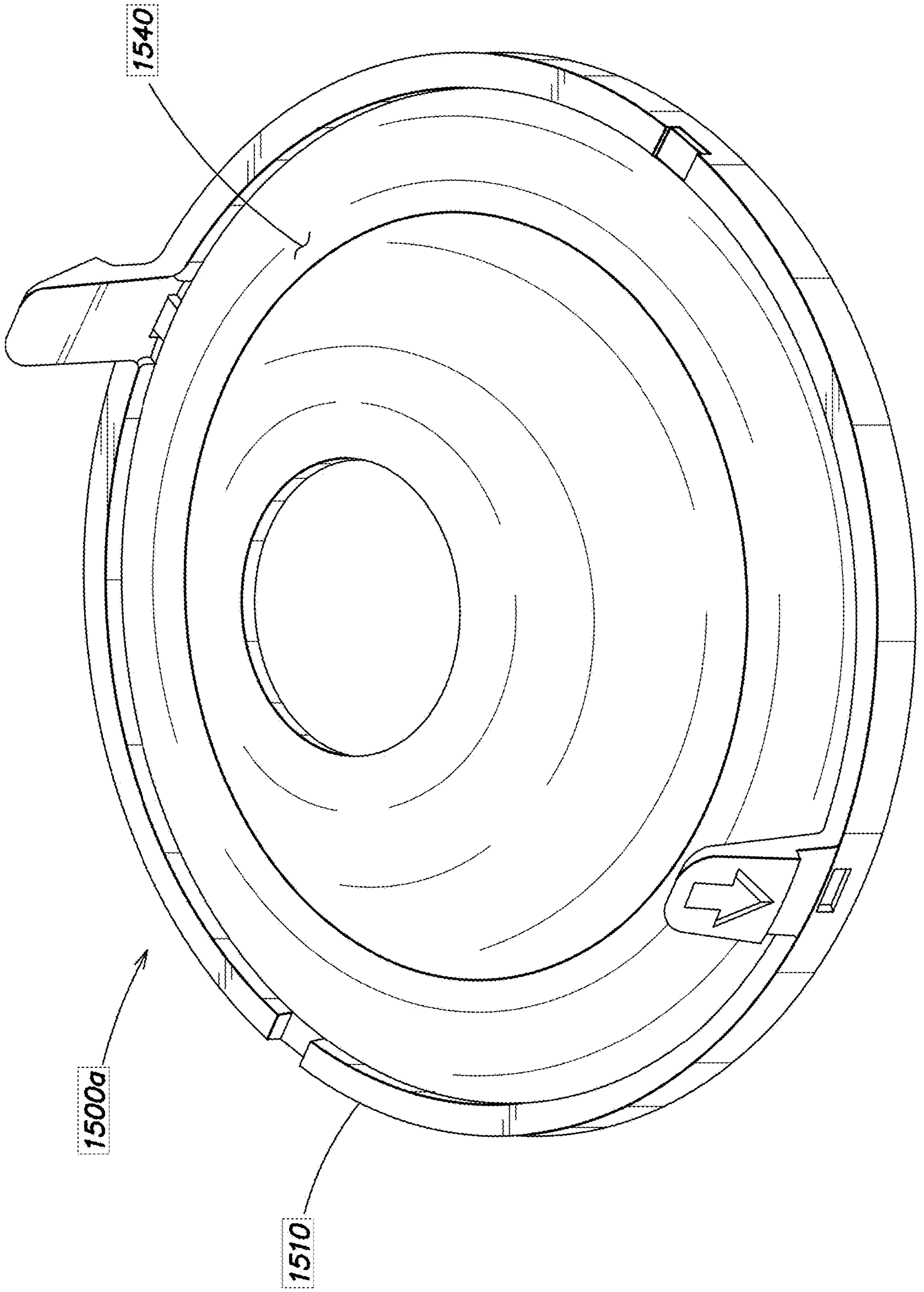
FIG. 8B shows a bottom perspective view of the optical assembly of FIG. 8A.
Figure 8C:
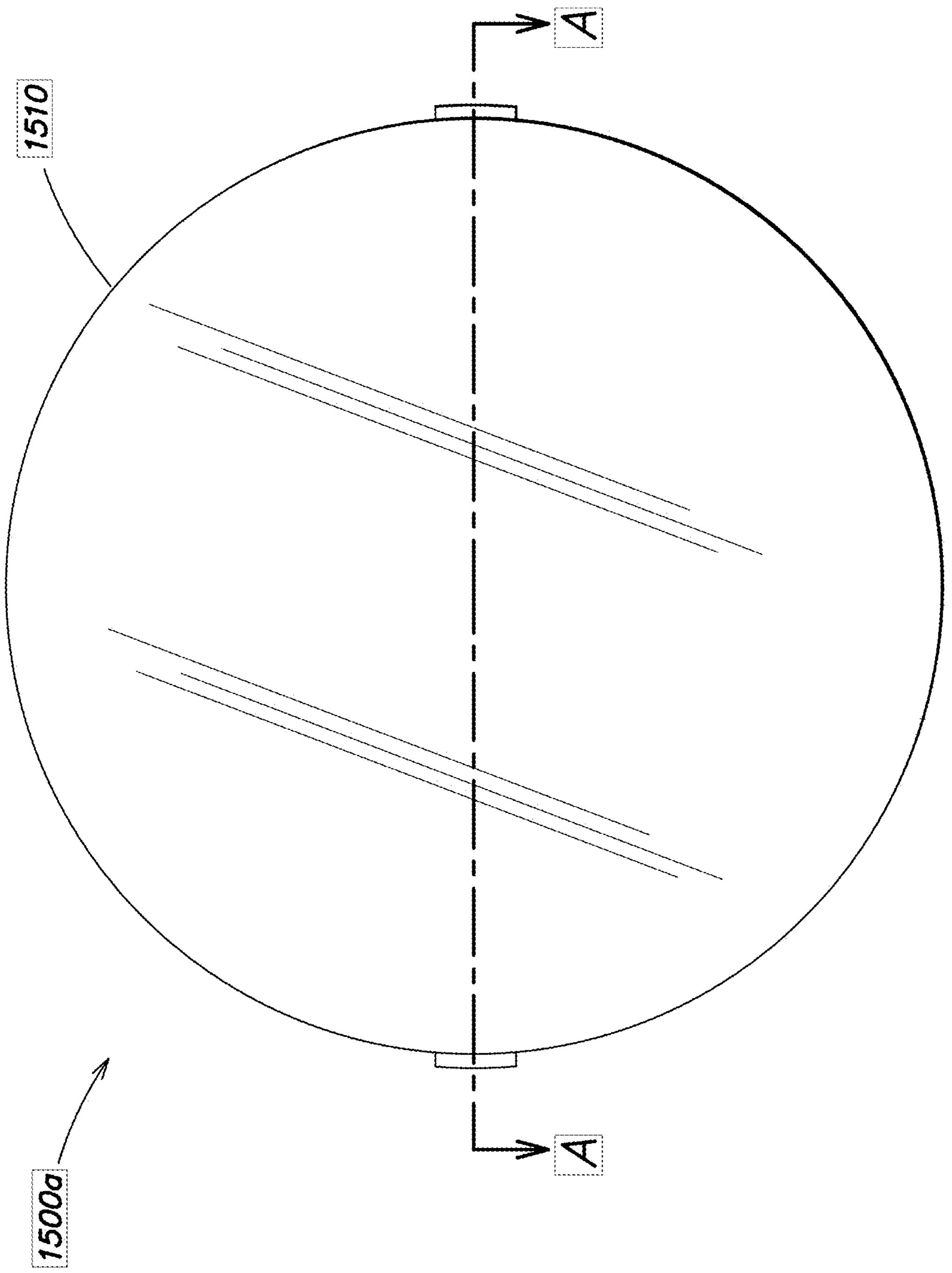
FIG. 8C shows a top view of the optical assembly of FIG. 8A.
Figure 8D:
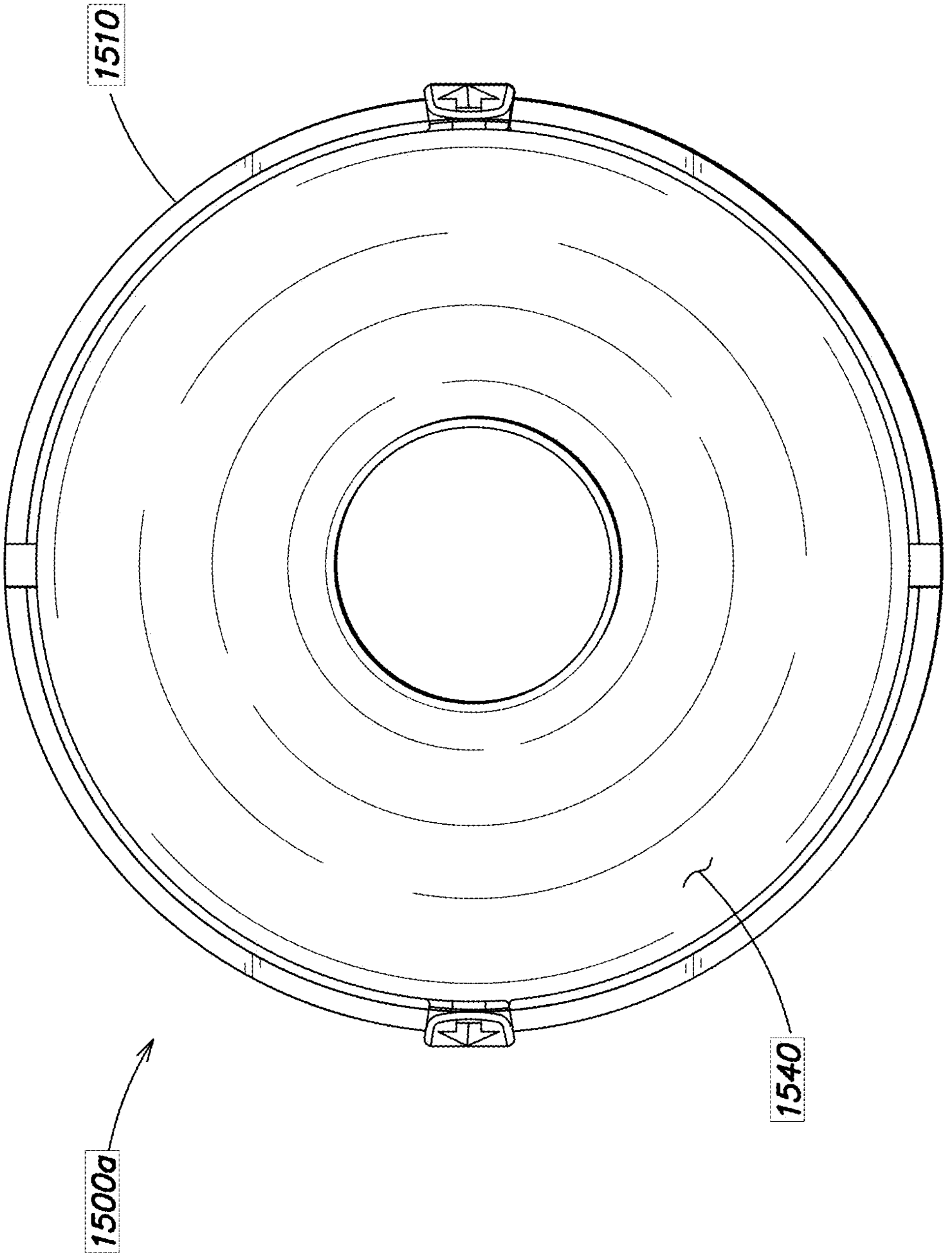
FIG. 8D shows a bottom view of the optical assembly of FIG. 8A.
Figure 8E:
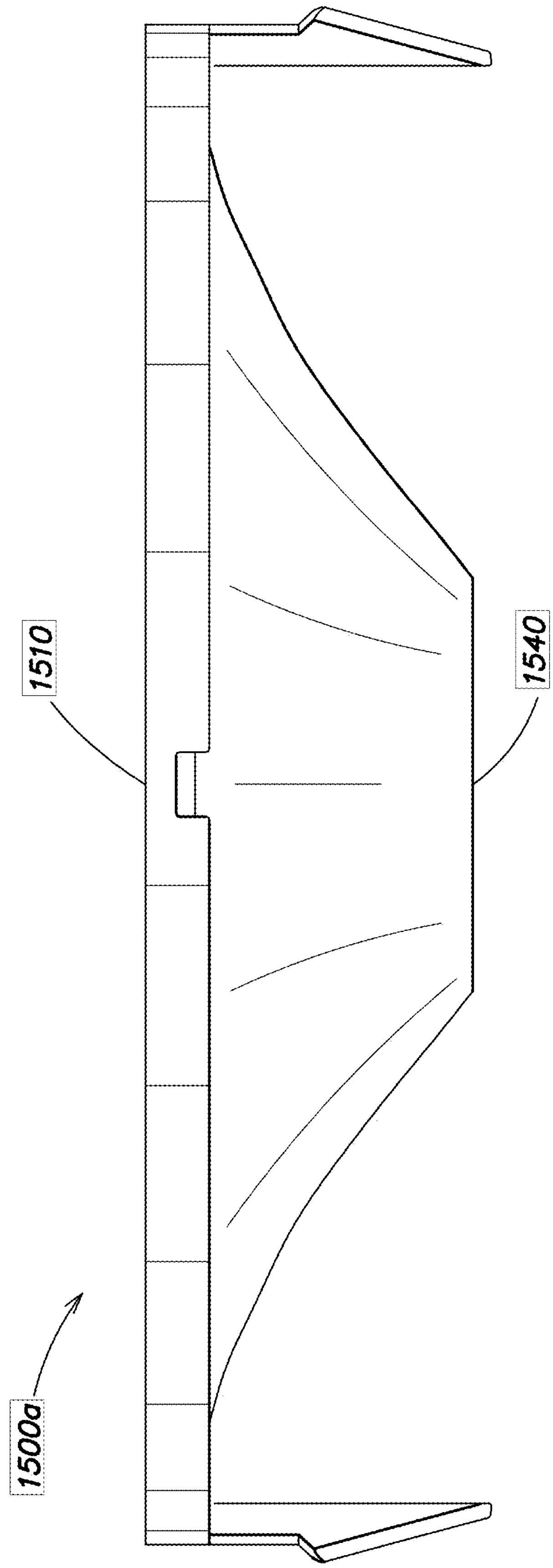
FIG. 8E shows a front view of the optical assembly of FIG. 8A.
Figure 8F:
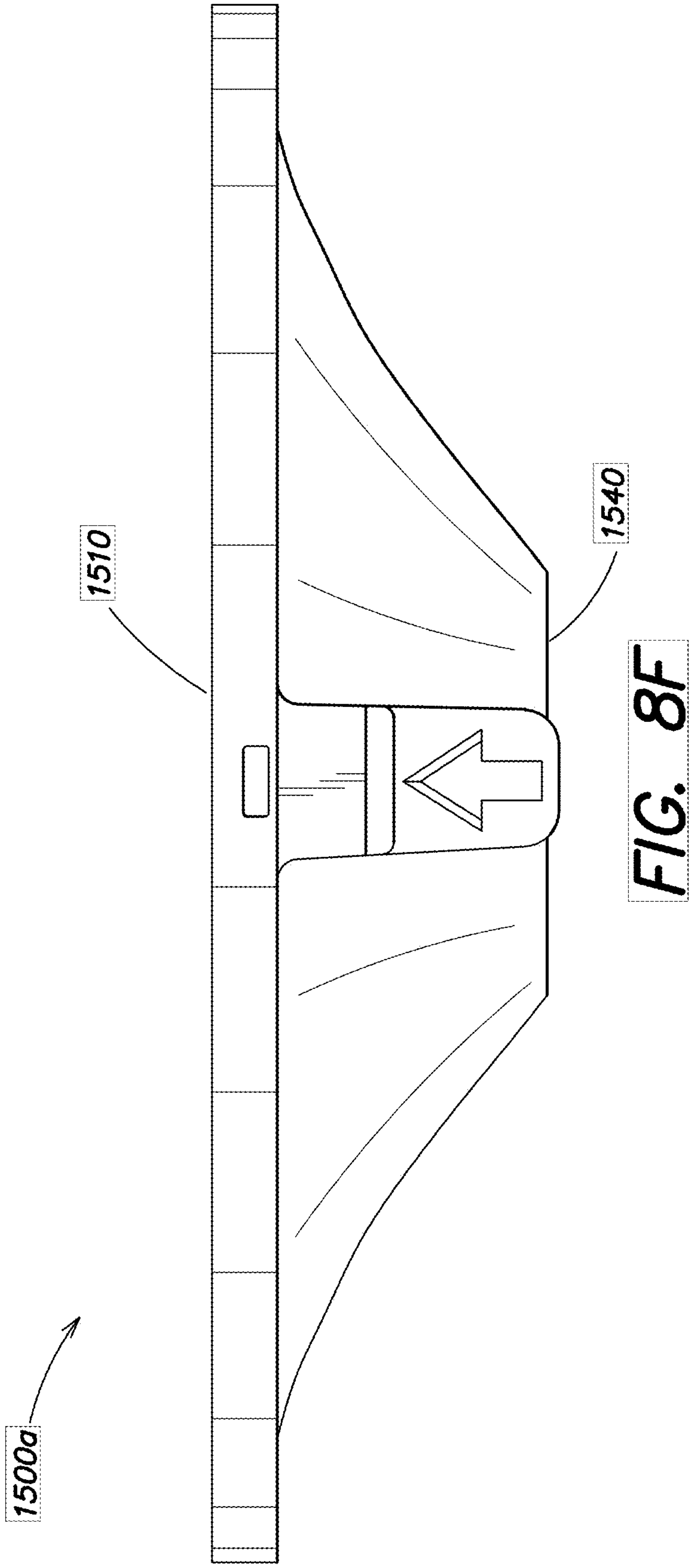
FIG. 8F shows a right-side view of the optical assembly of FIG. 8A.
Figure 8G:
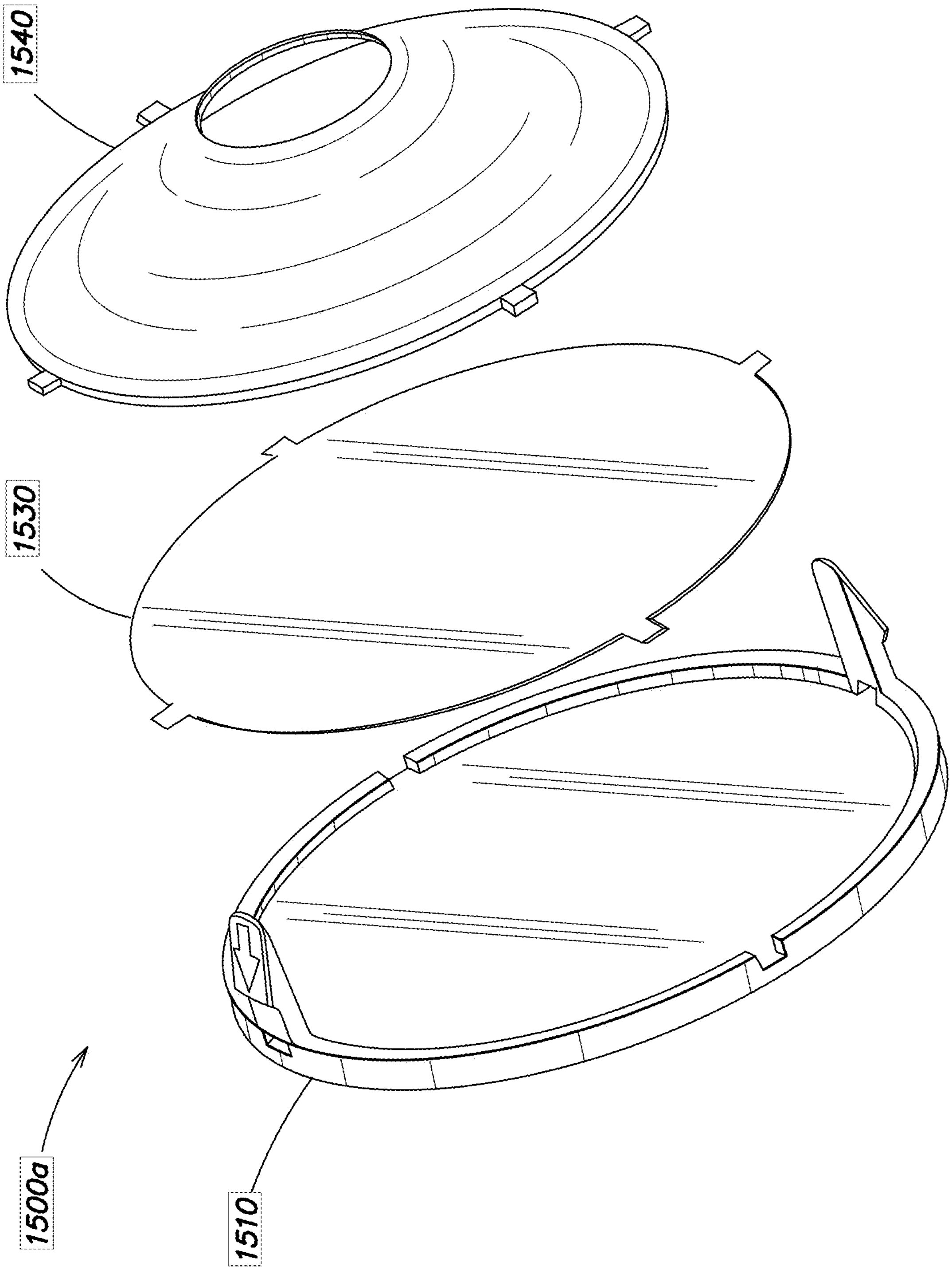
FIG. 8G shows an exploded bottom view of the optical assembly of FIG. 8A.
Figure 8H:
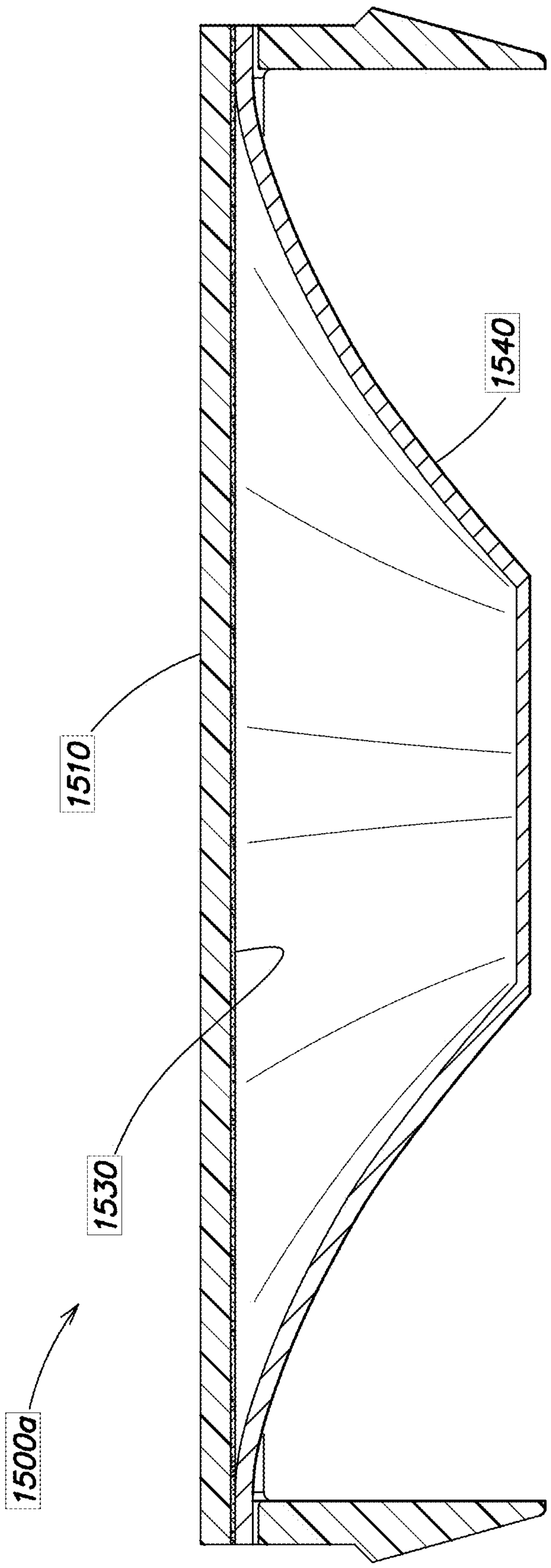
FIG. 8H shows a cross-sectional view of the optical assembly corresponding to the plane A-A of FIG. 8C.
Figure 9A:
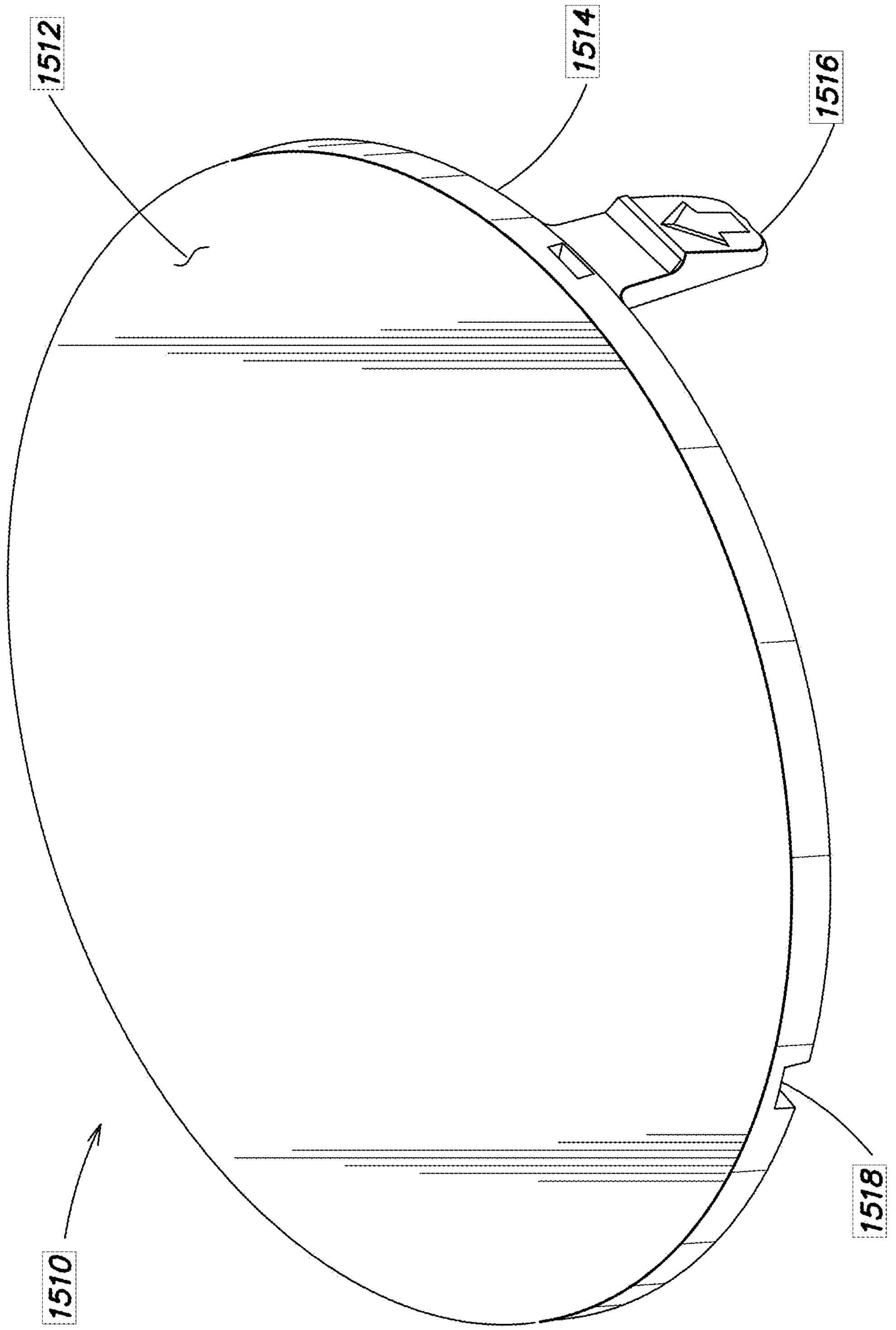
FIG. 9A shows a top perspective view of a cover lens in the optical assembly of FIG. 8A.
Figure 9B:
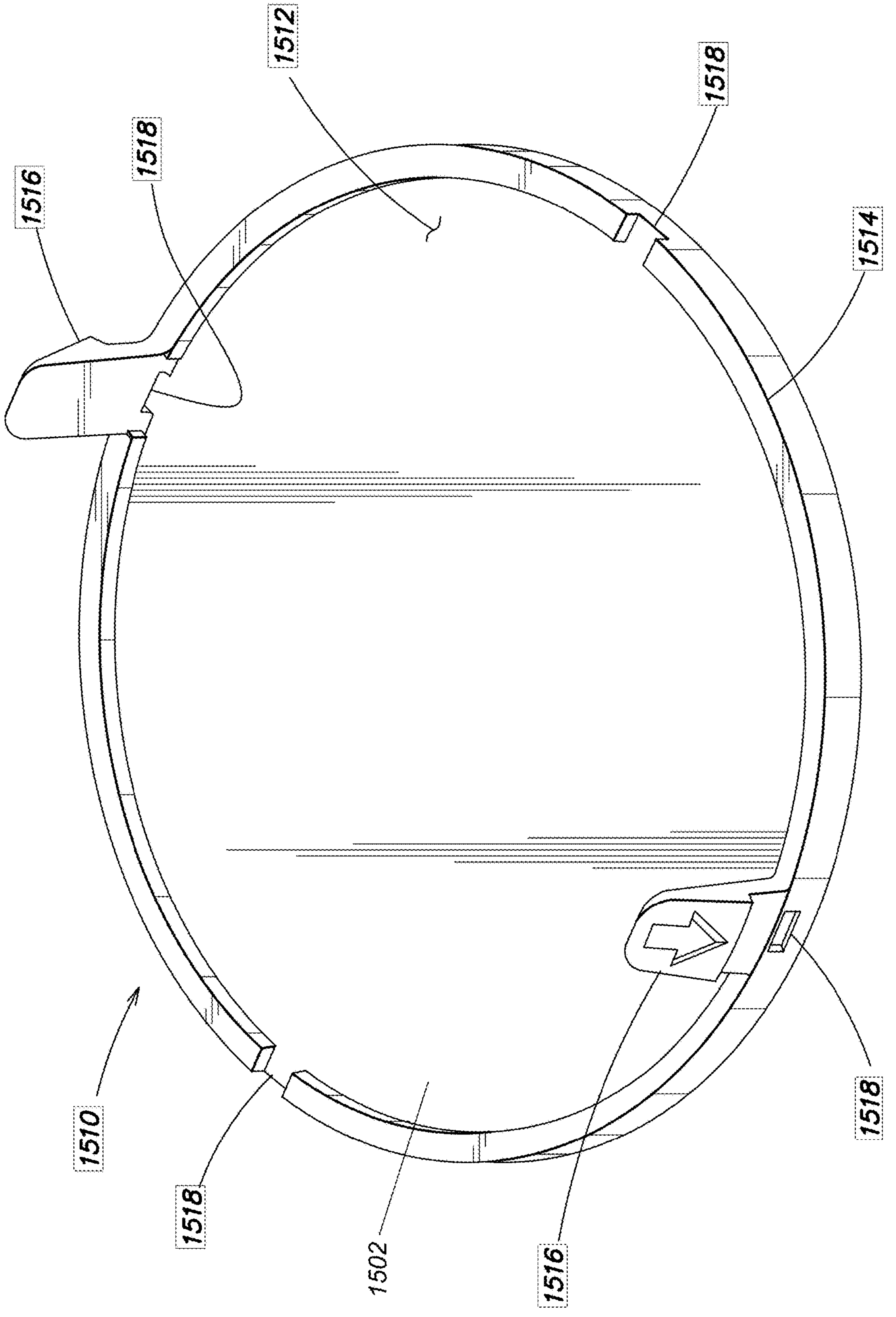
FIG. 9B shows a bottom perspective view of the cover lens of FIG. 9A.
Figure 9C:
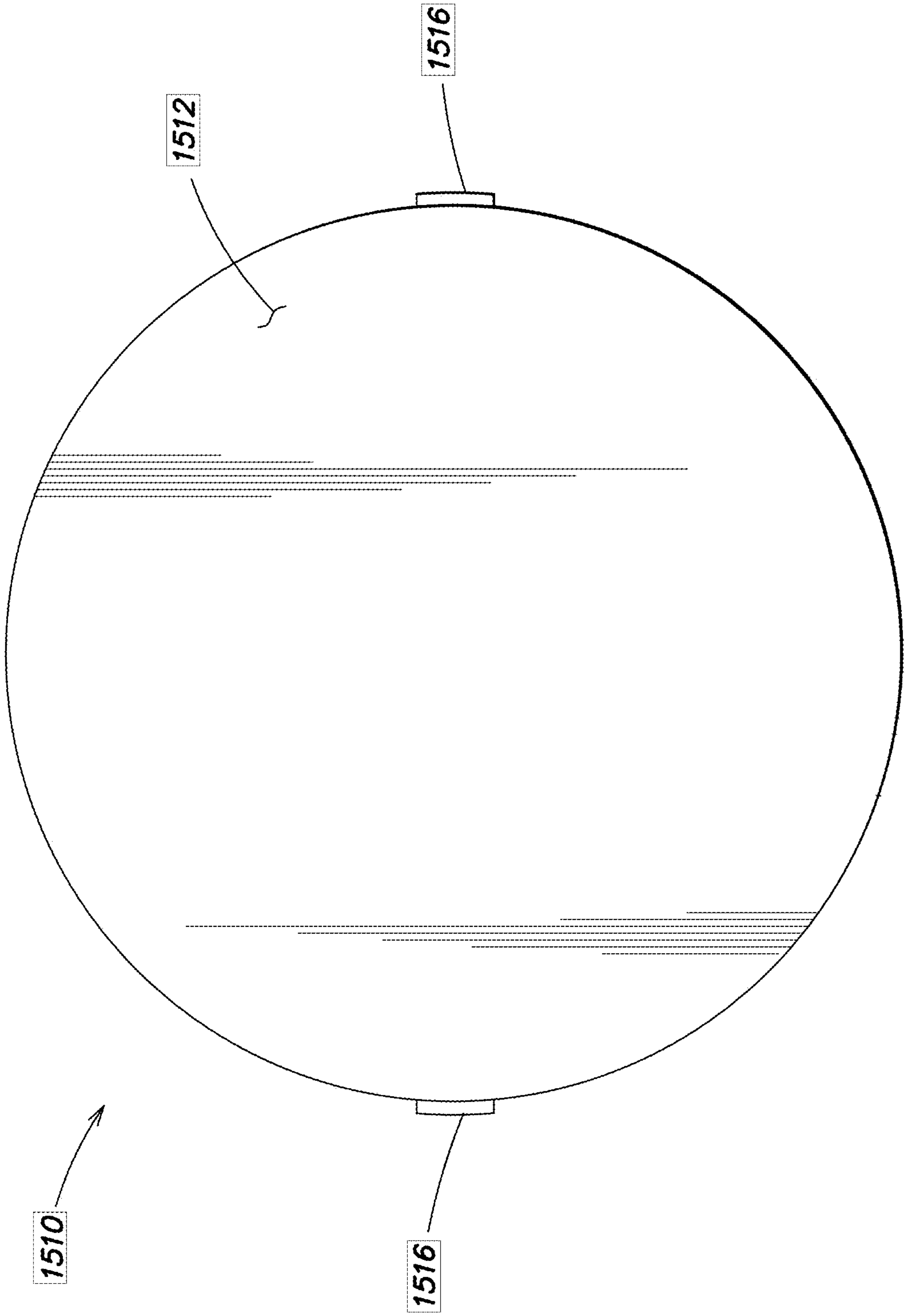
FIG. 9C shows a top view of the cover lens of FIG. 9A.
Figure 9D:
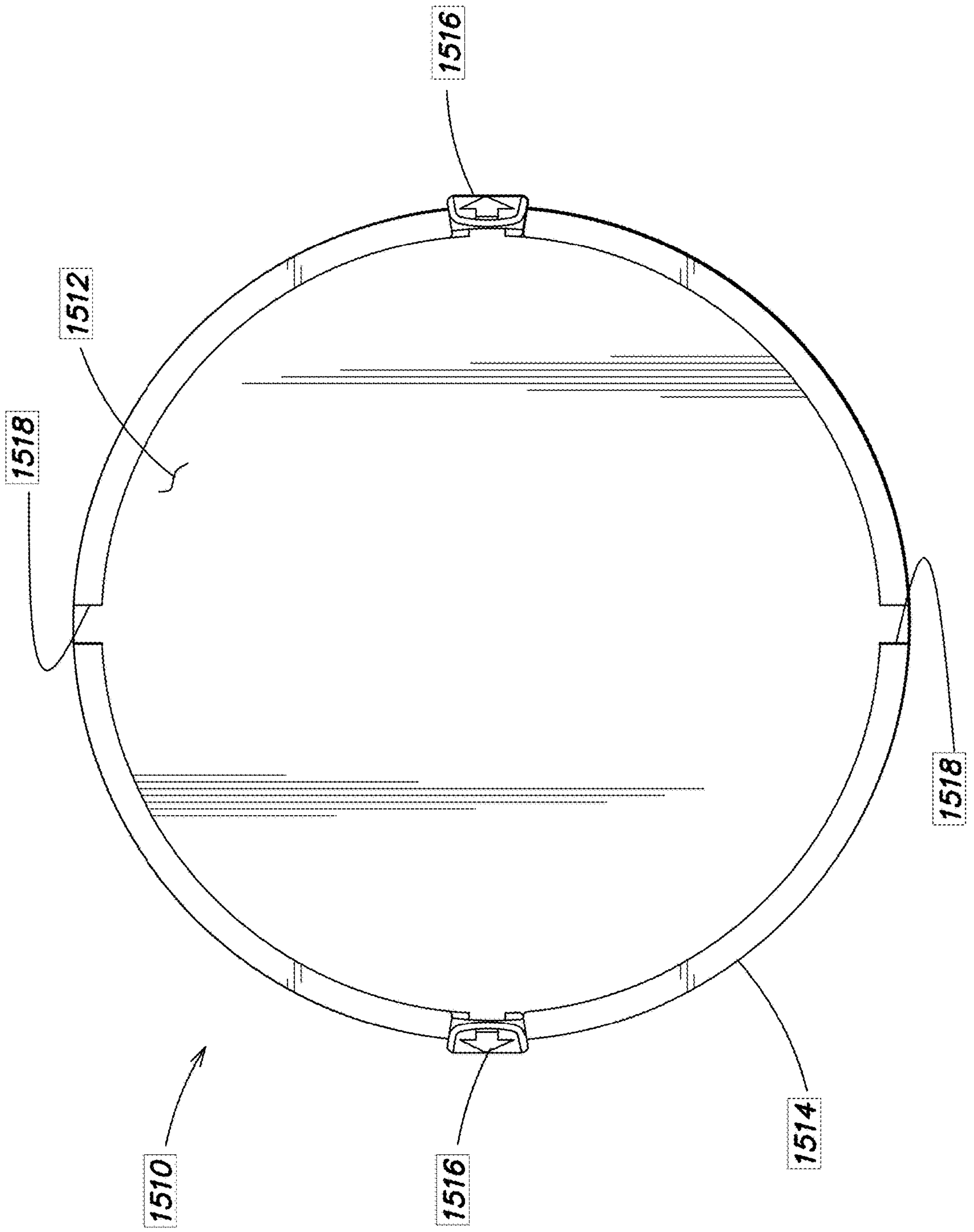
FIG. 9D shows a bottom view of the cover lens of FIG. 9A.
Figure 9E:
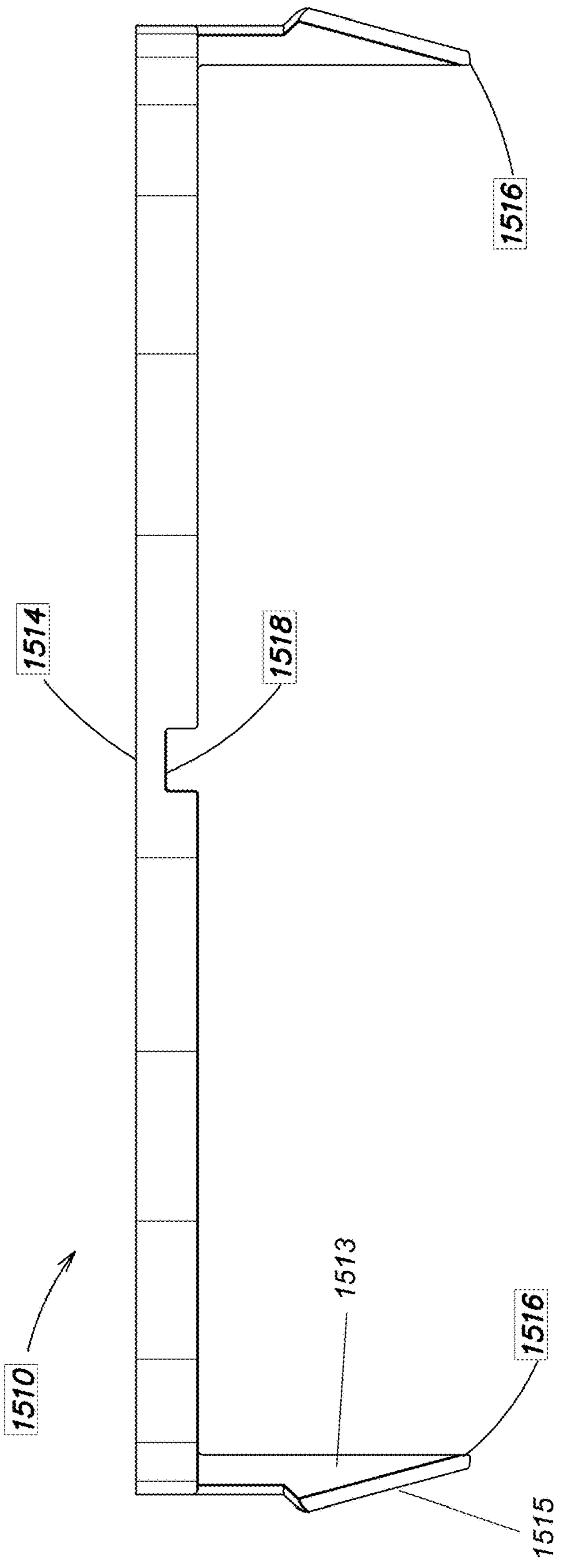
FIG. 9E shows a front view of the cover lens of FIG. 9A.
Figure 9F:
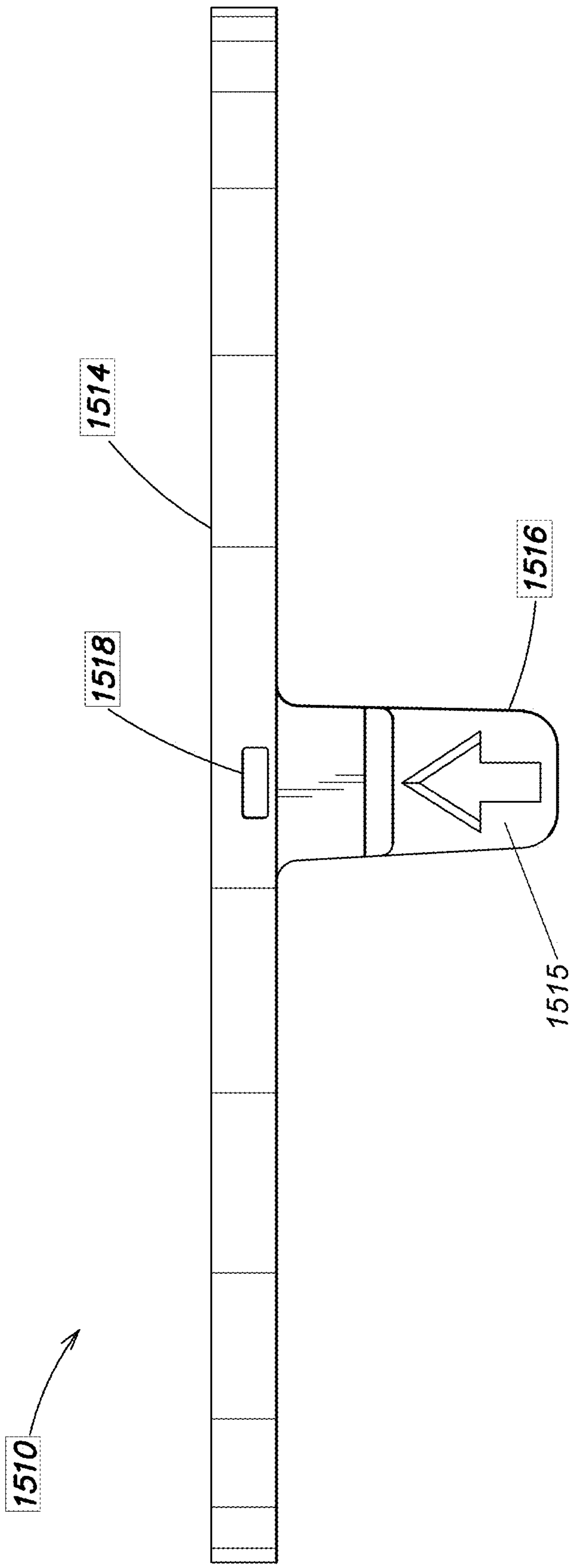
FIG. 9F shows a right-side view of the cover lens of FIG. 9A.

In some implementations, the light source 1300 may be a chip-on-board (COB) LED with a substrate, one or more light emitting elements, and respective terminals to receive electrical power from the driver module 1200 via the electrical cables 1030*a* and 1030*b*. FIG. 7 shows an example of a COB LED light source 1300 compatible with the lighting module 1000*a*. During assembly, the light source 1300 may be mounted to the heat sink 1100 via the light source holder 1400*a* as described above.

As noted above, the optical assembly 1500*a* in the lighting system 1000*a* may be field-changeable. In other words, the optical assembly 1500*a* may be readily removed and/or replaced with another optical assembly 1500*a* or a different optical assembly (e.g., optical assemblies 1500*b* or 1500*c*) after purchase or after installation. For example, the optical assembly 1500*a*, as described above, may provide an emission profile tailored for general ambient lighting. However, different optical assemblies may provide different emission profiles, such as light with a beam angle of about 15 degrees, about 25 degrees, about 40 degrees, or about 60 degrees.

In some implementations, the optical assembly may provide a radially symmetric beam of light. In some implementations, the optical assembly may support a linear spread lens that provides an elliptical beam of light. For example, the elliptical beam of light may have a first beam angle of 60 degrees along a first transverse axis and a second beam angle of 20 degrees along a second transverse axis orthogonal to the first transverse axis. The optical assembly may also provide additional optical elements to alter the clarity or haze of the light output by adjusting the relative proportions of light that is specularly or diffusely transmitted. The optical assembly may also provide filters to adjust the spectral content (e.g., the color) of the light.

In some implementations, the optical assembly 1500*a* may be mounted to the heat sink 1100 and/or removable from the heat sink 1100 without the use of any tools. As shown in FIGS. 1I and 1J, the optical assembly 1500*a* may include a cover lens 1510 with snap-fit connectors 1516 that couple the optical assembly 1500*a* to the heat sink 1100. The snap-fit connectors 1516 may be shaped to provide a sufficiently large area (e.g., 0.4 to 0.6 square centimeters) for a user's finger to press. The heat sink 1110 may further include snap-fit receivers 1126 that are positioned and shaped to allow a user's fingers to readily access and press the snap-fit connectors 1516 after the optical assembly 1500*a* is coupled to the heat sink 1100.

The snap-fit connectors 1516 may also be sufficiently compliant such that the snap-fit connectors 1516 securely couple the optical assembly 1500*a* to the heat sink 1100 (i.e., the optical assembly 1500*a* does not move appreciably relative to the heat sink 1100) while allowing a user to actuate the snap-fit connectors 1516 (i.e., bend the snap-fit connectors 1516) without the use of a tool. For example, the snap-fit connectors 1516 may be shaped and/or dimensioned so that a force with a magnitude of about 25 pounds is sufficient to actuate the snap-fit connector 1516 and remove the optical assembly 1500*a* from the heat sink 1100. More generally, the snap-fit connector 1516 may be tailored so that the force to actuate the snap-fit connector 1516 ranges between about 1 pound and about 25 pounds.

The optical assembly 1500*a* may generally include several optical components that are assembled together in one assembly (or two assemblies in the case of the optical assemblies 1500*b* and 1500*c*) to improve the ease of removal and replacement. For example, FIGS. 8A-8H show the optical assembly 1500*a* may include the cover lens 1510 to facilitate attachment to the heat sink 1100, an optical element 1530 (e.g., a diffuser, a filter), and a reflector 1540 to redirect light emitted at large emission angles. The cover lens 1510 may include one or more notches 1518 to receive and align corresponding tabs 1534 of the optical element 1530 and/or tabs 1548 of the reflector 1540 in a snap-fit connection. In this manner, the cover lens 1510, the optical element 1530, and the reflector 1540 may be installed and/or removed together as one assembly.

In some implementations, the features of the optical element 1530 may be integrated together with the cover lens 1510 to form a single component. For example, the structural features of the optical element 1530 (e.g., a desired surface roughness to diffusely transmit light) may be directly formed onto the cover lens 1510. This may be accomplished, for example, by injection molding where the mold incorporates the desired surface roughness. The cover lens 1510 may also be formed of a material that is optically diffuse (e.g., the material intrinsically scatters light in a diffuser manner). In another example, the cover lens 1510 may be formed from a material that provides the desired filtering of the light (e.g., a color filter, an intensity filter).

FIGS. 9A-9F show several views of the cover lens 1510 in the optical assembly 1500*a*. As shown, the cover lens 1510 may include a cover 1512 (also referred to herein as a "cover portion 1512") to substantially enclose the cavity 1102 of the heat sink 1100 surrounded by a ridge 1514. The ridge 1514 may protrude from the cover 1512 to provide a surface to abut the ledge 1119 in the heat sink 1100. In some implementations, the ridge 1514 may be dimensioned such that the top surface of the cover 1512 is substantially flush or flush with the top end of the sidewall 1110 of the heat sink 1100 (i.e., the top surface of the cover 1512 and the top end of the sidewall 1110 defining the opening into the cavity 1102 lie on the same horizontal plane). In some implementations, the ridge 1514 may be dimensioned to provide a sufficiently large gap to ensure certain optical components (e.g., the optical element 1530) does not physically contact another optical element (e.g., the folded optical element 1550 in the lighting module 1000*b*). The ridge 1514 may further include the notches 1518 described above. In some implementations, respective pairs of notches 1518 may be disposed diametrically opposite of each other along the ridge 1514.

The cover lens 1510 also includes one or more snap-fit connectors 1516. As described above, the snap-fit connectors 1516 may be shaped and/or dimensioned to provide a sufficiently large surface are for a user's finger to readily contact and press the snap-fit connector 1516. Furthermore, the snap-fit connector 1516 may rigidly couple the optical cover lens 1510 to the heat sink 1100 while being sufficiently compliant such that a user may actuate (e.g., bend) the snap-fit connector 1516 without the use of any tools. The cover lens 1510 may be formed of a material transparent to the wavelengths of light emitted by the light source 1300 (e.g., ultraviolet, visible, near infrared radiation).

Figure 10A:
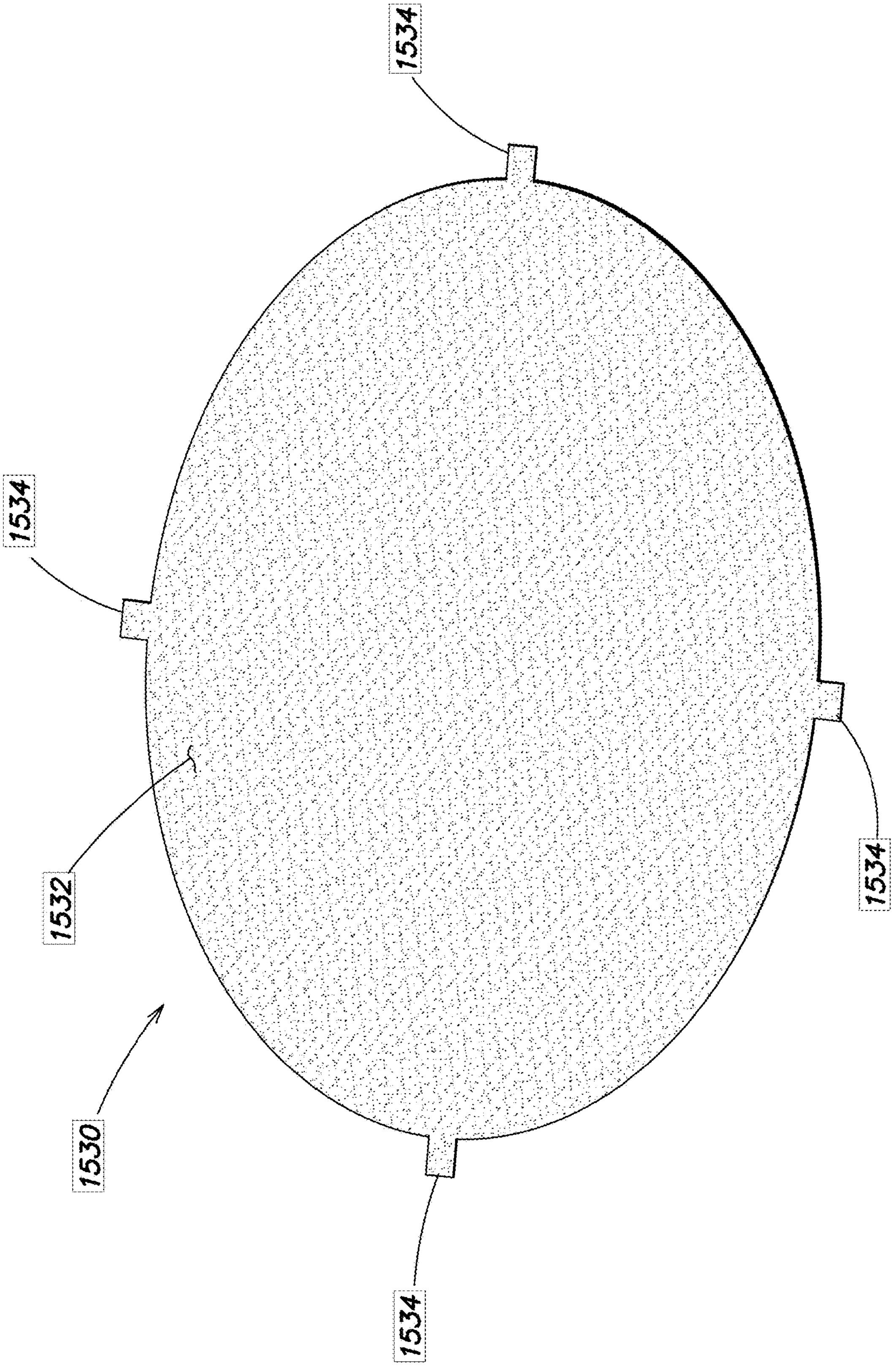
FIG. 10A shows a top perspective view of an optical element in the optical assembly of FIG. 8A.
Figure 10B:
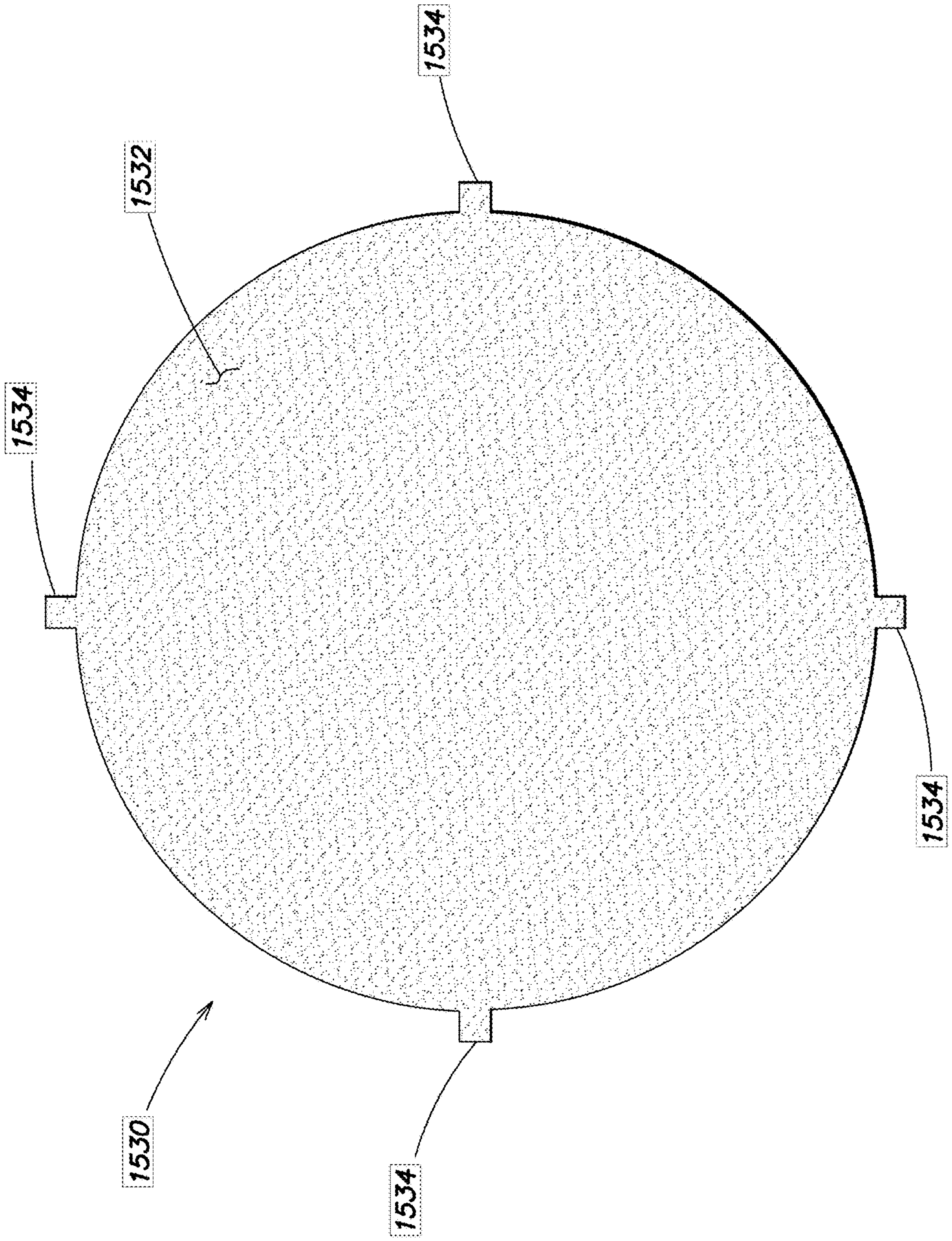
FIG. 10B shows a top view of the optical element of FIG. 10A.
Figure 11A:
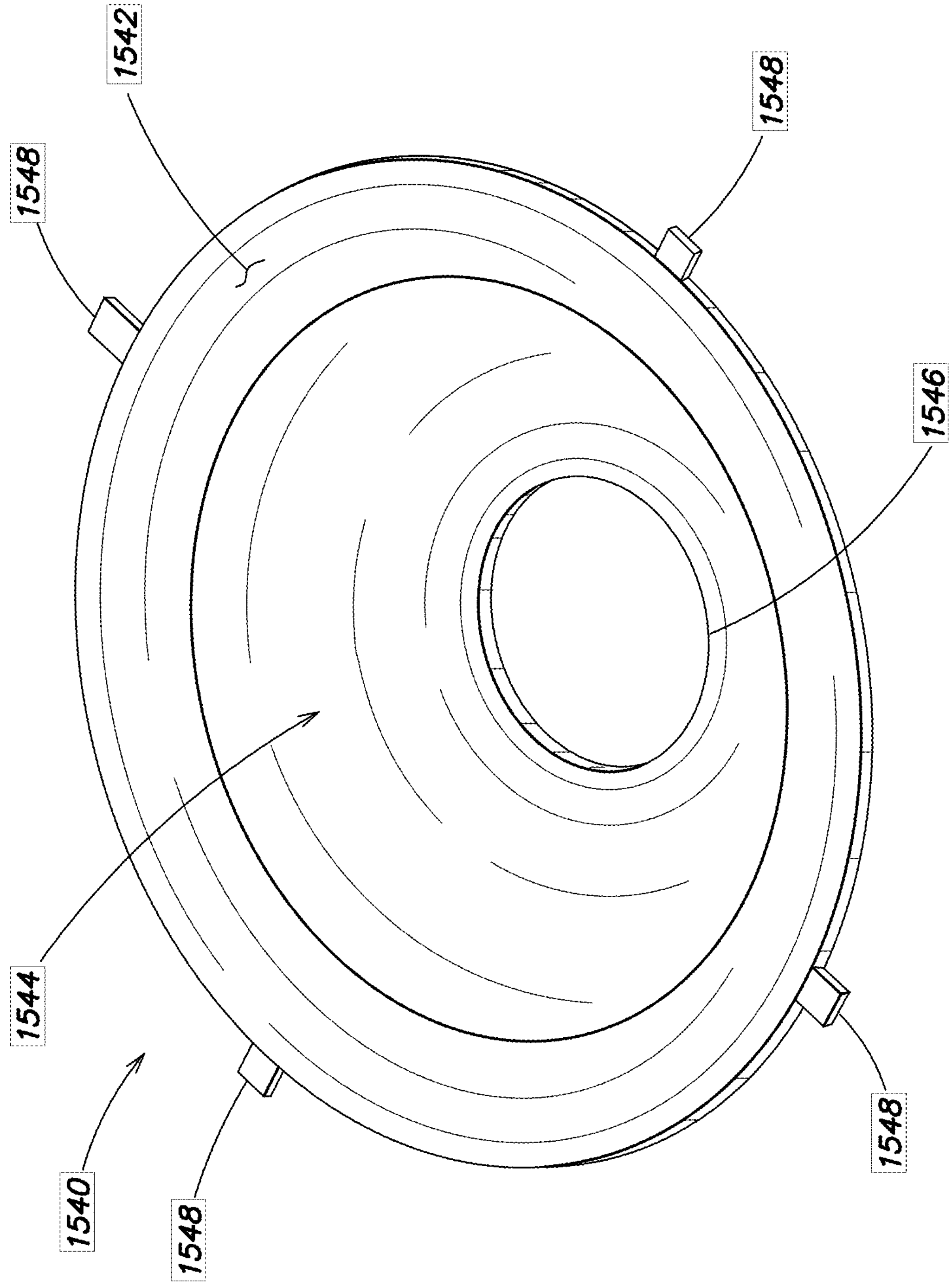
FIG. 11A shows a top perspective view of a reflector in the optical assembly of FIG. 8A.
Figure 11B:
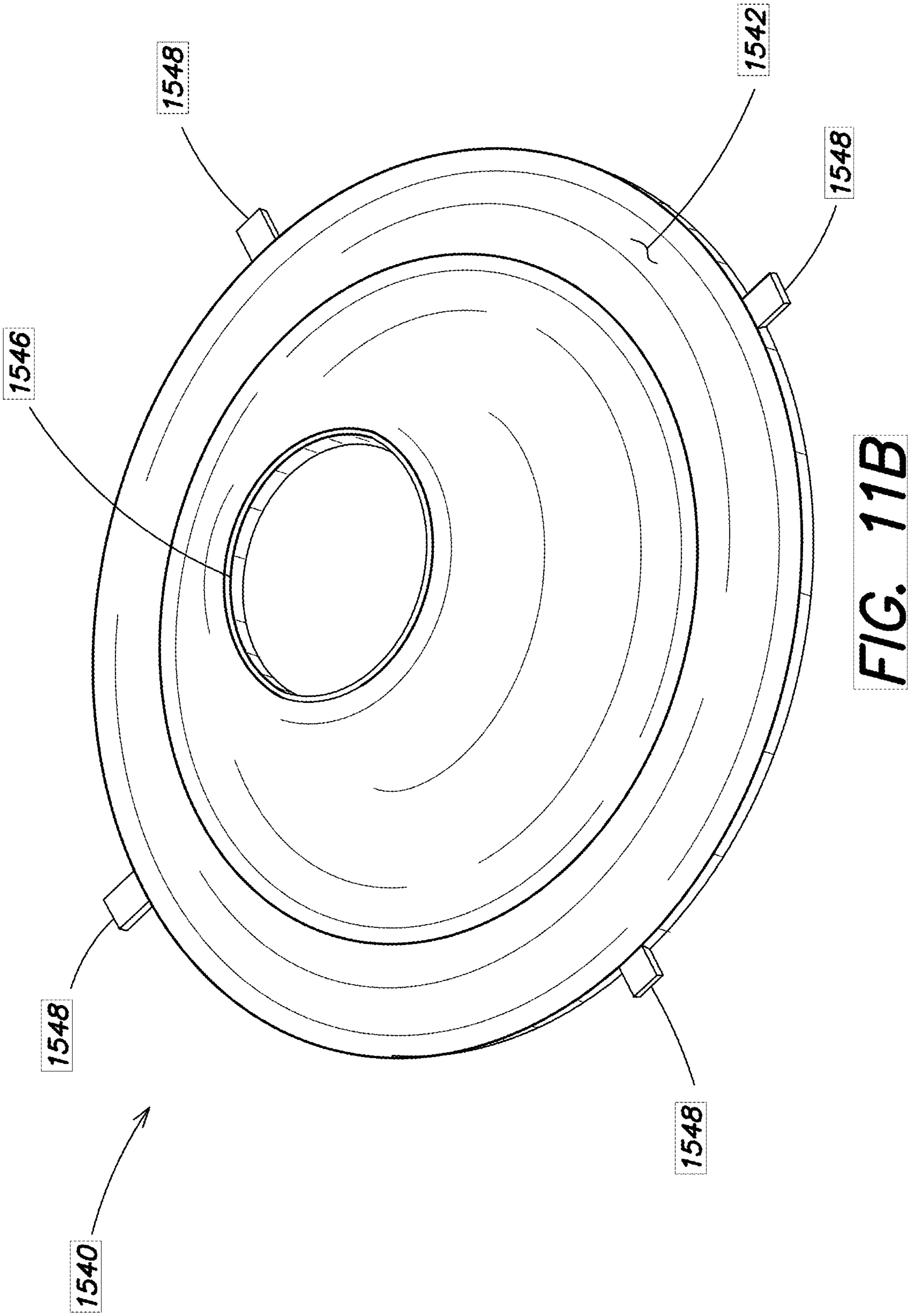
FIG. 11B shows a bottom perspective view of the reflector of FIG. 11A.
Figure 11C:
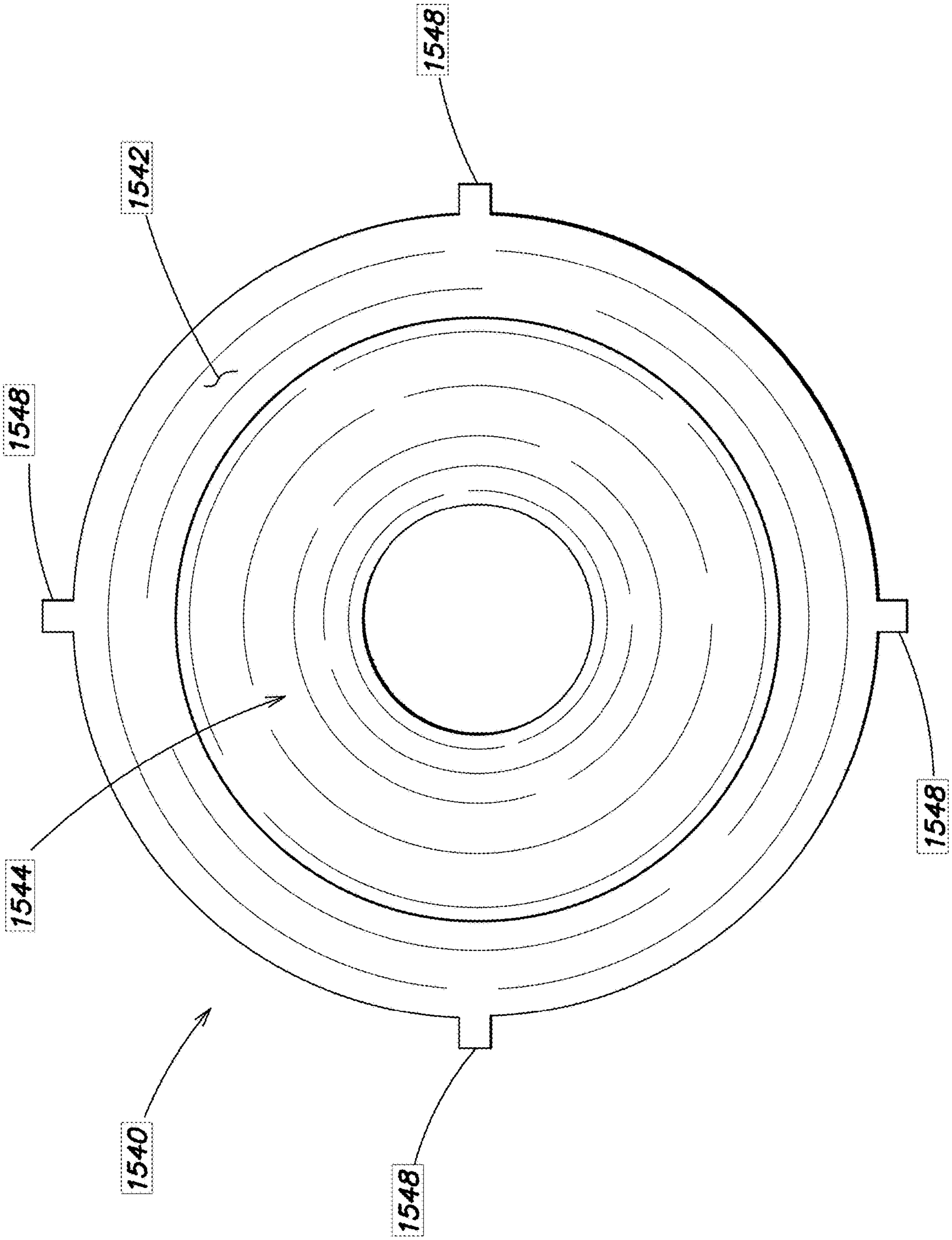
FIG. 11C shows a top view of the reflector of FIG. 11A.
Figure 11D:
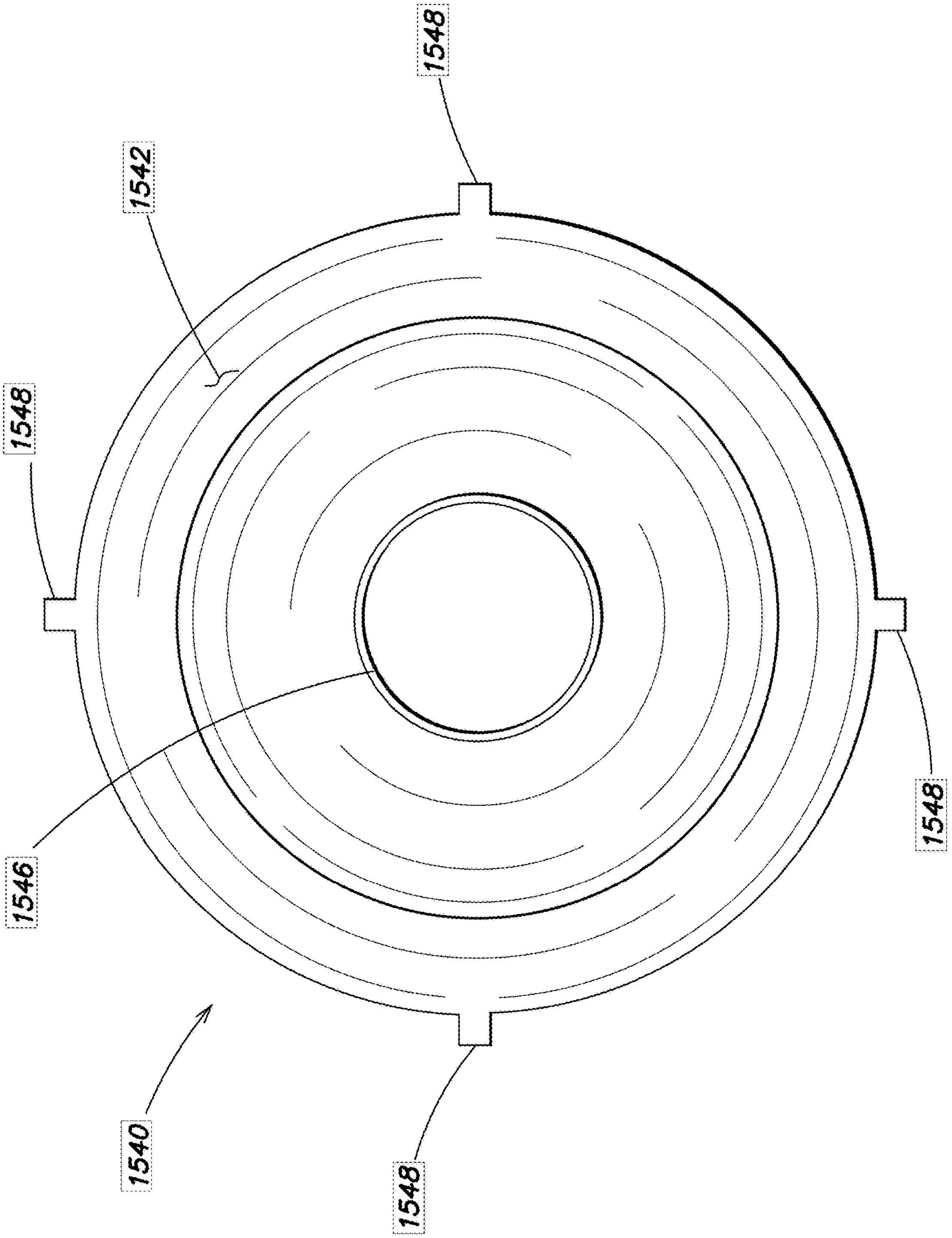
FIG. 11D shows a bottom view of the reflector of FIG. 11A.
Figure 11E:
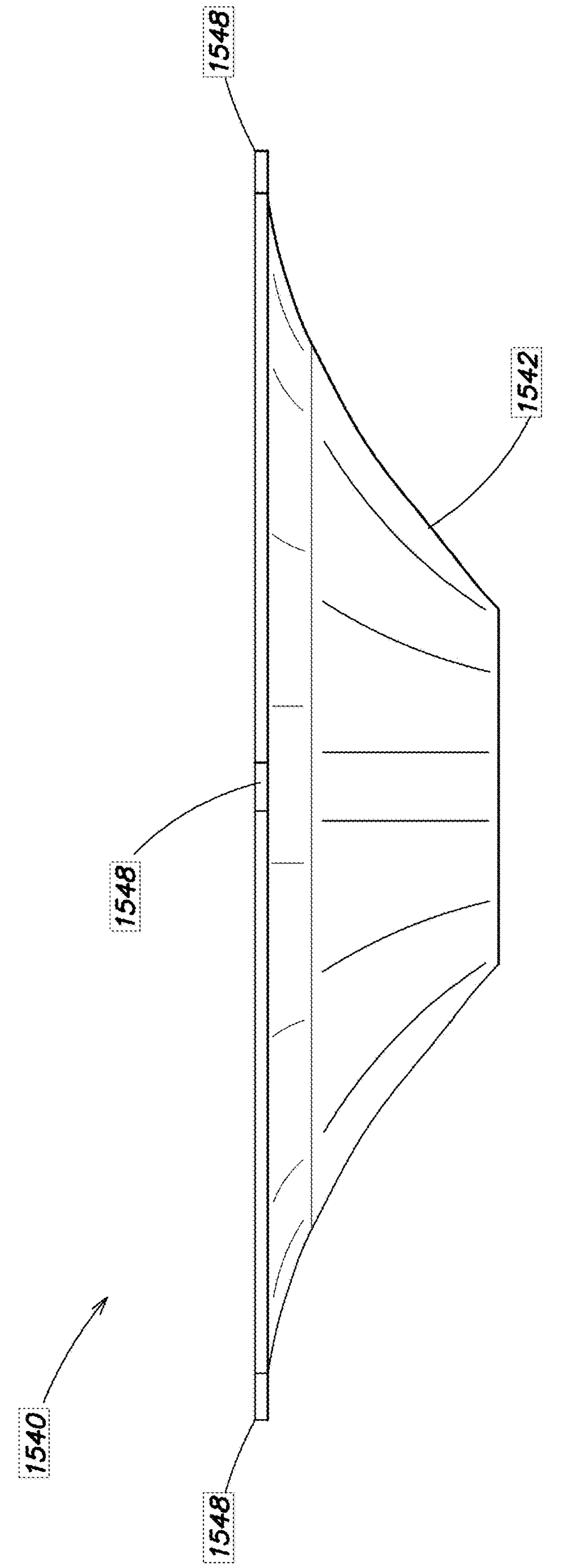
FIG. 11E shows a front view of the reflector of FIG. 11A.

FIGS. 10A and 10B show several views of the optical element 1530 in the optical assembly 1500*a*. The optical element 1530 may be a film 1532 that modifies the light distribution of light as the light exits the lighting module 1000*a*. For example, the optical element 1530 may be a diffuser to disperse light and/or to smooth the spatial and/or angular distribution of light, thus producing less glare and/or a more aesthetically appealing illumination pattern. Different optical assemblies may include different diffusers to adjust the light spread. In some implementations, the optical element 1530 may be a filter to reduce the intensity of the output light and/or to change the color of the output light. For example, different optical assemblies may include different filters to selectively transmit and/or block certain wavelengths of light. As shown, the optical element 1530 may be shaped to substantially conform with the interior space of the cover lens 1510 surrounded by the ridge 1514. The optical element 1530 may further include the tabs 1534 for attachment to the cover lens 1510.

FIGS. 11A-11E show several views of the reflector 1540 in the optical assembly 1500*a*. The reflector 1540 primarily reflects the light emitted by the light source 1300 out of the lighting module 1000*a*, thus increasing the light coupling efficiency of the lighting module 1000*a*. As shown, the reflector 1540 may include a sidewall 1542 defining an opening 1546 for light to enter the reflector 1540 and an opening 1544 for light to exit the reflector 1540. The opening 1546 may be shaped and/or dimensioned based on the light source 1300 and/or the light source holder 1400*a*. The opening 1544 may be shaped and/or dimensioned to substantially cover the partition 1120, thus ensuring the light intersects the reflector 1540 and not the heat sink 1100. In some implementations, the reflector 1540 may be axisymmetric.

The reflector 1540 may further include the tabs 1548 for attachment to the cover lens 1510, which may be arranged to align with the notches 1518 of the cover lens 1510. The tabs 1548 may further constrain the reflector 1540 from rotating relative to the cover lens 1510 and/or the optical element 1530. In some implementations, however, the reflector 1540 may include one or more twist and lock connectors (not shown) to couple the reflector 1540 directly to the heat sink 1100 via the twist and lock receivers 1124. In this manner, the reflector 1540 may be rigidly coupled to the heat sink 1100 to maintain a desired position and/or alignment while allowing a user to replace only the optical element 1530 and/or the cover lens 1510. In some implementations, the reflector 1540 may not include the tabs 1548 and, hence, may not be mechanically constrained to the cover lens 1510 (i.e., the reflector 1540 may rotate and/or otherwise be movable with respect to the cover lens 1510). In some implementations, the reflector 1540 may be mounted directly to the light source holder 1400*a* using, for example, one or more snap-fit connections.

The sidewall 1542 of the reflector 1540 may be shaped to have a profile that reflects the light along a preferred direction. For example, the reflector 1540 may be shaped to provide general ambient lighting with a beam angle greater than or equal to about 90 degrees. Additionally, the reflector 1540 may be shaped to reflect any light reflected by the cover lens 1510 and/or 1530 back towards output direction in order to increase the light coupling efficiency of the lighting module 1000*a*. In some implementations, the reflector 1540 may include surface texturing to further modify the beam angle of the output light. For instance, the reflector 1540 may be textured to have a sufficient surface roughness to diffusely reflect light over a wider beam angle.

In another example, the light intersecting the reflector 1540 (e.g., the light emitted at larger emission angles) may be redirected to increase the intensity along certain directions, thus reducing the appearance of unwanted non-uniformities (e.g., spots or rings of varying intensity, scalloping). Thus, the shape of the reflector 1540 may depend, in part, on the emission profile of the light source 1300.

In general, the reflector 1540 may have a reflectivity of at least about 75%. The reflector 1540 may be formed of a reflective material including, but not limited to, aluminum, brass, stainless steel, Spectralon®. In some implementations, the reflective surfaces may be polished to provide specular reflection or roughened to provide diffuse reflection. In some implementations, the reflector 1540 may be formed non-reflective materials, such as polycarbonate, acrylic polymer, cyclo-olefin polymer (Zeonex), polystyrene, and subsequently coated with a reflective material, such as chromium, aluminum, silver, or gold. Various manufacturing techniques may be used to fabricate the reflector 1540 including, but not limited to, injection molding and vacuum forming.

The various components of the lighting module 1000*a* may be assembled into sub-assemblies before final assembly. For example, the light source 1300 may be coupled to the light source holder 1400*a* via a spring clip (not shown). In another example, the circuitry 1210 may be disposed into the driver housing 1230. In some implementations, a potting material 1202 may seal the circuitry 1210 in the driver housing 1230. In another example, the various optical elements in the optical assembly 1500*a* may be assembled together to form, for example, a single assembly as shown in FIG. 1J. In another example, the driver insulator 1250 may be disposed onto the partition 1120 of the heat sink 1100 and the ground cable 1010 may be initially coupled to the heat sink 1100 via the fastener 1204.

Once these various sub-assemblies are put together, these sub-assemblies may then be assembled together to complete the lighting module 1000*a*. As described above, the lighting module 1000*a* may have different configurations depending, in part, on the type of lighting system and/or the type of output light desired. The overall methodology for assembly of the lighting module 1000*a*, however, may remain substantially similar or the same.

In some implementations, the lighting module 1000*a* may be assembled via the following steps: (1) routing the electrical cables 1030*a* and 1030*b*, which are coupled to the circuitry 1210 of the driver module 1200, through the openings 1134 of the heat sink 1100, (2) unfastening the fastener 1204 to remove the ground cable 1010 from the heat sink 1100, (3) aligning the connector 1012 of the ground cable 1010 to the connector 1016 of the ground cable 1014, (4) fastening the connectors 1012 and 1016 to the heat sink 1100 via the fastener 1204, (5) routing the ground cable 1010 through the opening 1246 of the driver housing 1230, (6) aligning the keyed feature 1238 of the driver housing 1230 to the keyed feature 1116 of the heat sink 1100, (7) inserting the driver housing 1230 into the cavity 1104 of the heat sink 1100 until the driver housing 1230 is stopped (i.e., the snap-fit connectors 1236 of the driver housing 1230 engage the snap-fit receivers 1126 of the heat sink 1100, the driver housing 1230 contacts a ledge 1118 of the heat sink 1100), (8) inserting electrical cables 1030*a* and 1030*b* into the openings 1430 containing the poke-in connectors to electrically couple the electrical cables 1030*a* and 1030*b* to the light source 1300, (9) applying thermal paste to the back portion of the light source 1300, (10) aligning the openings 1420 of the light source holder 1400*a* to the openings 1132 of the heat sink 1100, (11) fastening the fasteners 1302 to couple the light source holder 1400*a* to the heat sink 1100, (12) pressing excess portions of the electrical cables 1030*a* and 1030*b* back into the cavity 1104 through the openings 1134, and (13) inserting snap-fit connectors 1516 of the optical assembly 1500*a* into the snap-fit receivers 1126 of the heat sink 1100.

As shown, the various components of the lighting module 1000*a* may incorporate tool-less mounting features for greater ease of assembly. For example, the light source holder 1400*a* may include integrated snap-fit connectors 1416*a* and 1416*b*. Although the lighting module 1000*a* shown in FIG. 1J includes fasteners 1302 to couple the light source holder 1400*a* to the heat sink 1100, the snap-fit connectors 1416*a* and 1416*b* may be used in other implementations to couple the light source holder 1400*a* to the heat sink 1100. In another example, the optical assembly 1500*a* includes snap-fit connectors 1516 on the cover lens

1510 to couple the optical assembly 1500*a* to the heat sink 1100. In yet another example, the driver module 1200 may include snap-fit connectors 1236 on the driver housing 1230 to couple the driver module 1200 to the heat sink 1100.

In some implementations, the lighting module 1000*a* may not include a ground connection. For example, in retrofit lighting applications, lighting fixtures with remote-mounted power supplies, or lighting fixtures with low voltage inputs such as through a power over Ethernet (PoE) connection may be used without a ground connection. If the above mounting features (i.e., snap-fit connectors 1416, 1516, and 1236) of the lighting module 1000*a* are used, the lighting module 1000*a* may be assembled without any fasteners. More generally, the various mounting features described herein enable the lighting module 1000*a* to include fewer parts and enable the lighting module 1000*a* to be more quickly and easily assembled using fewer tools compared to previous lighting modules.

A Lighting Module with a Total Internal Reflection (TIR) Optic

As described above, the optical assembly in the lighting modules described herein may be field-changeable. The optical assembly 1500*a*, for example, may be configured to provide general illumination (i.e., ambient lighting) of an environment. However, in some implementations, it may be desirable to reconfigure the lighting module to provide a different type of lighting (e.g., task lighting). Unlike previous lighting modules, the lighting module described herein may allow a user to readily replace the optical assembly without having to remove and/or otherwise replace the entire lighting module.

For example, FIGS. 12A-12D show another exemplary lighting module 1000*b* that includes an optical assembly 1500*b* tailored to provide light with a narrower beam angle, which may be used, for example in task lighting applications. As shown, the lighting module 1000*b* may share several of the same components as the lighting module 1000*a* including the heat sink 1100, the driver module 1200, the light source 1300, and the light source holder 1400*a* along with the various fasteners (e.g., fasteners 1204, 1302) and wiring (e.g., electrical cables 1020, 1030*a*, 1030*b*, ground cables 1010, 1014). The optical assembly 1500*b* may further include the cover lens 1510 and the optical element 1530 in the optical assembly 1500*a*.

In this example, however, the optical assembly 1500*b* may include an optical element 1550 (e.g., an optical lens) supported by an optic holder 1560 instead of a reflector 1540. The optical element 1550 may be configured to collimate the light emitted by the light source 1300 and direct the light along a preferred direction out of the lighting module 1000*b*. The optic holder 1560 may provide an interface to mechanically mount the optical element 1550 to the heat sink 1100. For example, the optic holder 1560 may include one or more twist and lock connectors 1564 that couple to the twist and lock receivers 1124. Thus, the optic holder 1560 and the optical element 1550 may be coupled directly to the heat sink 1100 and separately from the cover lens 1510 and the optical element 1530. It should be appreciated, however, that in some implementations, the optical element 1530 may be directly coupled to the cover lens 1510 via, for example, a snap-fit connection.

Additionally, the optic holder 1560 may include registration features 1562 to engage the indents 1138 on the heat sink 1100, thus aligning the optical element 1550 to the light source 1300 and/or the light source holder 1400*a*. The optic holder 1560 may also include notches 1566 to provide sufficient clearance for the snap-fit connectors 1516 to engage the snap-fit receivers 1126 of the heat sink 1100. In some implementations, the optic holder 1560 may couple directly to the light source holder 1400*a* via, for example, one or more snap-fit connections or one or more twist and lock connections.

Figure 12A:
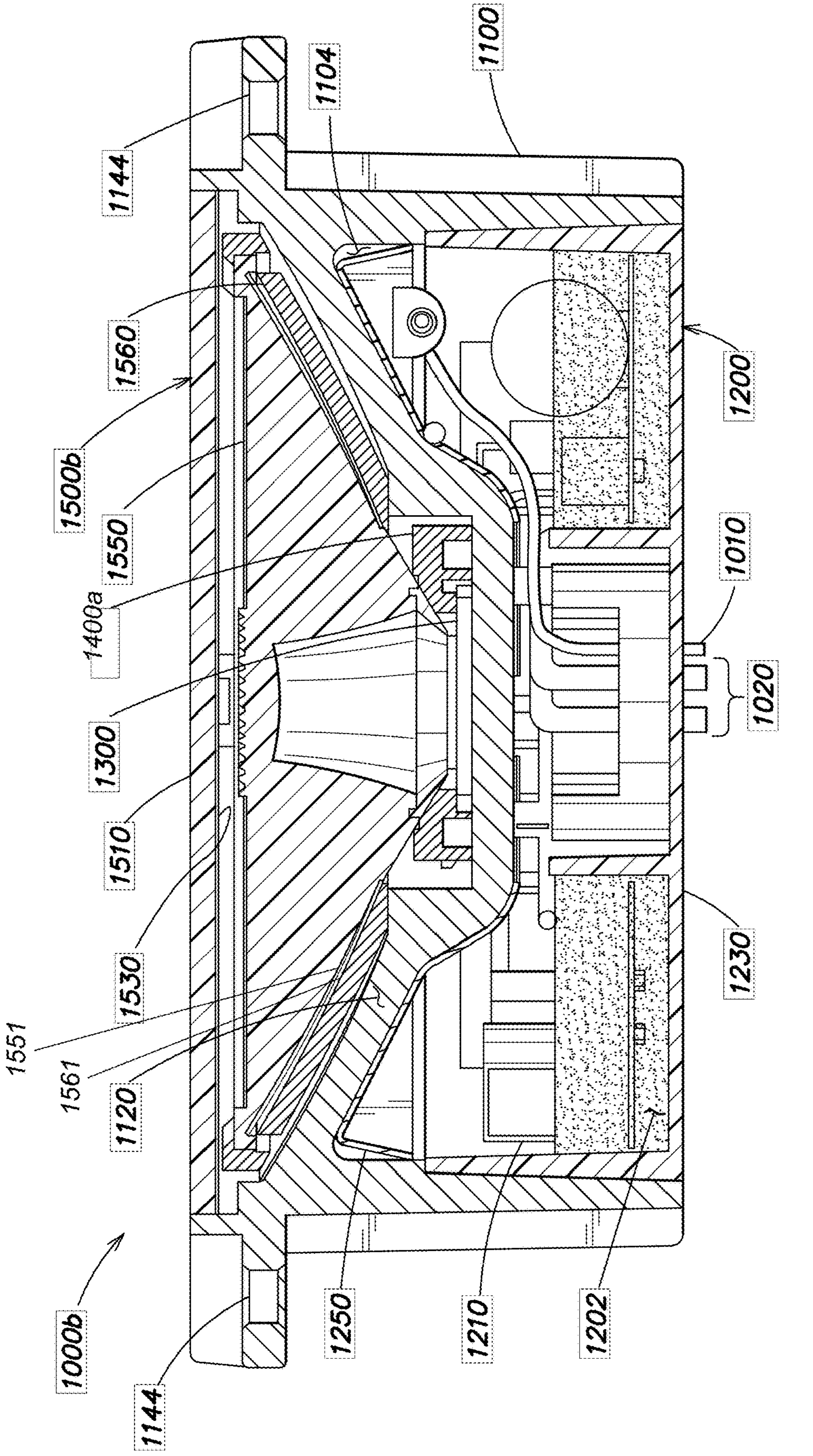
FIG. 12A shows a cross-sectional view of an exemplary lighting module with a folded optical element in place of the reflector in the optical assembly of FIG. 1A. The view corresponds to the plane A-A of FIG. 1D.
Figure 12B:
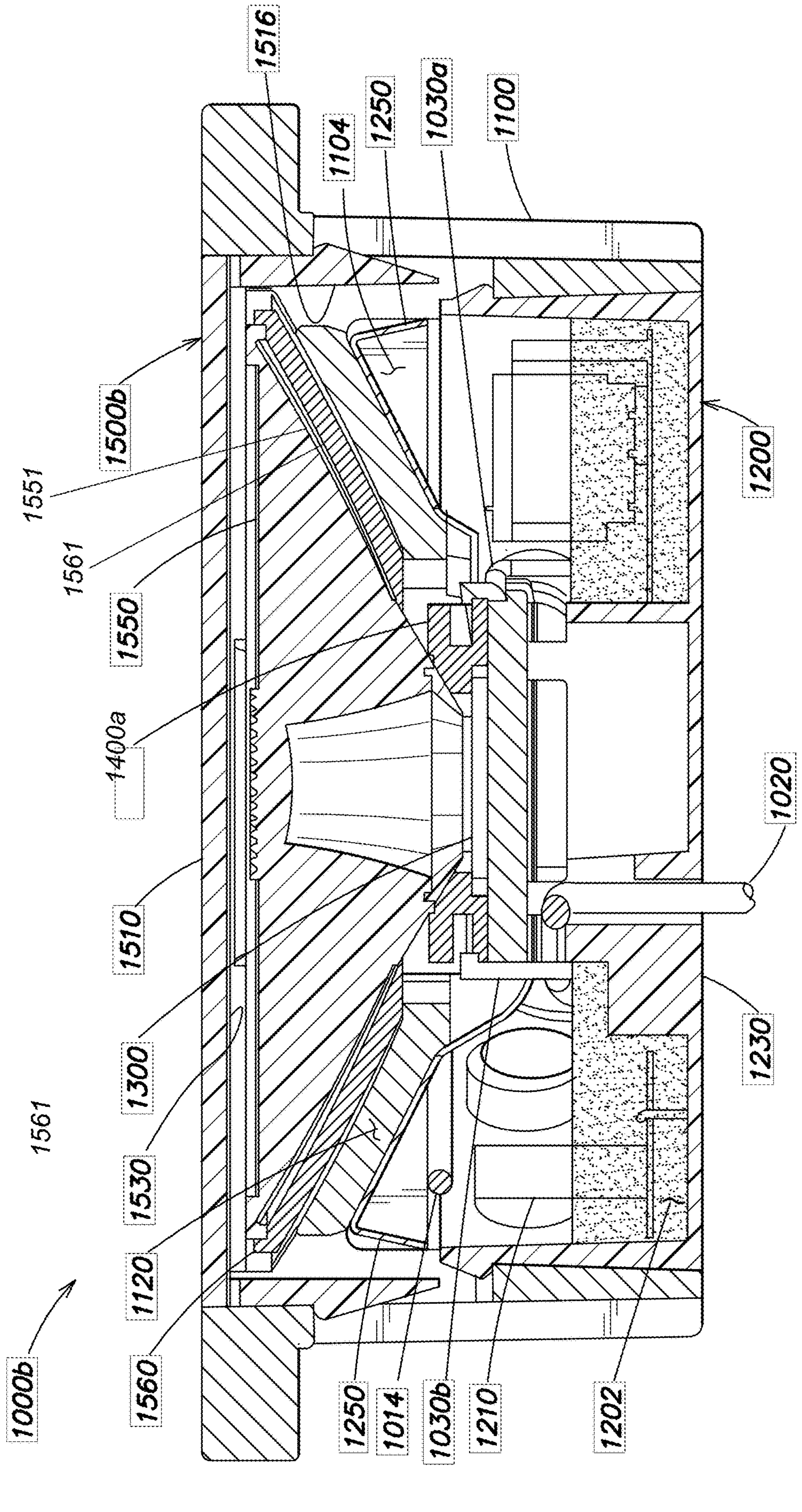
FIG. 12B shows a cross-sectional view of the lighting module of FIG. 12A corresponding to the plane B-B of FIG. 1E.
Figure 12C:
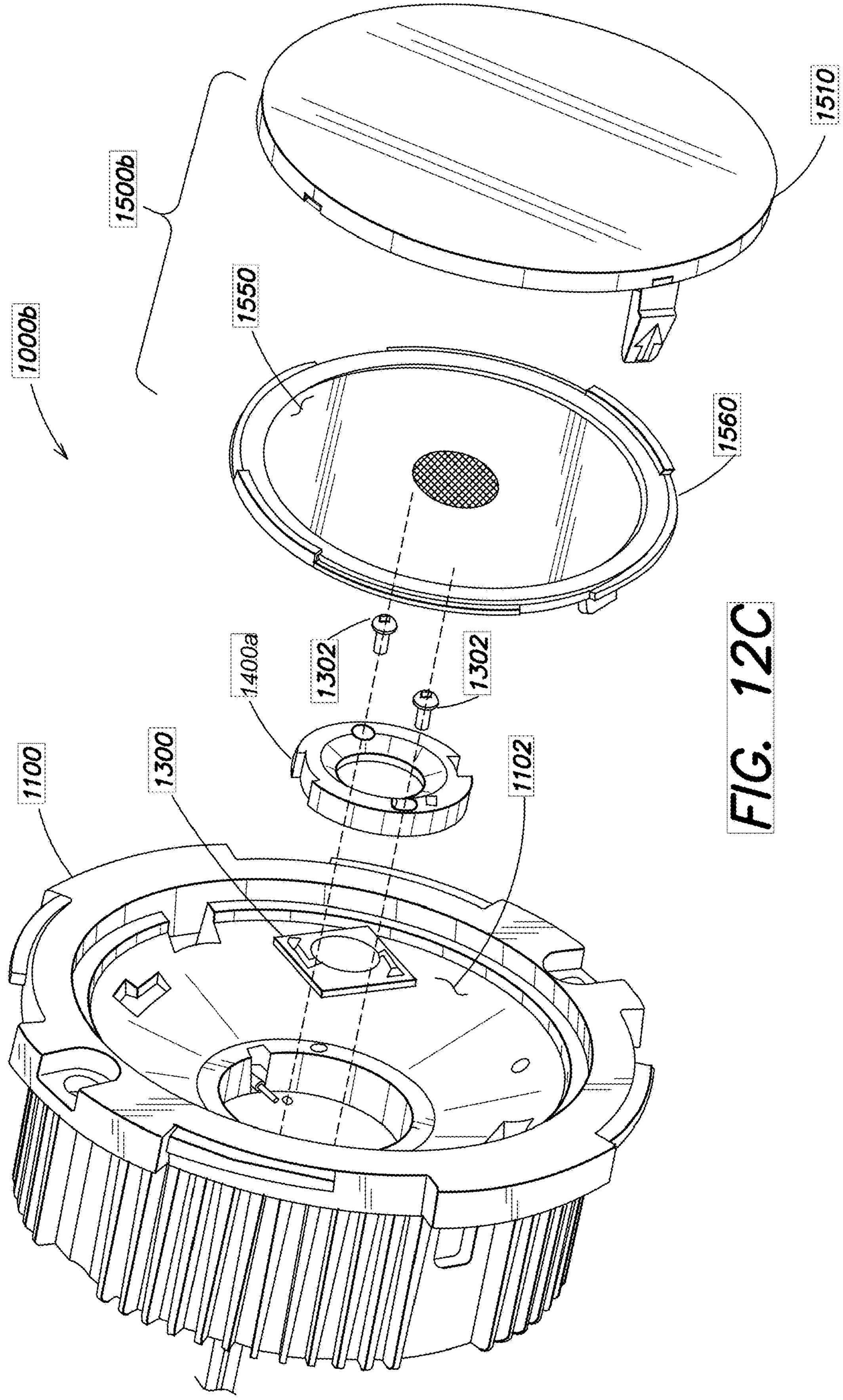
FIG. 12C shows an exploded top perspective view of the lighting module of FIG. 1B where the optical assembly, the light source holder, the light source, and fasteners are separated.
Figure 12D:
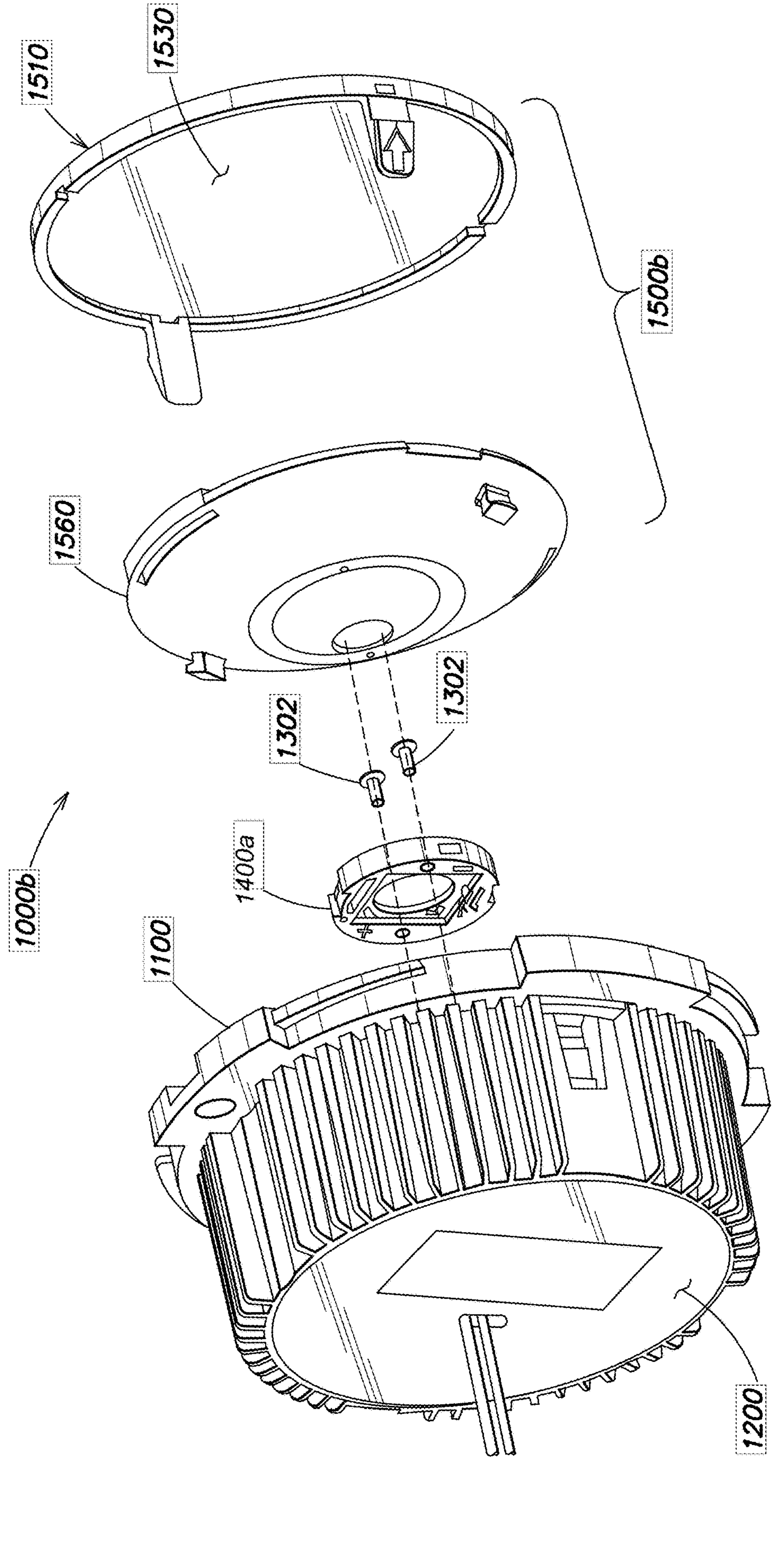
FIG. 12D shows an exploded bottom perspective view of the lighting module of FIG. 12C.

The combination of the twist and lock connectors 1564 and the indents 1138 enable the optical element 1550 to be more precisely aligned to the light source 1300. Furthermore, this approach may ensure the optical element 1550 is in physical contact with the light source 1300 to increase the light coupling efficiency of the lighting module 1000*b*. A portion of the optical element 1550 may also be supported by the tapered section 1412 of the light source holder 1400*a* as shown in FIGS. 12A and 12B. A portion of the optic holder 1560 may also be supported by portions of the partition 1120 once the twist and lock connectors 1564 are engaged. By separately coupling the cover lens 1510 to the heat sink 1100, a user may also readily replace the cover lens 1510 and/or the optical element 1530 without affecting the alignment of the optical element 1550. In this manner, the user may more easily adjust the direction and/or beam spread of the light exiting the lighting module 1000*b*.

FIGS. 12A and 12B further show an interior surface 1561 of the optic holder 1560 may be offset from a reflective outer surface 1551 of the optical element 1550. In other words, the optic holder 1560 may be shaped such that the interior surface 1561 does not physically contact the reflective outer surface 1551 and, hence, does not affect the reflective properties of the reflective outer surface 1551. Instead, the optic holder 1560 may only contact optical dead zones of the optical element 1550 (i.e., areas of the optical element 1550 that are not intended to interact with the light).

In some implementations, the interior surface 1561 may also be reflective. For example, a portion of the light propagating through the optical element 1550 may exit the optical element 1550 through, for example, the reflective outer surface 1551 due to stray light scattering within the optical element 1550. If the optic holder 1560 and, in particular, the interior surface 1561 is reflective, this portion of the light may be redirected back into the optical element 1550 and subsequently coupled out of the optical element 1550 as originally intended. In this manner, the optic holder 1560 may recycle light that would otherwise be lost, thus preserving the light coupling efficiency of the optical assembly 1500*b*.

In some implementations, the optic holder 1560 and, in particular, the interior surface 1561 may have a reflectivity of at least about 75%. In general, the optic holder 1560 may be diffusely and/or specularly reflective. In some implementations, the optic holder 1560 may be formed from a reflective material, such as a white colored plastic (e.g., Spectralon®). In some implementations, the optic holder 1560 may be coated with a reflective material (e.g., a metal, a reflective polymer, a Bragg mirror).

Figure 13A:
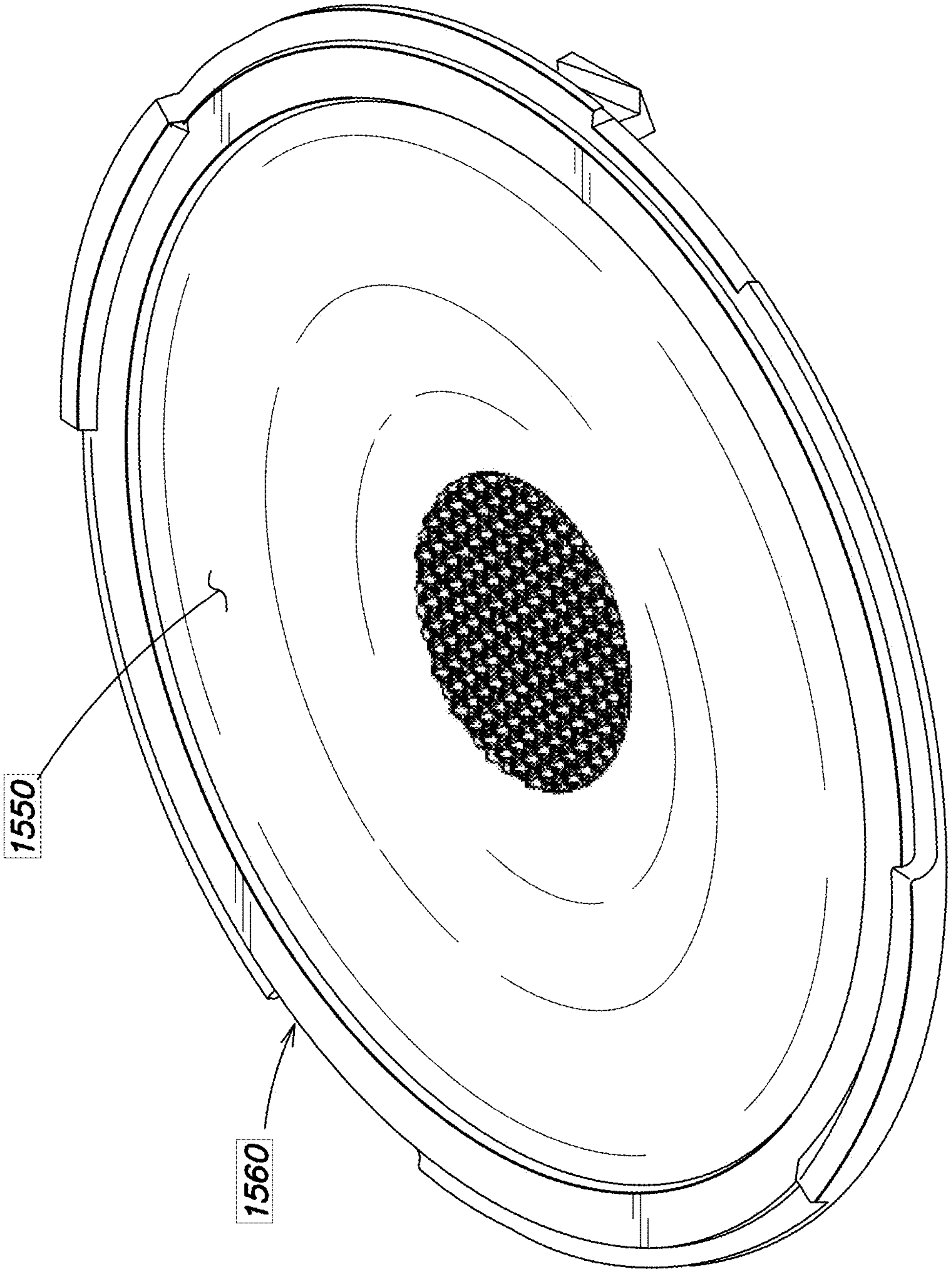
FIG. 13A shows a top perspective view of a portion of an optical assembly in the lighting module of FIG. 12A with the folded optical element.
Figure 13B:
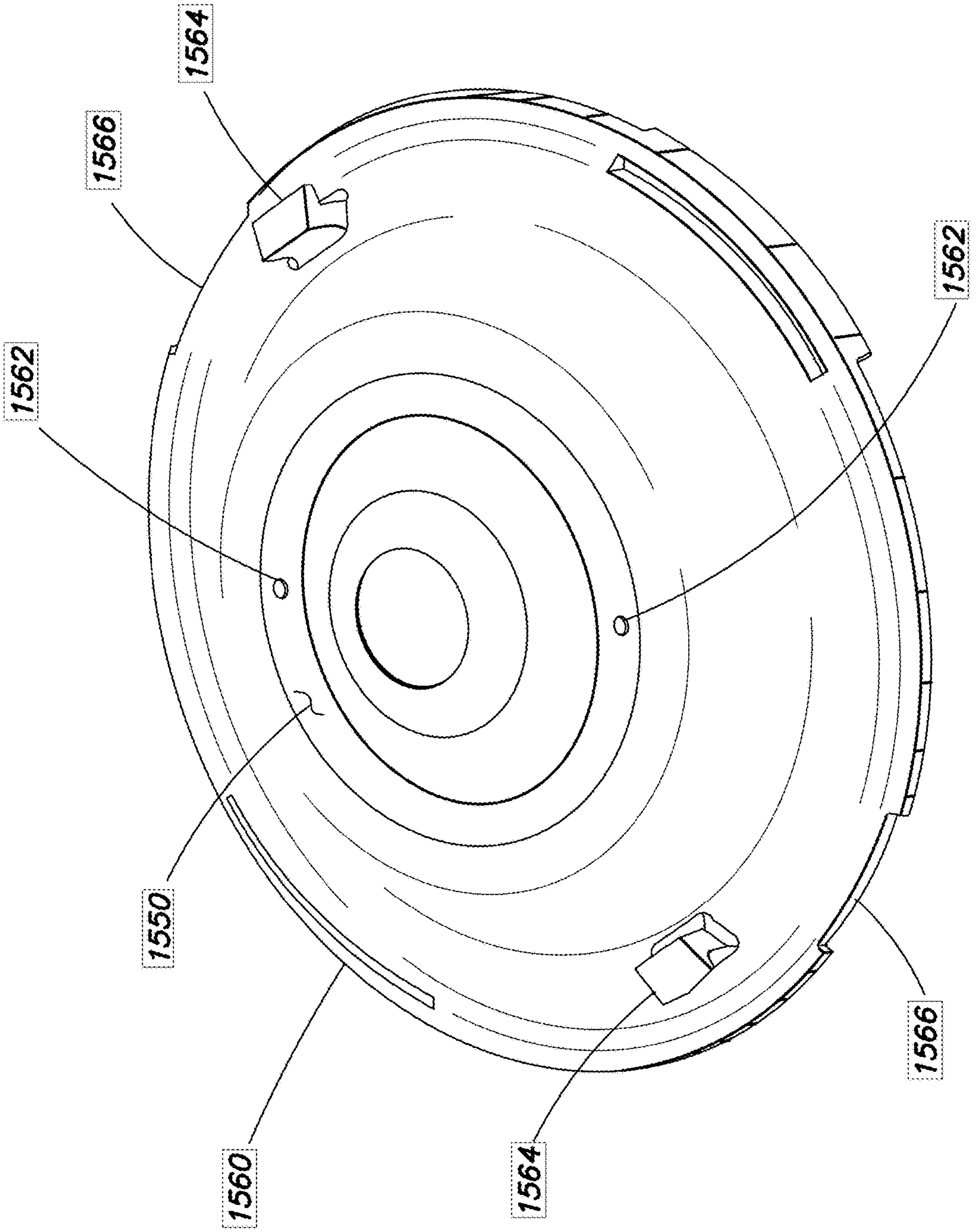
FIG. 13B shows a bottom perspective view of the portion of the optical assembly of FIG. 13A.

FIGS. 13A and 13B show additional views of the optical element 1550 and the optic holder 1560. The optical element 1550 may generally be shaped and/or dimensioned to fit within the cavity 1102 of the heat sink 1100. For example, the optical element 1550 may have a diameter that ranges between about 20 mm and about 75 mm. The optical element 1550 may also have a height that is at least about 2 mm. In some implementations, the optical element 1550 may substantially collimate the light such that the beam angle of the light leaving the lighting module 1000*b* is less than about 10 degrees. In some implementations, the optical element 1550 may collimate the light such that the beam angle of the light leaving the lighting module 1000*b* is less than about 8 degrees.

However, it should be appreciated other types of optical elements 1550 may be used in the optical assembly 1500*b* to provide light with wider beam angles greater than or equal to 8 degrees including, but not limited to, 15 degrees, 25 degrees, 40 degrees, and 60 degrees. In some implementations, the optical element 1550 may output light having an angular distribution characterized by a full width half maximum (FWHM) that ranges between about 10 degrees and about 60 degrees. In some implementations, the FWHM ranges between about 8 degrees and about degrees. In some implementations, the optical element 1550 may have a light coupling efficiency (i.e., the ratio of the luminous flux coupled out of the optical element 1550 and into the environment and the luminous flux coupled into the optical element 1550 from the light source 1300) that is at least about 60%. In some implementations, the light coupling efficiency of the optical element 1550 may be at least about 70%.

In some implementations, the optical element 1550 may redirect light at different wavelengths of interest in a substantially similar manner (i.e., the optical element 1550 has low chromatic aberration). For example, the light source 1300 may include multiple light emitting elements that emit light at different wavelengths. The optical element 1550 may be tailored to redirect the light at each wavelength such that the resulting spatial and angular distributions of light at each wavelength are substantially the same.

The optical element 1550 may generally be various types of optics including, but not limited to, a folded optical element (e.g., a total internal reflection (TIR) optic), a Fresnel lens, and a lens array (e.g., a substantially flat, transparent substrate with multiple lenses formed onto the substrate). The optical element 1550 may be formed of various hard plastics and glasses including, but not limited to as polycarbonate, acrylic polymer, cyclo olefin polymer (Zeonex), polystyrene, silicate-based glasses.

The optical element 1550 shown in FIGS. 13A and 13B is a TIR optic that redirects and outputs light from the light source 1300 with a desired angular and spatial distribution. The TIR optic may include surfaces configured to total internally reflect light in order to redirect light emitted over a broad range of emission angles (e.g., a a solid angle or a hemisphere) while maintaining a compact size. For example, the TIR optic may receive light from the light source 1300 and subsequently redirect the light via refraction, reflection, and transmission such that the light is outputted along a preferred direction without interacting with the interior surfaces of the cavity 1102.

In some implementations, the TIR optic may include a hollow core to receive light and subsequently redirect the light along a desired trajectory via refraction. The TIR optic may also include V-shaped grooves disposed along an outer surface to reflect light via total internal reflection. The TIR optic may be circular in shape and the V-shaped grooves may be oriented radially with respect to the center of the TIR optic.

In general, the lighting module may support various TIR optics so long as the dimensions of the TIR optic are suitable for the lighting module (i.e., the TIR optic fits in the cavity 1102). For example, the TIR optic may have a diameter that ranges between about 20 mm and about 60 mm. In some implementations, the diameter of the TIR optic ranges between about 20 mm and about 75 mm. The height of the TIR optic may be less than about 20 mm. In some implementations, the height of the TIR optic is less than about 25 mm.

The term "about," when used to describe the various dimensions of the TIR optic, is intended to cover manufacturing tolerances. For example, "about 25 mm" may correspond to the following dimensional ranges: 24.75 to 25.25 mm (+/−1% tolerance), 24.8 to 25.2 mm (+/−0.8% tolerance), 24.85 to 25.15 mm (+/−0.6% tolerance), 24.9 to 25.1 mm (+/−0.4% tolerance), 24.95 to 25.05 mm (+/−0.2% tolerance).

In some implementations, the TIR optic may be a hybrid TIR optic that includes an integrated reflector to increase the light coupling efficiency of the optic (i.e., the luminous flux coupled out of the TIR optic divided by the luminous flux generated by the light source 1300). The integrated reflector may be coupled to a folded optic element to redirect light emitted at large emission angles that may otherwise be absorbed and/or scattered along an undesirable direction in the second cavity 1120. Examples of hybrid TIR optics and/or optic holders may be found in U.S. application Ser. No. 16/831,322 (hereafter the '322 application), filed on Mar. 26, 2020, entitled, "FOLDED OPTICS METHODS AND APPARATUS FOR IMPROVING EFFICIENCY OF LED-BASED LUMINAIRES," and International Application No. PCT/US20/39728 (hereafter the '728 application), filed on Jun. 26, 2020, entitled, "OPTICAL ELEMENT FOR IMPROVING BEAM QUALITY AND LIGHT COUPLING EFFICIENCY". Each of the aforementioned applications is incorporated by reference herein in its entirety.

It should be appreciated that, in some implementations, the TIR optic and/or the optic may be a smaller or a larger variant of the hybrid TIR optic and/or optic holder in the '322 application or the '728 application.

Figure 14:
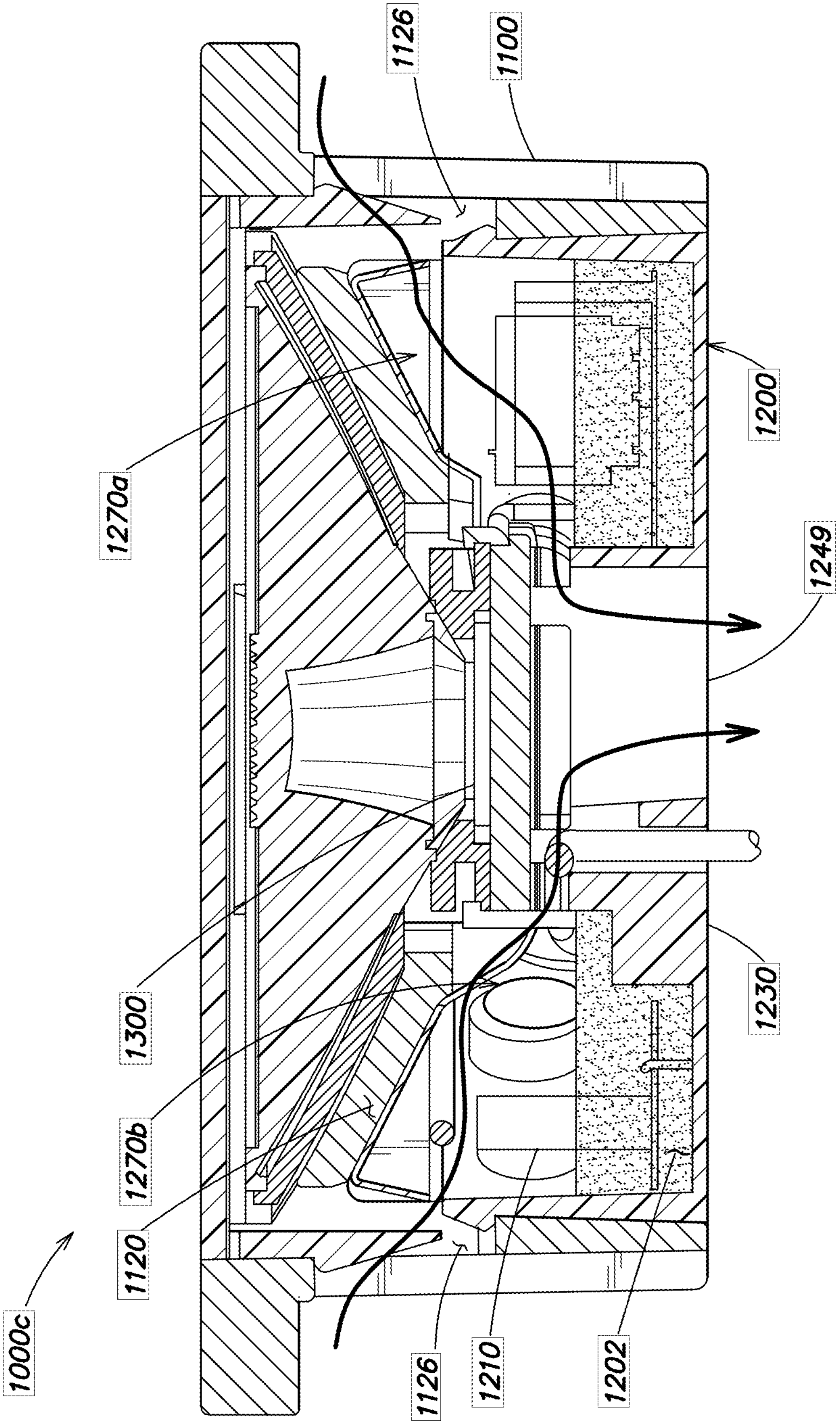
FIG. 14 shows another exemplary lighting module that provides an internal airway to convectively cool the light source and the driver.
Figure 15A:
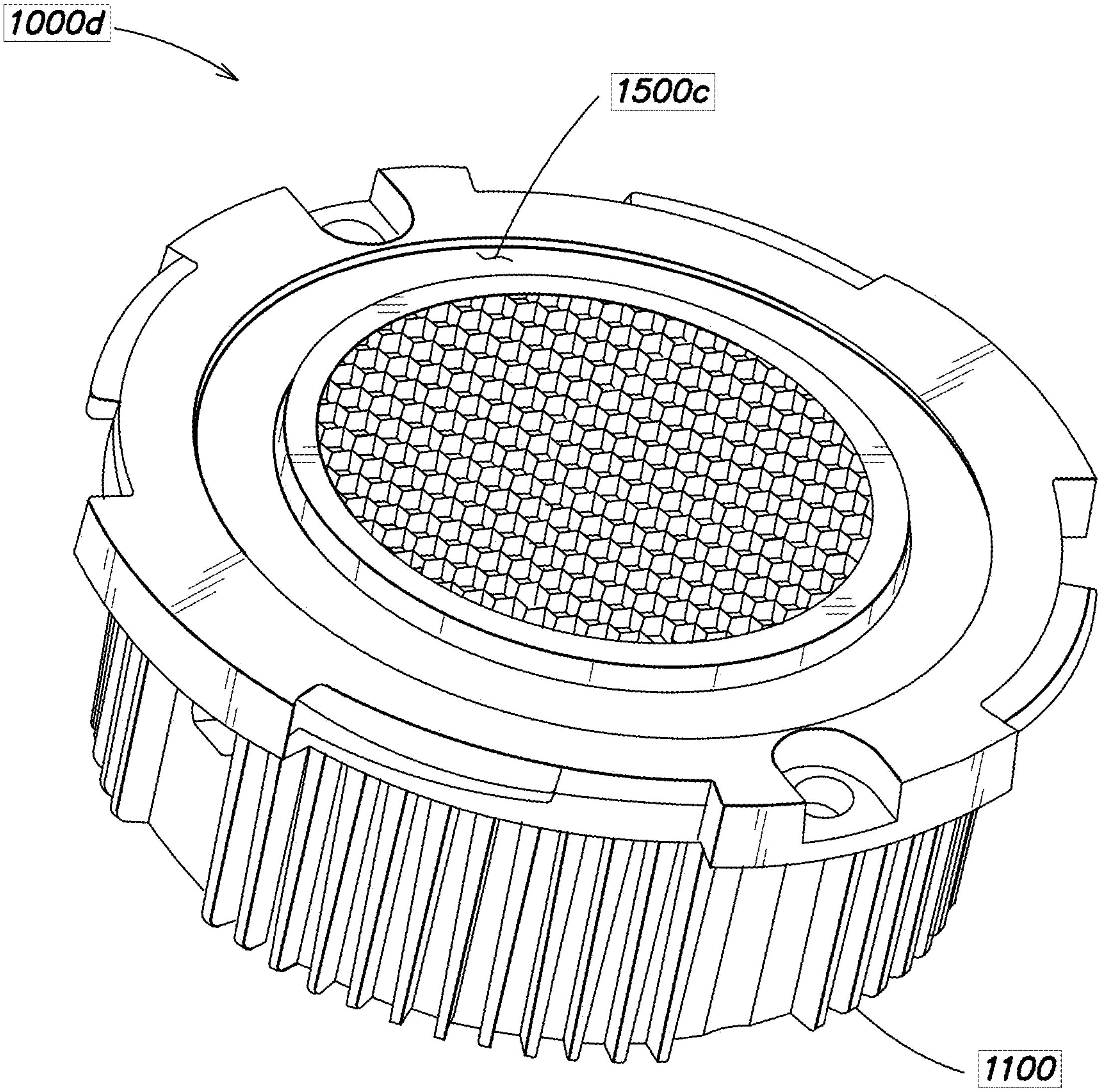
FIG. 15A shows a top perspective view of another exemplary lighting module where the optical assembly includes a hex louver.
Figure 15B:
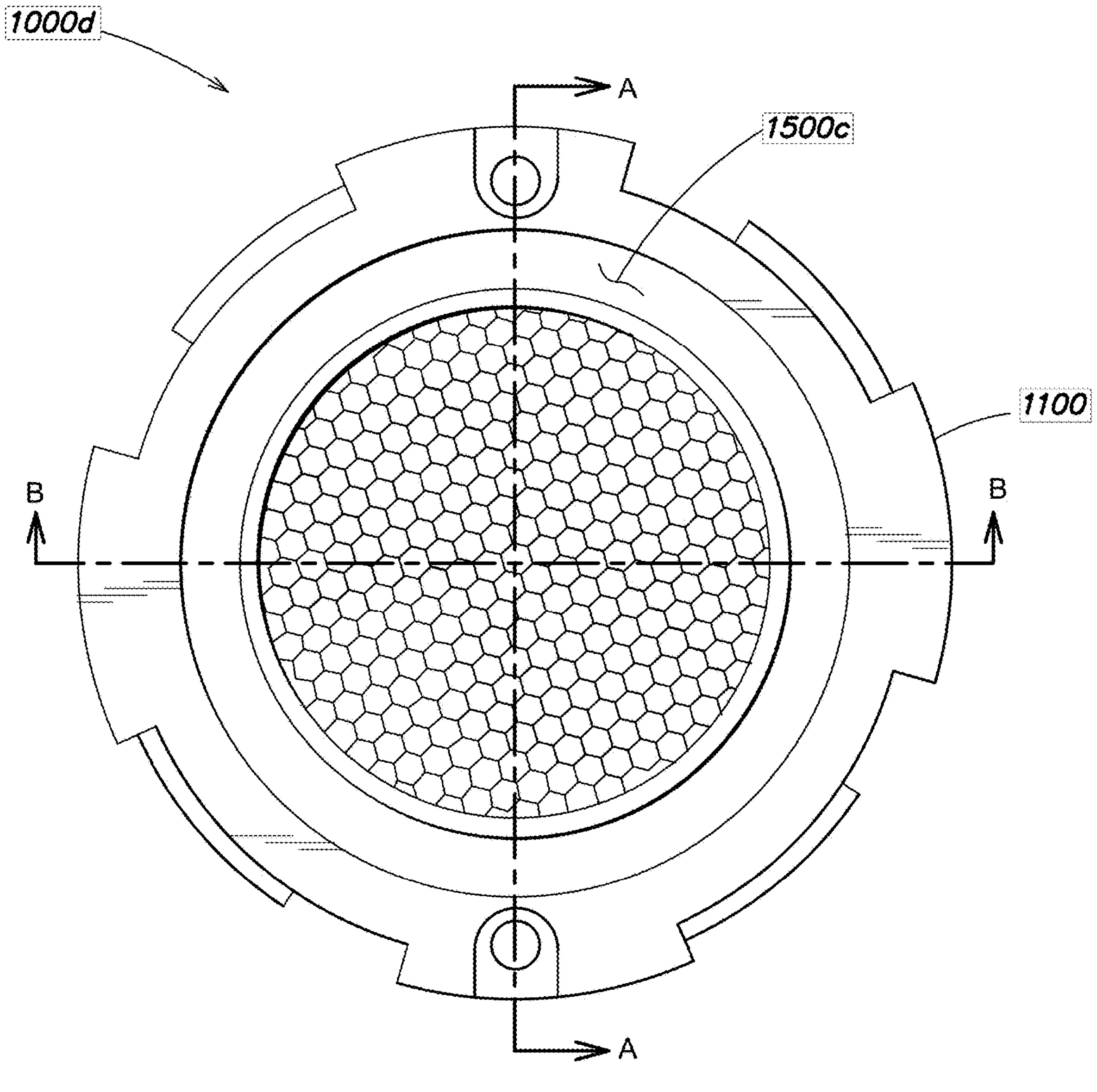
FIG. 15B shows a top view of the lighting module of FIG. 15A.
Figure 15C:
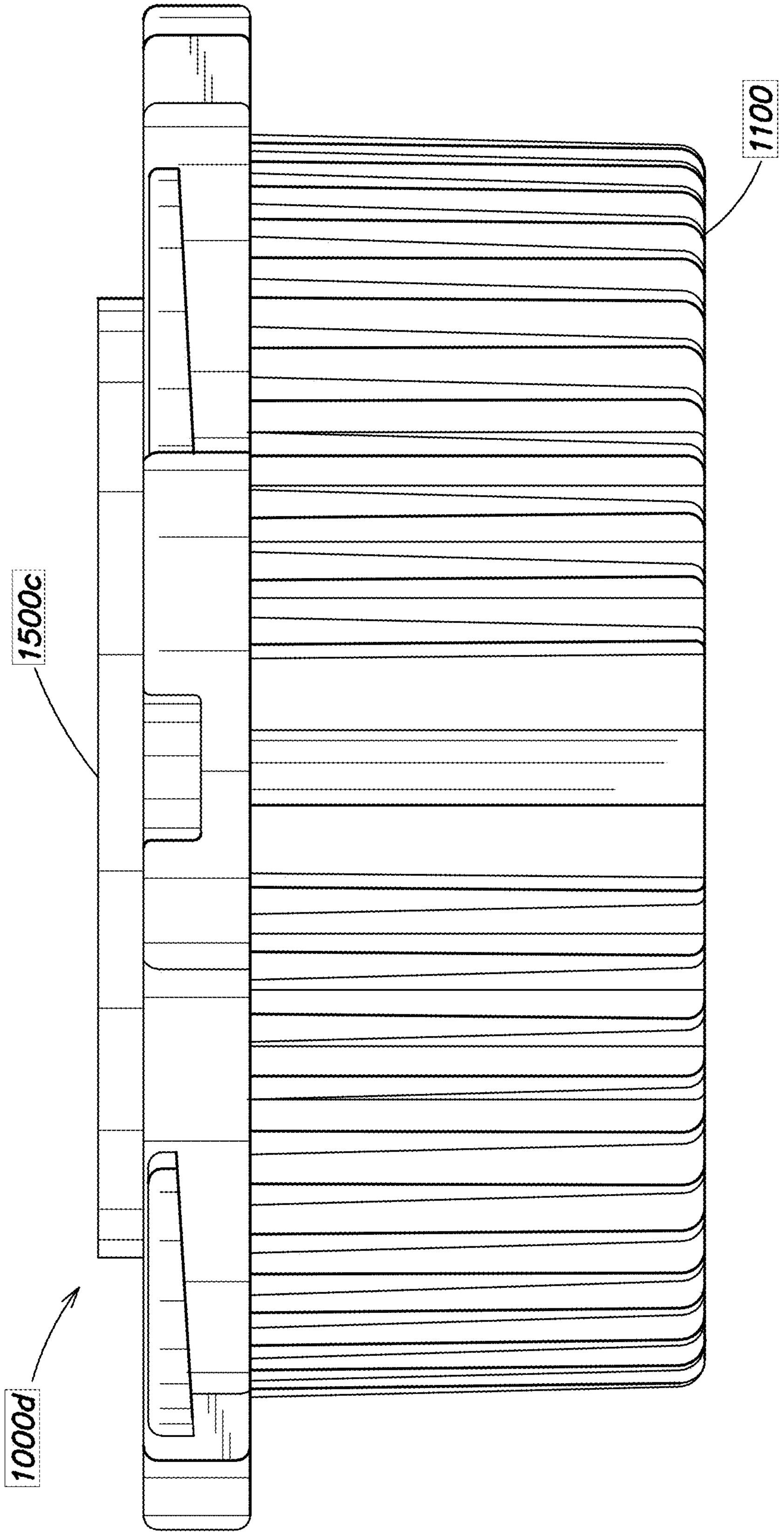
FIG. 15C shows a left-side view of the lighting module of FIG. 15A.
Figure 15D:
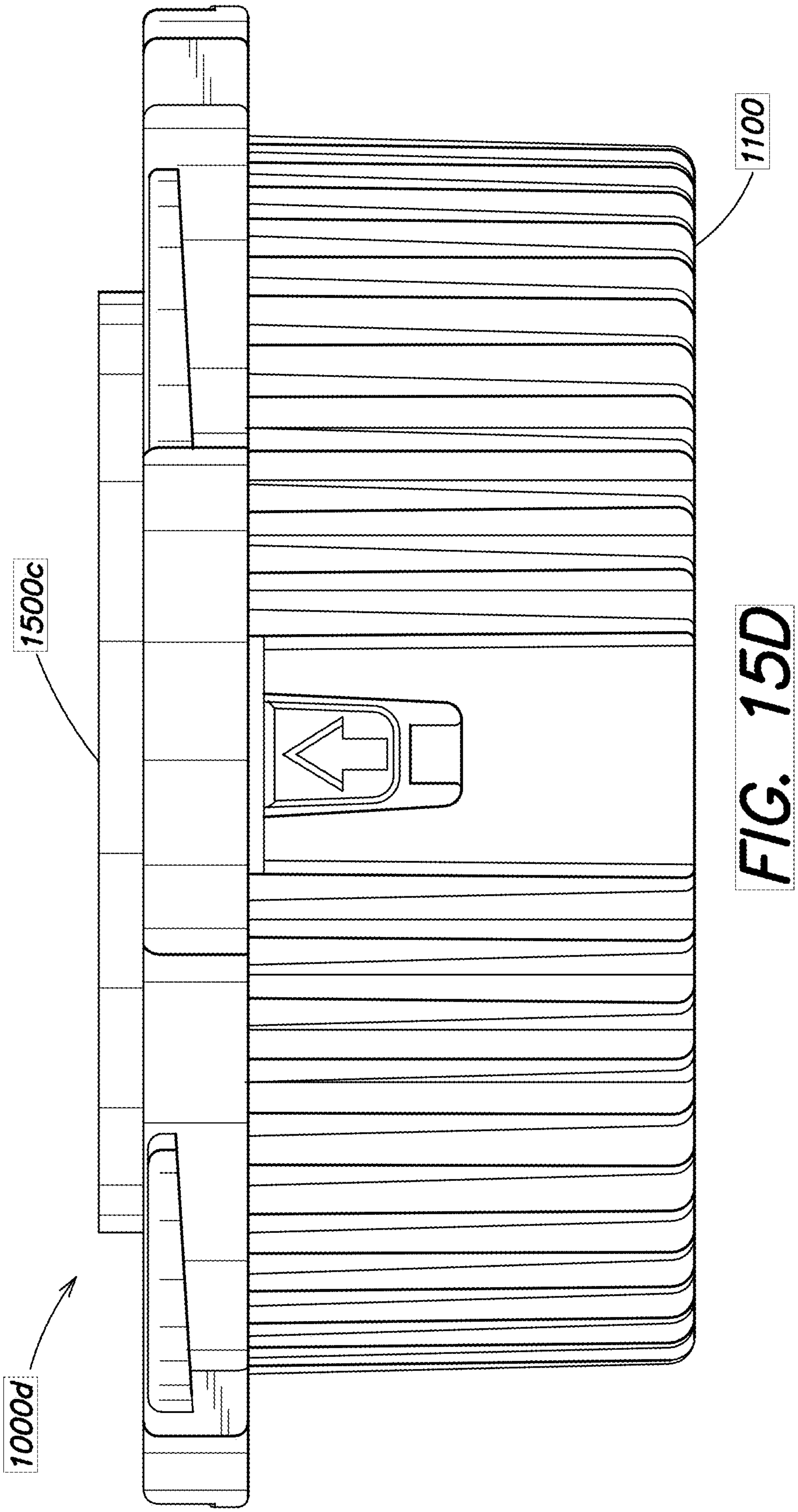
FIG. 15D shows a front view of the lighting module of FIG. 15A.
Figure 15E:
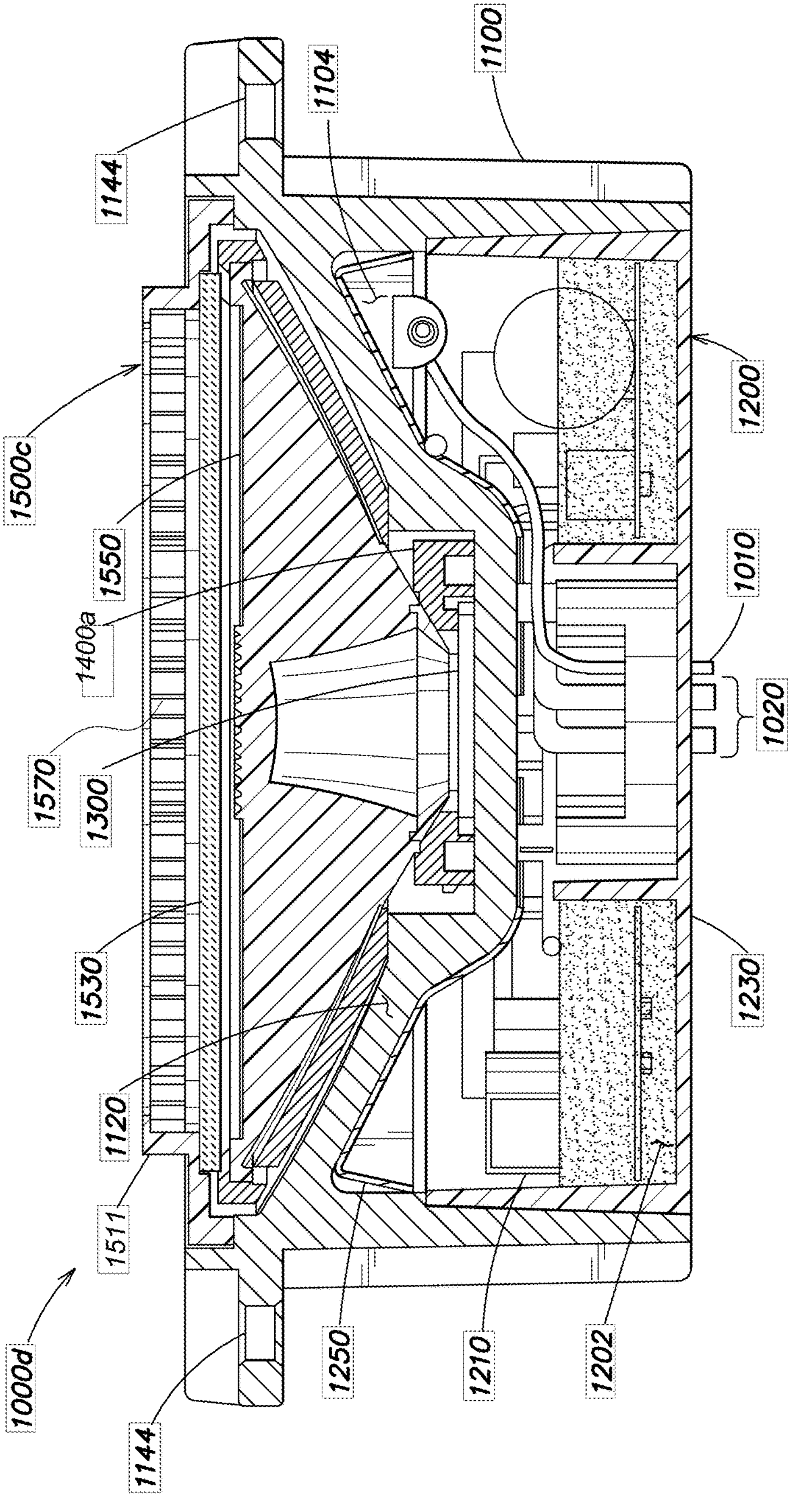
FIG. 15E shows a cross-sectional view of the lighting module corresponding to the plane A-A of FIG. 15B.
Figure 15F:
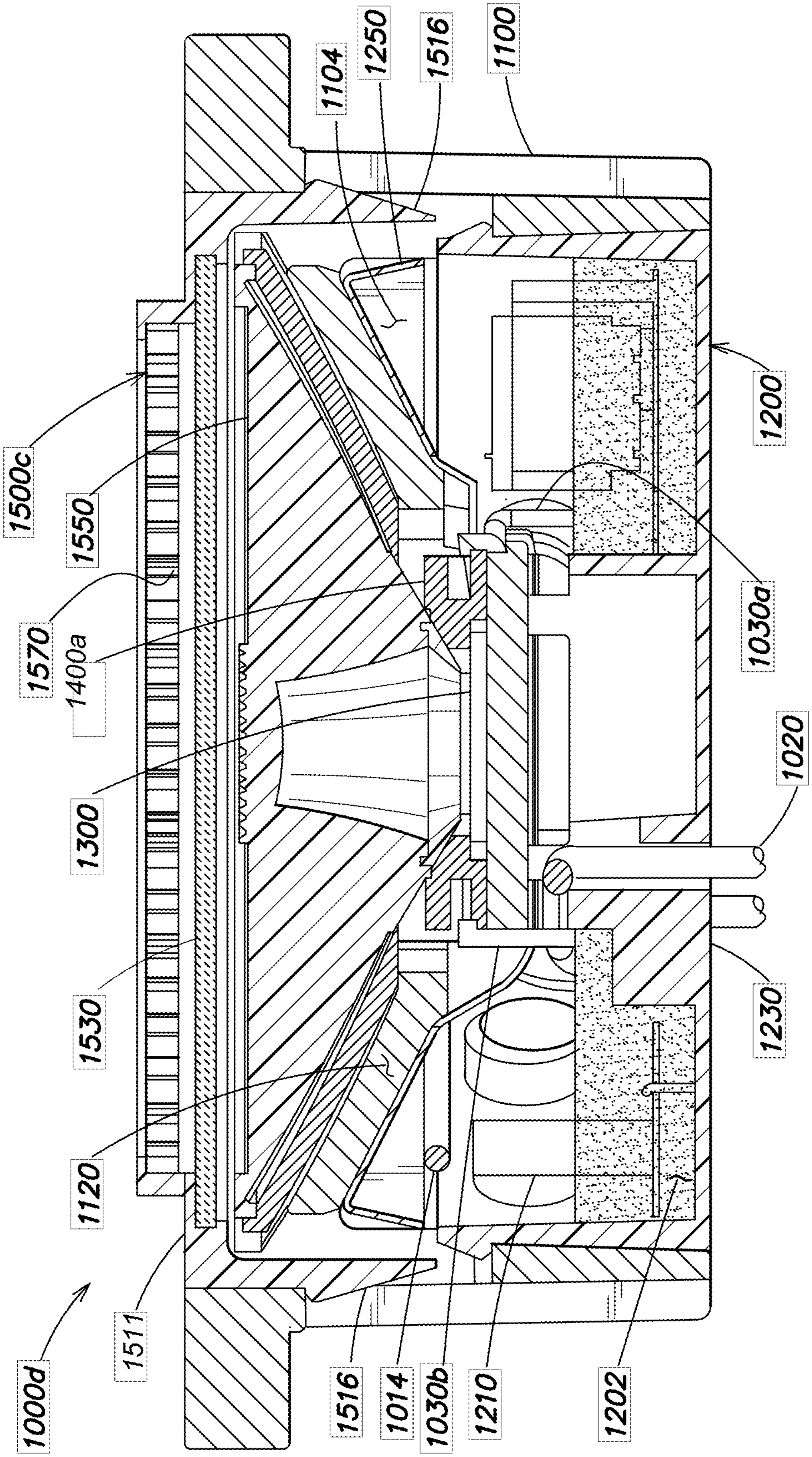
FIG. 15F shows a cross-sectional view of the lighting module corresponding to the plane B-B of FIG. 15B.
Figure 15G:
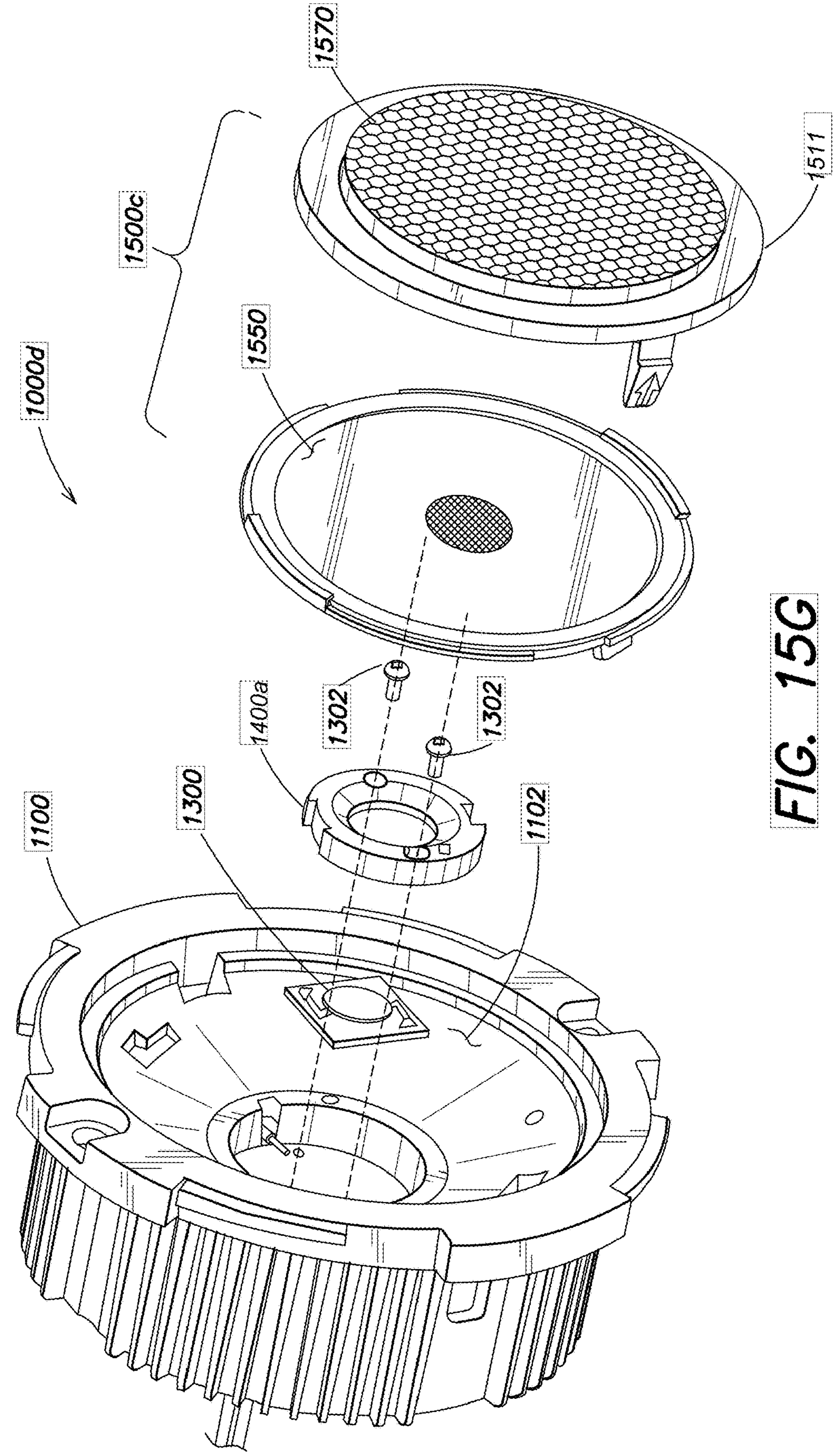
FIG. 15G shows an exploded top perspective view of the lighting module of FIG. 15A.
Figure 15H:
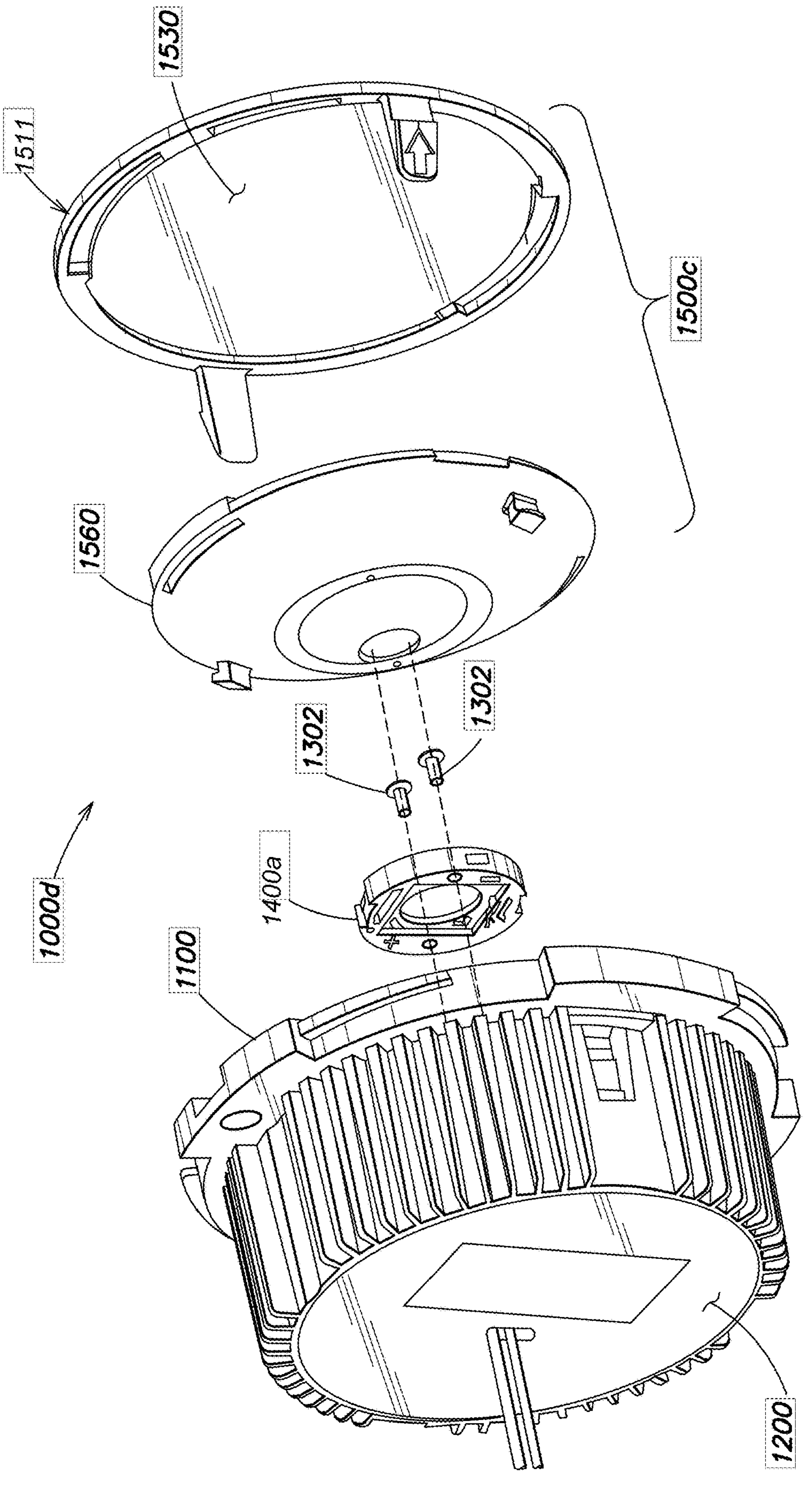
FIG. 15H shows an exploded bottom perspective view of the lighting module of FIG. 15A.
Figure 16A:
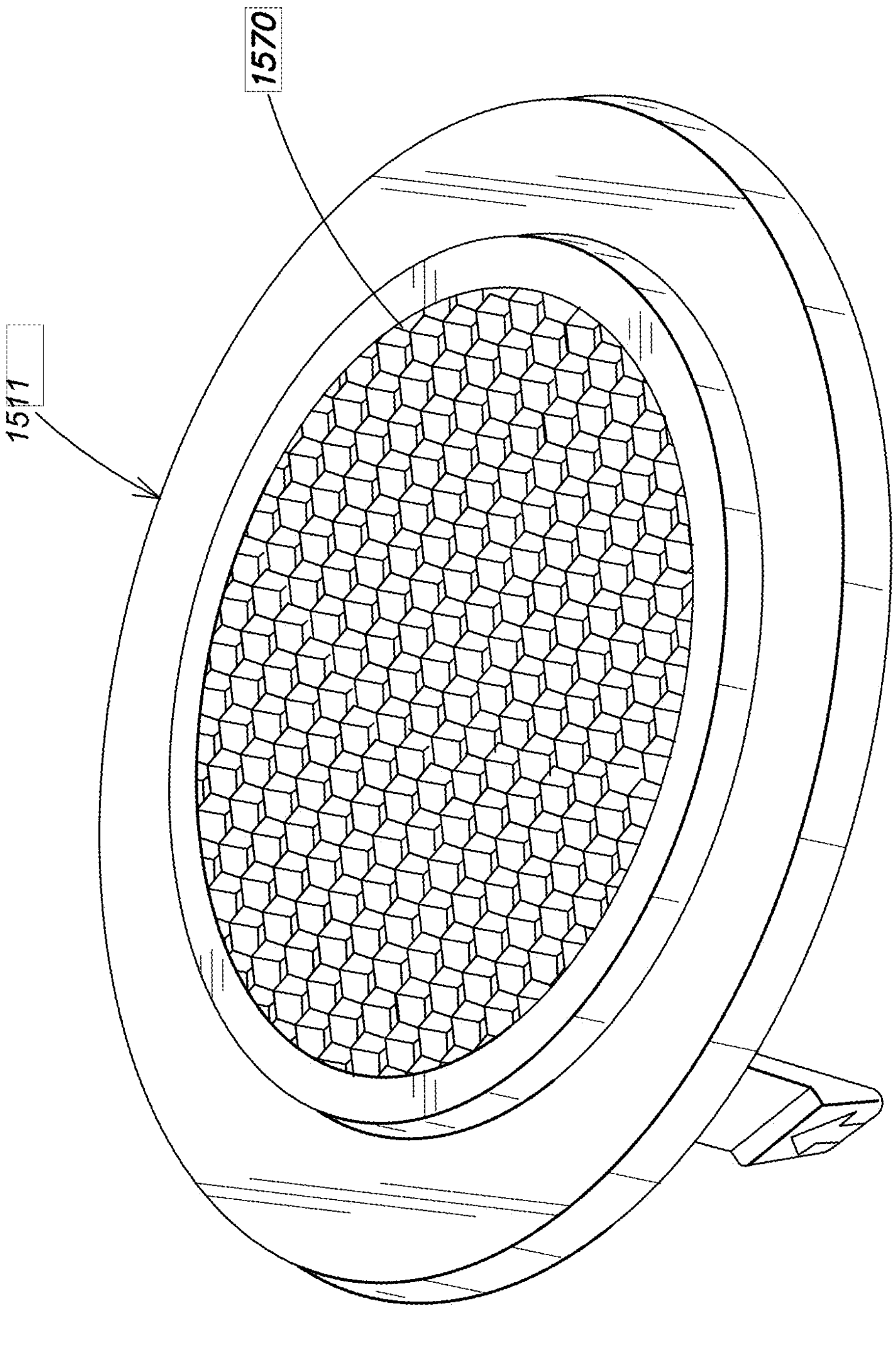
FIG. 16A shows a top perspective view of a portion of the optical assembly in the lighting module of FIG. 15A with the hex louver.
Figure 16B:
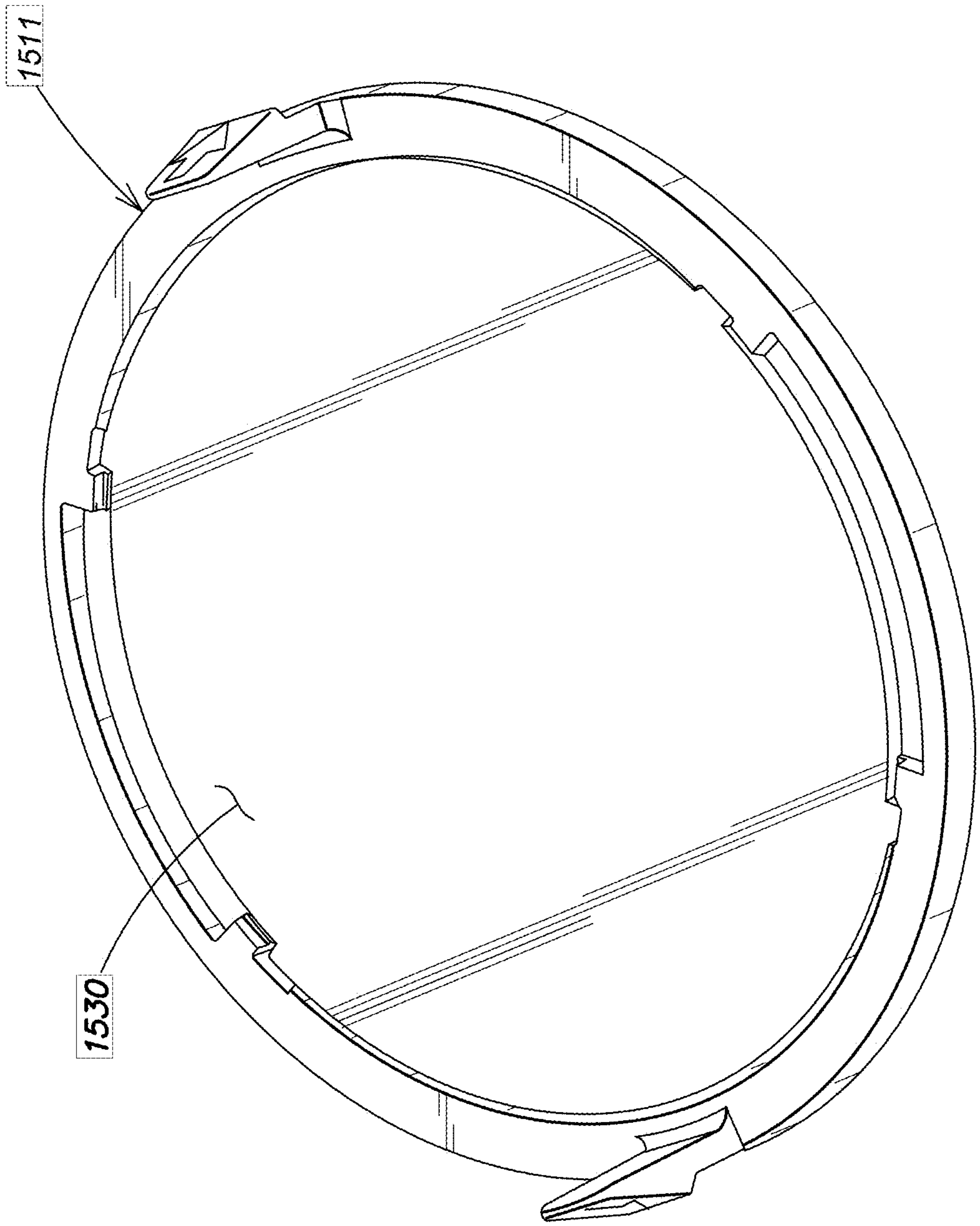
FIG. 16B shows a bottom perspective view of the portion of the optical assembly of FIG. 16A.
Figure 16C:
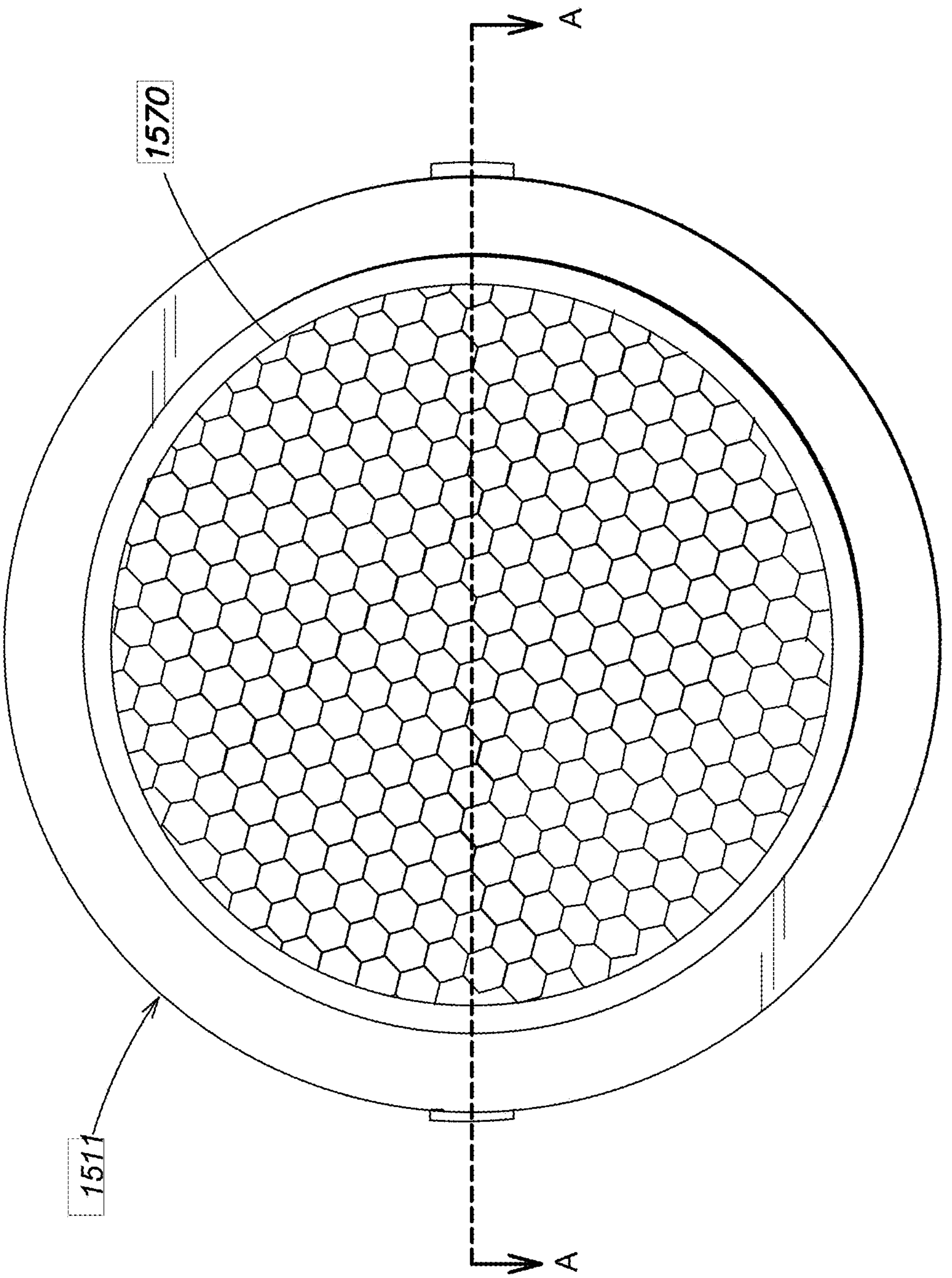
FIG. 16C shows a top view of the portion of the optical assembly of FIG. 16A.
Figure 16D:
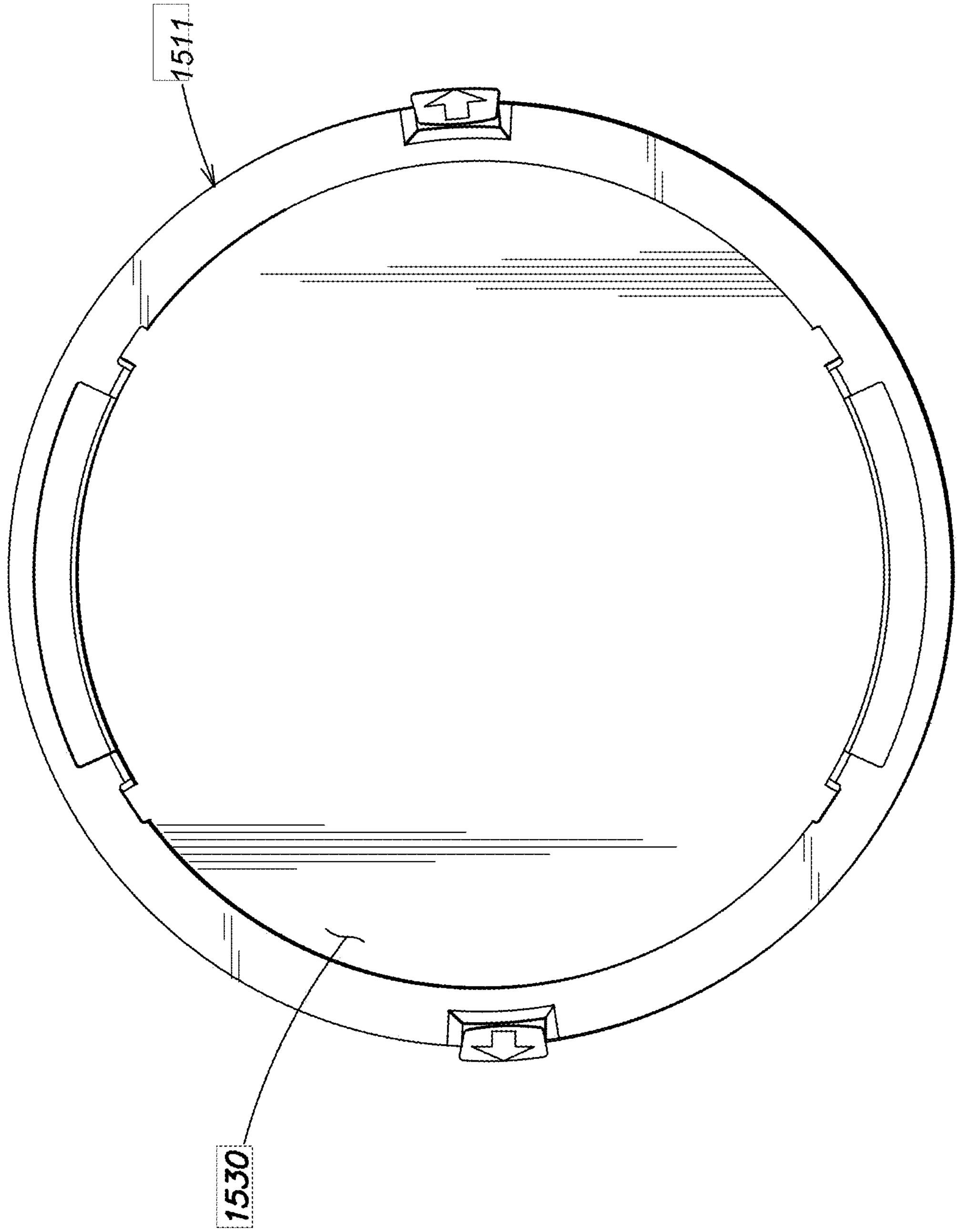
FIG. 16D shows a bottom view of the portion of the optical assembly of FIG. 16A.
Figure 16E:
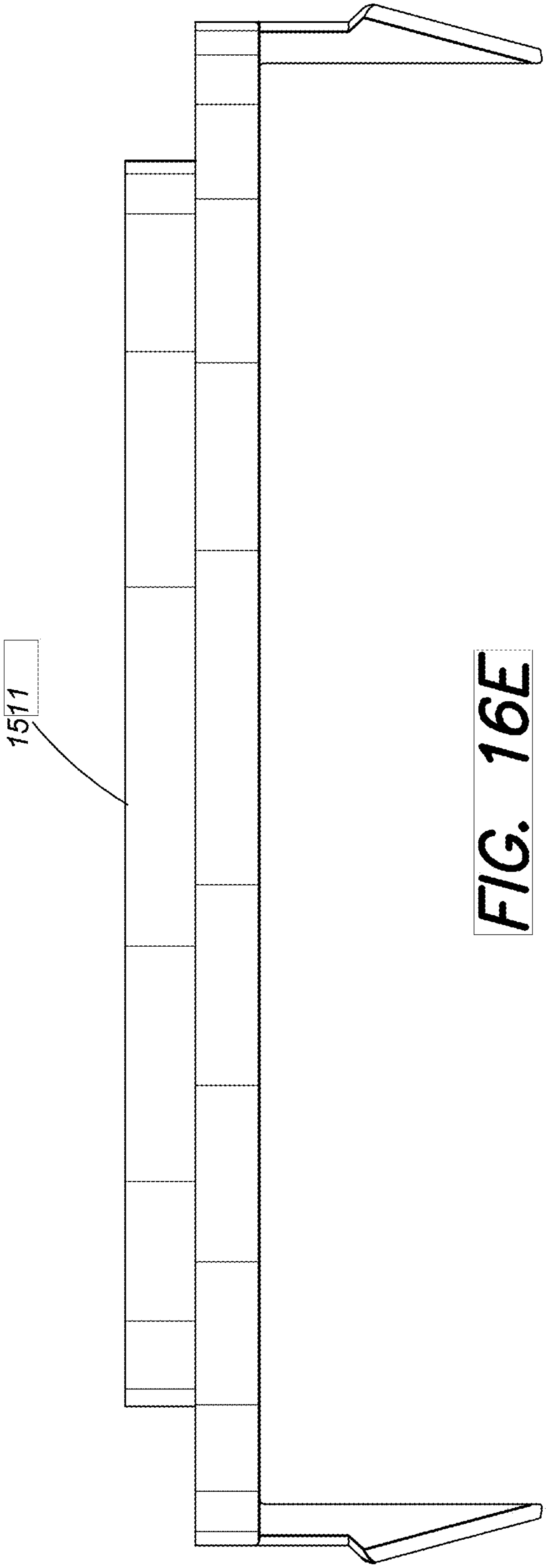
FIG. 16E shows a front view of the portion of the optical assembly of FIG. 16A.
Figure 16F:
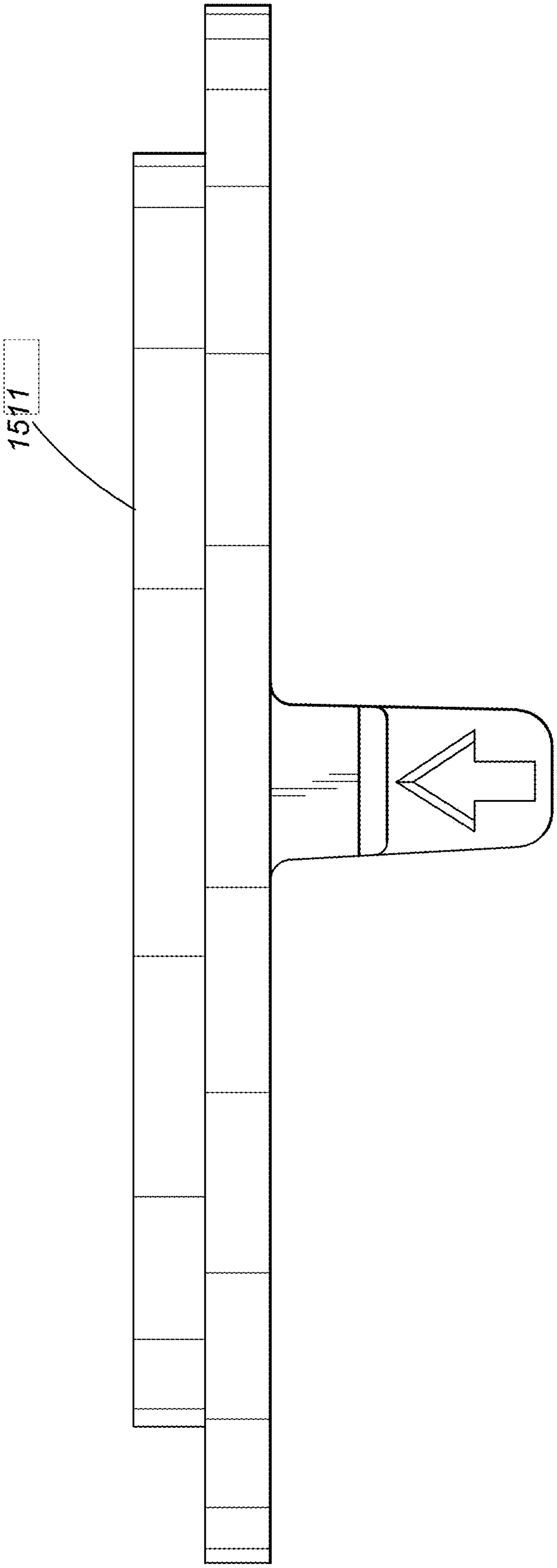
FIG. 16F shows a right-side view of the portion of the optical assembly of FIG. 16A.
Figure 16G:
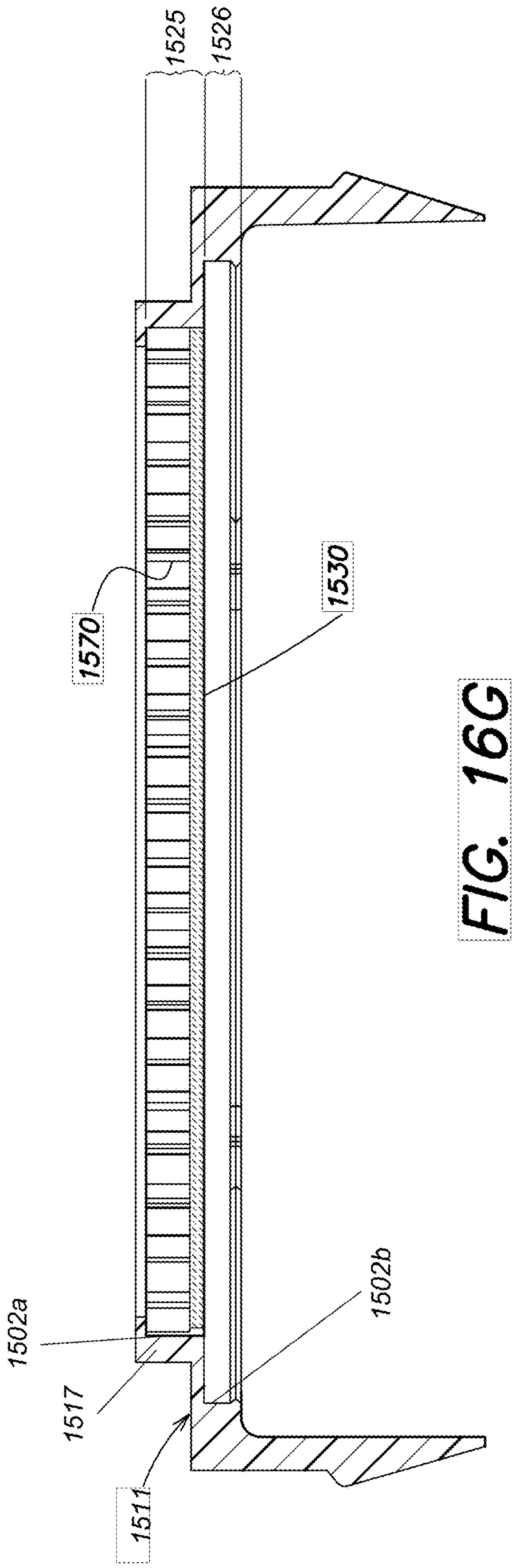
FIG. 16G shows a cross-sectional view of the portion of the optical assembly corresponding to the plane A-A of FIG. 16C.
Figure 16H:
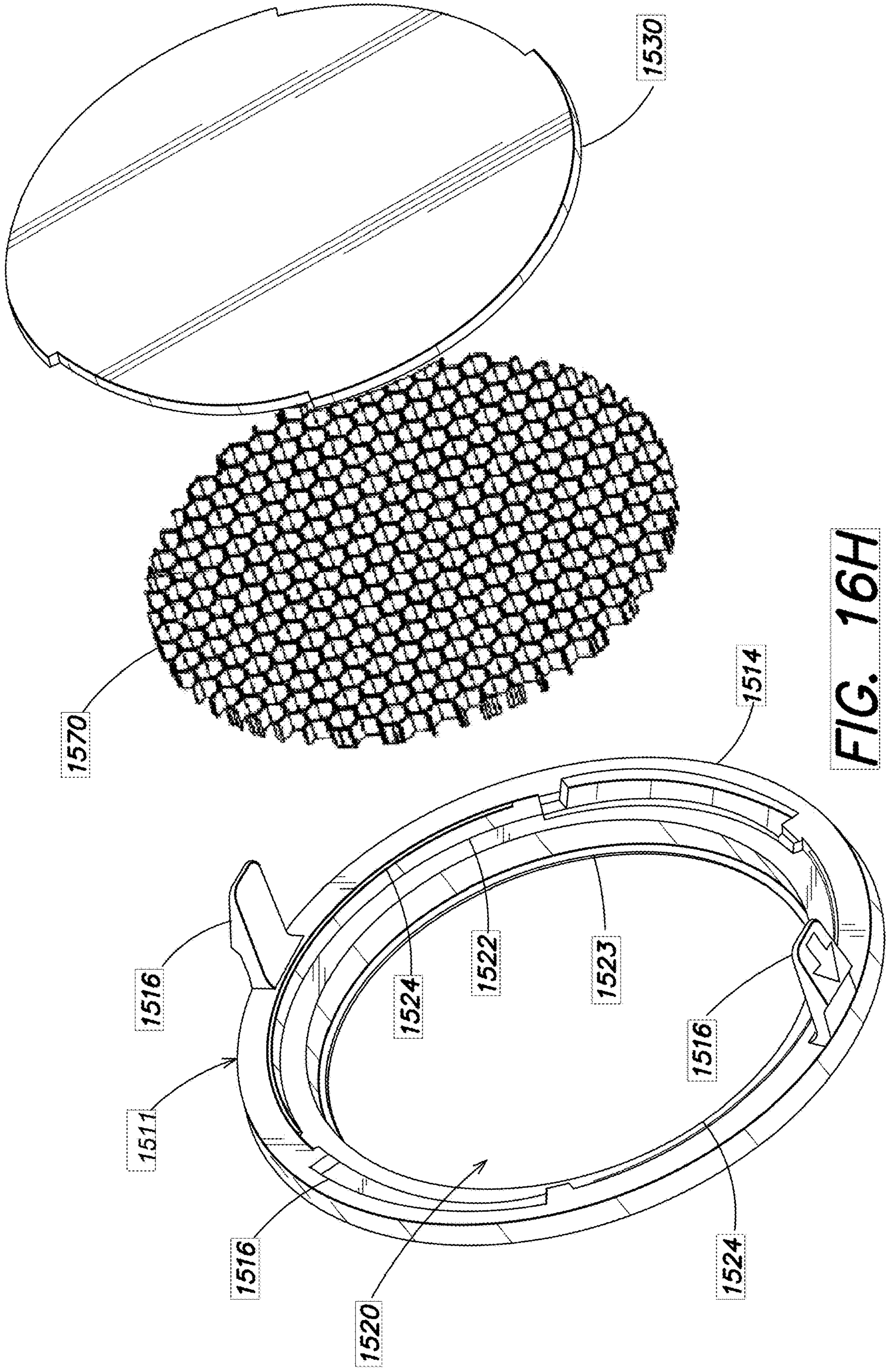
FIG. 16H shows an exploded bottom perspective view of the portion of the optical assembly of FIG. 16A.

FIG. 14 shows another exemplary lighting module 1000*c* that provides one or more internal airways (e.g., airways 1270*a* and 1270*b*) to convectively cool the light source 1300 and/or the driver circuitry 1210. As shown, the lighting module 1000*c* may share several of the same components and structural features as the lighting modules 1000*a* and 1000*b*. For example, the lighting module 1000*c* may include a heat sink 1100 with a partition 1120, a driver module 1200 that includes the circuitry 1210 disposed in a driver housing 1230 with potting material 1202, and a light source 1300. The driver housing 1230 in the lighting module 1000*c*, however, includes an opening 1249 on the base 1234 where the island section 1240 is located in the cavity 1231. This, in turn, forms one or more continuous airways (e.g., airways 1270*a* and 1270*b*) through the lighting module 1000*c*.

When the lighting module 1000*c* is installed into, for example, a ceiling, the airways 1270*a* and 1270*b* may provide a pathway for air to rise upwards through the lighting module 1000*c* as its heated in order to convectively cool the lighting module 1000*c*. In other words, the airways 1270*a* and 1270*b* function as a thermal "chimney" where the air flowing through the lighting module 1000*c* is heated and subsequently rises out of the lighting module 1000*c*.

The flow of air through the lighting module 1000*c* may be initially generated by the heating of stagnant air located within the lighting module 1000*c*. When the stagnant air is heated, the air may then rise due its higher buoyancy out of the lighting module 1000*c* through the opening 1249. This, in turn, generates a pressure gradient along the airways 1270*a* and 1270*b* that causes air from the cooler portions of the ceiling space to flow into the lighting module 1000*c* through openings formed by the snap-fit receivers 1126 on the heat sink 1100.

The cooler air may then flow through the lighting module 1000c along the airways 1270a and 1270b during which the air is heated as it passes along the portions of the partition 1120 heated by the light source 1300, the portions of the circuitry 1210 that generate heat, and/or the portions of the potting material 1202 heated by the circuitry 1210. The heated air may then flow into the island section 1240 of the driver housing 1230 through openings formed between the partition 1120 and the posts 1244 before coming out of the lighting module 1000c through the opening 1249.

A Lighting Module with a Hex Louver

In some implementations, the lighting module may also support an optical assembly configured to reduce glare. The optical assembly may generally incorporate various glare reduction components including, but not limited to, a hex louver, a diffusive optical element that disperses light, and a filter. For example, FIGS. 15A-15H show another exemplary lighting module 1000d with an optical assembly 1500c that includes a hex louver 1570. As shown, the lighting module 1000d may share several of the same components and features as the lighting modules described above including the heat sink 1100, the driver module 1200, the light source 1300, and the light source holder 1400a. The optical assembly 1500c may also include the optical element 1550 and the optic holder 1560 in the lighting module 1500b.

The optical assembly 1500c, however, may include a retaining ring 1511 instead of a cover lens 1510 to support the hex louver 1570. FIGS. 16A-16H show several views of the retaining ring 1511, the optical element 1530, and the hex louver 1570. Similar to the cover lens 1510, the retaining ring 1511 may include a ridge 1514 with one or more snap-fit connectors 1516 to facilitate connection to the heat sink 1100. The ridge 1514 may define a recess 1526 to contain the optical element 1530. In this implementation, however, the retaining ring 1511 may include an opening 1520 defined, in part, by a lip 1522 disposed along the ridge 1514. The lip 1522 may extend from the top of the ridge 1514 to define a recess 1525 where the hex louver 1570 is placed during assembly. To retain the hex louver 1570 in the retaining ring 1511, the retaining ring 1511 may include an additional lip 1523 that extends into the opening 1520 from the lip 1522 to provide a surface that abuts the periphery of the hex louver 1570.

The retaining ring 1511 may also support the optical element 1530 as before. As shown, the retaining ring 1511 may include one or more snap-fit connectors 1524 disposed along the ridge 1514 in order to couple the optical element 1530 to the retaining ring 1511. In some implementations, the hex louver 1570 may not be directly secured to the retaining ring 1511, but instead may be held in place by the optical element 1530. It should be appreciated, however, that in other implementations, the hex louver 1570 may be directly coupled to the retaining ring 1511 using various coupling mechanisms including, but not limited to, a snap-fit connector, a fastener, and an adhesive.

As before, the optical element 1530 may be a film or a flat optic that modifies the spatial and/or angular distribution of the light or filters certain wavelengths of light. In some implementations, an additional filter, such as a color film, may be sandwiched between the retaining ring 1511 and the optical element 1530.

The hex louver 1570 may be a slotted structure where the array of slots is shaped to substantially reduce the amount of light exiting the lighting module 1000d at larger angles in order to reduce glare. The characteristic width and the depth of each slot may be tailored to reduce light within a desired angular range. For example, the hex louver 1570 may be tailored to reduce light that exits the lighting module 1000c at an angle defined relative to an optical axis of the optical assembly 1500c at least about 45 degrees.

As shown, the hex louver 1570 may be formed as an array of hexagonal-shaped slots.

However, it should be appreciated the hex louver 1570 may be substituted for similar glare-reducing arrays with different cross-sectional geometries including, but not limited to, a circle, an ellipse, a square, a triangle, a polygon, and any combinations of the foregoing. The hex louver 1570 may also be formed of a material that reflectors or absorbs light. For example, the hex louver 1570 may be formed from a polished metal (e.g., polished aluminum) or an absorptive material (e.g., anodized aluminum).

Conclusion

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lighting module, comprising:
- a heat sink, comprising:
  - a sidewall having a first opening and a second opening; and
  - a partition joined to the sidewall, the partition and the sidewall together defining a first cavity that is accessible through the first opening and a second cavity that is accessible through the second opening;
- a LED light source, disposed in the first cavity and coupled to the heat sink, to emit light;
- a driver module disposed in the second cavity and coupled to the heat sink, the driver module comprising:
  - a driver housing coupled to the heat sink and enclosing the second cavity of the heat sink, the driver housing defining a driver cavity; and
  - driver circuitry, disposed within the driver cavity of the driver housing, to supply electrical power to the LED light source; and
- an optical assembly, disposed within the first cavity of the heat sink and directly coupled to the heat sink, to redirect the light emitted by the LED light source, the optical assembly comprising:
  - a cover lens removably coupled to the heat sink via a tool-less coupling mechanism and enclosing the first opening of the heat sink.

2. The lighting module of claim 1, wherein the tool-less coupling mechanism comprises:
- a plurality of snap-fit openings disposed on the heatsink; and
- a plurality of snap-fit connectors disposed on the cover lens.

3. The lighting module of claim 1, wherein:
- the tool-less coupling mechanism is a first tool-less coupling mechanism; and
- the optical assembly further comprises:
  - a reflector, directly coupled to the cover lens via a second tool-less coupling mechanism, having a reflector sidewall defining a first reflector opening to receive the light emitted by the LED light source and a second reflector opening through which the light exits the reflector.

4. The lighting module of claim 3, wherein the optical assembly further comprises:
- an optical element, disposed between the cover lens and the reflector and removably coupled to the cover lens via a third tool-less coupling mechanism, to modify at least one of a spatial distribution or an angular distribution of the light.

5. The lighting module of claim 4, wherein:
- the second tool-less coupling mechanism comprises:
  - a plurality of notches disposed on the cover lens; and
  - a first plurality of tabs disposed on the reflector near the second reflector opening, each tab of the first plurality of tabs being coupled to a corresponding notch of the plurality of notches via a snap-fit connection; and
  - the third tool-less coupling mechanism comprises:
  - the plurality of notches; and
  - a second plurality of tabs disposed on the optical element, each tab of the second plurality of tabs being coupled to a corresponding notch of the plurality of notches via a snap-fit connection.

6. The lighting module of claim 1, wherein:
- the tool-less coupling mechanism is a first tool-less coupling mechanism; and
- the optical assembly further comprises:
  - an optic holder directly coupled to the heat sink via a second tool-less coupling mechanism, the optic holder being coupled to the heat sink separately from the cover lens; and
  - an optical lens directly coupled to the optic holder and disposed between the LED light source and the cover lens.

7. The lighting module of claim 6, wherein the second tool-less coupling mechanism comprises:

at least one twist and lock receiver disposed on the heat sink; and at least one twist and lock connector disposed on the optic holder and engaged to the at least one twist and lock receiver, the at least one twist and lock connector disengaging the at least one twist and lock receiver when the optic holder is rotated relative to the heat sink thereby allowing removal of the optic holder from the heat sink.

8. The lighting module of claim 6, wherein the optical lens is coupled to the optic holder such that removal of the cover lens from the heat sink does not affect an alignment of the optical lens.

9. The lighting module of claim 1, wherein the driver circuitry receives an alternating current (AC) to power the LED light source and a control signal to adjust at least one of a brightness of the light emitted by the LED light source or a correlated color temperature (CCT) of the light.

10. The lighting module of claim 9, wherein:

the AC comprises an AC waveform with a first half cycle and a second half cycle;

the control signal is encoded into at least one of the first half cycle or the second half cycle; and the driver circuitry comprises:

a controller to decode the AC waveform and obtain the control signal.

11. The lighting module of claim 1, wherein the driver circuitry receives a direct current (DC) to power the LED light source and a control signal to adjust at least one a brightness of the light emitted by the LED light source or a correlated color temperature (CCT) of the light.

12. The lighting module of claim 1, wherein:

the tool-less coupling mechanism is a first tool-less coupling mechanism; and the optical assembly further comprises:

an optical element, removably coupled to the cover lens via a second tool-less coupling mechanism, to modify at least one of a spatial distribution or an angular distribution of the light.

13. The lighting module of claim 12, wherein the optical element is at least one of a diffuser or a filter.

14. The lighting module of claim 1, wherein the light redirected by the optical assembly has a beam angle equal to one of about 15 degrees, about 25 degrees, about 40 degrees, or about 60 degrees.

15. A lighting module, comprising:

a heat sink defining a cavity with an opening;

a LED light source, disposed in the cavity of the heat sink, to emit light;

a driver module, comprising:

driver circuitry to supply electrical power to the LED light source; and a driver housing, coupled to the heat sink and supporting the driver circuitry, to provide an electrically insulating barrier separating the driver circuitry from the heat sink; and an optical assembly, disposed within the cavity of the heat sink and coupled to the heat sink, to redirect the light emitted by the LED light source, the optical assembly comprising:

an optic holder disposed entirely within the cavity and coupled to the heat sink via a tool-less coupling mechanism; and an optical lens disposed entirely within the cavity and directly coupled to the optic holder.

16. The lighting module of claim 15, wherein:

the tool-less coupling mechanism is a first tool-less coupling mechanism; and the optical assembly further comprises:

a cover lens removably coupled to the heat sink via a second tool-less coupling mechanism and enclosing the opening of the heat sink.

17. The lighting module of claim 16, wherein the second tool-less coupling mechanism comprises:

a plurality of snap-fit openings disposed on the heat sink; and a plurality of snap-fit connectors disposed on the cover lens.

18. The lighting module of claim 15, wherein the heat sink comprises:

a sidewall with a plurality of fins; and a flange, coupled to the sidewall, having one or more twist-and-lock connectors configured to couple a trim to the heat sink.

19. The lighting module of claim 15, wherein:

the driver circuitry receives alternating current (AC) to power the LED light source and a control signal to adjust at least one of a brightness of the light emitted by the LED light source or a correlated color temperature (CCT) of the light;

the AC comprises an AC waveform with a first half cycle and a second half cycle;

the control signal is encoded into at least one of the first half cycle or the second half cycle; and the driver circuitry comprises:

a controller to decode the AC waveform and obtain the control signal.

20. A lighting module, comprising:

a heat sink comprising a sidewall having an opening and defining a first cavity that is accessible through the opening;

a LED light source, disposed in the first cavity and coupled to the heat sink, to emit light passing through the opening;

a driver module, comprising:

a driver housing coupled to the heat sink and defining a second cavity; and driver circuitry, disposed within the second cavity of the driver housing, to supply electrical power to the LED light source; and an optical assembly, disposed within the first cavity and coupled to the heat sink, to redirect the light emitted by the LED light source, the optical assembly comprising:

a cover lens removably coupled to the heat sink via a first tool-less coupling mechanism and enclosing the opening of the heat sink;

an optic holder directly coupled to the heat sink via a second tool-less coupling mechanism, the optic holder being coupled to the heat sink separately from the cover lens; and an optical lens directly coupled to the optic holder and disposed between the LED light source and the cover lens, wherein the optical lens is coupled to the optic holder such that removal of the cover lens from the heat sink does not affect an alignment of the optical lens.

* * * * *